(12) United States Patent
Yoshitsugu et al.

(10) Patent No.: US 8,300,318 B2
(45) Date of Patent: *Oct. 30, 2012

(54) ZOOM LENS SYSTEM, IMAGING DEVICE AND CAMERA

(75) Inventors: Keiki Yoshitsugu, Hyogo (JP); Takakazu Bito, Osaka (JP)

(73) Assignee: Panasonic Corporation, Osaka (JP)

( * ) Notice: Subject to any disclaimer, the term of this patent is extended or adjusted under 35 U.S.C. 154(b) by 164 days.

This patent is subject to a terminal disclaimer.

(21) Appl. No.: 12/864,900

(22) PCT Filed: Jan. 21, 2009

(86) PCT No.: PCT/JP2009/000198
§ 371 (c)(1),
(2), (4) Date: Jul. 28, 2010

(87) PCT Pub. No.: WO2009/096156
PCT Pub. Date: Aug. 6, 2009

(65) Prior Publication Data
US 2010/0328500 A1    Dec. 30, 2010

(30) Foreign Application Priority Data

Jan. 28, 2008 (JP) .................................. 2008-015987
Dec. 10, 2008 (JP) .................................. 2008-315079

(51) Int. Cl.
*G02B 15/14* (2006.01)
*G02B 27/64* (2006.01)
(52) U.S. Cl. ................. 359/682; 359/557; 359/689
(58) Field of Classification Search .......... 359/680–682, 359/689, 554, 557
See application file for complete search history.

(56) References Cited

U.S. PATENT DOCUMENTS

| 6,191,896 | B1 | 2/2001 | Itoh |
| 6,233,099 | B1 | 5/2001 | Itoh |
| 7,212,349 | B2 * | 5/2007 | Mitsuki .................... 359/682 |
| 8,004,772 | B2 * | 8/2011 | Yoshitsugu et al. .......... 359/682 |

(Continued)

FOREIGN PATENT DOCUMENTS

| JP | 10-104520 A | 4/1998 |
| JP | 11-084243 A | 3/1999 |
| JP | 2005-140916 A | 6/2005 |
| JP | 2006-065034 A | 3/2006 |

(Continued)

OTHER PUBLICATIONS

International Search Report for PCT/JP2009/000198 dated Mar. 31, 2009.

*Primary Examiner* — Scott J Sugarman
(74) *Attorney, Agent, or Firm* — Pearne & Gordon LLP

(57) ABSTRACT

A zoom lens system of the present invention has a plurality of lens units each composed of at least one lens element and, in order from the object side to the image side, comprises: a first lens unit having negative optical power and composed of two lens elements; a second lens unit having positive optical power; and a third lens unit having positive optical power, wherein in zooming from a wide-angle limit to a telephoto limit during image taking, the individual lens units are moved along an optical axis such that an interval between the first lens unit and the second lens unit should decrease and that an interval between the second lens unit and the third lens unit should increase, so that magnification change is achieved, and wherein on the image side relative to the second lens unit, an aperture diaphragm is arranged that moves along the optical axis integrally with the second lens unit during zooming.

12 Claims, 76 Drawing Sheets

U.S. PATENT DOCUMENTS

| | | |
|---|---|---|
| 8,089,701 B2 * | 1/2012 | Yoshitsugu et al. .......... 359/682 |
| 2005/0185287 A1 | 8/2005 | Sekita |
| 2005/0275951 A1 * | 12/2005 | Otake .......................... 359/689 |
| 2006/0114574 A1 | 6/2006 | Sekita |
| 2006/0215275 A1 | 9/2006 | Ori |
| 2006/0262423 A1 | 11/2006 | Kiyotoshi |
| 2007/0211350 A1 | 9/2007 | Kurioka |
| 2008/0062532 A1 * | 3/2008 | Iwama ......................... 359/689 |

FOREIGN PATENT DOCUMENTS

| | | |
|---|---|---|
| JP | 2006-084829 A | 3/2006 |
| JP | 2006-208890 A | 8/2006 |
| JP | 2006-267677 A | 10/2006 |
| JP | 2006-301154 A | 11/2006 |
| JP | 2007-121748 A | 5/2007 |
| JP | 2007-272216 A | 10/2007 |

* cited by examiner

ZOOM LENS SYSTEM, IMAGING DEVICE AND CAMERA

TECHNICAL FIELD

The present invention relates to a zoom lens system, an imaging device and a camera. In particular, the present invention relates to: a zoom lens system that has not only a high resolution but also a reduced overall optical length (overall length of lens system) and a variable magnification ratio as high as approximately 5 and that has a view angle of approximately 70° at a wide-angle limit and hence is satisfactorily adaptable for wide-angle image taking; an imaging device employing this zoom lens system; and a thin and remarkably compact camera employing this imaging device.

BACKGROUND ART

With recent progress in the development of solid-state image sensors such as a CCD (Charge Coupled Device) and a CMOS (Complementary Metal-Oxide Semiconductor) having a high pixel, digital still cameras and digital video cameras (simply referred to as "digital cameras", hereinafter) are rapidly spreading that employ an imaging device including an imaging optical system of high optical performance corresponding to the above-mentioned solid-state image sensors of a high pixel. Among these digital cameras of high optical performance, demands are increasing especially for digital cameras of compact type.

In digital cameras of compact type described above, from the perspective of easiness in carrying and accommodation, further thickness reduction is required. For the purpose of realizing such compact and thin digital cameras, in the conventional art, variable zoom lens systems have been proposed that have a three-unit construction of negative lead type, in order from the object side to the image side, comprising a first lens unit having negative optical power, a second lens unit having positive optical power and a third lens unit having positive optical power and that have a reduced overall optical length (overall length of lens system: the distance measured from the vertex of a lens surface on the most object side in the entire lens system to the image surface).

For example, Japanese Patent Publication No. 3513369 discloses a zoom lens which, in order from the object side to the image side, comprises three lens units of negative, positive and positive and in which: at a telephoto limit in comparison with a wide-angle limit, the individual lens units are moved such that the interval between first and second lens units and the interval between second and third lens units should decrease so that magnification change is achieved; the first lens unit is composed of two lenses of negative and positive; the second lens unit is composed of independent two lenses of positive and negative; the third lens unit is composed of one positive lens; and a particular relation is satisfied by the radius of curvature of the object side surface of the negative lens contained in the second lens unit and the focal length of the entire system at a wide-angle limit. In this zoom lens disclosed in Japanese Patent Publication No. 3513369, overall optical length is reduced, and still high optical performance is obtained over the entire variable magnification range.

Further, Japanese Laid-Open Patent Publication No. 2006-301154 discloses a zoom lens which, in order from the object side to the image side, comprises three lens units of negative, positive and positive and in which: the intervals between the individual lens units vary at the time of magnification change; particular relations are satisfied respectively by the taken-image height and the focal length of the entire system at a wide-angle limit, by the axial interval between the first and the second lens units and the focal length of the first lens unit, and by the axial interval between the first and the second lens units and the focal length of the second lens unit; and a variable magnification ratio that falls within a particular range is obtained. This zoom lens disclosed in Japanese Laid-Open Patent Publication No. 2006-301154 has a wide view angle at a wide-angle limit as well as a relatively high variable magnification ratio.

Moreover, Japanese Laid-Open Patent Publication No. 2006-065034 discloses a zoom lens which, in order from the object side to the image side, comprises three lens units of negative, positive and positive and in which: the intervals between the individual lens units vary at the time of magnification change; the first lens unit is composed of two lenses of negative and positive; the second lens unit is constructed from a 2a-th lens unit composed of two lenses of positive and negative and a 2b-th lens unit composed of at least one positive lens arranged on the image side relative to the 2a-th lens unit; the third lens unit is composed of at least one positive lens; and particular relations are satisfied by the imaging magnifications of the second lens unit at a wide-angle limit and a telephoto limit, the interval between the first and the second lens units at a wide-angle limit, and the interval between the second and the third lens units at a telephoto limit. This zoom lens disclosed in Japanese Laid-Open Patent Publication No. 2006-065034 achieves desired optical performance and still has a reduced number of component lenses and relative compactness.

Patent Document 1: Japanese Patent Publication No. 3513369
Patent Document 2: Japanese Laid-Open Patent Publication No. 2006-301154
Patent Document 3: Japanese Laid-Open Patent Publication No. 2006-065034

DISCLOSURE OF THE INVENTION

Problems to be Solved by the Invention

The above-mentioned zoom lens disclosed in Japanese Patent Publication No. 3513369 has high optical performance, a view angle as wide as 65° to 75° at a wide-angle limit, and a reduced overall optical length. This permits further thickness reduction in digital cameras of compact type. Nevertheless, the zoom lens has as small a variable magnification ratio as approximately 3, and hence does not satisfy a requirement in digital cameras of compact type in recent years.

Further, the zoom lens disclosed in Japanese Laid-Open Patent Publication No. 2006-301154 has a sufficient view angle for wide-angle image taking and a higher variable magnification ratio than the zoom lens disclosed in Japanese Patent Publication No. 3513369. Nevertheless, in this lens configuration, the amount of movement of the second lens unit along the optical axis at the time of magnification change is large. Thus, the overall optical length increases, and hence further thickness reduction cannot be achieved in digital cameras of compact type.

Moreover, similarly to the zoom lens disclosed in Japanese Patent Publication No. 3513369, the zoom lens disclosed in Japanese Laid-Open Patent Publication No. 2006-065034 achieves desired optical performance and still has a sufficient view angle for wide-angle image taking and a reduced overall optical length. This permits further thickness reduction in digital cameras of compact type. Nevertheless, this zoom lens has as small a variable magnification ratio as approximately 3, and hence does not satisfy a requirement in digital cameras of compact type in recent years.

An object of the present invention is to provide: a zoom lens system that has not only a high resolution but also a reduced overall optical length and a variable magnification ratio as high as approximately 5 and that has a view angle of approximately 70° at a wide-angle limit and hence is satisfactorily adaptable for wide-angle image taking; an imaging device employing this zoom lens system; and a thin and remarkably compact camera employing this imaging device.

Solution to the Problems

One of the above-mentioned objects is achieved by the following zoom lens system. That is, the present invention relates to a zoom lens system having a plurality of lens units each composed of at least one lens element and, in order from an object side to an image side, comprising:

a first lens unit having negative optical power and composed of two lens elements;

a second lens unit having positive optical power; and a third lens unit having positive optical power, wherein in zooming from a wide-angle limit to a telephoto limit during image taking, the individual lens units are moved along an optical axis such that an interval between the first lens unit and the second lens unit should decrease and that an interval between the second lens unit and the third lens unit should increase, so that magnification change is achieved, and wherein on the image side relative to the second lens unit, an aperture diaphragm is arranged that moves along the optical axis integrally with the second lens unit during zooming.

One of the above-mentioned objects is achieved by the following imaging device. That is, the present invention relates to an imaging device capable of outputting an optical image of an object as an electric image signal, comprising:

a zoom lens system that forms the optical image of the object; and an image sensor that converts the optical image formed by the zoom lens system into the electric image signal, wherein the zoom lens system has a plurality of lens units each composed of at least one lens element and, in order from an object side to an image side, comprises:

a first lens unit having negative optical power and composed of two lens elements;

a second lens unit having positive optical power; and a third lens unit having positive optical power, wherein in zooming from a wide-angle limit to a telephoto limit during image taking, the individual lens units are moved along an optical axis such that an interval between the first lens unit and the second lens unit should decrease and that an interval between the second lens unit and the third lens unit should increase, so that magnification change is achieved, and wherein on the image side relative to the second lens unit, an aperture diaphragm is arranged that moves along the optical axis integrally with the second lens unit during zooming.

One of the above-mentioned objects is achieved by the following camera. That is, the present invention relates to a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein the zoom lens system has a plurality of lens units each composed of at least one lens element and, in order from an object side to an image side, comprises:

a first lens unit having negative optical power and composed of two lens elements;

a second lens unit having positive optical power; and a third lens unit having positive optical power, wherein in zooming from a wide-angle limit to a telephoto limit during image taking, the individual lens units are moved along an optical axis such that an interval between the first lens unit and the second lens unit should decrease and that an interval between the second lens unit and the third lens unit should increase, so that magnification change is achieved, and wherein on the image side relative to the second lens unit, an aperture diaphragm is arranged that moves along the optical axis integrally with the second lens unit during zooming.

Effect of the Invention

According to the present invention, a zoom lens system is provided that has not only a high resolution but also a reduced overall optical length and a variable magnification ratio as high as approximately 5 and that has a view angle of approximately 70° at a wide-angle limit and hence is satisfactorily adaptable for wide-angle image taking. Further, the present invention provides: an imaging device employing this zoom lens system; and a thin and remarkably compact camera employing this imaging device.

DESCRIPTION OF THE REFERENCE CHARACTERS

Figure 1:
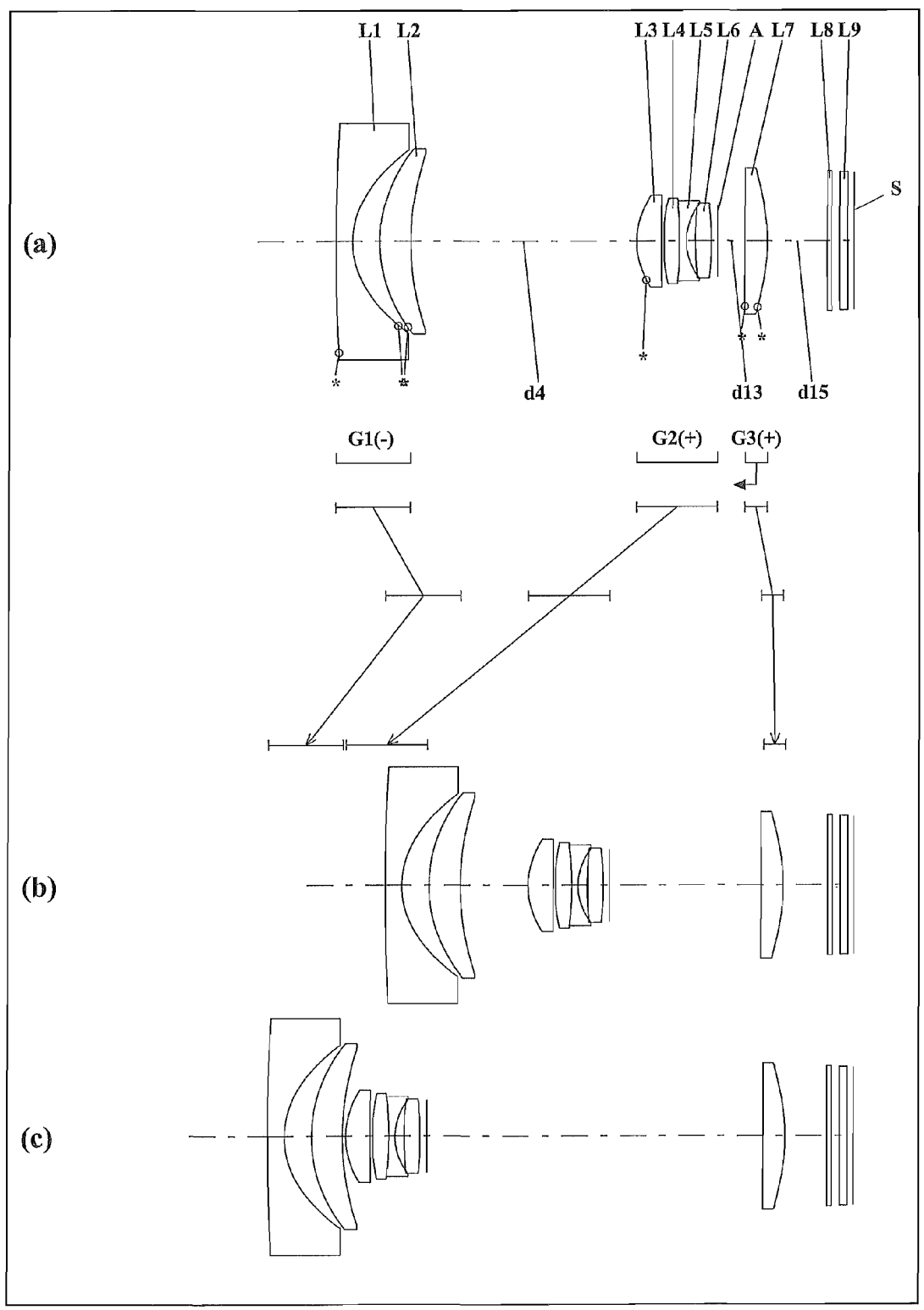
FIG. 1 is a lens arrangement diagram showing an infinity in-focus condition of a zoom lens system according to Embodiment 1 (Example 1).
Figure 2:
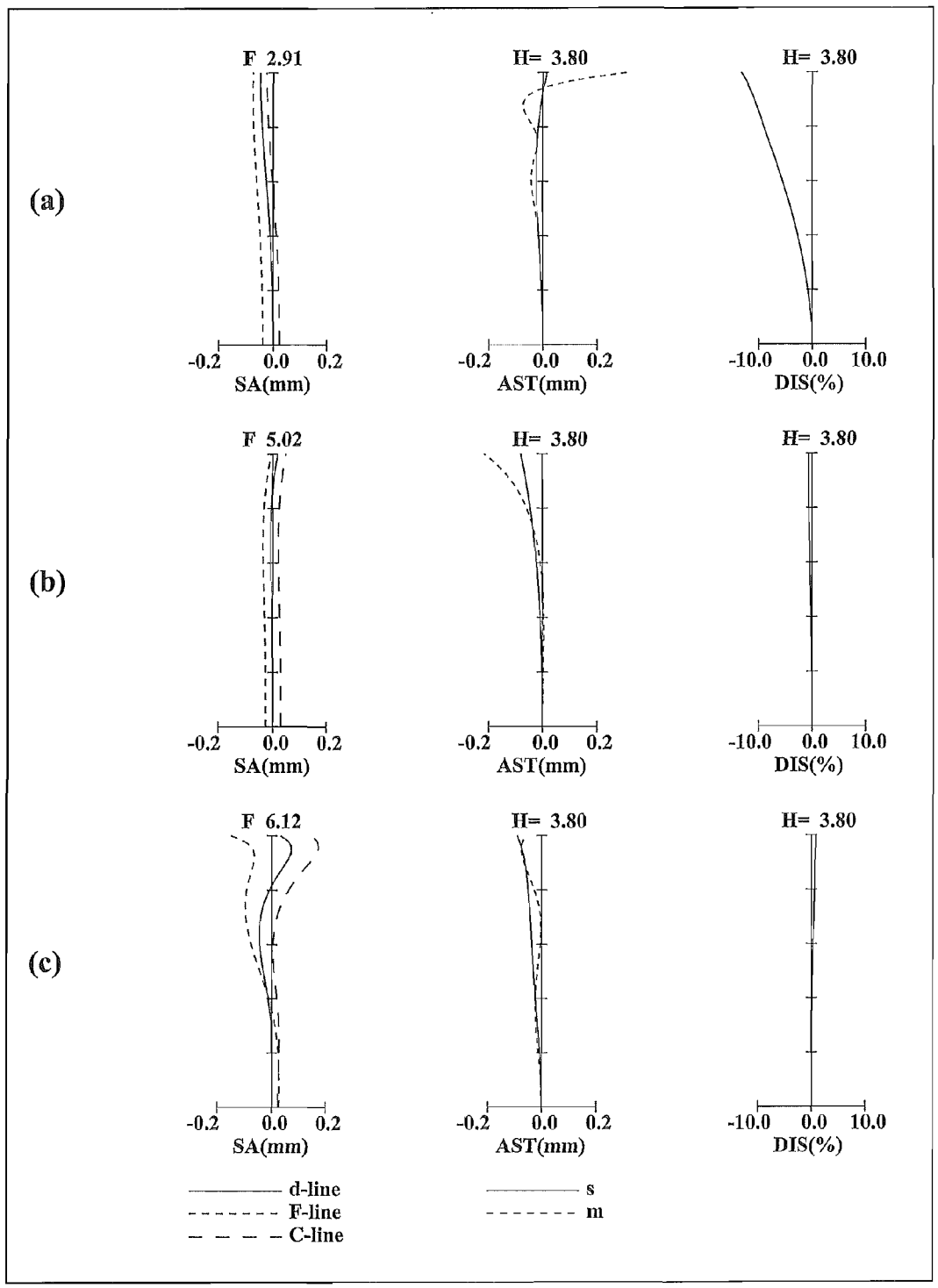
FIG. 2 is a longitudinal aberration diagram of an infinity in-focus condition of a zoom lens system according to Example 1.
Figure 3:
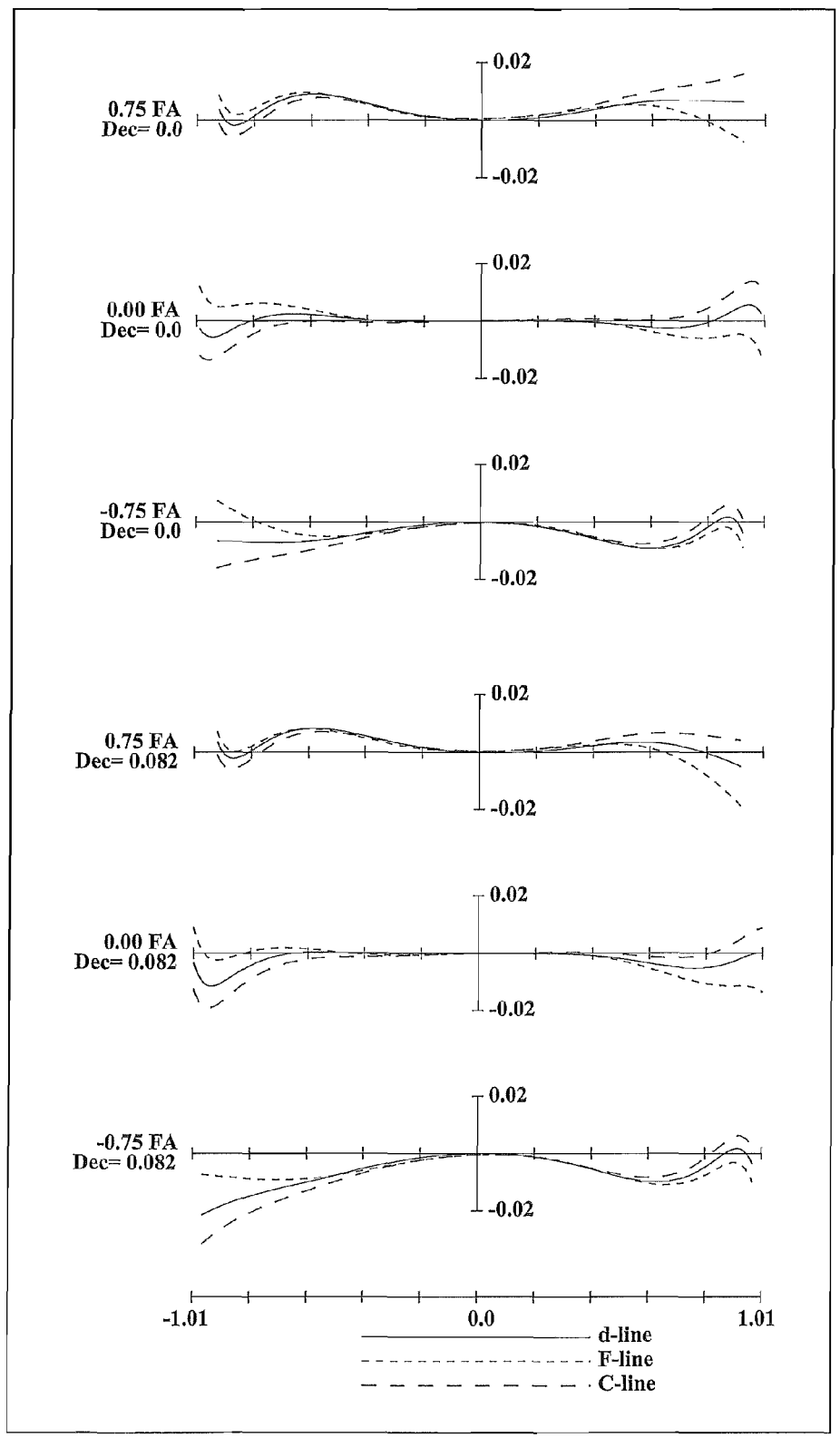
FIG. 3 is a lateral aberration diagram of a zoom lens system according to Example 1 at a telephoto limit in a basic state where image blur compensation is not performed and in a blur compensation state.

G1 First lens unit
G2 Second lens unit
G3 Third lens unit
L1 First lens element
L2 Second lens element
L3 Third lens element
L4 Fourth lens element
L5 Fifth lens element
L6 Sixth lens element
L7 Seventh lens element, Plane parallel plate
L8 Plane parallel plate
L9 Plane parallel plate
A Aperture diaphragm
S Image surface
1 Zoom lens system
2 Image sensor
3 Liquid crystal display monitor
4 Body
5 Main barrel
6 Moving barrel
7 Cylindrical cam

BEST MODE FOR CARRYING OUT THE INVENTION (Embodiments 1 to 25)

FIGS. 1, 4, 7, 10, 13, 16, 19, 22, 25, 28, 31, 34, 37, 40, 43, 46, 49, 52, 55, 58, 61, 64, 67, 70 and 73 are lens arrangement diagrams of zoom lens systems according to Embodiments 1 to 25, respectively.

Each of FIGS. 1, 4, 7, 10, 13, 16, 19, 22, 25, 28, 31, 34, 37, 40, 43, 46, 49, 52, 55, 58, 61, 64, 67, 70 and 73 shows a zoom lens system in an infinity in-focus condition. In each FIG., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each FIG., each bent arrow located between part (a) and part (b) indicates a line obtained by connecting the positions of each lens unit respectively at, in order from the upper, a wide-angle limit, a middle position and a telephoto limit. Thus, in the part between the wide-angle limit and the middle position and the part between the middle position and the telephoto limit, the positions are connected simply with a straight line, and hence this line does not indicate actual motion of each lens unit. Moreover, in each FIG., an arrow imparted to a lens unit indicates focusing from an infinity in-focus condition to a close-object in-focus condition. That is, the arrow indicates the moving direction at the time of focusing from an infinity in-focus condition to a close-object in-focus condition.

The zoom lens system according to each embodiment, in order from the object side to the image side, comprises a first lens unit G1 having negative optical power, a second lens unit G2 having positive optical power and a third lens unit G3 having positive optical power. Then, in zooming from a wide-angle limit to a telephoto limit during image taking, the individual lens units move along the optical axis such that the interval between the first lens unit G1 and the second lens unit G2 should decrease and that the interval between the second lens unit G2 and the third lens unit G3 should increase (this lens configuration is referred to as the basic configuration of the embodiment, hereinafter). In the zoom lens system according to each embodiment, when these lens units are arranged in a desired optical power configuration, high optical performance is obtained and still size reduction is achieved in the entire lens system.

Further, in FIGS. 1, 4, 7, 10, 13, 16, 19, 22, 25, 28, 31, 34, 37, 40, 43, 46, 49, 52, 55, 58, 61, 64, 67, 70 and 73, an asterisk * imparted to a particular surface indicates that the surface is aspheric. In each FIG., symbol (+) or (−) imparted to the symbol of each lens unit corresponds to the sign of the optical power of the lens unit. In each FIG., the straight line located on the most right-hand side indicates the position of the image surface S. On the object side relative to the image surface S (that is, between the image surface S and the most image side lens surface of the third lens unit G3), a plane parallel plate such as an optical low-pass filter and a face plate of an image sensor is provided.

Moreover, in FIGS. 1, 4, 7, 10, 13, 16, 19, 22, 25, 28, 31, 34, 37, 40, 43, 46, 49, 52, 55, 58, 61, 64, 67, 70 and 73, an aperture diaphragm A is provided on the image side relative to the second lens unit G2 (that is, between the most image side lens surface of the second lens unit G2 and the most object side lens surface of the third lens unit G3). In zooming from a wide-angle limit to a telephoto limit during image taking, the aperture diaphragm A moves along the optical axis integrally with the second lens unit G2. As such, in the zoom lens system according to each embodiment, on the image side relative to the second lens unit G2, the aperture diaphragm A is arranged that moves along the optical axis integrally with the second lens unit G2 during zooming from a wide-angle limit to a telephoto limit in image taking. This permits length reduction in the air space between the first lens unit G1 and the second lens unit G2. As a result, in spite of being a three-unit construction of negative lead type, a reduced overall optical length and a variable magnification ratio as high as approximately 5 are achieved simultaneously.

As shown in FIG. 1, in the zoom lens system according to Embodiment 1, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces, while the second lens element L2 has an aspheric object side surface.

Further, in the zoom lens system according to Embodiment 1, the second lens unit G2, in order from the object side to the image side, comprises: a positive meniscus third lens element L3 with the convex surface facing the object side; a bi-convex fourth lens element L4; a bi-concave fifth lens element L5; and a bi-convex sixth lens element L6. Among these, the fourth lens element L4 and the fifth lens element L5 are cemented with each other. In the surface data in the corresponding numerical example described later, surface number 8 indicates the cement layer between the fourth lens elements L4 and the fifth lens element L5. Further, the third lens element L3 has an aspheric object side surface.

Moreover, in the zoom lens system according to Embodiment 1, the third lens unit G3 comprises solely a positive meniscus seventh lens element L7 with the convex surface facing the image side. The seventh lens element L7 has two aspheric surfaces.

In the zoom lens system according to Embodiment 1, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 4:
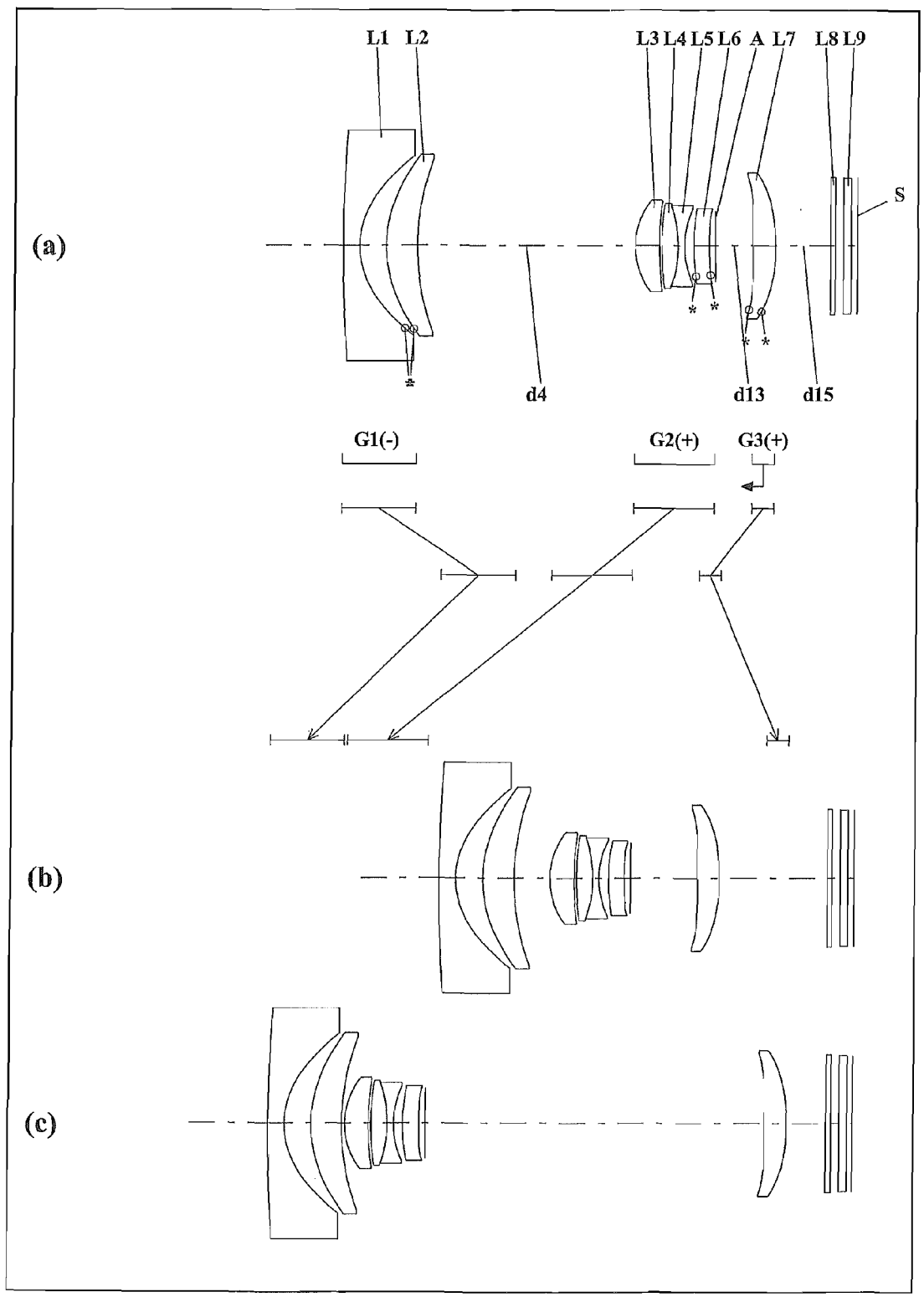
FIG. 4 is a lens arrangement diagram showing an infinity in-focus condition of a zoom lens system according to Embodiment 2 (Example 2).
Figure 5:
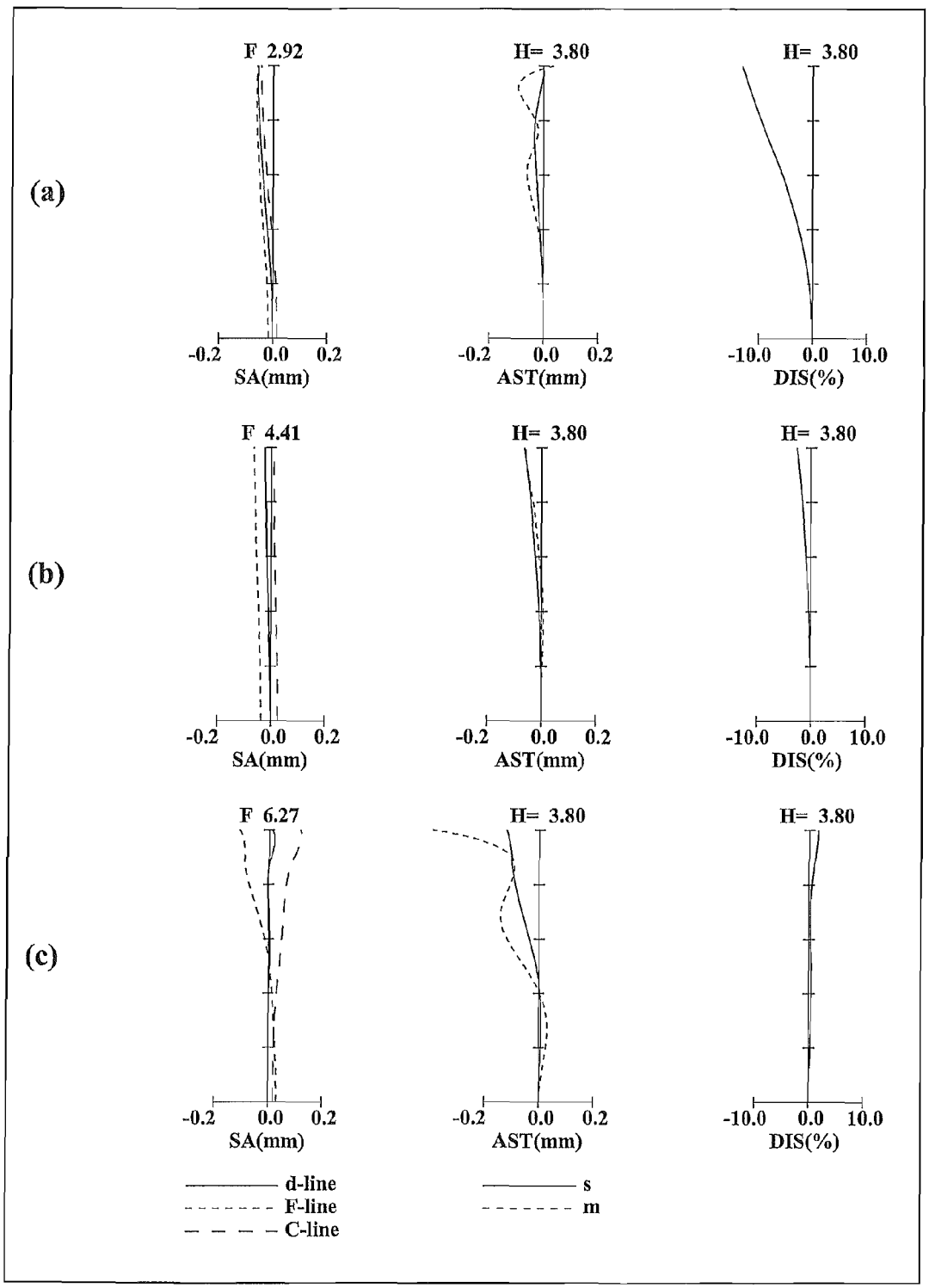
FIG. 5 is a longitudinal aberration diagram of an infinity in-focus condition of a zoom lens system according to Example 2.
Figure 6:
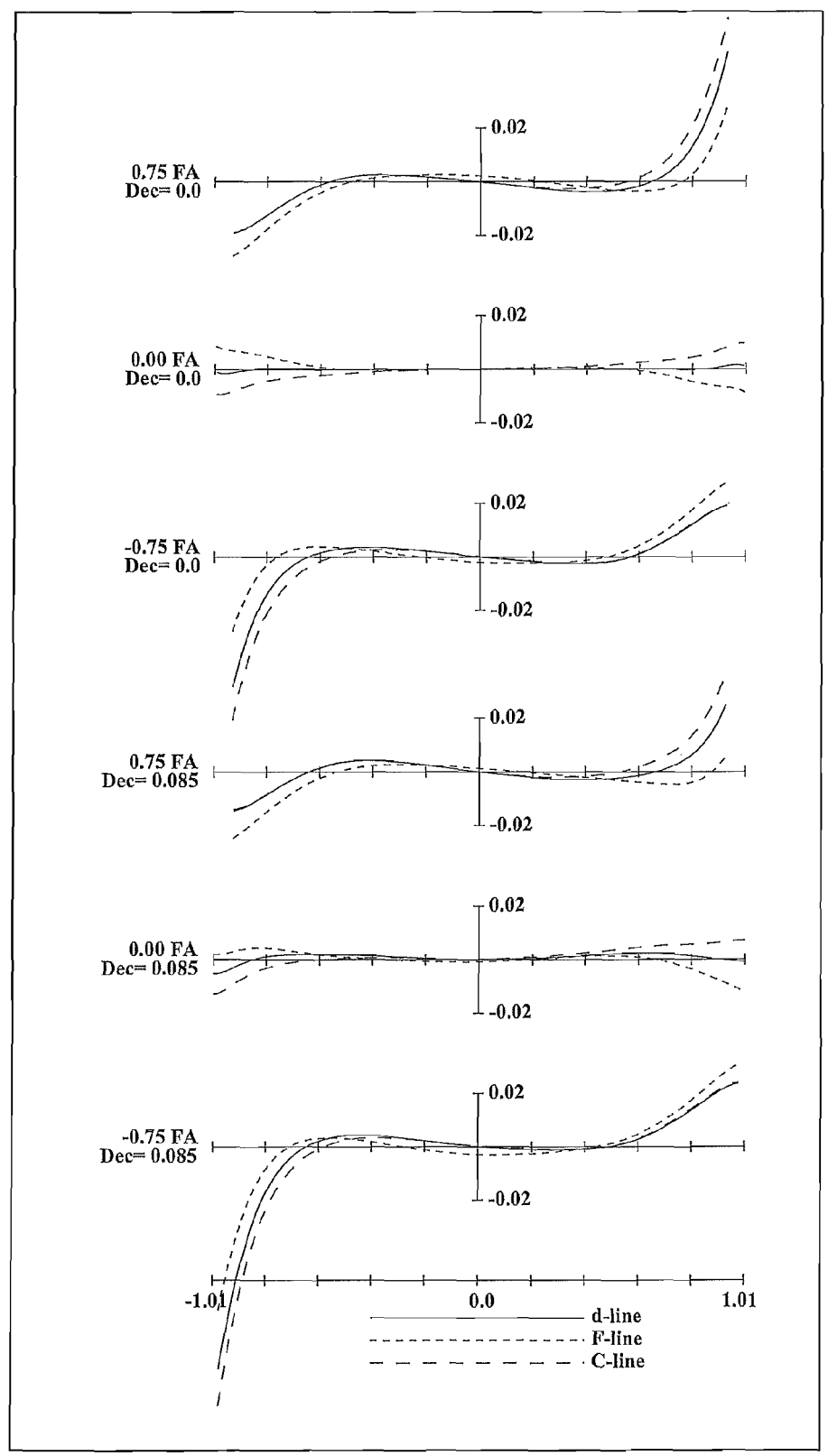
FIG. 6 is a lateral aberration diagram of a zoom lens system according to Example 2 at a telephoto limit in a basic state where image blur compensation is not performed and in a blur compensation state.

As shown in FIG. 4, in the zoom lens system according to Embodiment 2, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface, while the second lens element L2 has an aspheric object side surface.

In the zoom lens system of Embodiment 2, the second lens unit G2, in order from the object side to the image side, comprises: a positive meniscus third lens element L3 with the convex surface facing the object side; a bi-convex fourth lens element L4; a bi-concave fifth lens element L5; and a positive meniscus sixth lens element L6 with the convex surface facing the object side. Among these, the fourth lens element L4 and the fifth lens element L5 are cemented with each other. In the surface data in the corresponding numerical example described later, surface number 8 indicates the cement layer between the fourth lens elements L4 and the fifth lens element L5. Further, the sixth lens element L6 has two aspheric surfaces.

Further, in the zoom lens system of Embodiment 2, the third lens unit G3 comprises solely a bi-convex seventh lens element L7. The seventh lens element L7 has two aspheric surfaces.

In the zoom lens system according to Embodiment 2, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 7:
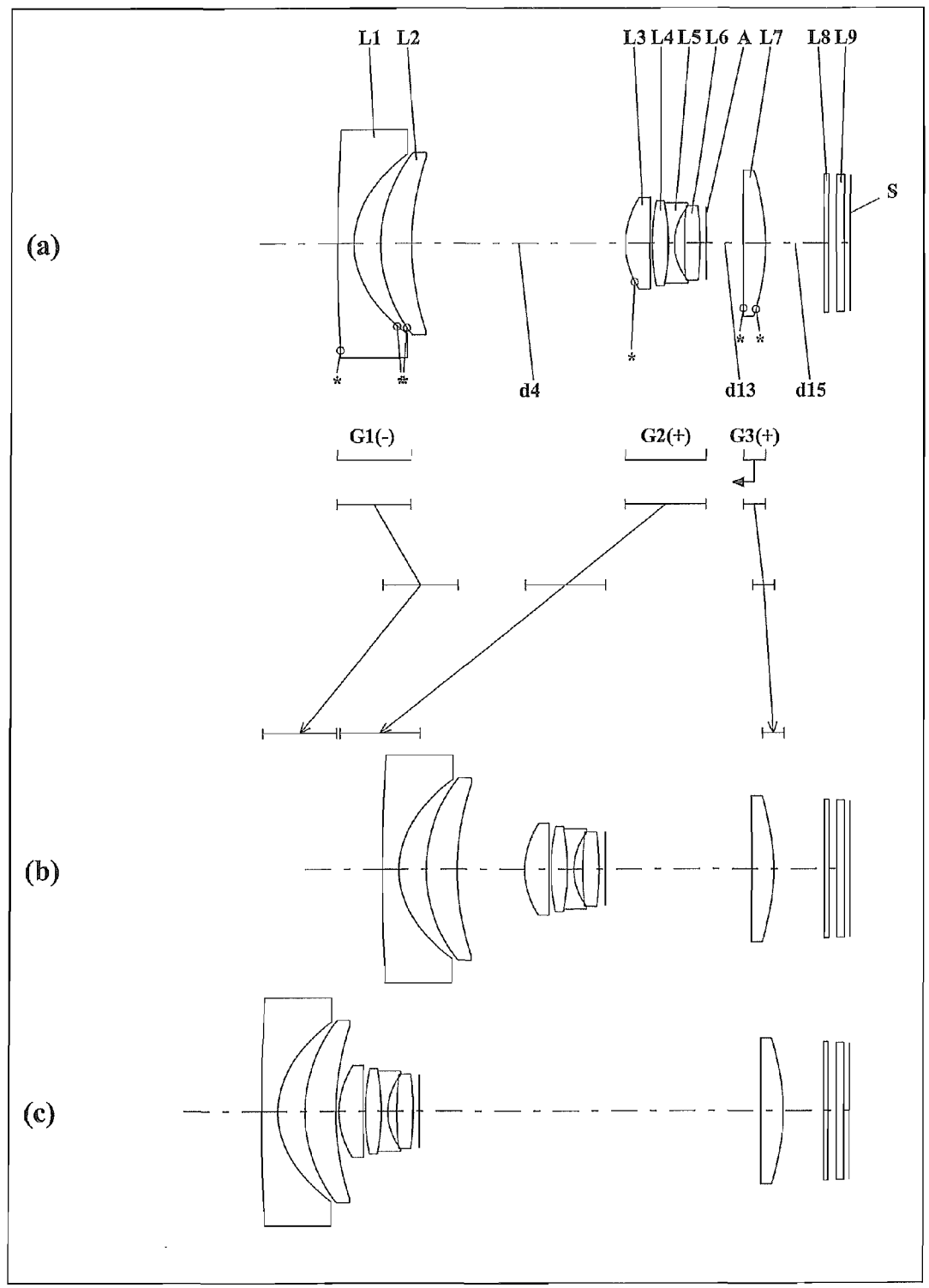
FIG. 7 is a lens arrangement diagram showing an infinity in-focus condition of a zoom lens system according to Embodiment 3 (Example 3).
Figure 8:
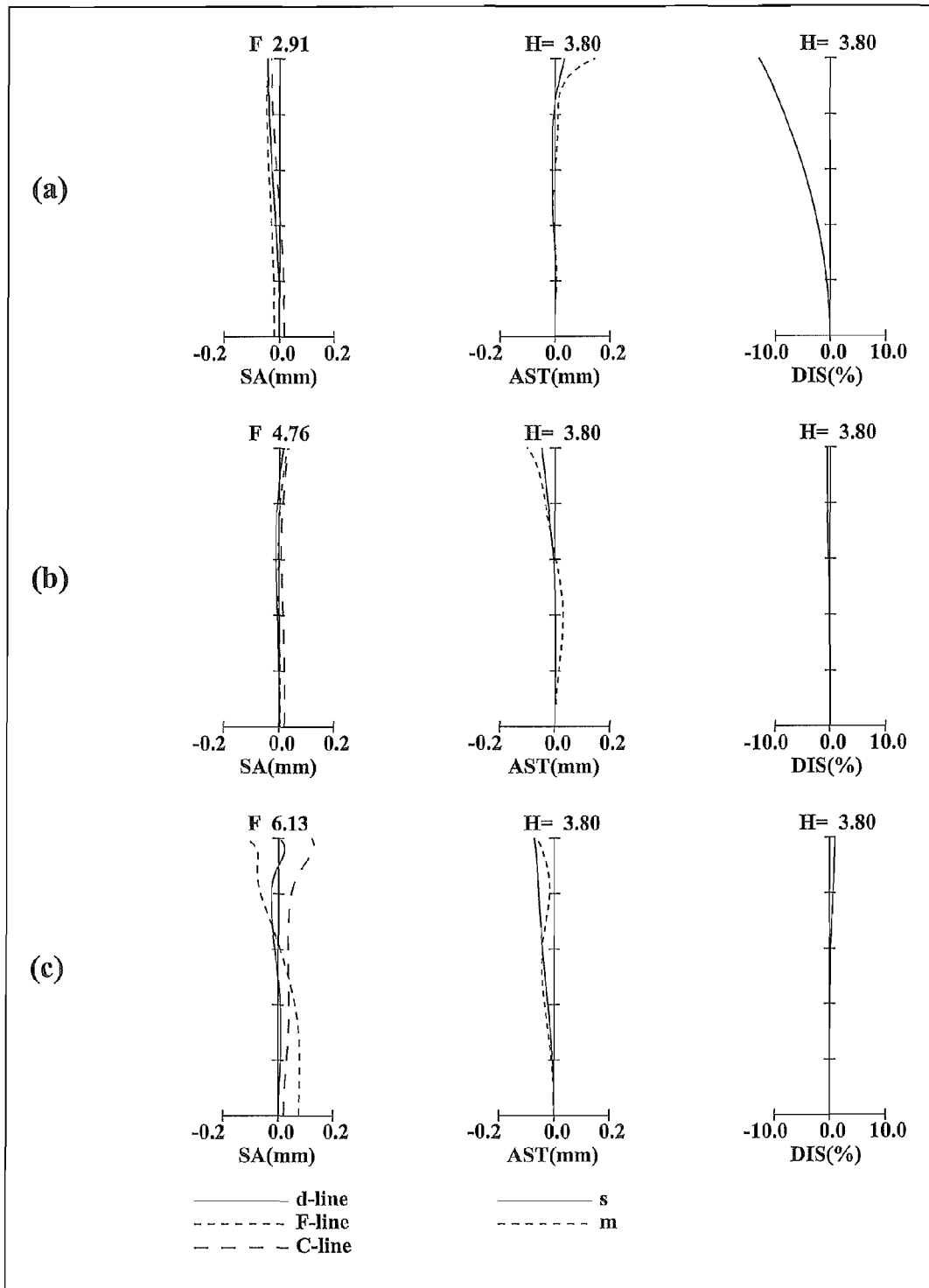
FIG. 8 is a longitudinal aberration diagram of an infinity in-focus condition of a zoom lens system according to Example 3.
Figure 9:
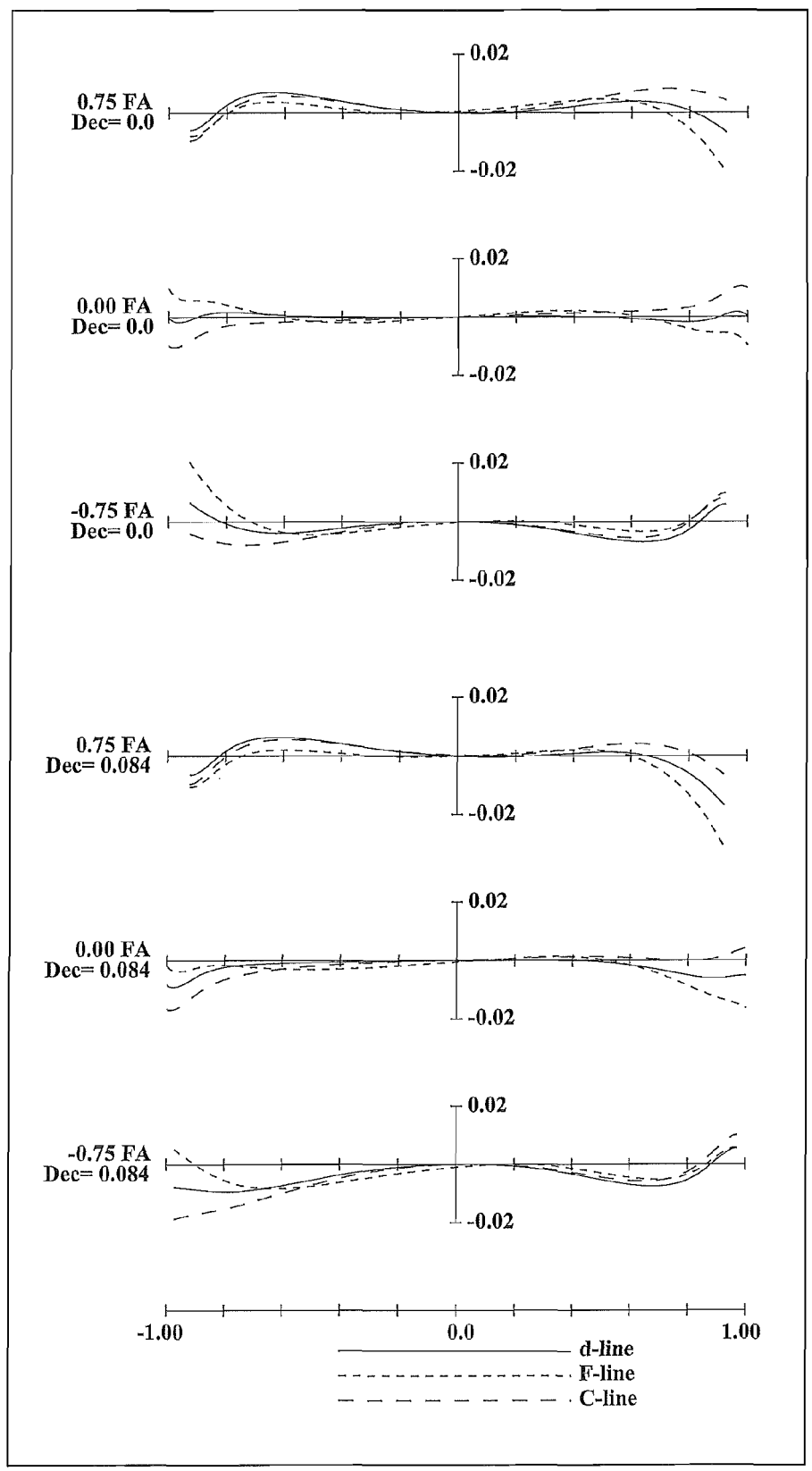
FIG. 9 is a lateral aberration diagram of a zoom lens system according to Example 3 at a telephoto limit in a basic state where image blur compensation is not performed and in a blur compensation state.

As shown in FIG. 7, in the zoom lens system according to Embodiment 3, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces, while the second lens element L2 has an aspheric object side surface.

Further, in the zoom lens system according to Embodiment 3, the second lens unit G2, in order from the object side to the image side, comprises: a positive meniscus third lens element L3 with the convex surface facing the object side; a bi-convex fourth lens element L4; a bi-concave fifth lens element L5; and a bi-convex sixth lens element L6. Among these, the fourth lens element L4 and the fifth lens element L5 are cemented with each other. In the surface data in the corresponding numerical example described later, surface number 8 indicates the cement layer between the fourth lens elements L4 and the fifth lens element L5. Further, the third lens element L3 has an aspheric object side surface.

Moreover, in the zoom lens system according to Embodiment 3, the third lens unit G3 comprises solely a positive meniscus seventh lens element L7 with the convex surface facing the image side. The seventh lens element L7 has two aspheric surfaces.

In the zoom lens system according to Embodiment 3, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 10:
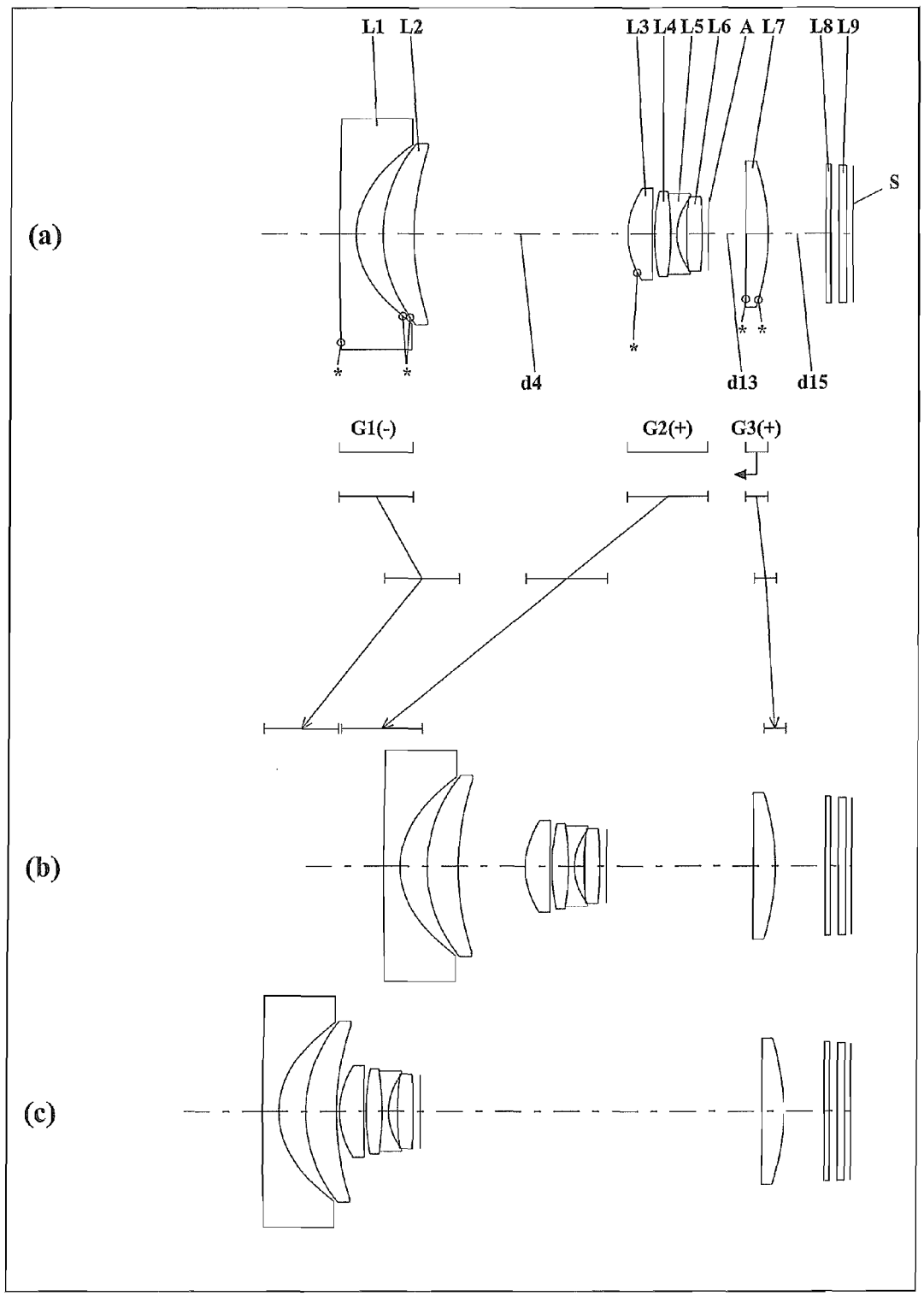
FIG. 10 is a lens arrangement diagram showing an infinity in-focus condition of a zoom lens system according to Embodiment 4 (Example 4).
Figure 11:
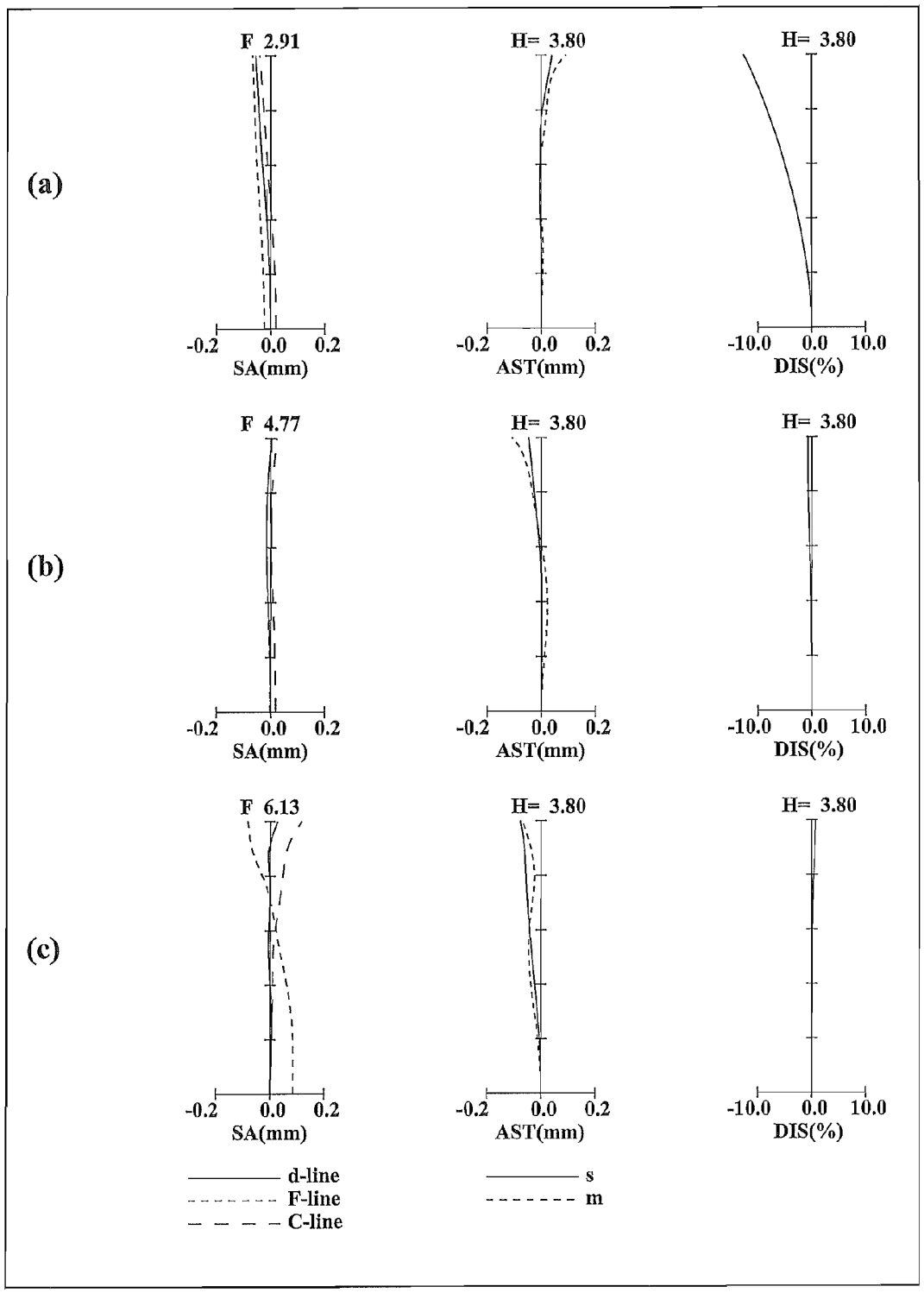
FIG. 11 is a longitudinal aberration diagram of an infinity in-focus condition of a zoom lens system according to Example 4.
Figure 12:
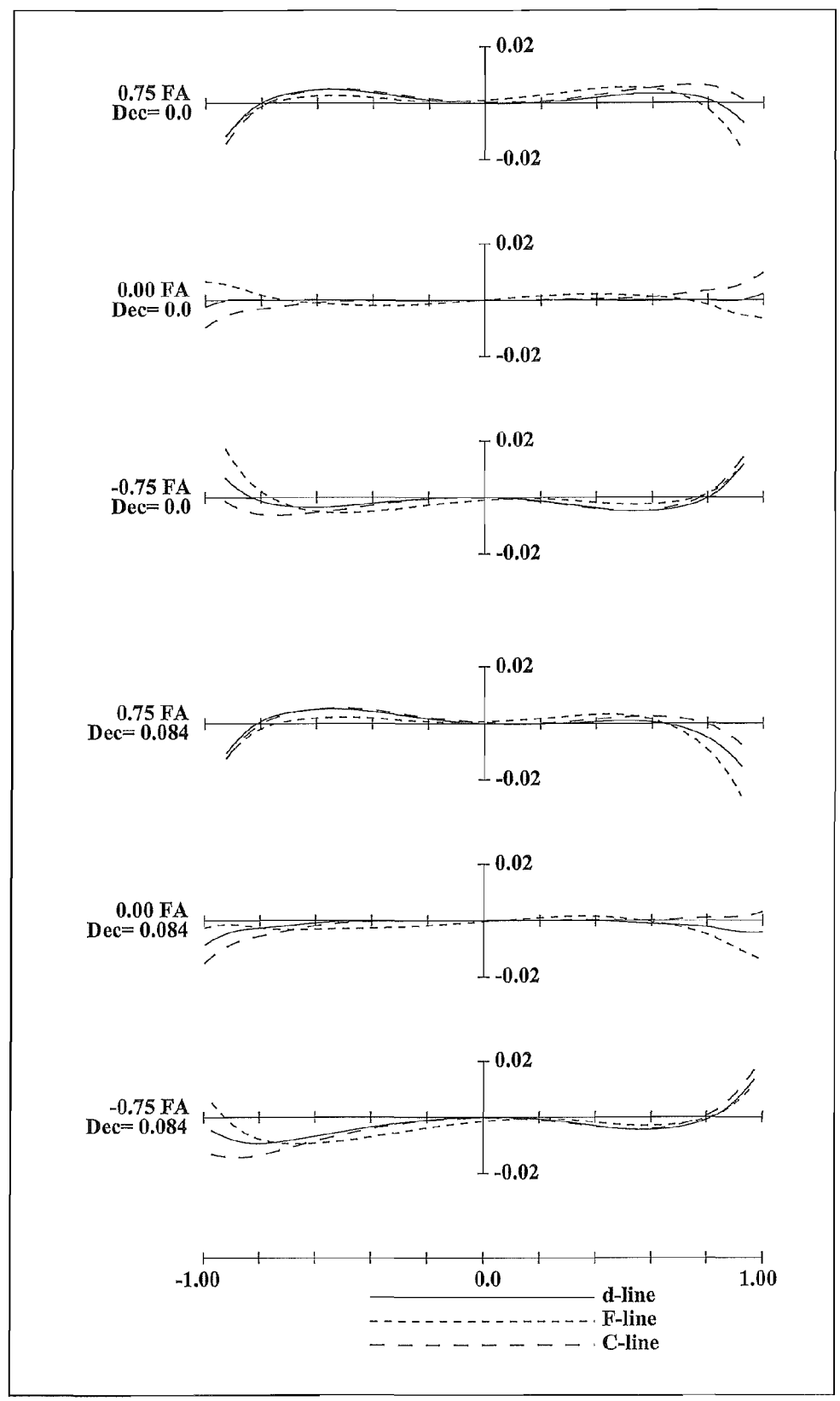
FIG. 12 is a lateral aberration diagram of a zoom lens system according to Example 4 at a telephoto limit in a basic state where image blur compensation is not performed and in a blur compensation state.

As shown in FIG. 10, in the zoom lens system according to Embodiment 4, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces, while the second lens element L2 has an aspheric object side surface.

Further, in the zoom lens system according to Embodiment 4, the second lens unit G2, in order from the object side to the image side, comprises: a positive meniscus third lens element L3 with the convex surface facing the object side; a bi-convex fourth lens element L4; a bi-concave fifth lens element L5; and a bi-convex sixth lens element L6. Among these, the fourth lens element L4 and the fifth lens element L5 are cemented with each other. In the surface data in the corresponding numerical example described later, surface number 8 indicates the cement layer between the fourth lens elements L4 and the fifth lens element L5. Further, the third lens element L3 has an aspheric object side surface.

Moreover, in the zoom lens system according to Embodiment 4, the third lens unit G3 comprises solely a positive meniscus seventh lens element L7 with the convex surface facing the image side. The seventh lens element L7 has two aspheric surfaces.

In the zoom lens system according to Embodiment 4, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 13:
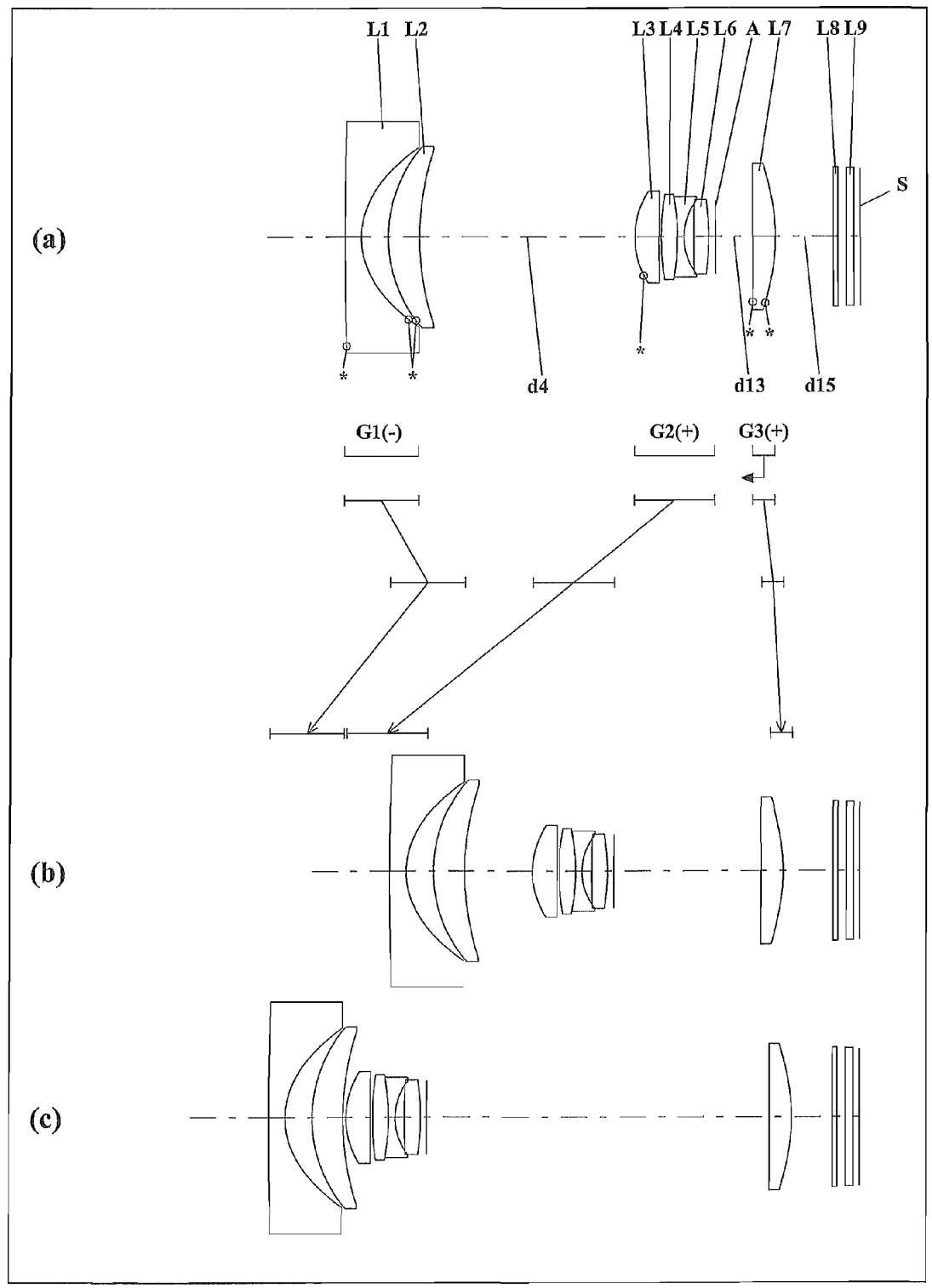
FIG. 13 is a lens arrangement diagram showing an infinity in-focus condition of a zoom lens system according to Embodiment 5 (Example 5).
Figure 14:
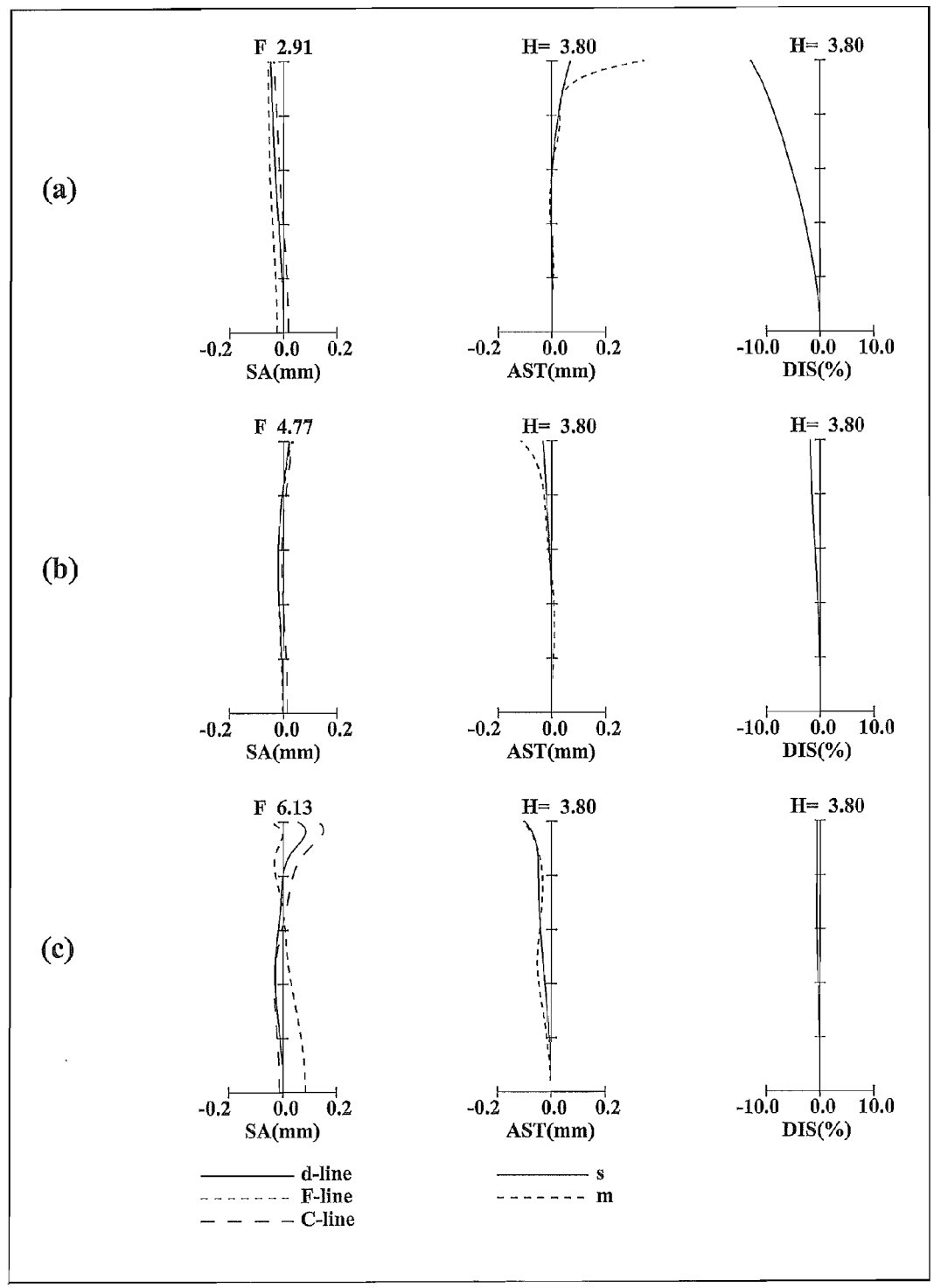
FIG. 14 is a longitudinal aberration diagram of an infinity in-focus condition of a zoom lens system according to Example 5.
Figure 15:
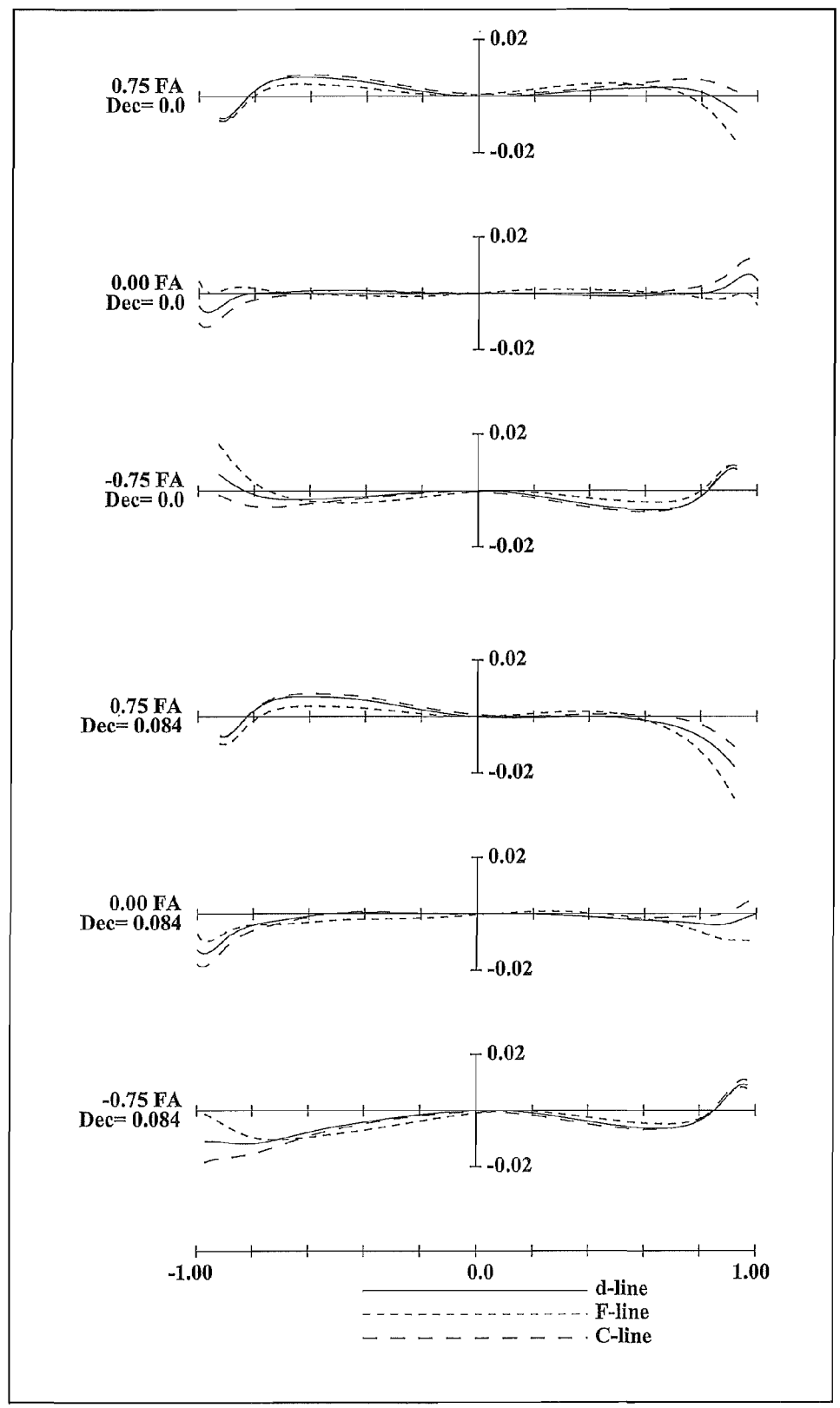
FIG. 15 is a lateral aberration diagram of a zoom lens system according to Example 5 at a telephoto limit in a basic state where image blur compensation is not performed and in a blur compensation state.

As shown in FIG. 13, in the zoom lens system according to Embodiment 5, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces, while the second lens element L2 has an aspheric object side surface.

Further, in the zoom lens system according to Embodiment 5, the second lens unit G2, in order from the object side to the image side, comprises: a positive meniscus third lens element L3 with the convex surface facing the object side; a bi-convex fourth lens element L4; a bi-concave fifth lens element L5; and a bi-convex sixth lens element L6. Among these, the fourth lens element L4 and the fifth lens element L5 are cemented with each other. In the surface data in the corresponding numerical example described later, surface number 8 indicates the cement layer between the fourth lens elements L4 and the fifth lens element L5. Further, the third lens element L3 has an aspheric object side surface.

Moreover, in the zoom lens system according to Embodiment 5, the third lens unit G3 comprises solely a positive meniscus seventh lens element L7 with the convex surface facing the image side. The seventh lens element L7 has two aspheric surfaces.

In the zoom lens system according to Embodiment 5, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 16:
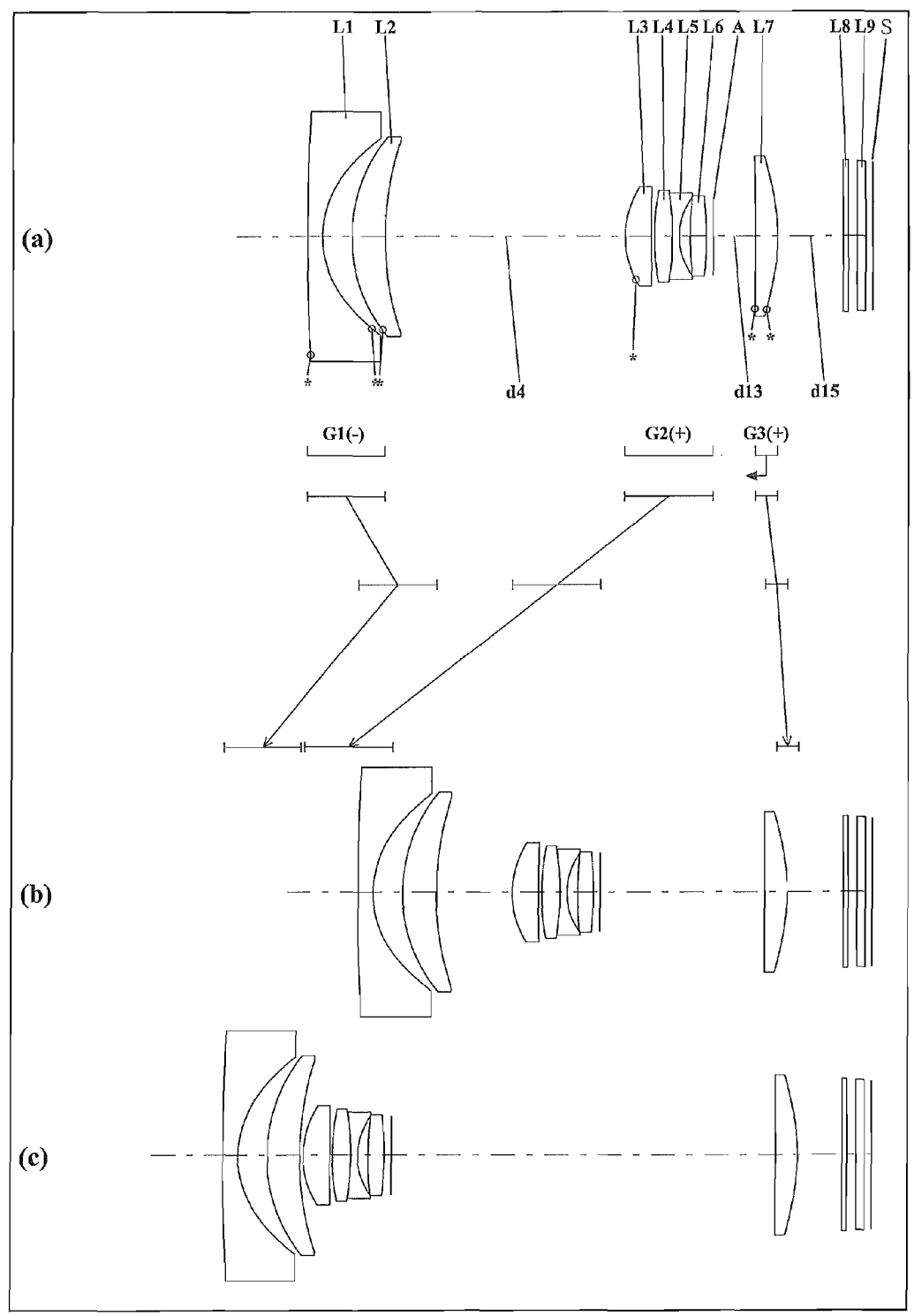
FIG. 16 is a lens arrangement diagram showing an infinity in-focus condition of a zoom lens system according to Embodiment 6 (Example 6).
Figure 17:
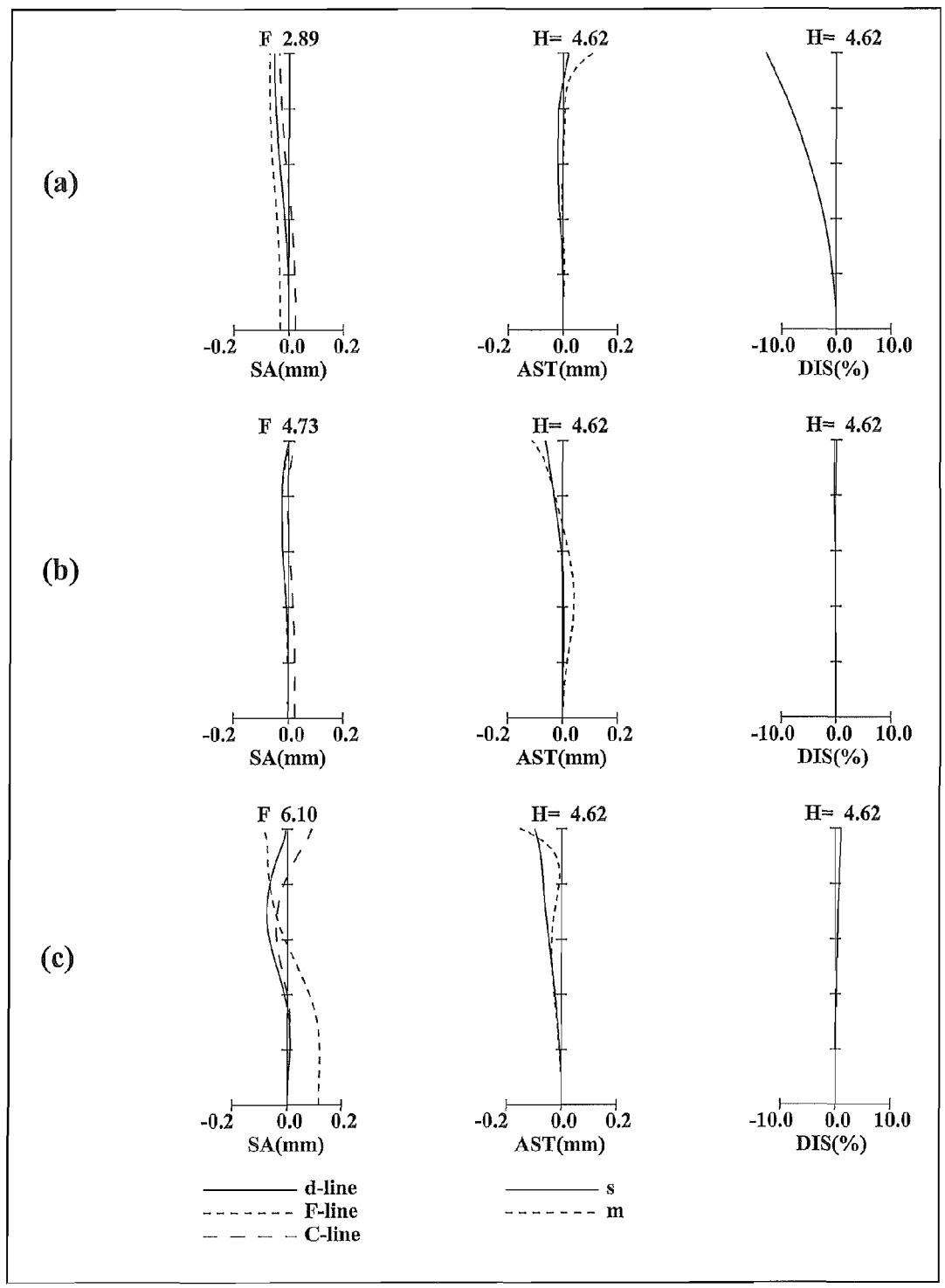
FIG. 17 is a longitudinal aberration diagram of an infinity in-focus condition of a zoom lens system according to Example 6.
Figure 18:
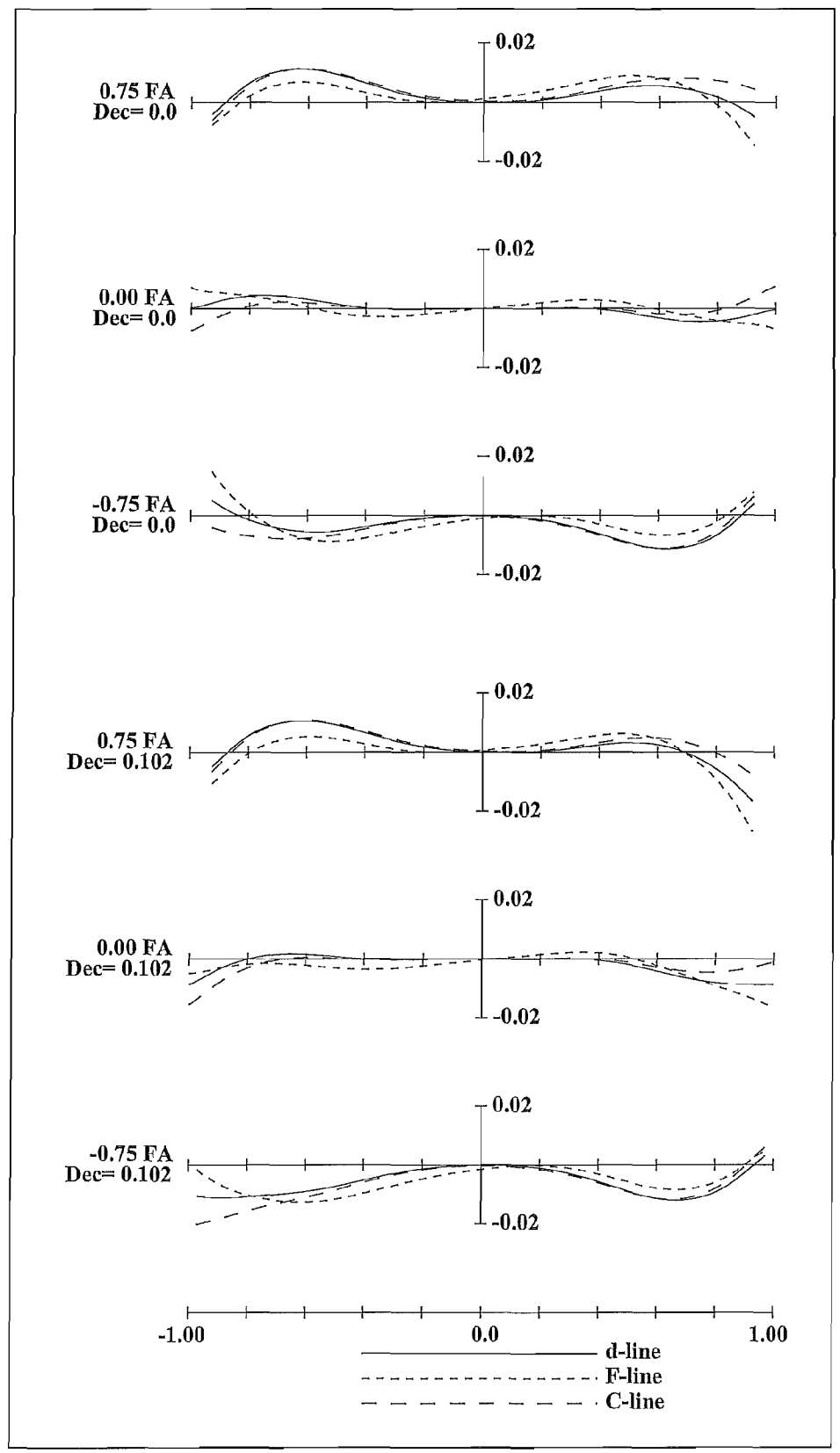
FIG. 18 is a lateral aberration diagram of a zoom lens system according to Example 6 at a telephoto limit in a basic state where image blur compensation is not performed and in a blur compensation state.

As shown in FIG. 16, in the zoom lens system according to Embodiment 6, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces, while the second lens element L2 has an aspheric object side surface.

Further, in the zoom lens system according to Embodiment 6, the second lens unit G2, in order from the object side to the image side, comprises: a positive meniscus third lens element L3 with the convex surface facing the object side; a bi-convex fourth lens element L4; a bi-concave fifth lens element L5; and a bi-convex sixth lens element L6. Among these, the fourth lens element L4 and the fifth lens element L5 are cemented with each other. In the surface data in the corresponding numerical example described later, surface number 8 indicates the cement layer between the fourth lens elements L4 and the fifth lens element L5. Further, the third lens element L3 has an aspheric object side surface.

Moreover, in the zoom lens system according to Embodiment 6, the third lens unit G3 comprises solely a positive meniscus seventh lens element L7 with the convex surface facing the image side. The seventh lens element L7 has two aspheric surfaces.

In the zoom lens system according to Embodiment 6, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 19:
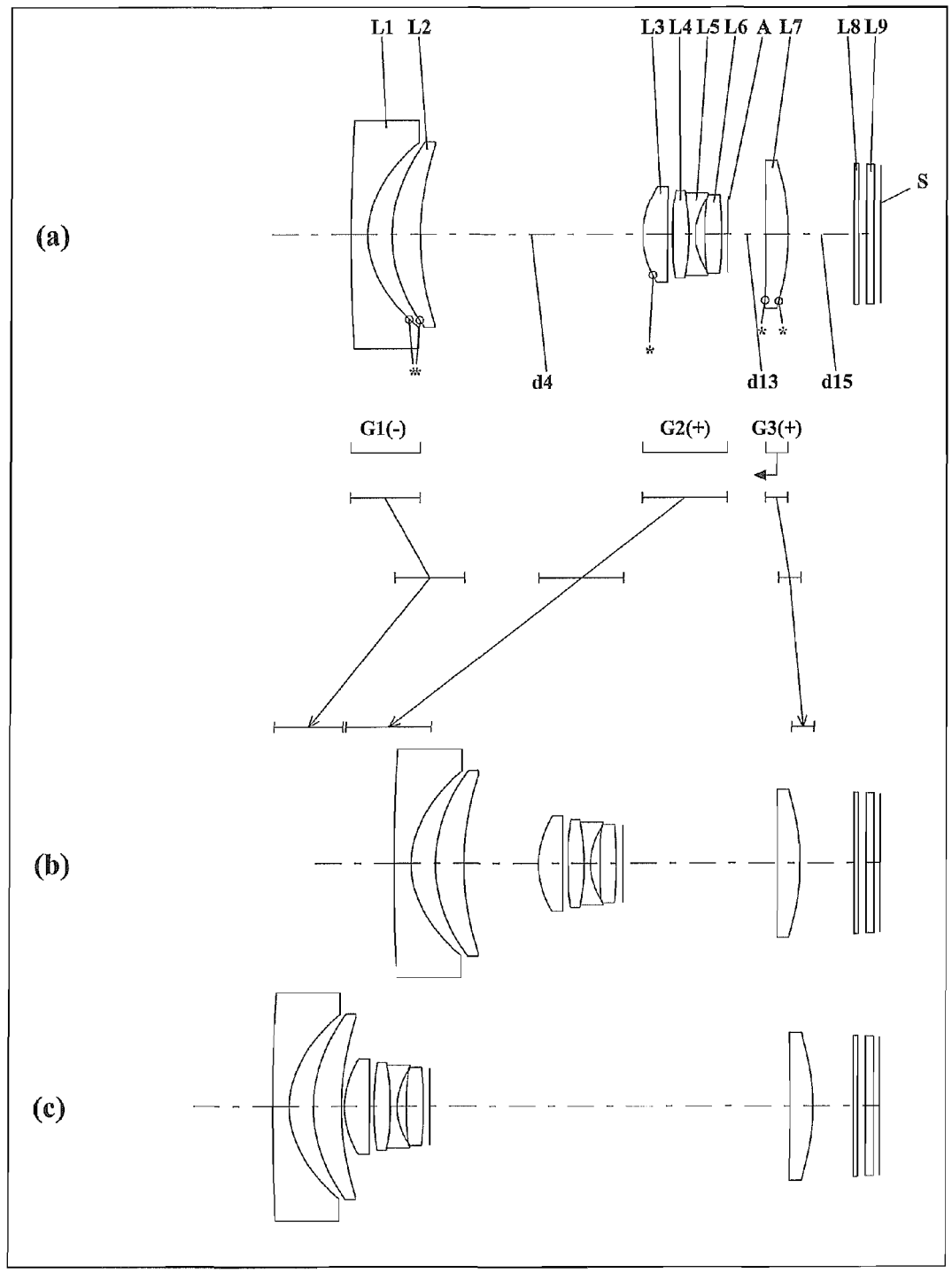
FIG. 19 is a lens arrangement diagram showing an infinity in-focus condition of a zoom lens system according to Embodiment 7 (Example 7).
Figure 20:
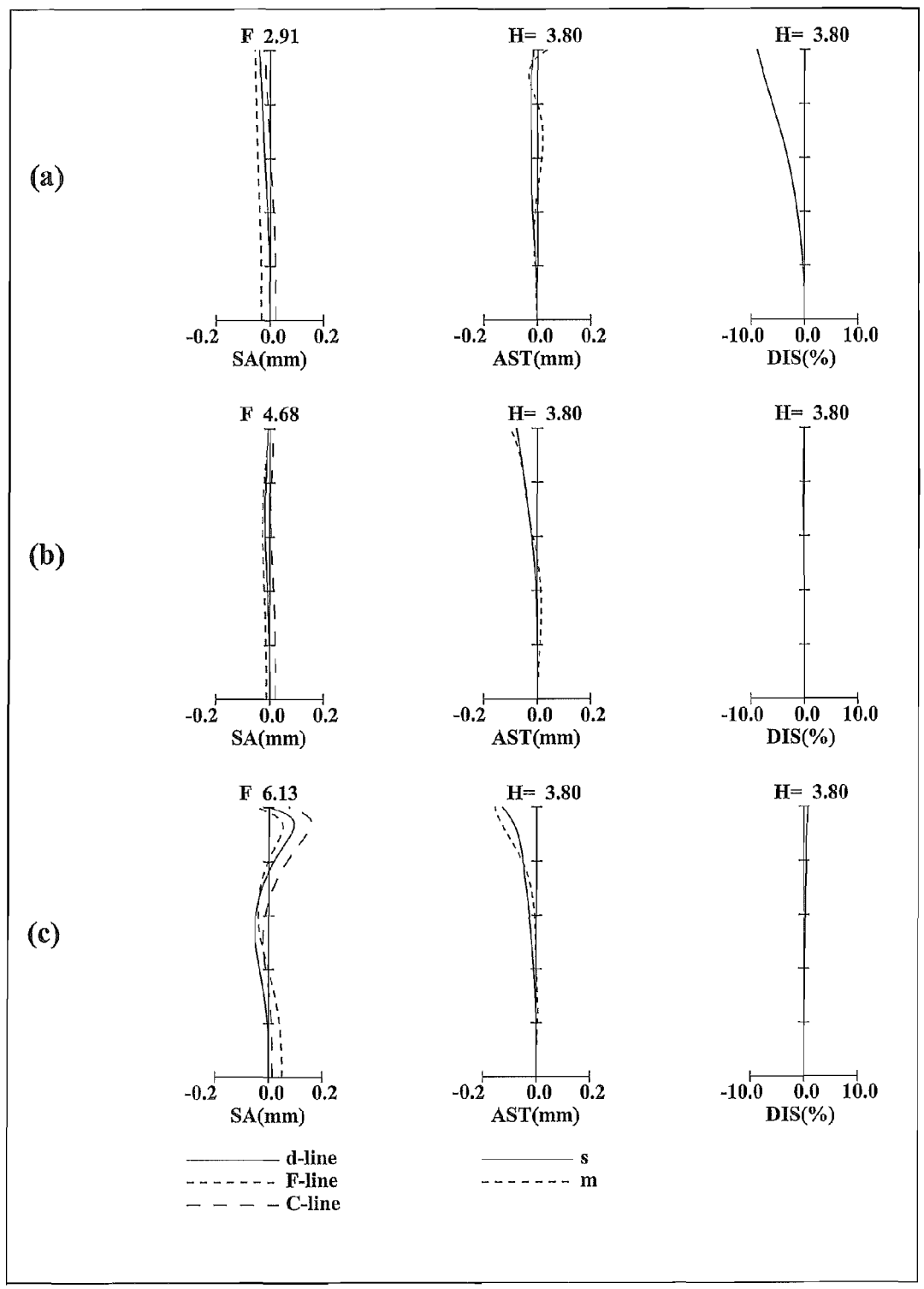
FIG. 20 is a longitudinal aberration diagram of an infinity in-focus condition of a zoom lens system according to Example 7.
Figure 21:
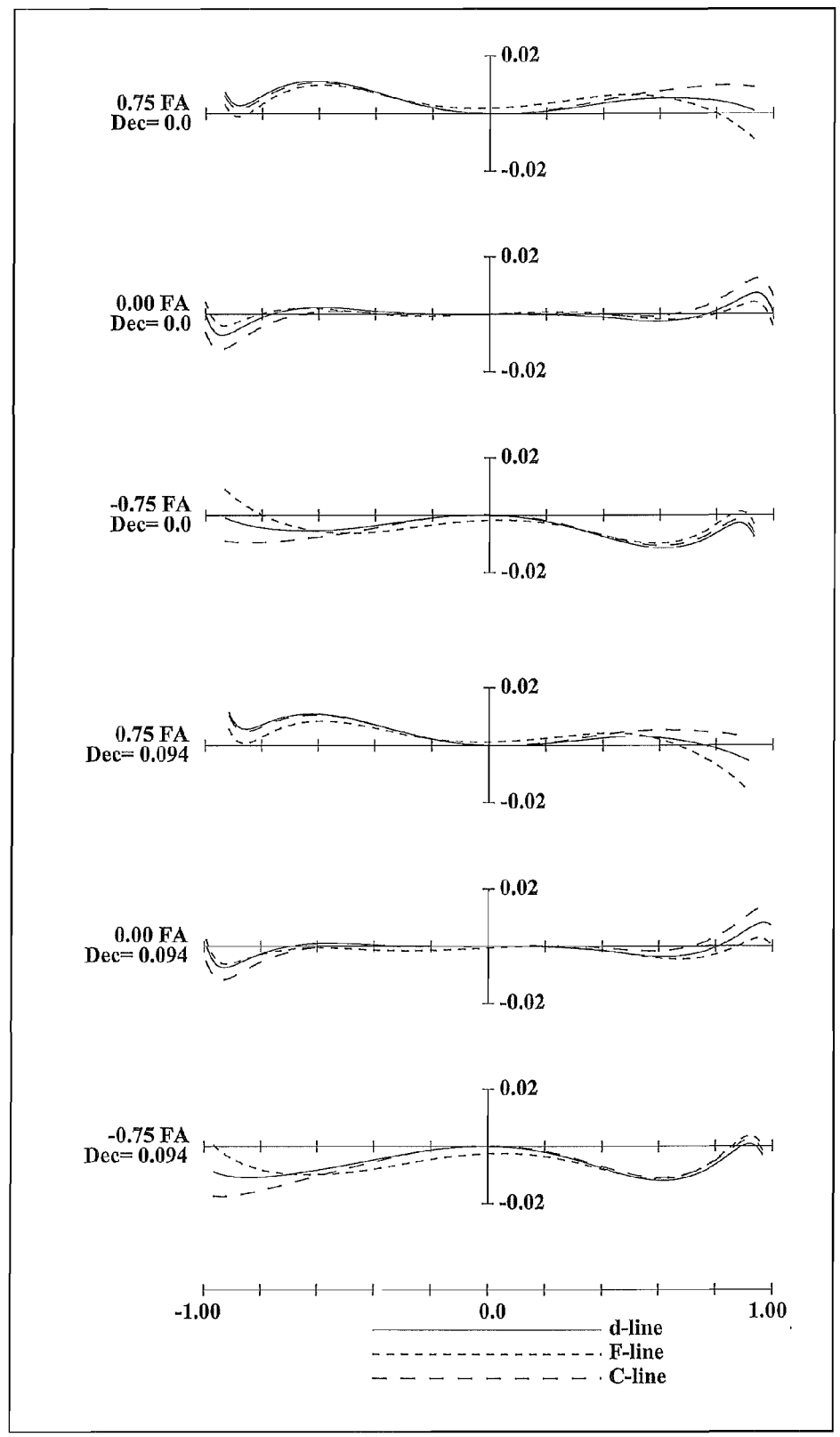
FIG. 21 is a lateral aberration diagram of a zoom lens system according to Example 7 at a telephoto limit in a basic state where image blur compensation is not performed and in a blur compensation state.

As shown in FIG. 19, in the zoom lens system according to Embodiment 7, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface, while the second lens element L2 has an aspheric object side surface.

Further, in the zoom lens system according to Embodiment 7, the second lens unit G2, in order from the object side to the image side, comprises: a positive meniscus third lens element L3 with the convex surface facing the object side; a bi-convex fourth lens element L4; a bi-concave fifth lens element L5; and a bi-convex sixth lens element L6. Among these, the fourth lens element L4 and the fifth lens element L5 are cemented with each other. In the surface data in the corresponding numerical example described later, surface number 8 indicates the cement layer between the fourth lens elements L4 and the fifth lens element L5. Further, the third lens element L3 has an aspheric object side surface.

Moreover, in the zoom lens system according to Embodiment 7, the third lens unit G3 comprises solely a positive meniscus seventh lens element L7 with the convex surface facing the image side. The seventh lens element L7 has two aspheric surfaces.

In the zoom lens system according to Embodiment 7, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 22:
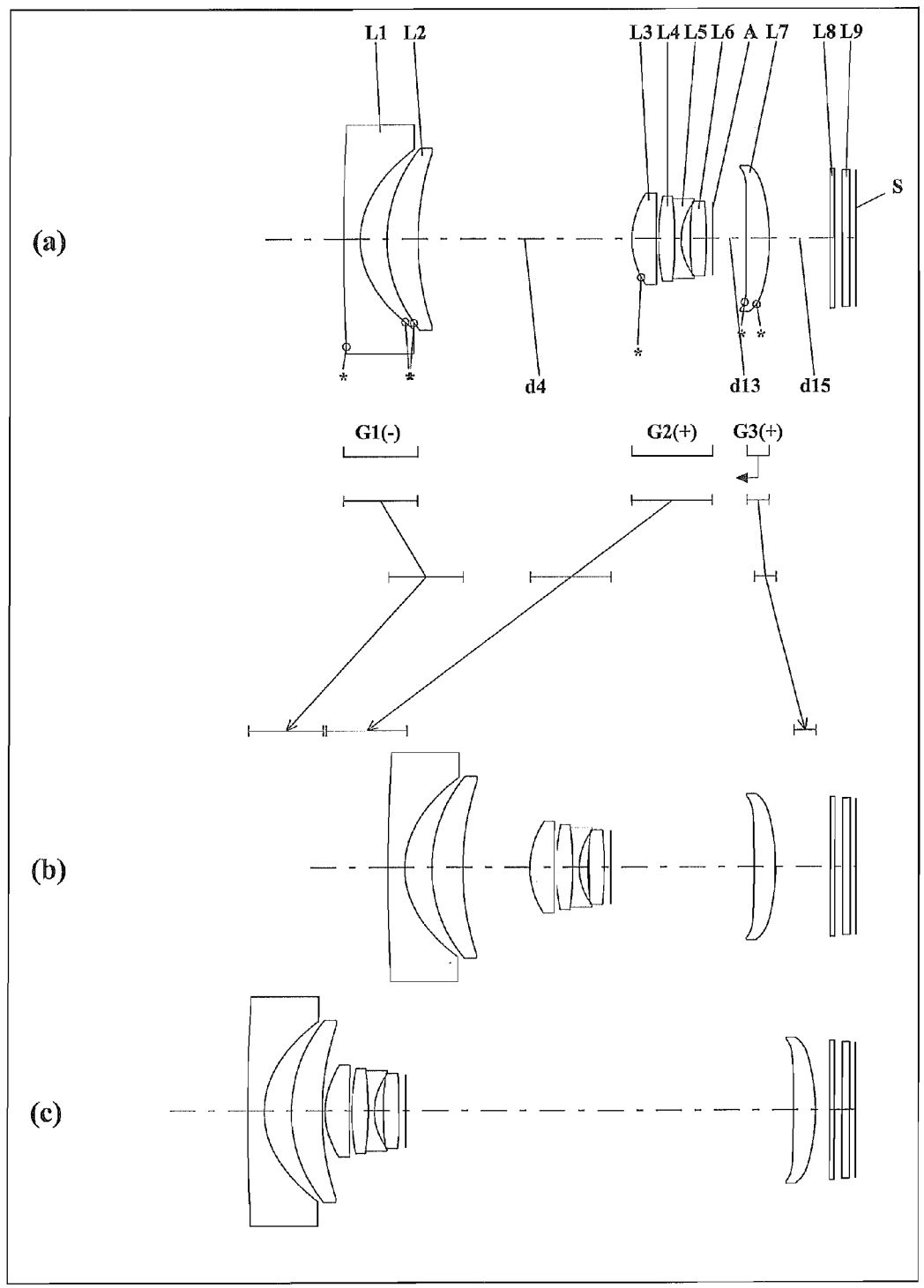
FIG. 22 is a lens arrangement diagram showing an infinity in-focus condition of a zoom lens system according to Embodiment 8 (Example 8).
Figure 23:
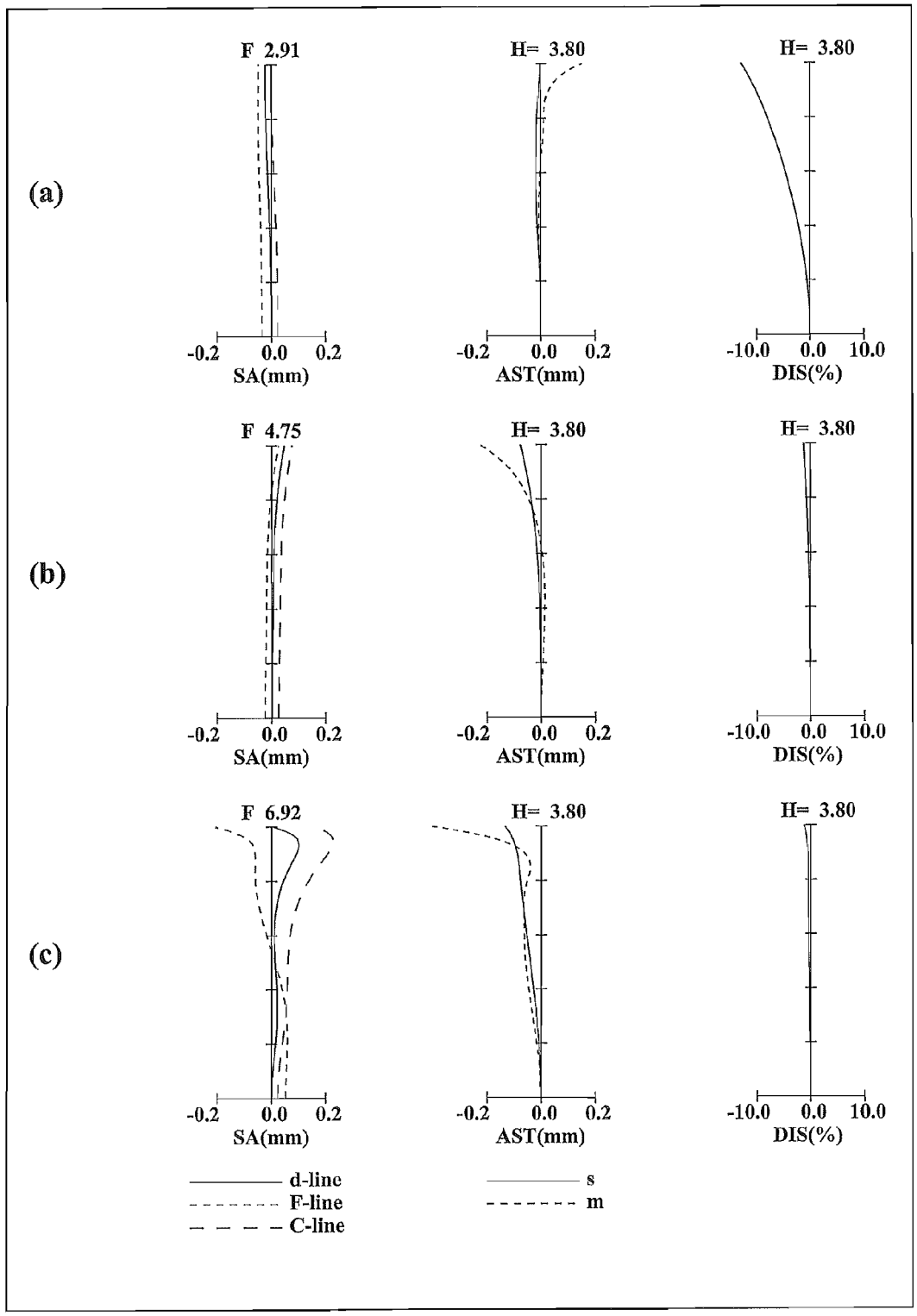
FIG. 23 is a longitudinal aberration diagram of an infinity in-focus condition of a zoom lens system according to Example 8.
Figure 24:
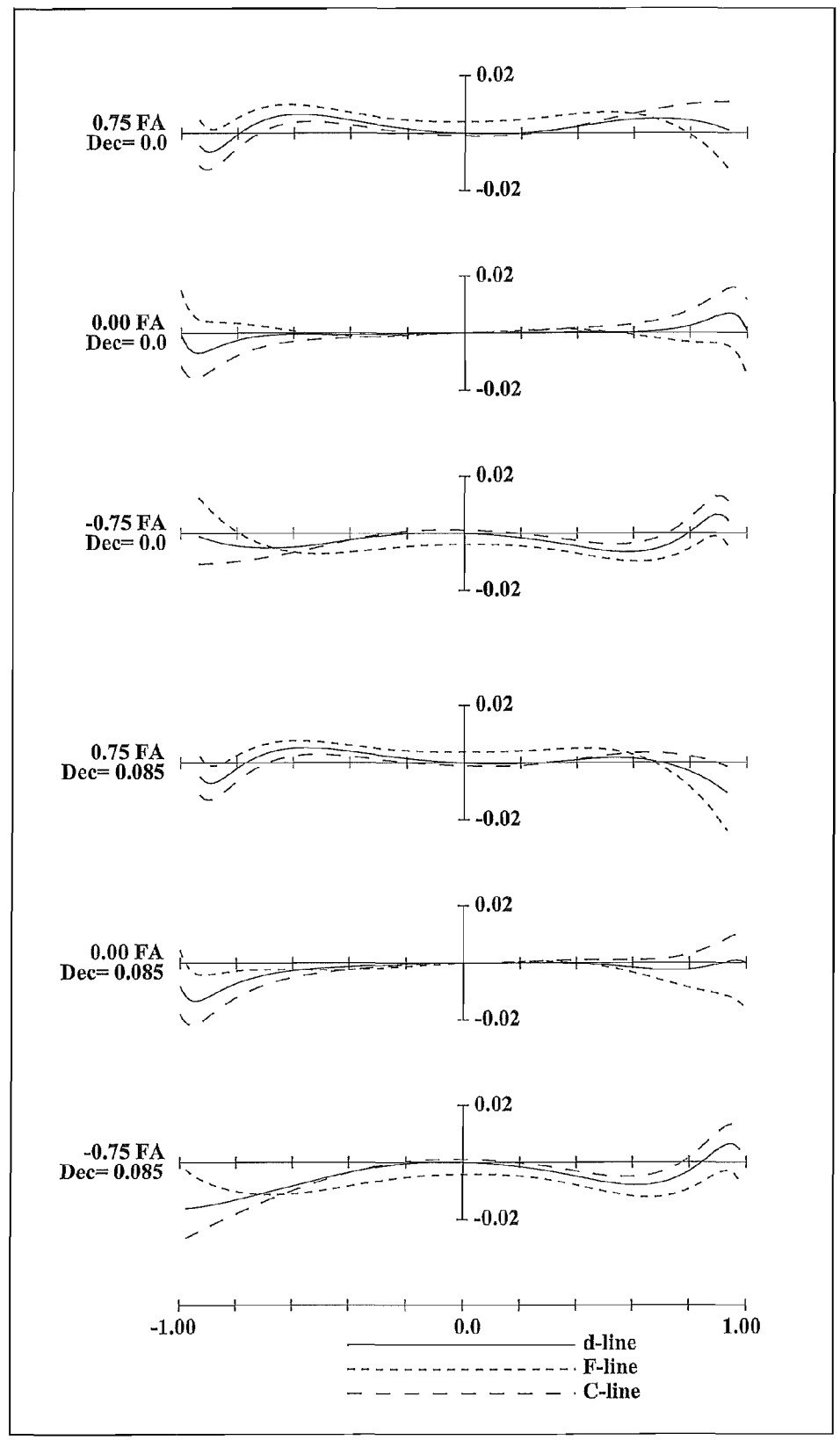
FIG. 24 is a lateral aberration diagram of a zoom lens system according to Example 8 at a telephoto limit in a basic state where image blur compensation is not performed and in a blur compensation state.

As shown in FIG. 22, in the zoom lens system according to Embodiment 8, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces, while the second lens element L2 has an aspheric object side surface.

Further, in the zoom lens system according to Embodiment 8, the second lens unit G2, in order from the object side to the image side, comprises: a positive meniscus third lens element L3 with the convex surface facing the object side; a bi-convex fourth lens element L4; a bi-concave fifth lens element L5; and a bi-convex sixth lens element L6. Among these, the fourth lens element L4 and the fifth lens element L5 are cemented with each other. In the surface data in the corresponding numerical example described later, surface number 8 indicates the cement layer between the fourth lens elements L4 and the fifth lens element L5. Further, the third lens element L3 has an aspheric object side surface.

Moreover, in the zoom lens system according to Embodiment 8, the third lens unit G3 comprises solely a positive meniscus seventh lens element L7 with the convex surface facing the image side. The seventh lens element L7 has two aspheric surfaces.

In the zoom lens system according to Embodiment 8, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 25:
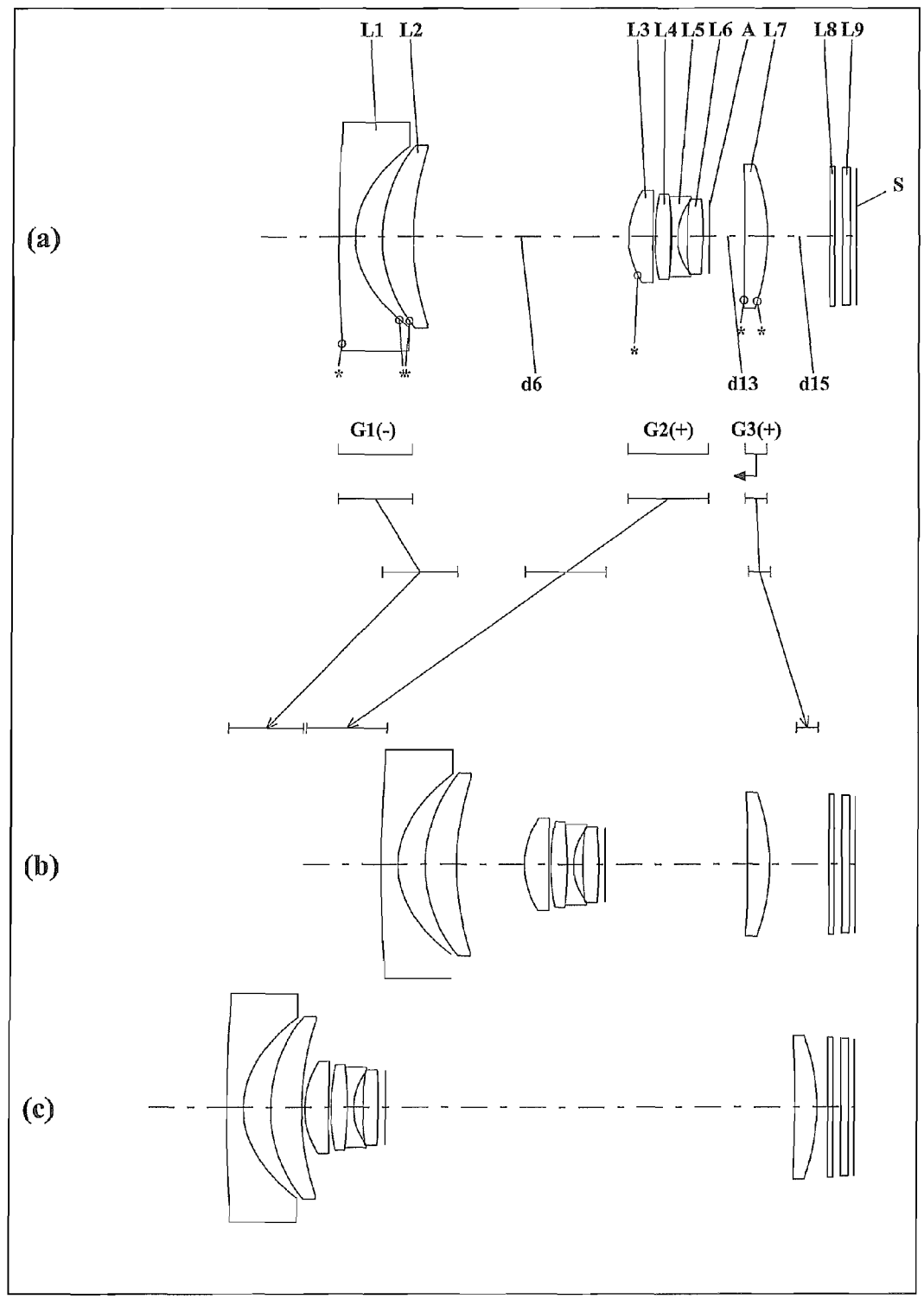
FIG. 25 is a lens arrangement diagram showing an infinity in-focus condition of a zoom lens system according to Embodiment 9 (Example 9).
Figure 26:
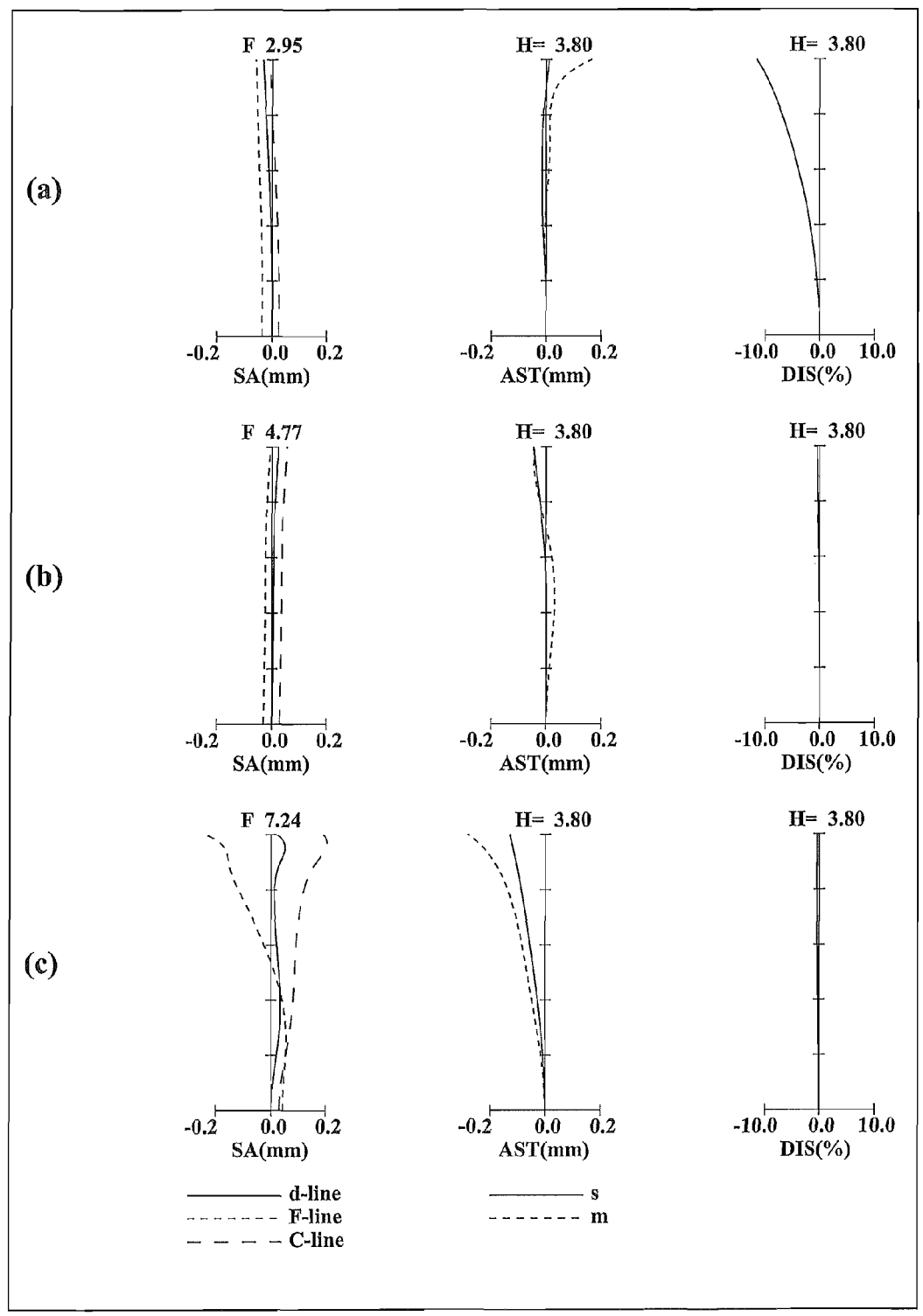
FIG. 26 is a longitudinal aberration diagram of an infinity in-focus condition of a zoom lens system according to Example 9.
Figure 27:
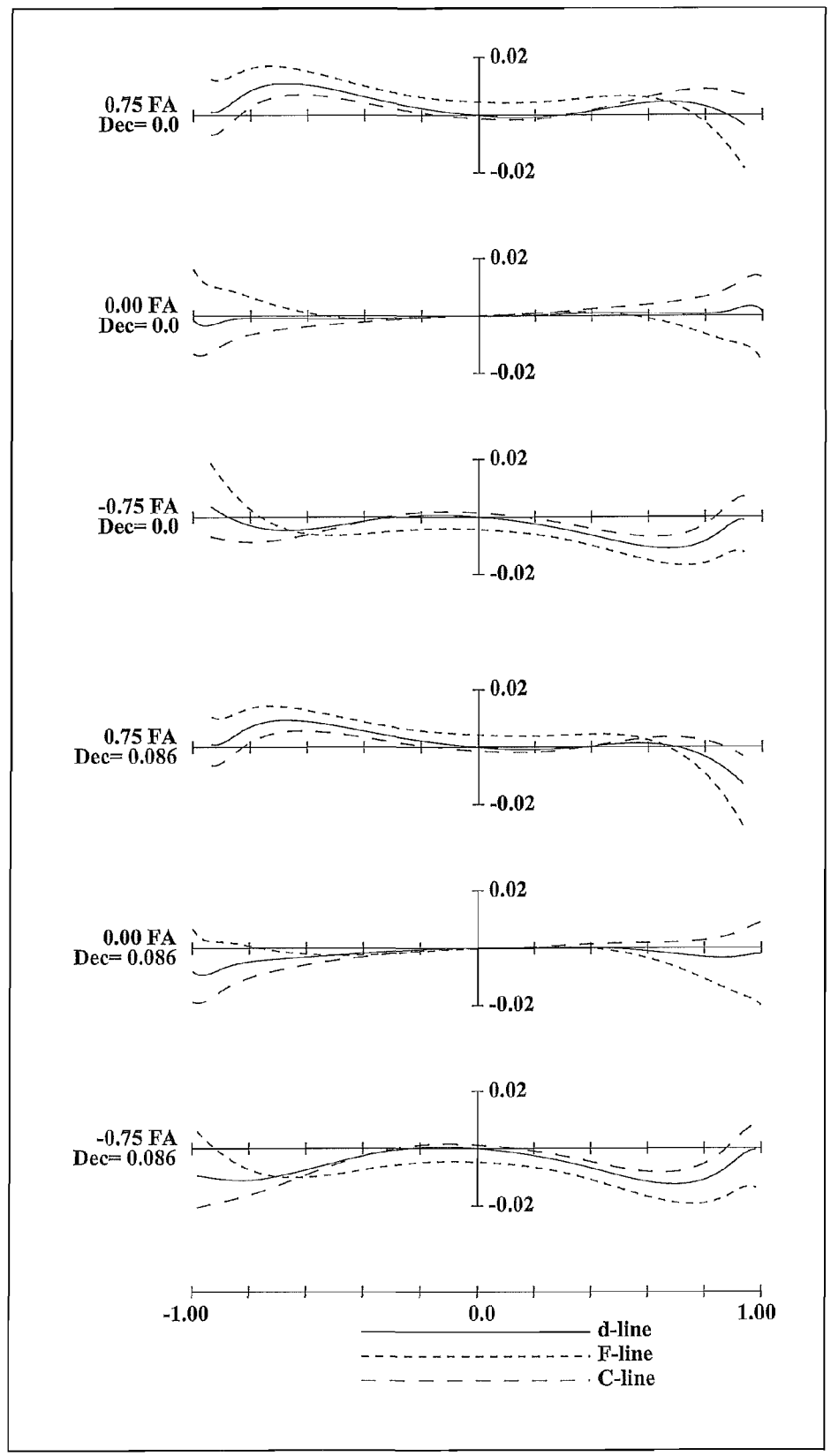
FIG. 27 is a lateral aberration diagram of a zoom lens system according to Example 9 at a telephoto limit in a basic state where image blur compensation is not performed and in a blur compensation state.

As shown in FIG. 25, in the zoom lens system according to Embodiment 9, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces, while the second lens element L2 has an aspheric object side surface.

Further, in the zoom lens system according to Embodiment 9, the second lens unit G2, in order from the object side to the image side, comprises: a positive meniscus third lens element L3 with the convex surface facing the object side; a bi-convex fourth lens element L4; a bi-concave fifth lens element L5; and a bi-convex sixth lens element L6. Among these, the fourth lens element L4 and the fifth lens element L5 are cemented with each other. In the surface data in the corresponding numerical example described later, surface number 8 indicates the cement layer between the fourth lens elements L4 and the fifth lens element L5. Further, the third lens element L3 has an aspheric object side surface.

Moreover, in the zoom lens system according to Embodiment 9, the third lens unit G3 comprises solely a positive meniscus seventh lens element L7 with the convex surface facing the image side. The seventh lens element L7 has two aspheric surfaces.

In the zoom lens system according to Embodiment 9, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 28:
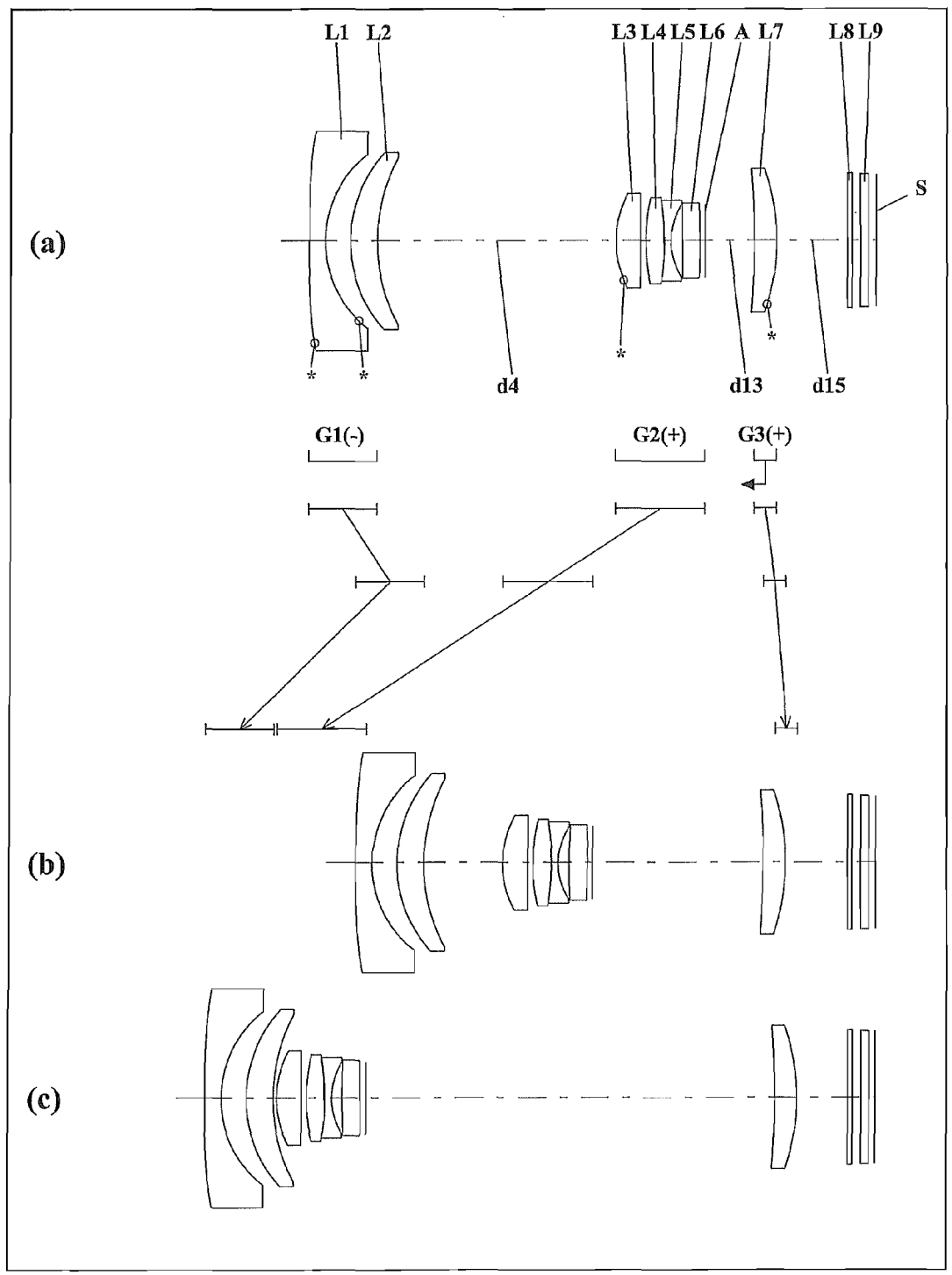
FIG. 28 is a lens arrangement diagram showing an infinity in-focus condition of a zoom lens system according to Embodiment 10 (Example 10).
Figure 29:
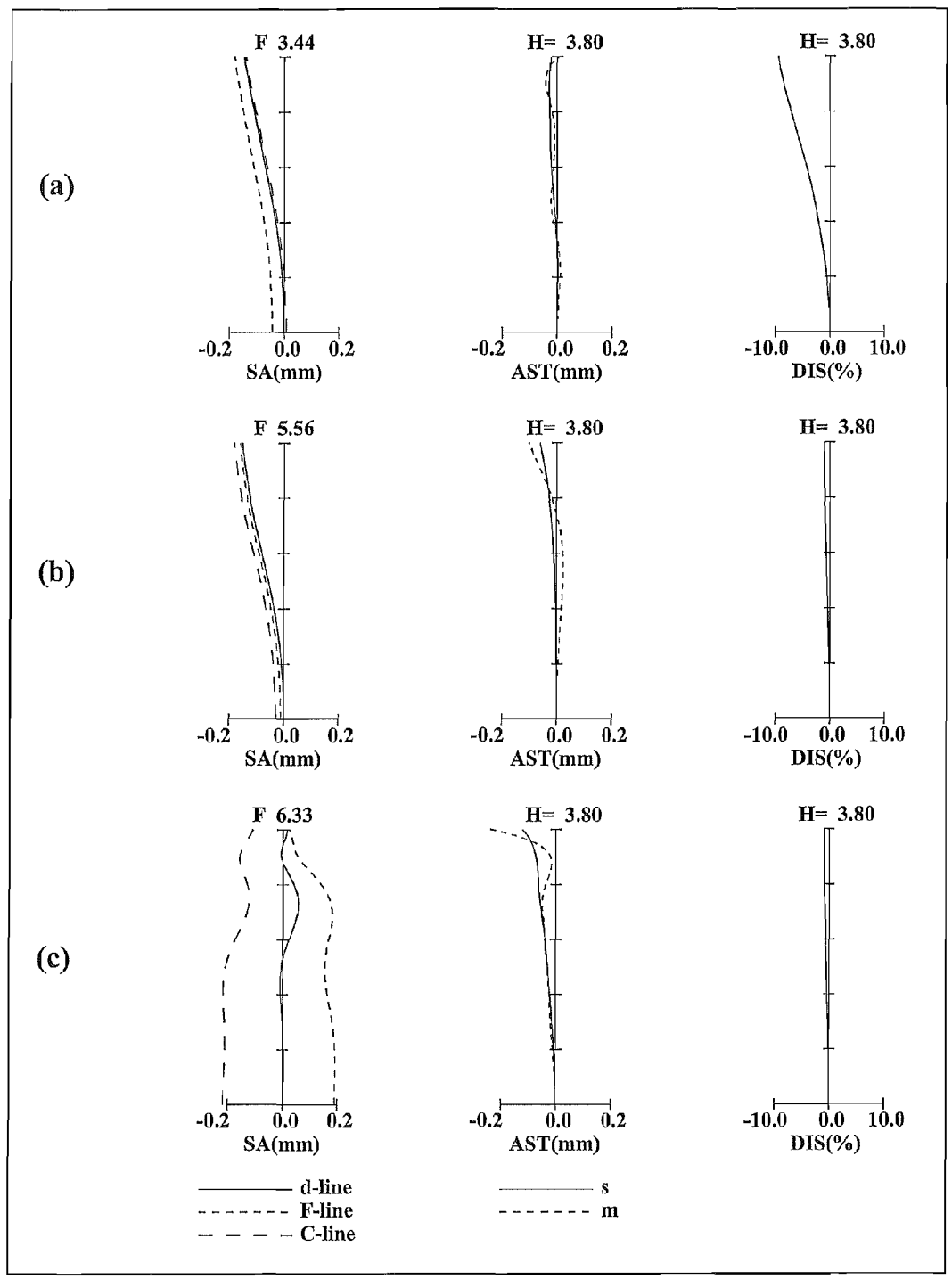
FIG. 29 is a longitudinal aberration diagram of an infinity in-focus condition of a zoom lens system according to Example 10.
Figure 30:
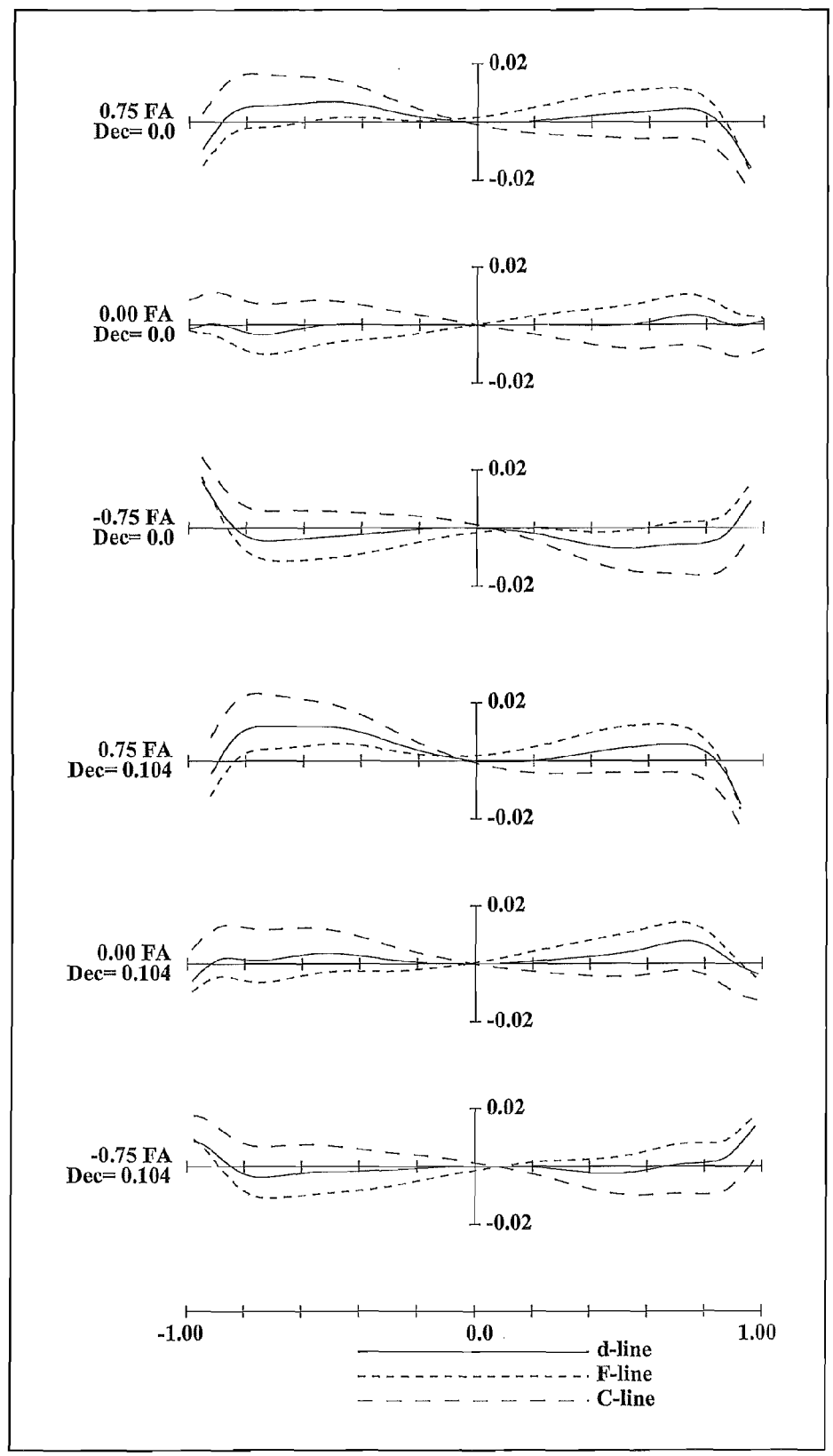
FIG. 30 is a lateral aberration diagram of a zoom lens system according to Example 10 at a telephoto limit in a basic state where image blur compensation is not performed and in a blur compensation state.

As shown in FIG. 28, in the zoom lens system according to Embodiment 10, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

Further, in the zoom lens system according to Embodiment 10, the second lens unit G2, in order from the object side to the image side, comprises: a bi-convex third lens element L3; a bi-convex fourth lens element L4; a bi-concave fifth lens element L5; and a bi-convex sixth lens element L6. Among these, the fourth lens element L4 and the fifth lens element L5 are cemented with each other. In the surface data in the corresponding numerical example described later, surface number 8 indicates the cement layer between the fourth lens element L4 and the fifth lens element L5. Further, the third lens element L3 has an aspheric object side surface.

Moreover, in the zoom lens system according to Embodiment 10, the third lens unit G3 comprises solely a positive meniscus seventh lens element L7 with the convex surface facing the image side. The seventh lens element L7 has an aspheric image side surface.

In the zoom lens system according to Embodiment 10, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 31:
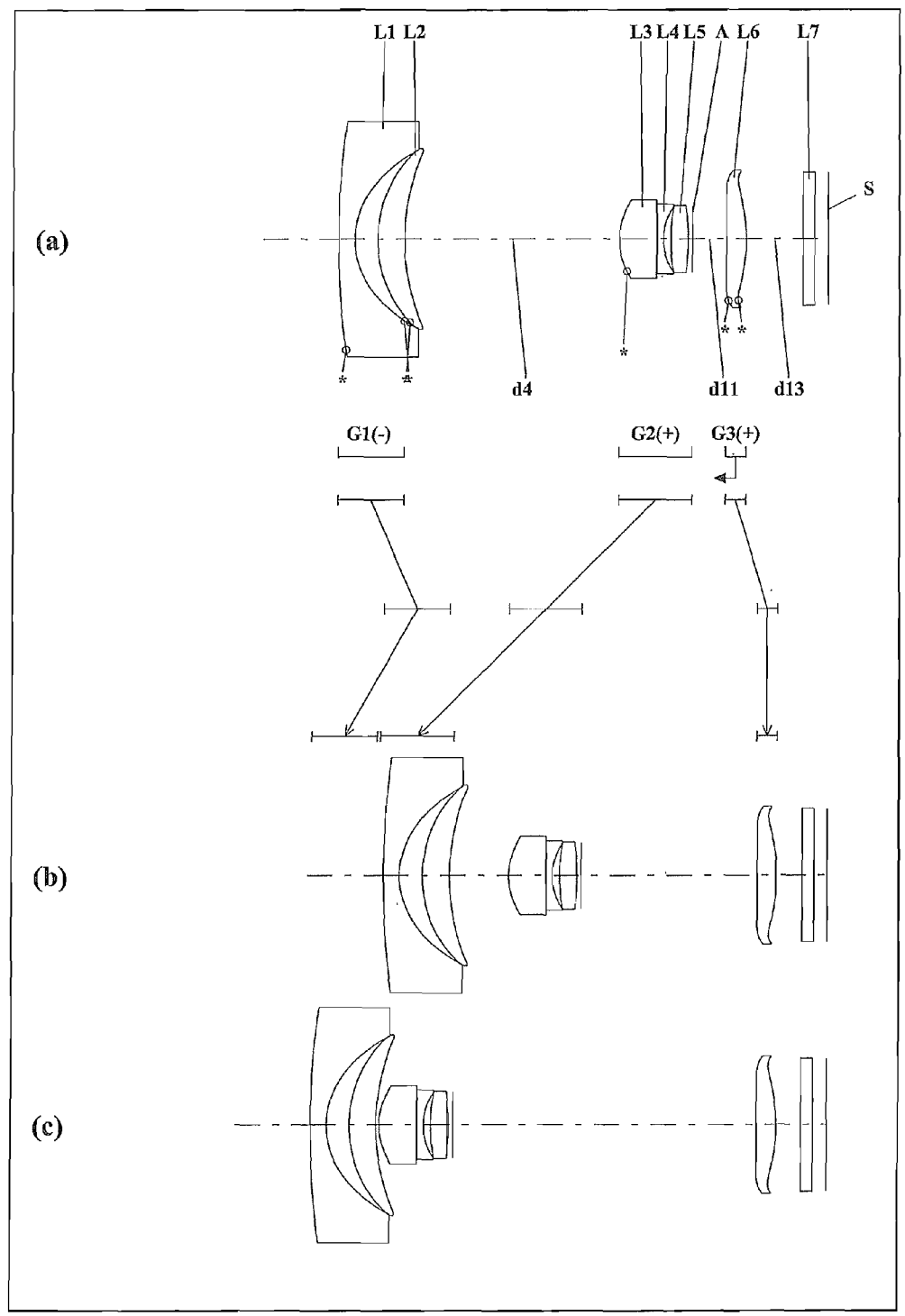
FIG. 31 is a lens arrangement diagram showing an infinity in-focus condition of a zoom lens system according to Embodiment 11 (Example 11).
Figure 32:
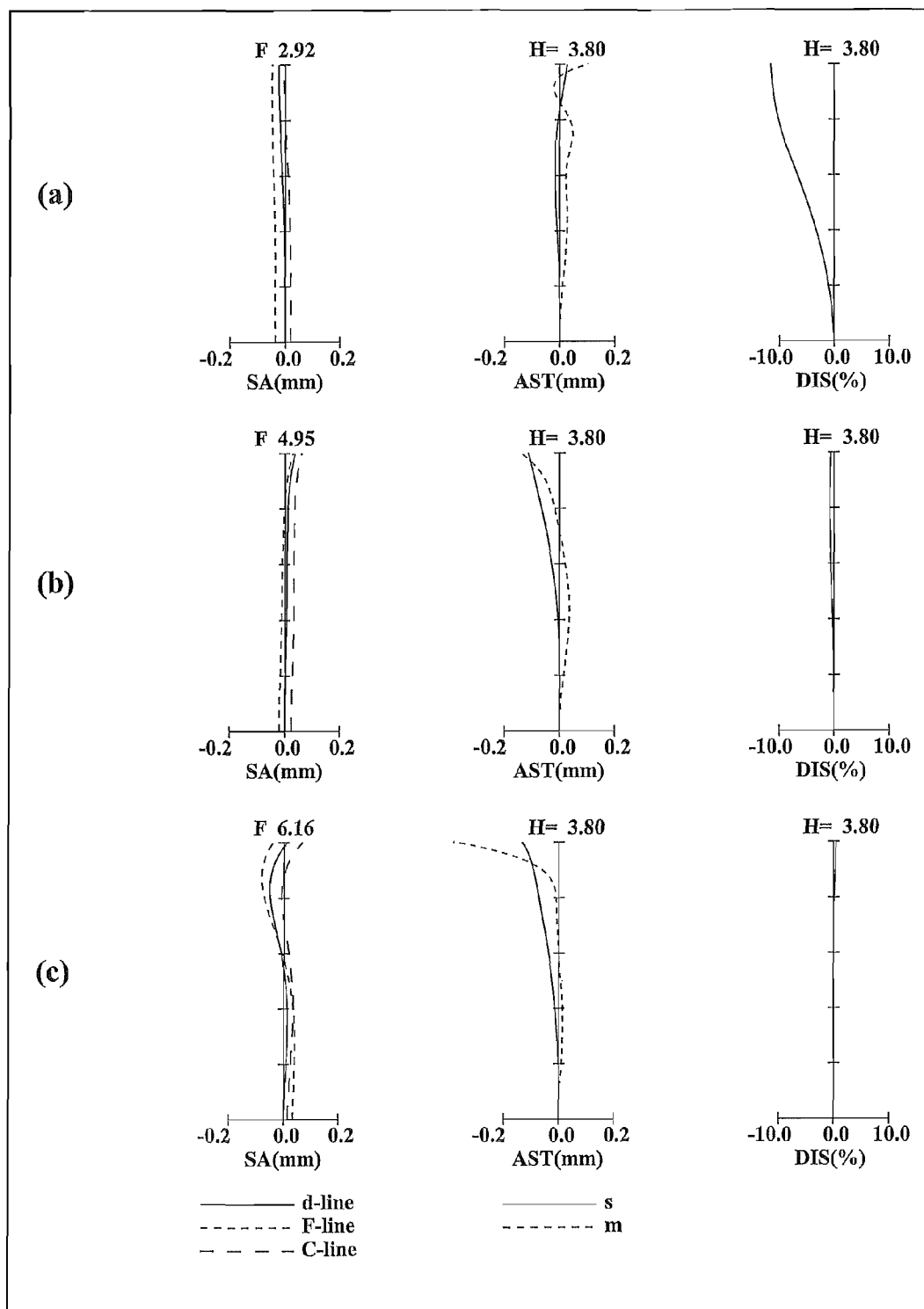
FIG. 32 is a longitudinal aberration diagram of an infinity in-focus condition of a zoom lens system according to Example 11.
Figure 33:
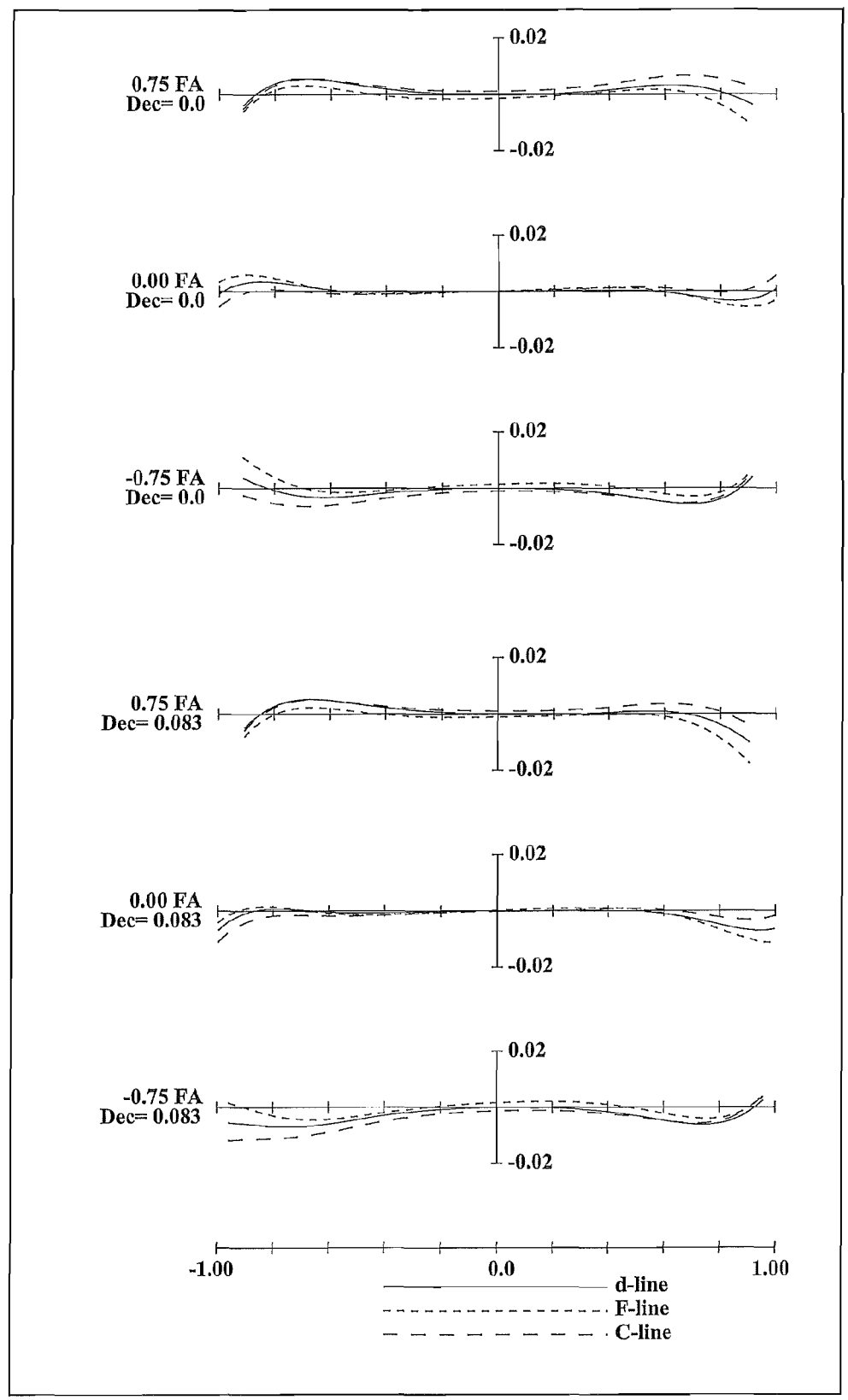
FIG. 33 is a lateral aberration diagram of a zoom lens system according to Example 11 at a telephoto limit in a basic state where image blur compensation is not performed and in a blur compensation state.

As shown in FIG. 31, in the zoom lens system according to Embodiment 11, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces, while the second lens element L2 has an aspheric object side surface.

Further, in the zoom lens system according to Embodiment 11, the second lens unit G2, in order from the object side to the image side, comprises: a bi-convex third lens element L3; a bi-concave fourth lens element L4; and a bi-convex fifth lens element L5. Among these, the third lens element L3 and the fourth lens element L4 are cemented with each other. In the surface data in the corresponding numerical example described later, surface number 6 indicates the cement layer between the third lens element L3 and the fourth lens element L4. Further, the third lens element L3 has an aspheric object side surface.

Further, in the zoom lens system of Embodiment 11, the third lens unit G3 comprises solely a bi-convex sixth lens element L6. The sixth lens element L6 has two aspheric surfaces.

In the zoom lens system according to Embodiment 11, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 34:
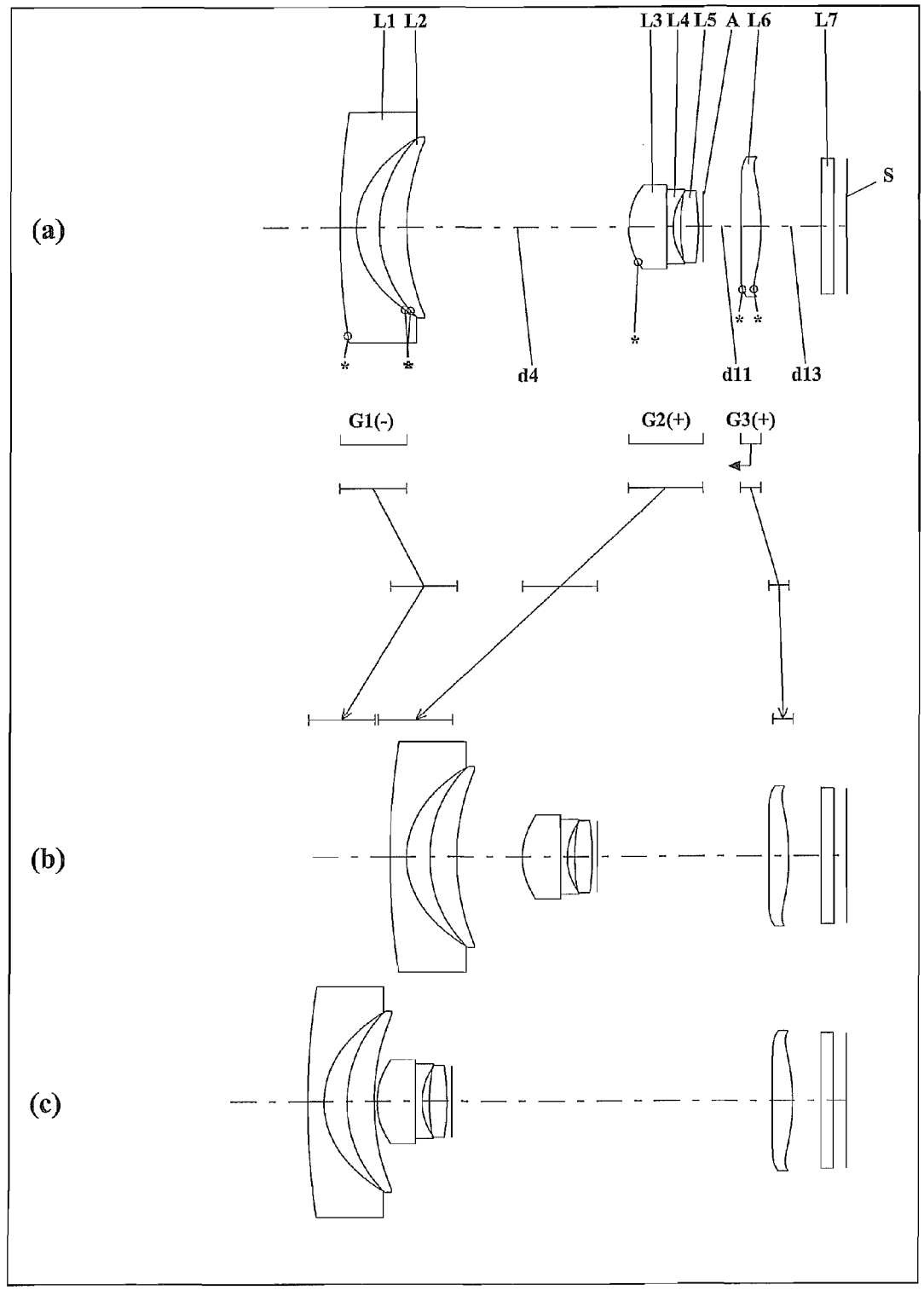
FIG. 34 is a lens arrangement diagram showing an infinity in-focus condition of a zoom lens system according to Embodiment 12 (Example 12).
Figure 35:
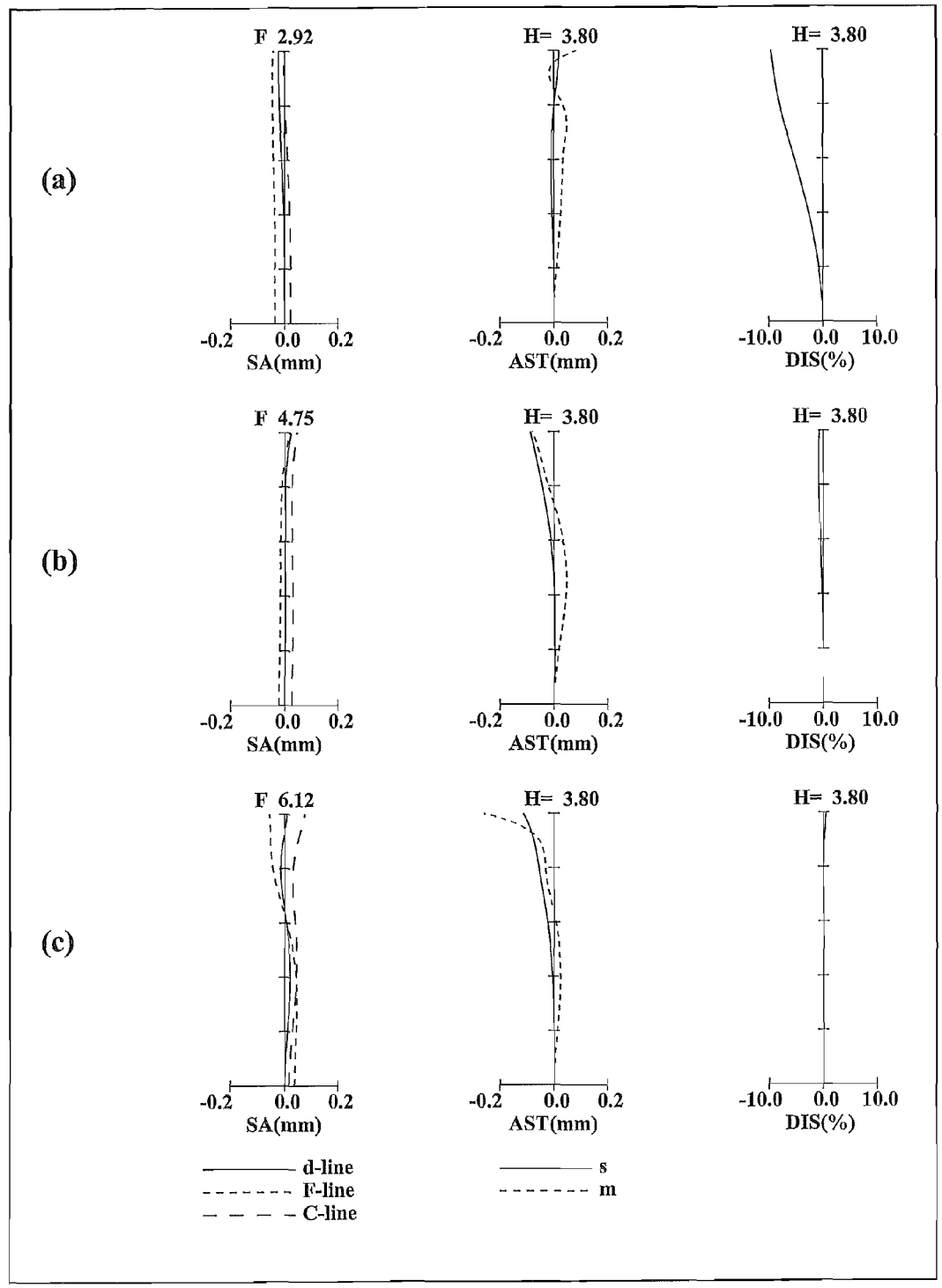
FIG. 35 is a longitudinal aberration diagram of an infinity in-focus condition of a zoom lens system according to Example 12.
Figure 36:
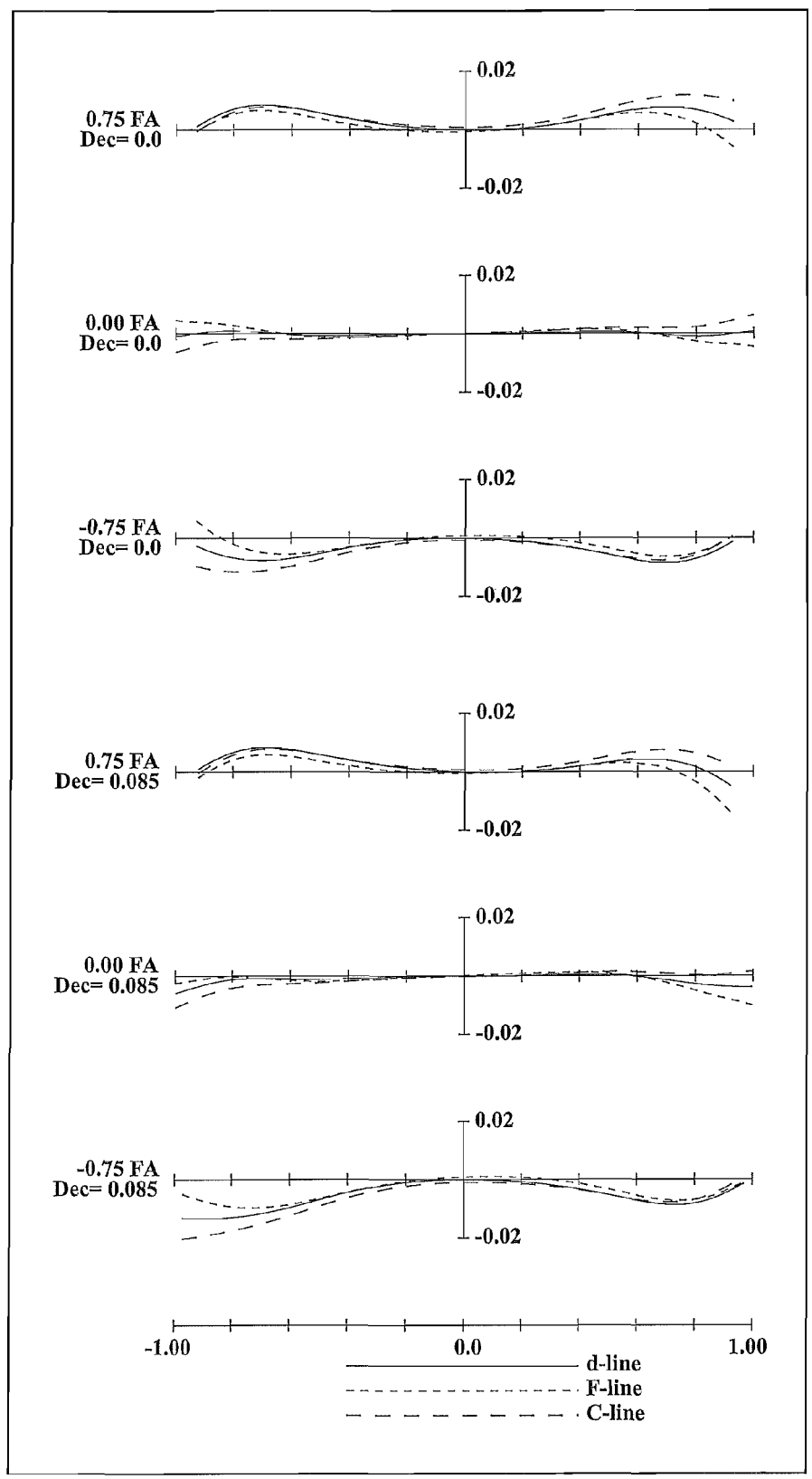
FIG. 36 is a lateral aberration diagram of a zoom lens system according to Example 12 at a telephoto limit in a basic state where image blur compensation is not performed and in a blur compensation state.

As shown in FIG. 34, in the zoom lens system according to Embodiment 12, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces, while the second lens element L2 has an aspheric object side surface.

Further, in the zoom lens system according to Embodiment 12, the second lens unit G2, in order from the object side to the image side, comprises: a bi-convex third lens element L3; a bi-concave fourth lens element L4; and a bi-convex fifth lens element L5. Among these, the third lens element L3 and the fourth lens element L4 are cemented with each other. In the surface data in the corresponding numerical example described later, surface number 6 indicates the cement layer between the third lens element L3 and the fourth lens element L4. Further, the third lens element L3 has an aspheric object side surface.

Further, in the zoom lens system of Embodiment 12, the third lens unit G3 comprises solely a bi-convex sixth lens element L6. The sixth lens element L6 has two aspheric surfaces.

In the zoom lens system according to Embodiment 12, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 37:
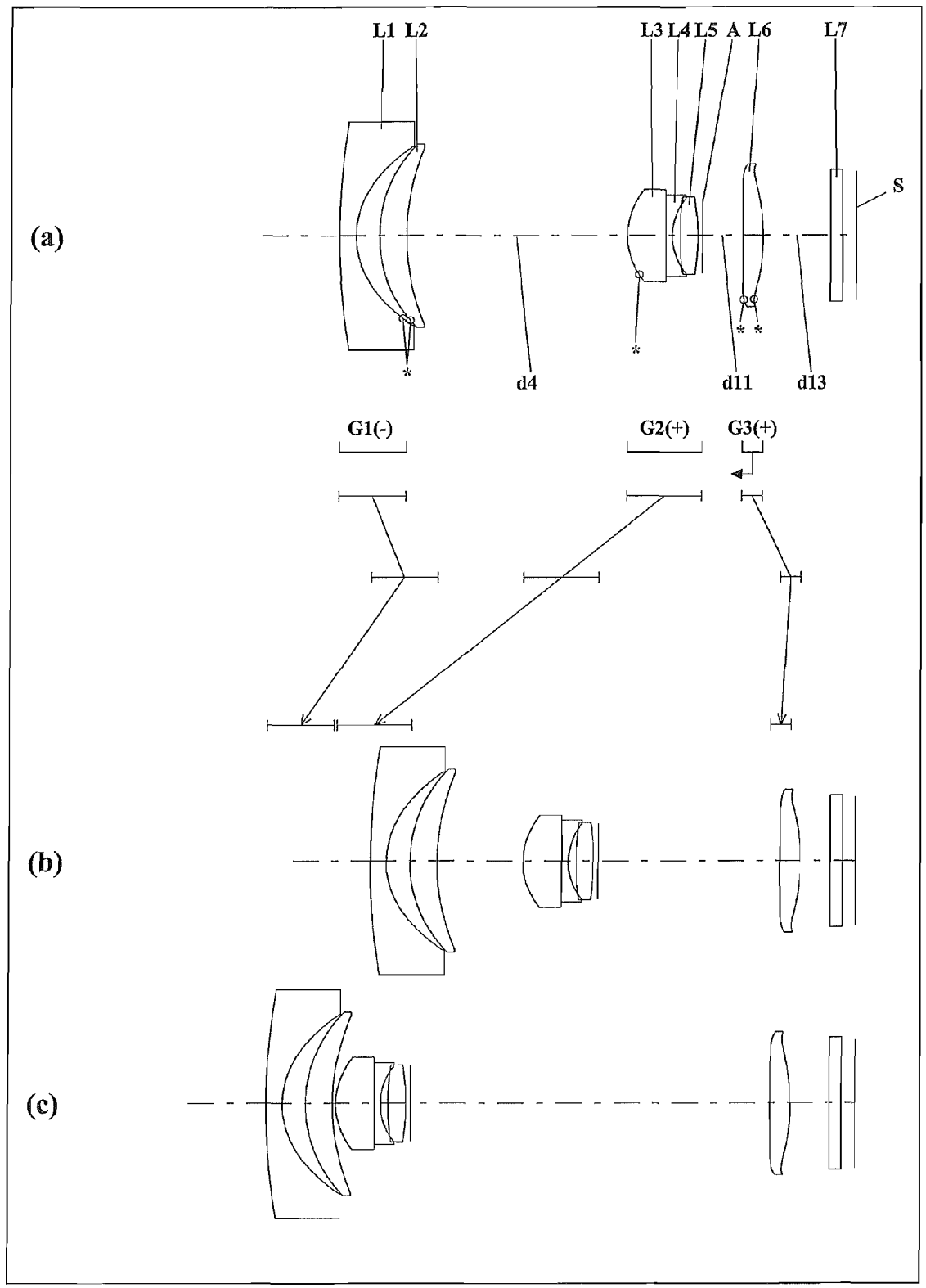
FIG. 37 is a lens arrangement diagram showing an infinity in-focus condition of a zoom lens system according to Embodiment 13 (Example 13).
Figure 38:
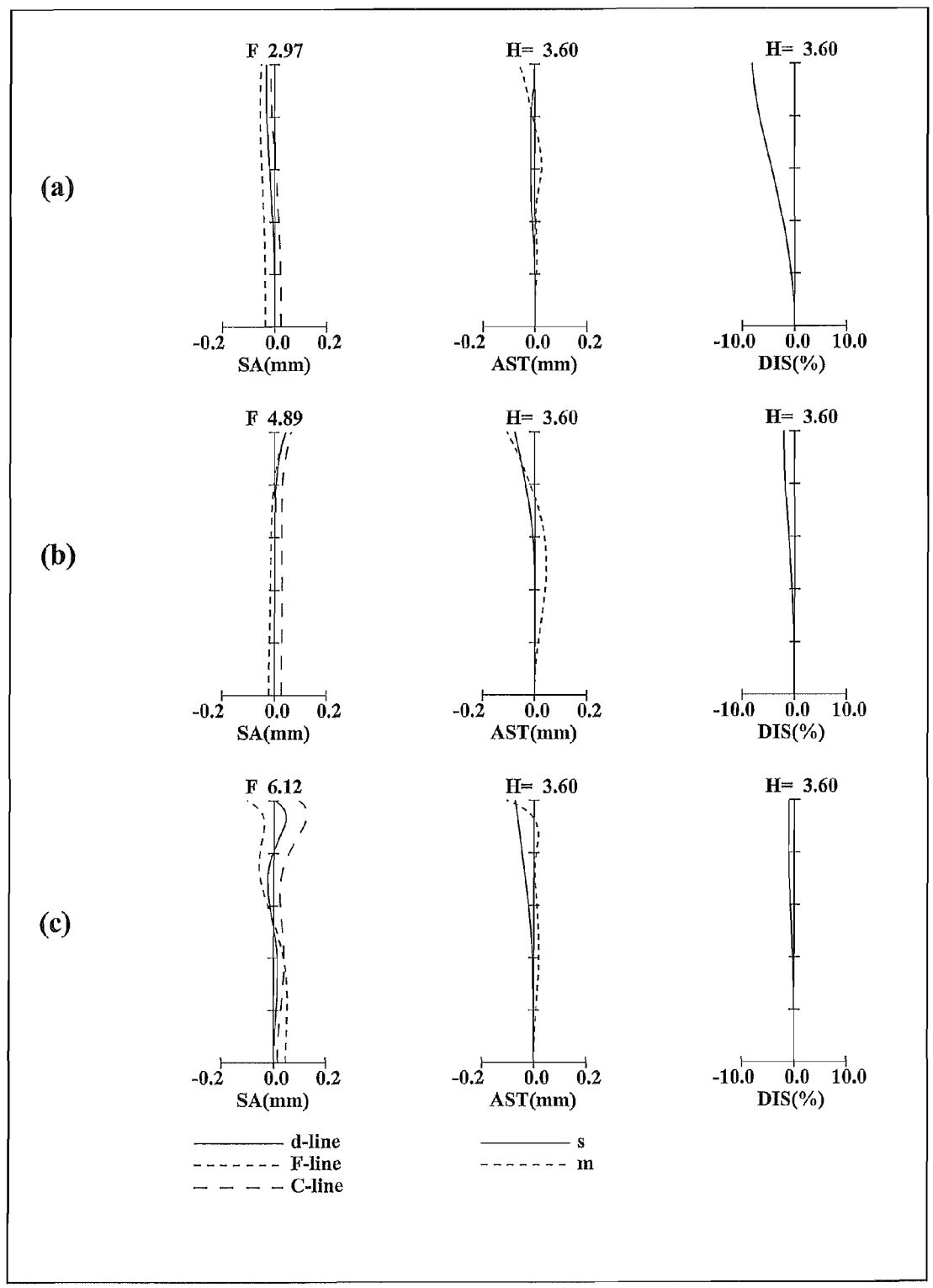
FIG. 38 is a longitudinal aberration diagram of an infinity in-focus condition of a zoom lens system according to Example 13.
Figure 39:
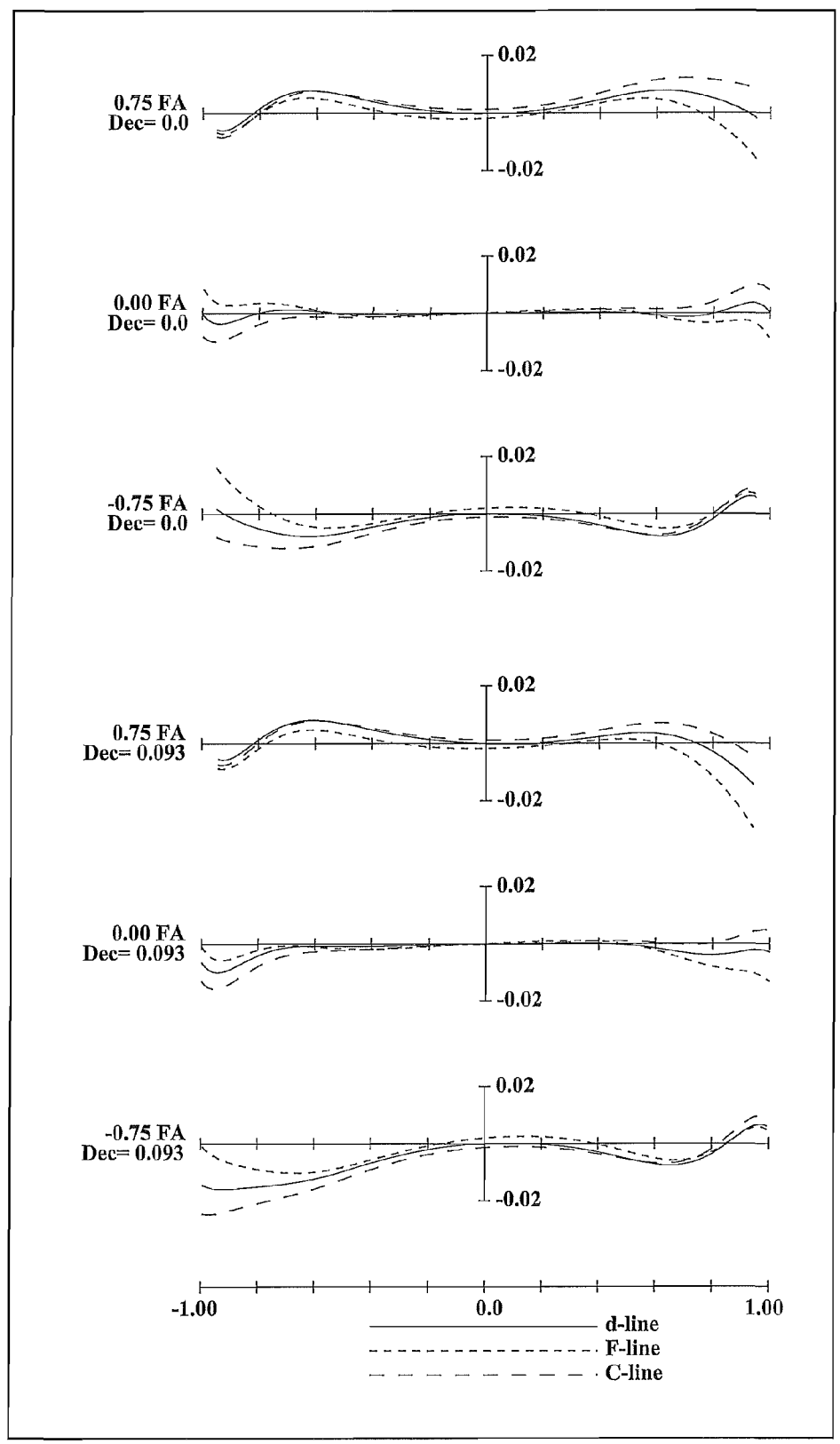
FIG. 39 is a lateral aberration diagram of a zoom lens system according to Example 13 at a telephoto limit in a basic state where image blur compensation is not performed and in a blur compensation state.

As shown in FIG. 37, in the zoom lens system according to Embodiment 13, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface, while the second lens element L2 has an aspheric object side surface.

Further, in the zoom lens system according to Embodiment 13, the second lens unit G2, in order from the object side to the image side, comprises: a bi-convex third lens element L3; a bi-concave fourth lens element L4; and a bi-convex fifth lens element L5. Among these, the third lens element L3 and the fourth lens element L4 are cemented with each other. In the surface data in the corresponding numerical example described later, surface number 6 indicates the cement layer between the third lens element L3 and the fourth lens element L4. Further, the third lens element L3 has an aspheric object side surface.

Further, in the zoom lens system of Embodiment 13, the third lens unit G3 comprises solely a bi-convex sixth lens element L6. The sixth lens element L6 has two aspheric surfaces.

In the zoom lens system according to Embodiment 13, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 40:
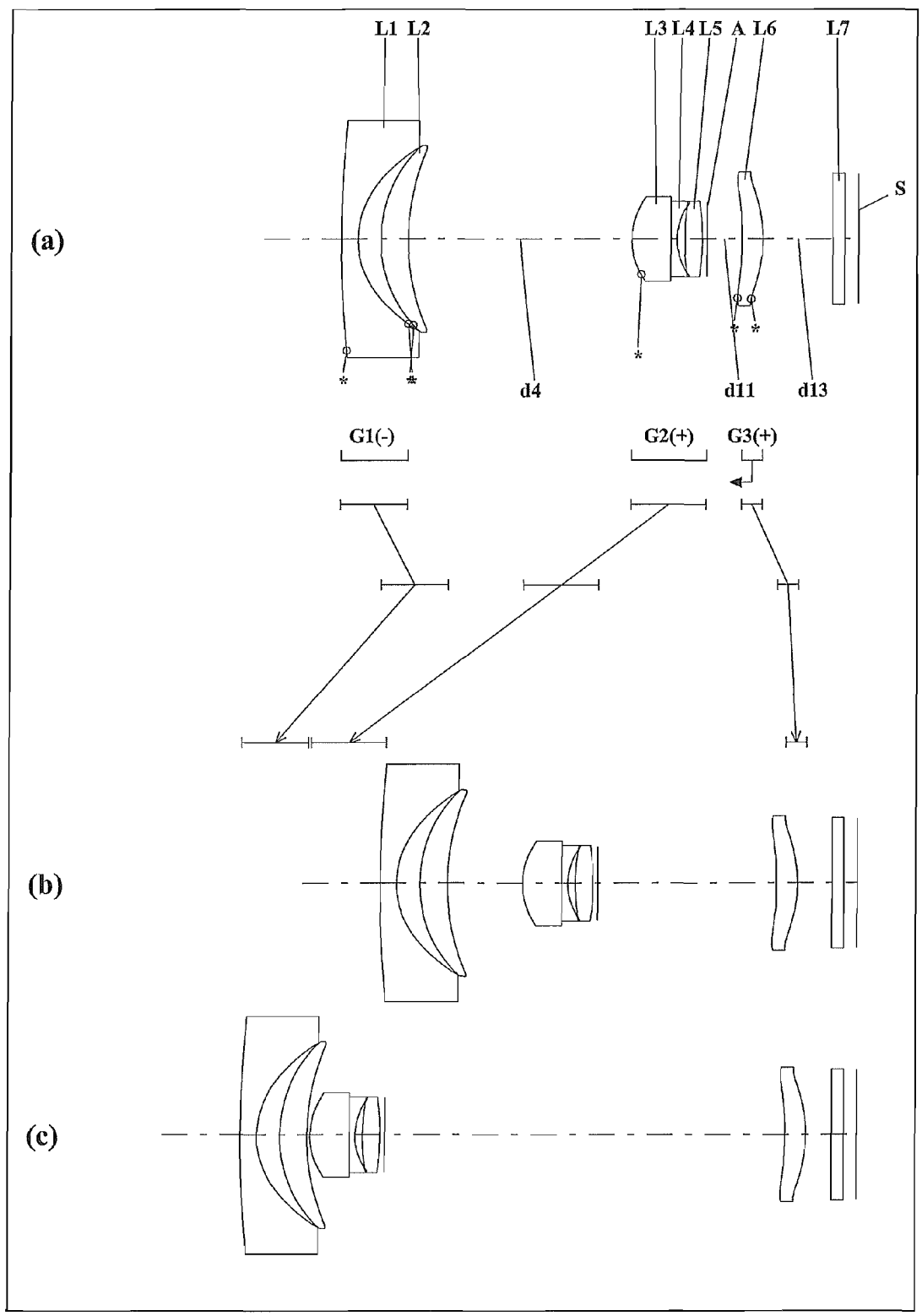
FIG. 40 is a lens arrangement diagram showing an infinity in-focus condition of a zoom lens system according to Embodiment 14 (Example 14).
Figure 41:
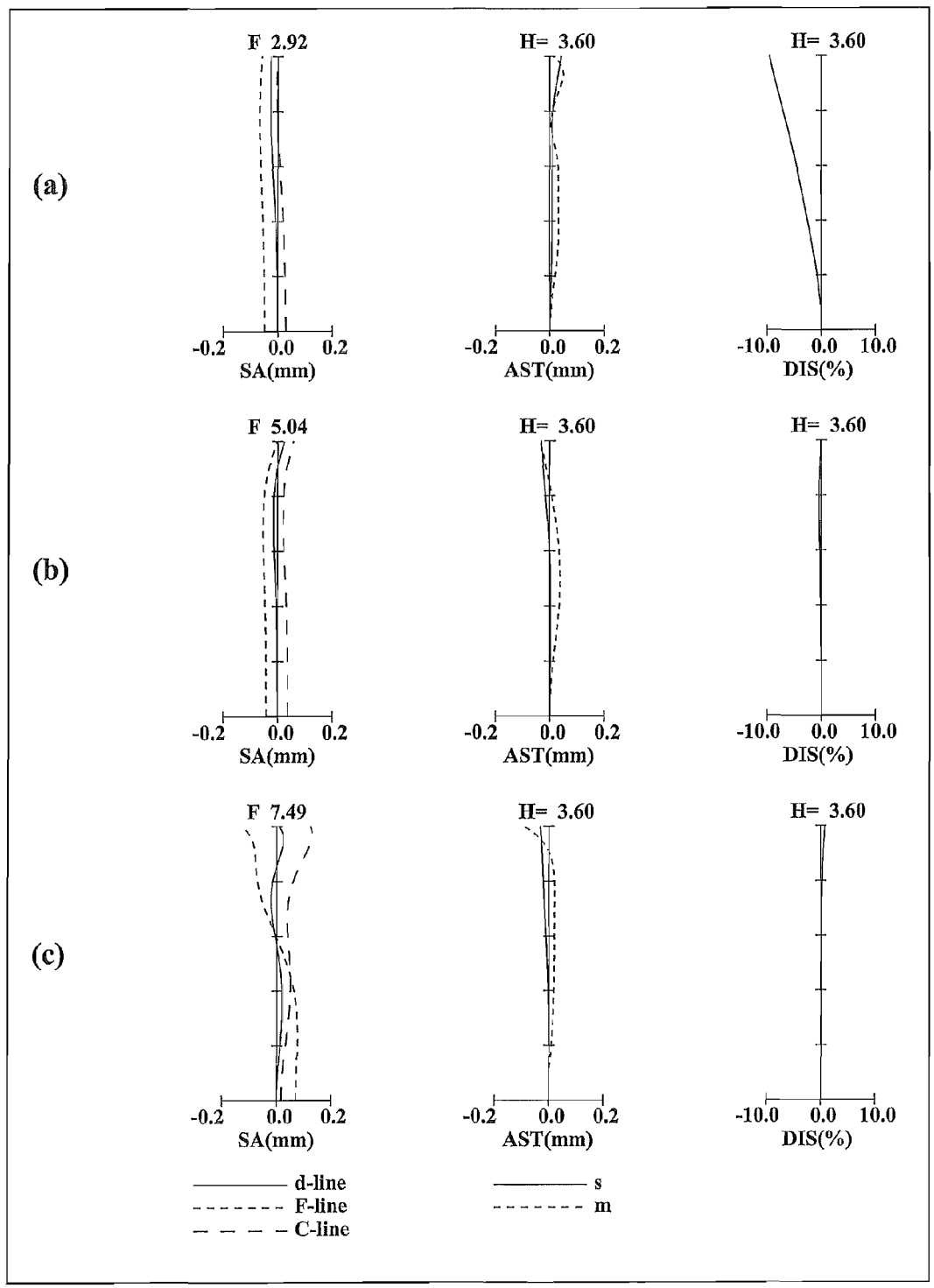
FIG. 41 is a longitudinal aberration diagram of an infinity in-focus condition of a zoom lens system according to Example 14.
Figure 42:
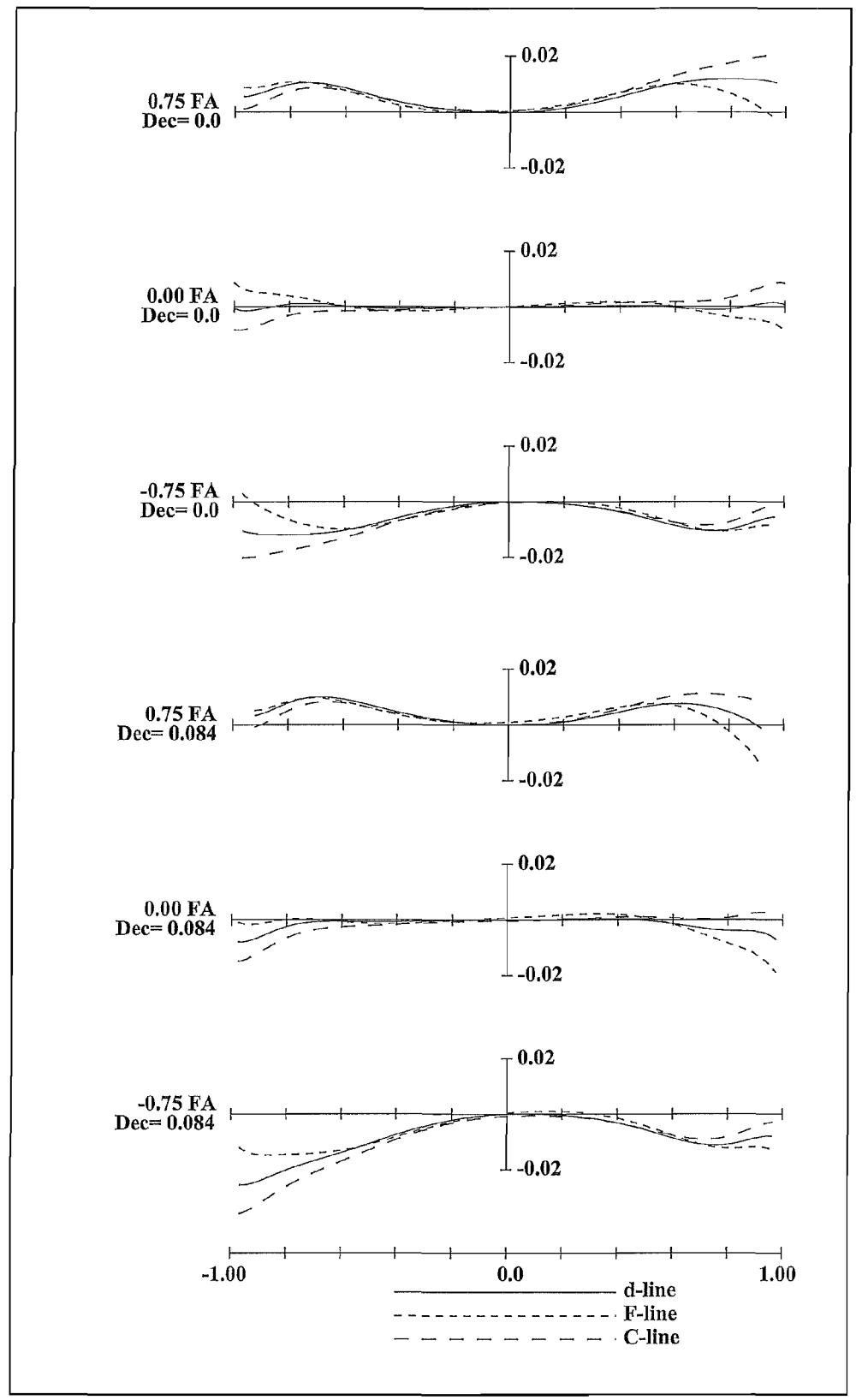
FIG. 42 is a lateral aberration diagram of a zoom lens system according to Example 14 at a telephoto limit in a basic state where image blur compensation is not performed and in a blur compensation state.

As shown in FIG. 40, in the zoom lens system according to Embodiment 14, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces, while the second lens element L2 has an aspheric object side surface.

Further, in the zoom lens system according to Embodiment 14, the second lens unit G2, in order from the object side to the image side, comprises: a positive meniscus third lens element L3 with the convex surface facing the object side; a negative meniscus fourth lens element L4 with the convex surface facing the object side; and a bi-convex fifth lens element L5. Among these, the third lens element L3 and the fourth lens element L4 are cemented with each other. In the surface data in the corresponding numerical example described later, surface number 6 indicates the cement layer between the third lens element L3 and the fourth lens element L4. Further, the third lens element L3 has an aspheric object side surface.

Moreover, in the zoom lens system according to Embodiment 14, the third lens unit G3 comprises solely a positive meniscus sixth lens element L6 with the convex surface facing the image side. The sixth lens element L6 has two aspheric surfaces.

In the zoom lens system according to Embodiment 14, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 43:
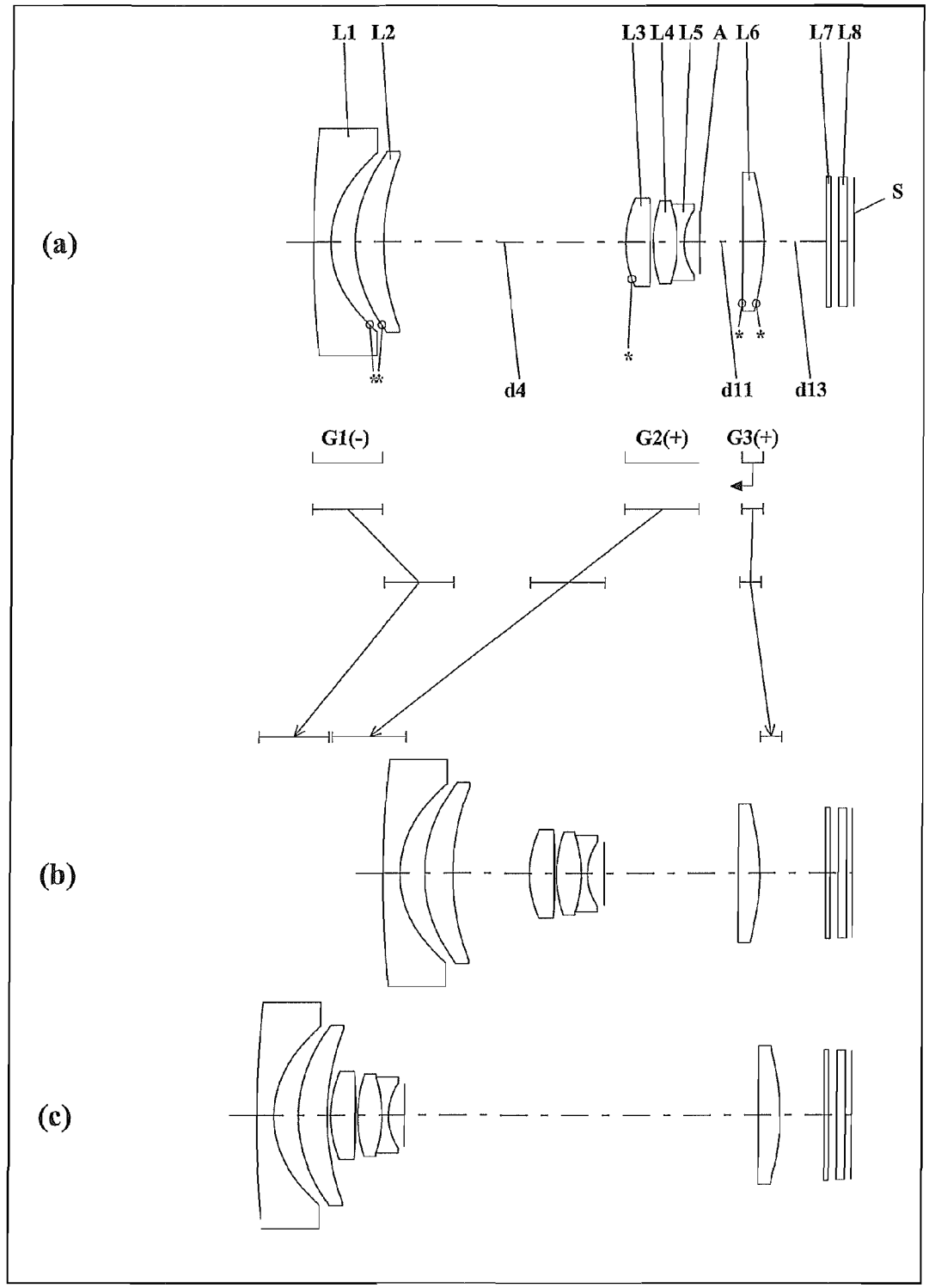
FIG. 43 is a lens arrangement diagram showing an infinity in-focus condition of a zoom lens system according to Embodiment 15 (Example 15).
Figure 44:
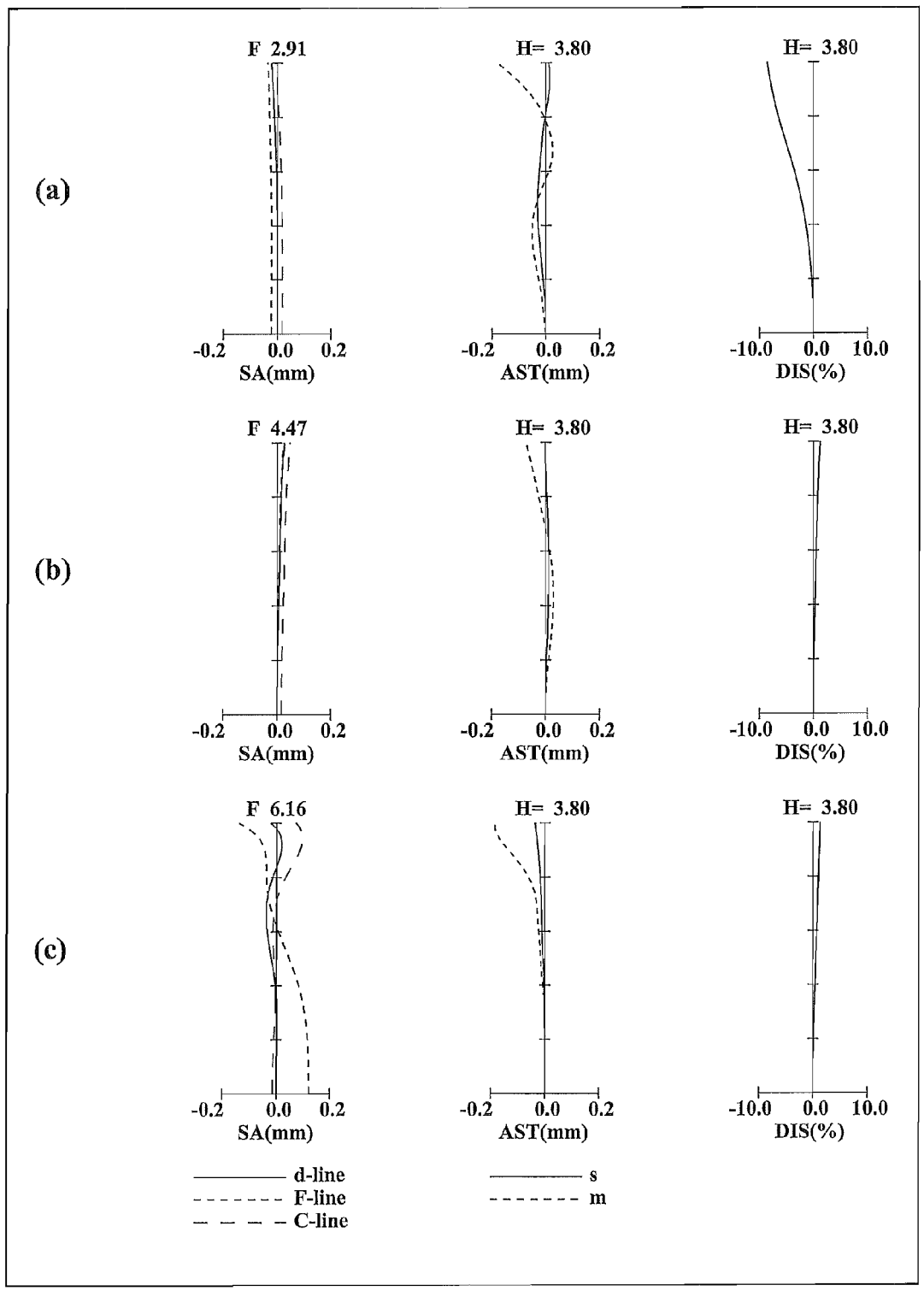
FIG. 44 is a longitudinal aberration diagram of an infinity in-focus condition of a zoom lens system according to Example 15.
Figure 45:
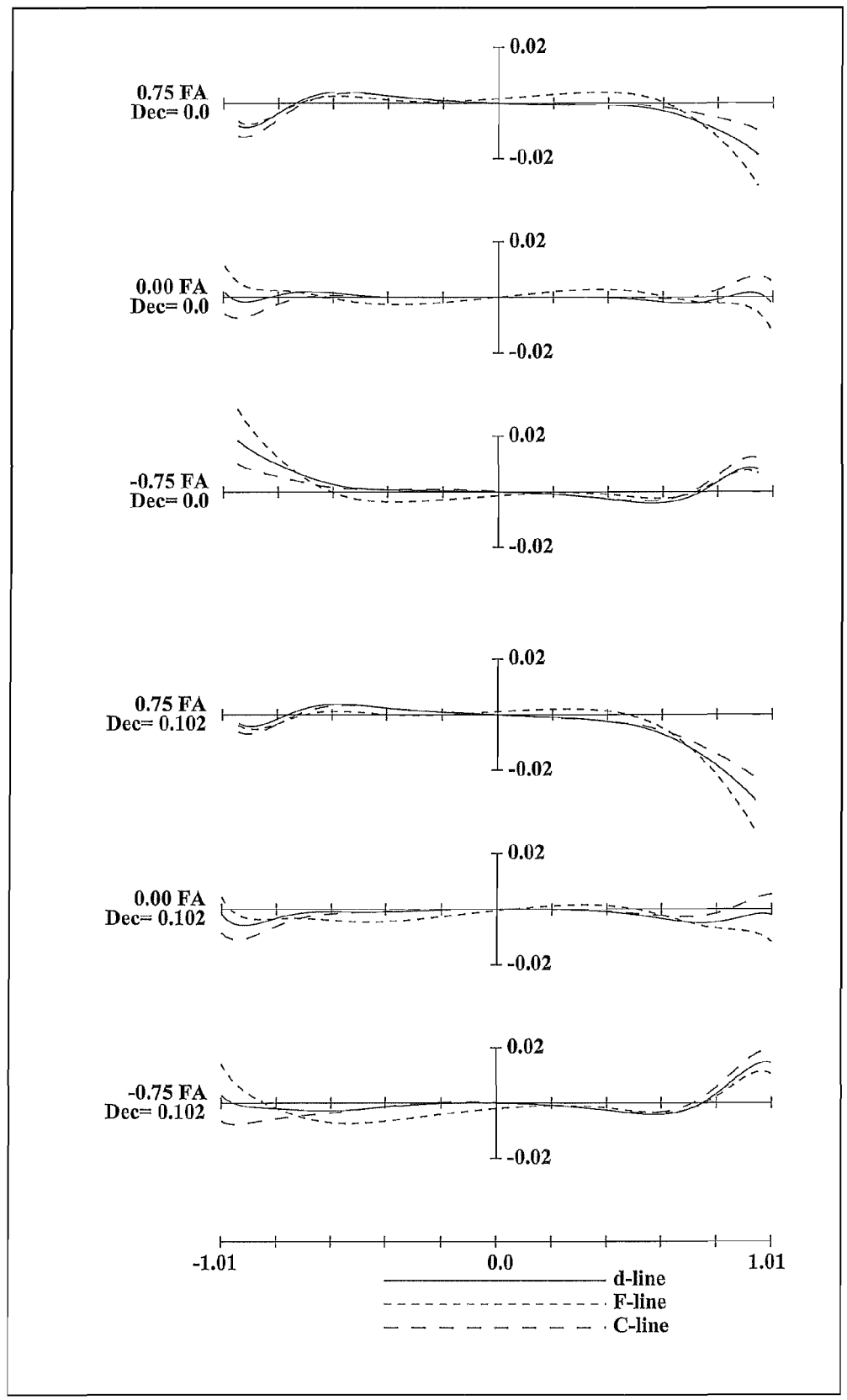
FIG. 45 is a lateral aberration diagram of a zoom lens system according to Example 15 at a telephoto limit in a basic state where image blur compensation is not performed and in a blur compensation state.

As shown in FIG. 43, in the zoom lens system according to Embodiment 15, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface, while the second lens element L2 has an aspheric object side surface.

Further, in the zoom lens system according to Embodiment 15, the second lens unit G2, in order from the object side to the image side, comprises: a bi-convex third lens element L3; a bi-convex fourth lens element L4; and a bi-concave fifth lens element L5. Among these, the fourth lens element L4 and the fifth lens element L5 are cemented with each other. In the surface data in the corresponding numerical example described later, surface number 8 indicates the cement layer between the fourth lens element L4 and the fifth lens element L5. Further, the third lens element L3 has an aspheric object side surface.

Moreover, in the zoom lens system according to Embodiment 15, the third lens unit G3 comprises solely a positive meniscus sixth lens element L6 with the convex surface facing the image side. The sixth lens element L6 has two aspheric surfaces.

In the zoom lens system according to Embodiment 15, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 46:
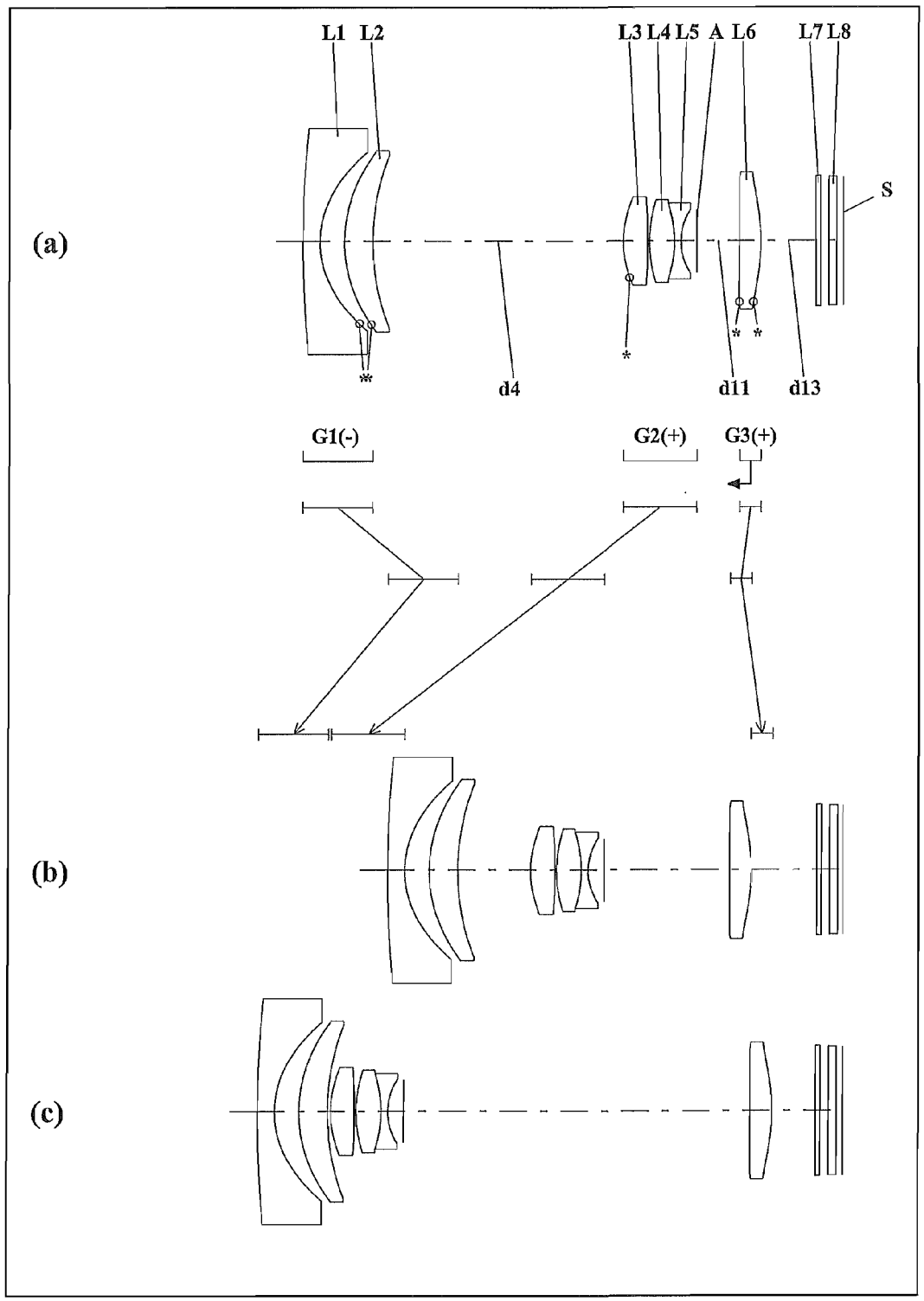
FIG. 46 is a lens arrangement diagram showing an infinity in-focus condition of a zoom lens system according to Embodiment 16 (Example 16).
Figure 47:
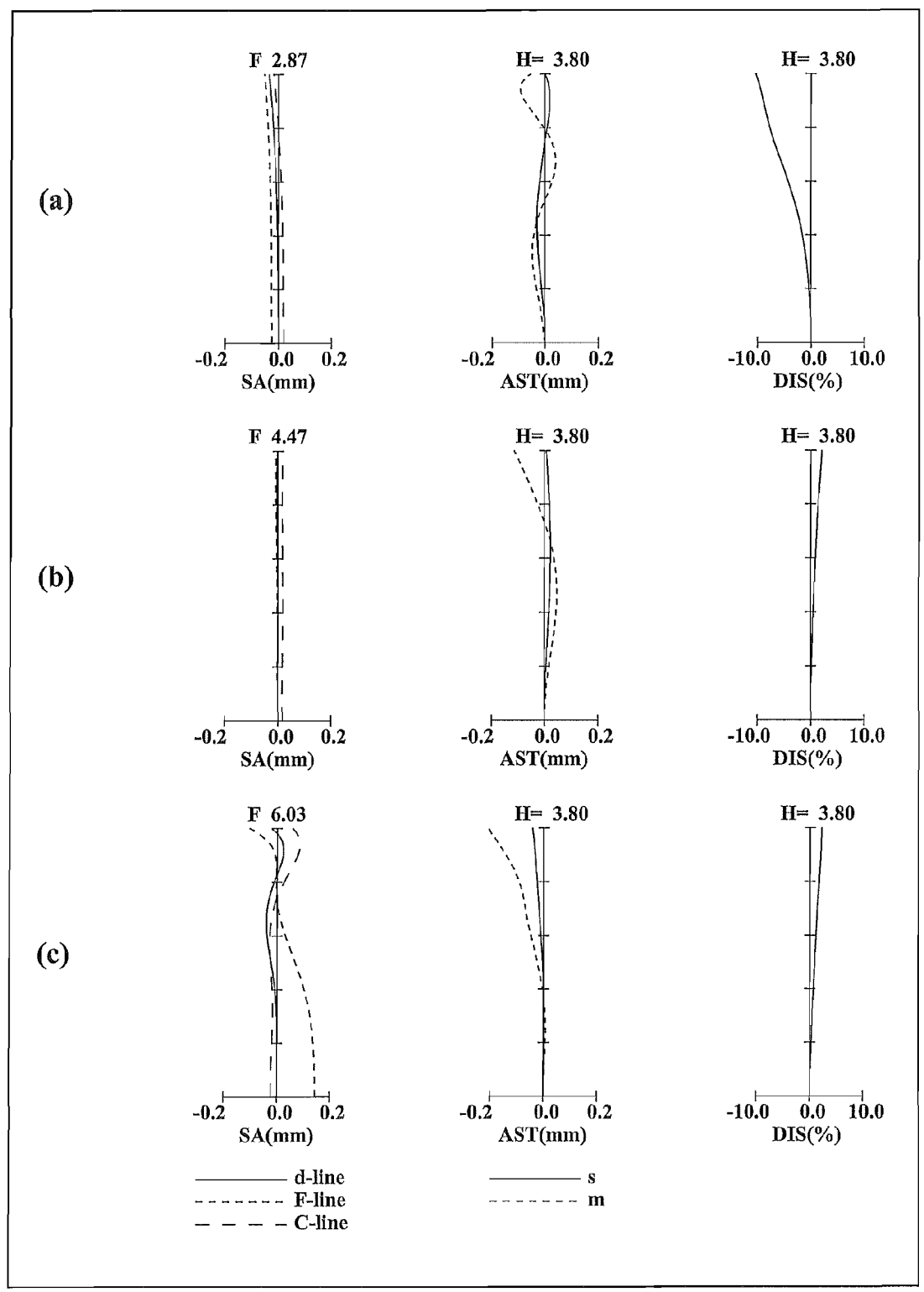
FIG. 47 is a longitudinal aberration diagram of an infinity in-focus condition of a zoom lens system according to Example 16.
Figure 48:
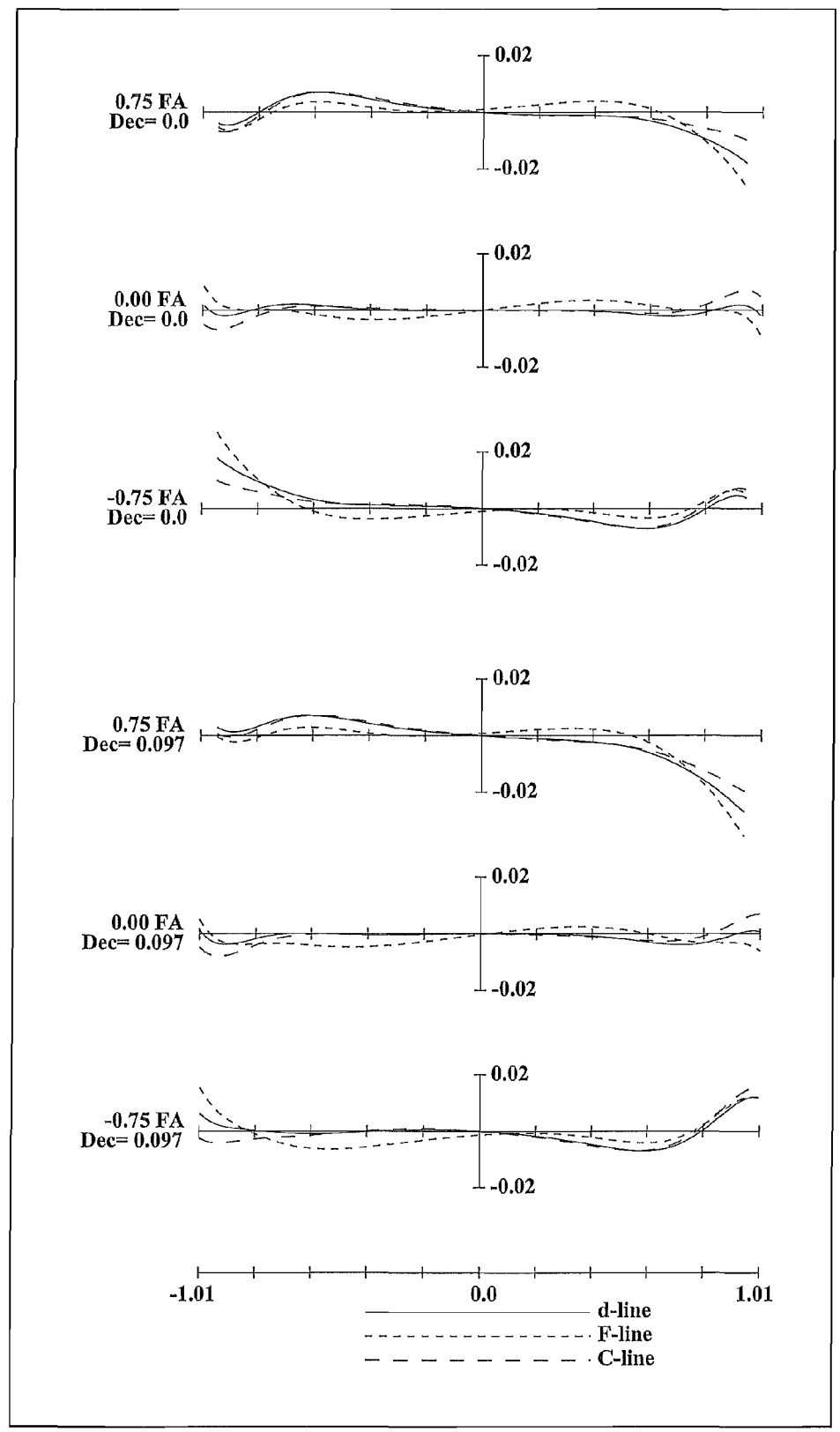
FIG. 48 is a lateral aberration diagram of a zoom lens system according to Example 16 at a telephoto limit in a basic state where image blur compensation is not performed and in a blur compensation state.

As shown in FIG. 46, in the zoom lens system according to Embodiment 16, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface, while the second lens element L2 has an aspheric object side surface.

Further, in the zoom lens system according to Embodiment 16, the second lens unit G2, in order from the object side to the image side, comprises: a bi-convex third lens element L3; a bi-convex fourth lens element L4; and a bi-concave fifth lens element L5. Among these, the fourth lens element L4 and the fifth lens element L5 are cemented with each other. In the surface data in the corresponding numerical example described later, surface number 8 indicates the cement layer between the fourth lens element L4 and the fifth lens element L5. Further, the third lens element L3 has an aspheric object side surface.

Moreover, in the zoom lens system according to Embodiment 16, the third lens unit G3 comprises solely a positive meniscus sixth lens element L6 with the convex surface facing the image side. The sixth lens element L6 has two aspheric surfaces.

In the zoom lens system according to Embodiment 16, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 49:
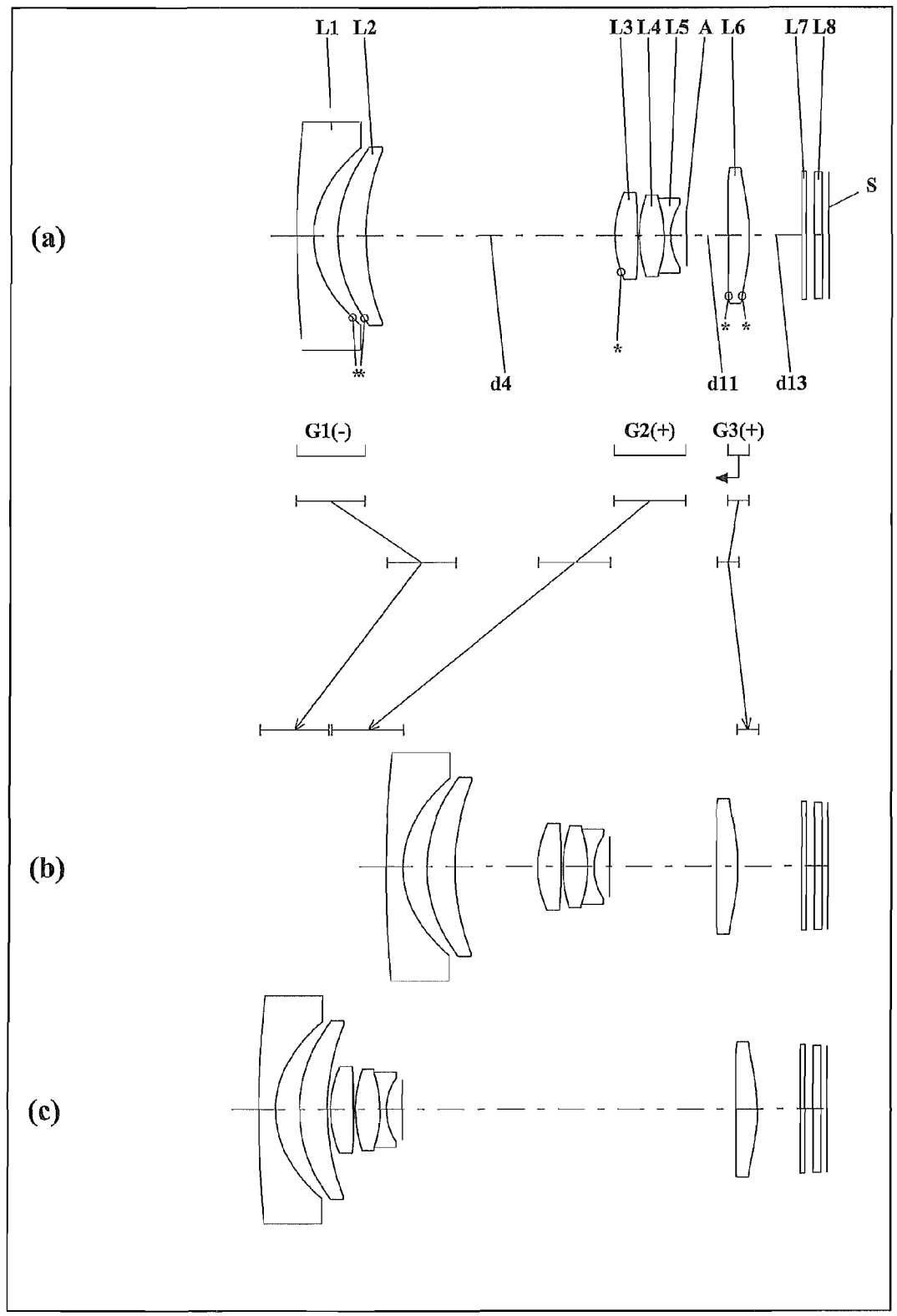
FIG. 49 is a lens arrangement diagram showing an infinity in-focus condition of a zoom lens system according to Embodiment 17 (Example 17).
Figure 50:
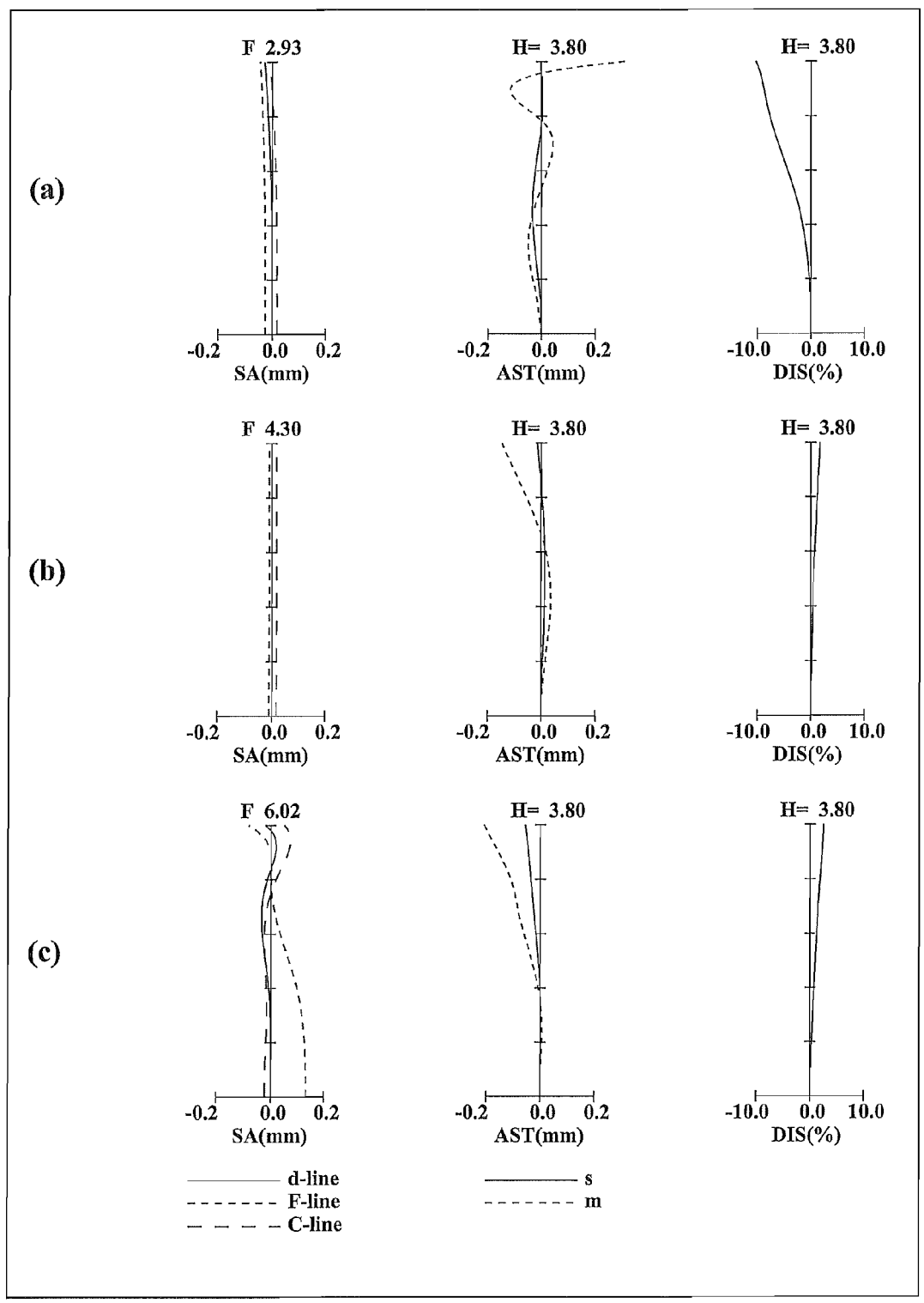
FIG. 50 is a longitudinal aberration diagram of an infinity in-focus condition of a zoom lens system according to Example 17.
Figure 51:
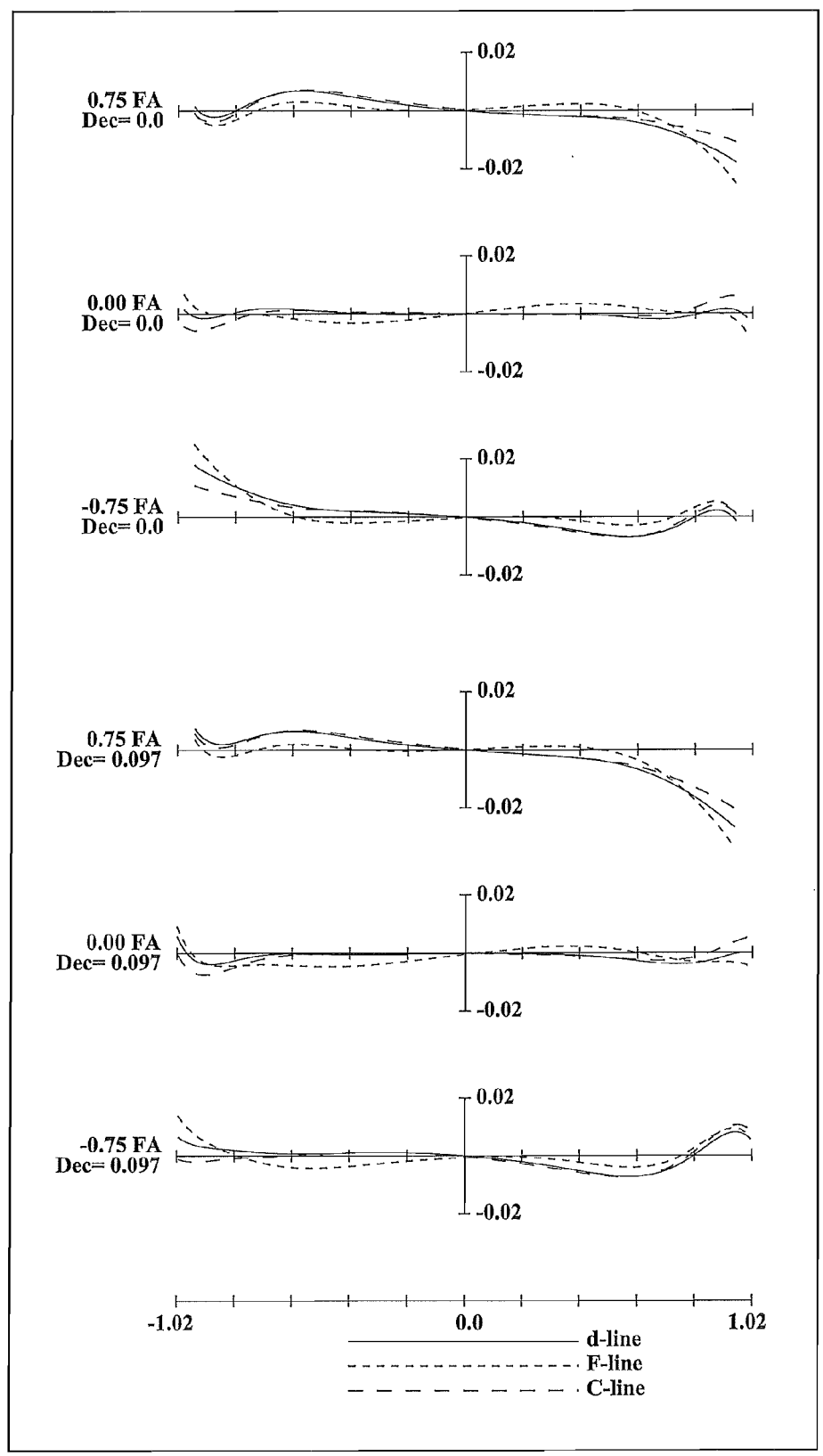
FIG. 51 is a lateral aberration diagram of a zoom lens system according to Example 17 at a telephoto limit in a basic state where image blur compensation is not performed and in a blur compensation state.

As shown in FIG. 49, in the zoom lens system according to Embodiment 17, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface, while the second lens element L2 has an aspheric object side surface.

Further, in the zoom lens system according to Embodiment 17, the second lens unit G2, in order from the object side to the image side, comprises: a bi-convex third lens element L3; a bi-convex fourth lens element L4; and a bi-concave fifth lens element L5. Among these, the fourth lens element L4 and the fifth lens element L5 are cemented with each other. In the surface data in the corresponding numerical example described later, surface number 8 indicates the cement layer between the fourth lens element L4 and the fifth lens element L5. Further, the third lens element L3 has an aspheric object side surface.

Moreover, in the zoom lens system according to Embodiment 17, the third lens unit G3 comprises solely a positive meniscus sixth lens element L6 with the convex surface facing the image side. The sixth lens element L6 has two aspheric surfaces.

In the zoom lens system according to Embodiment 17, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 52:
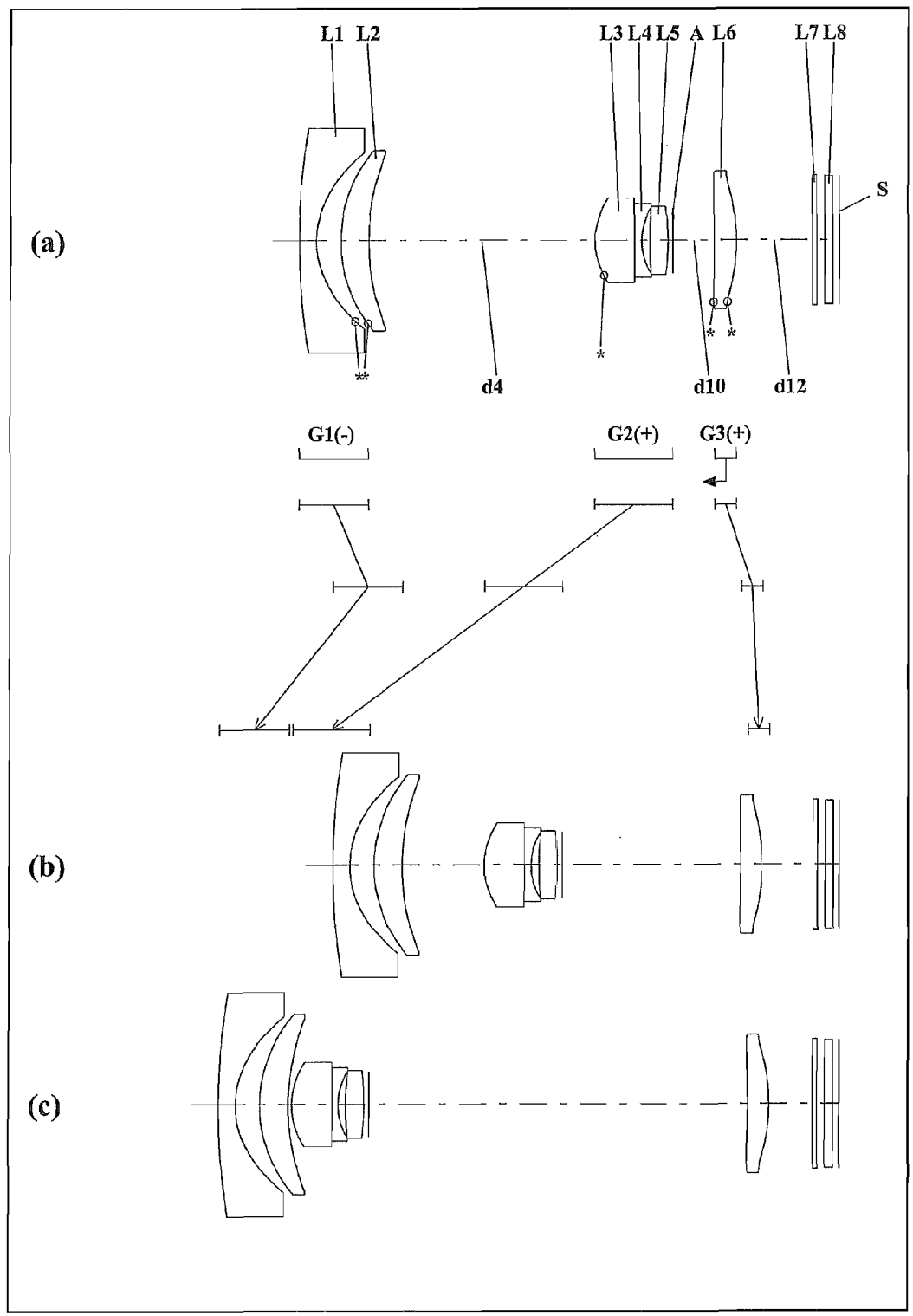
FIG. 52 is a lens arrangement diagram showing an infinity in-focus condition of a zoom lens system according to Embodiment 18 (Example 18).
Figure 53:
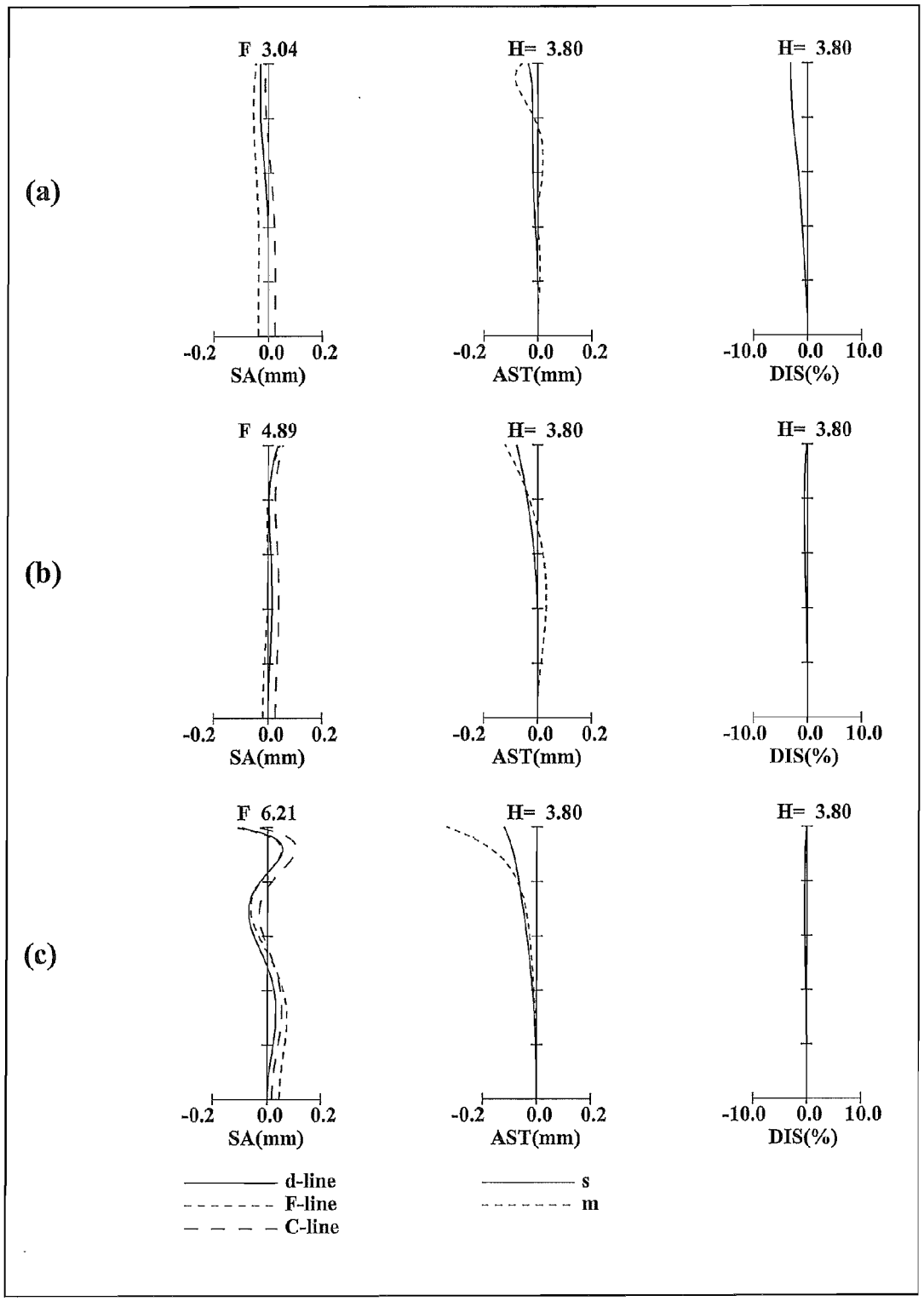
FIG. 53 is a longitudinal aberration diagram of an infinity in-focus condition of a zoom lens system according to Example 18.
Figure 54:
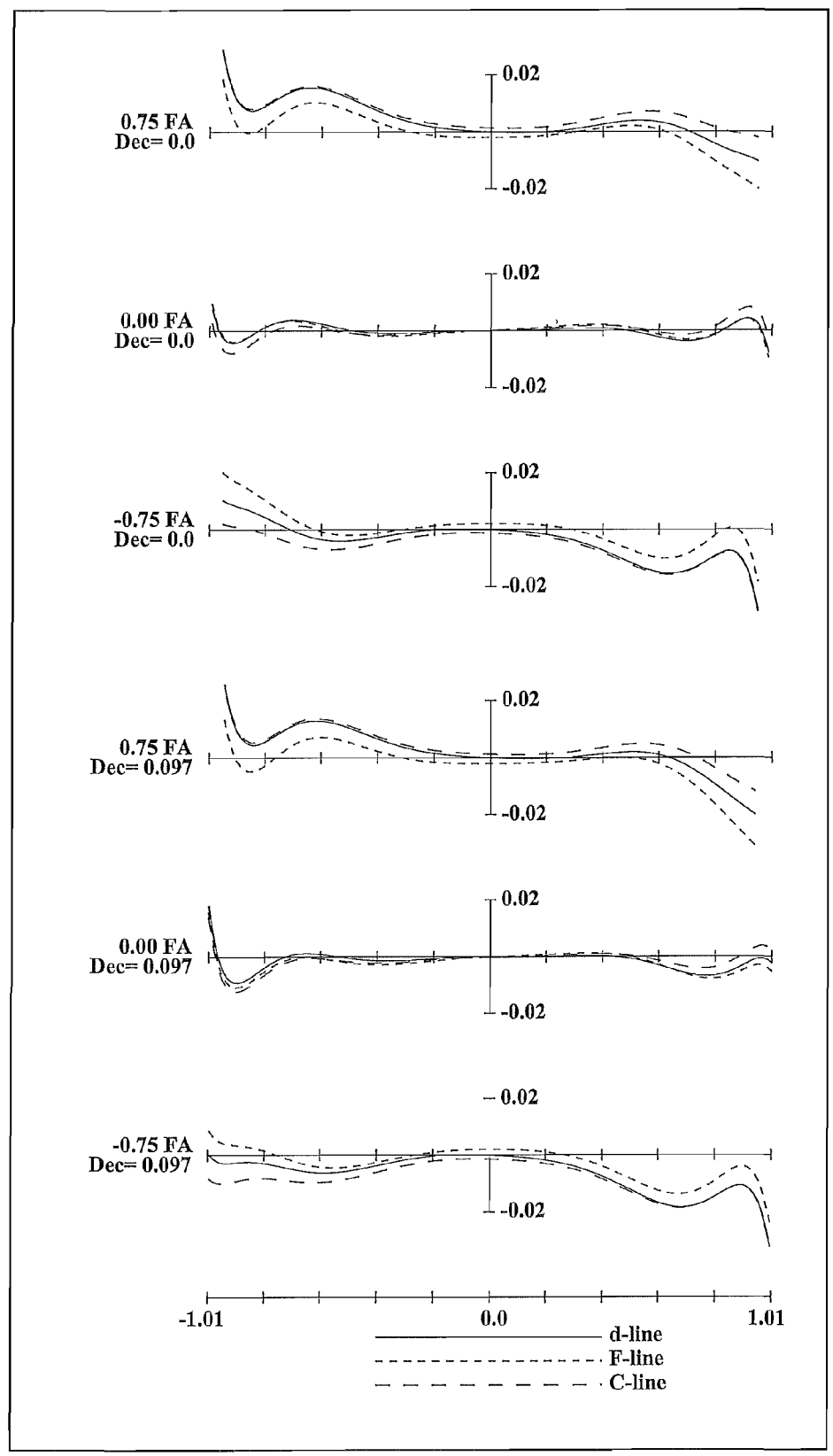
FIG. 54 is a lateral aberration diagram of a zoom lens system according to Example 18 at a telephoto limit in a basic state where image blur compensation is not performed and in a blur compensation state.

As shown in FIG. 52, in the zoom lens system according to Embodiment 18, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface, while the second lens element L2 has an aspheric object side surface.

Further, in the zoom lens system according to Embodiment 18, the second lens unit G2, in order from the object side to the image side, comprises: a bi-convex third lens element L3; a bi-concave fourth lens element L4; and a bi-convex fifth lens element L5. Among these, the third lens element L3 and the fourth lens element L4 are cemented with each other. Further, the third lens element L3 has an aspheric object side surface.

Moreover, in the zoom lens system according to Embodiment 18, the third lens unit G3 comprises solely a positive meniscus sixth lens element L6 with the convex surface facing the image side. The sixth lens element L6 has two aspheric surfaces.

In the zoom lens system according to Embodiment 18, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 55:
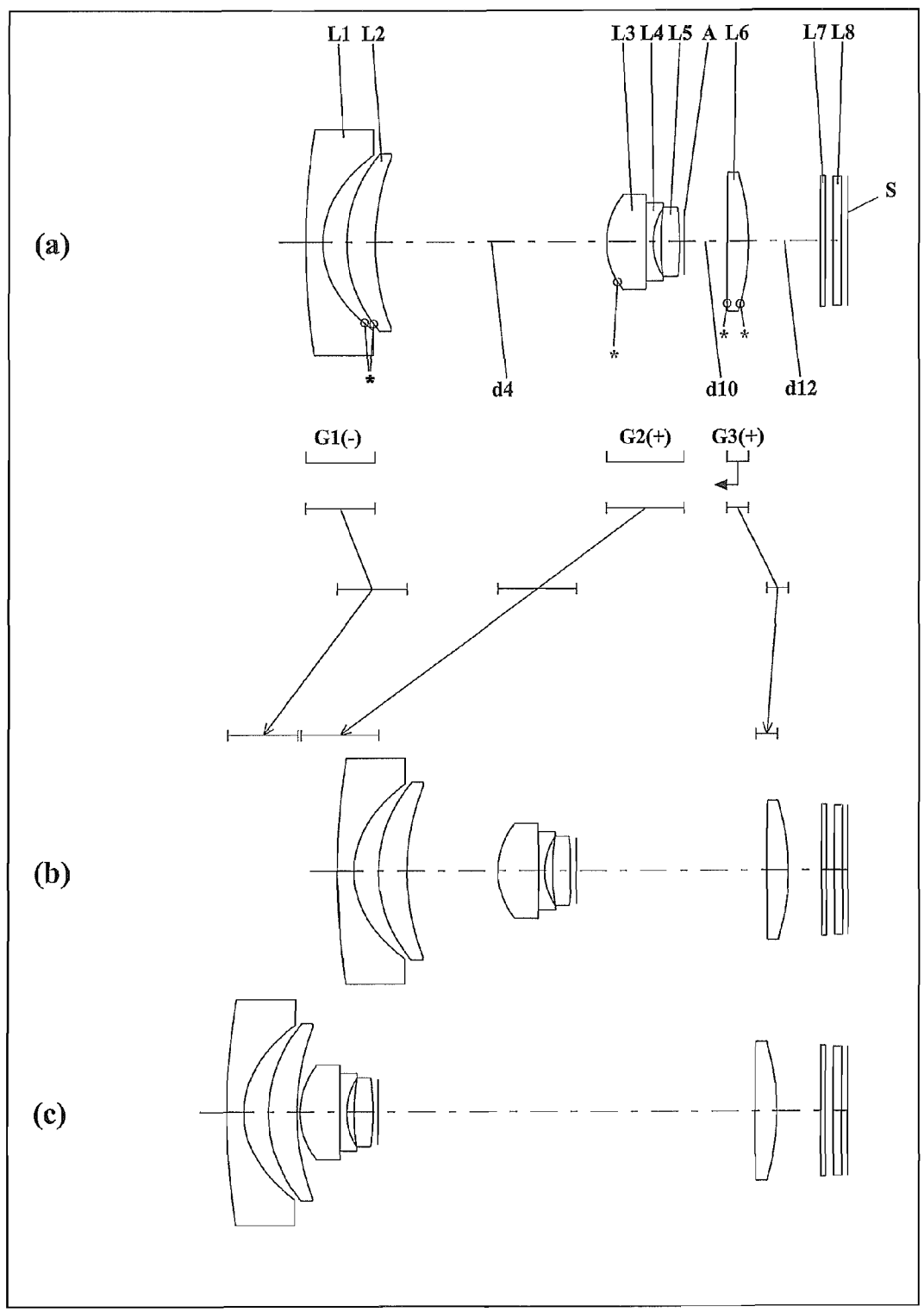
FIG. 55 is a lens arrangement diagram showing an infinity in-focus condition of a zoom lens system according to Embodiment 19 (Example 19).
Figure 56:
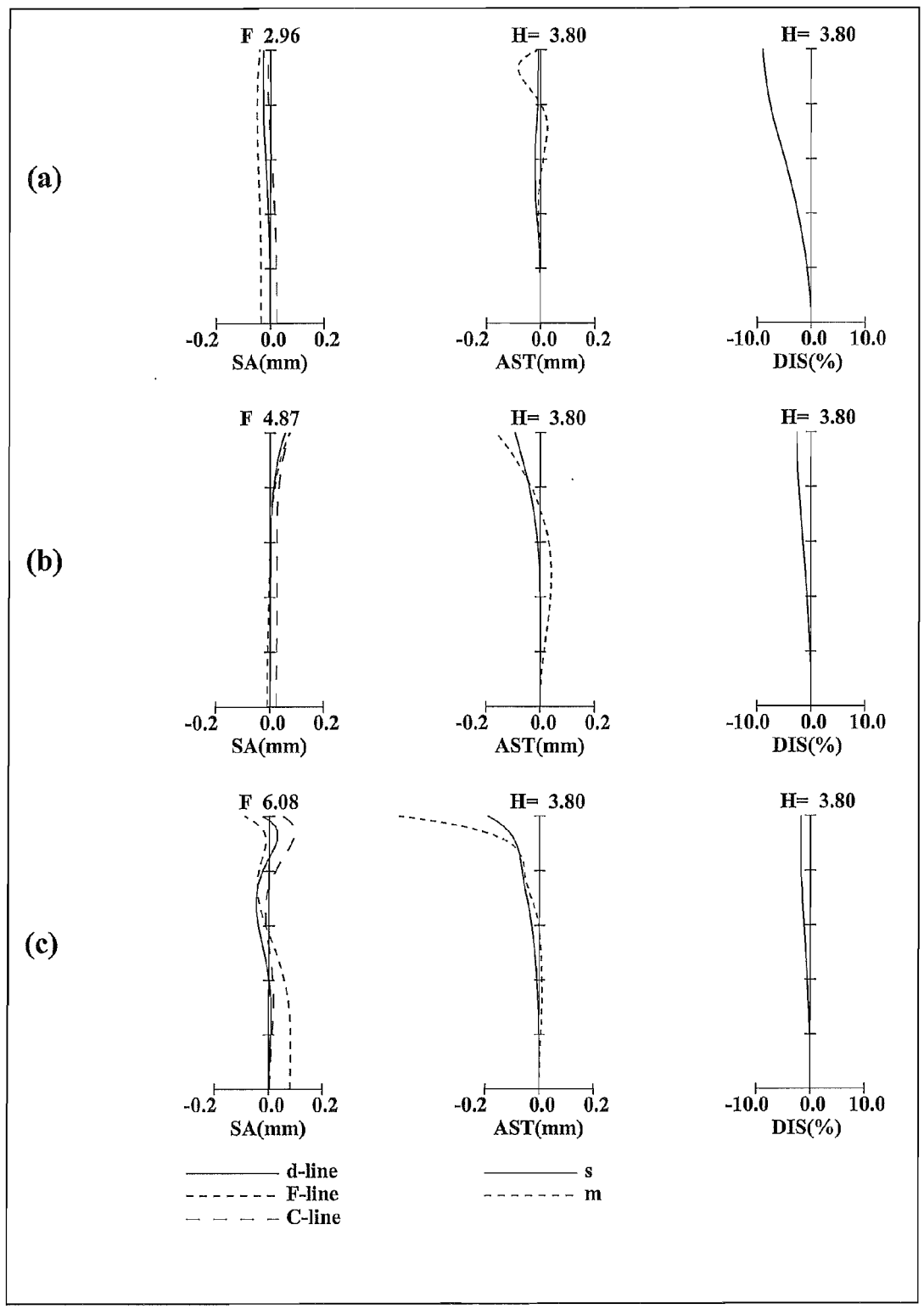
FIG. 56 is a longitudinal aberration diagram of an infinity in-focus condition of a zoom lens system according to Example 19.
Figure 57:
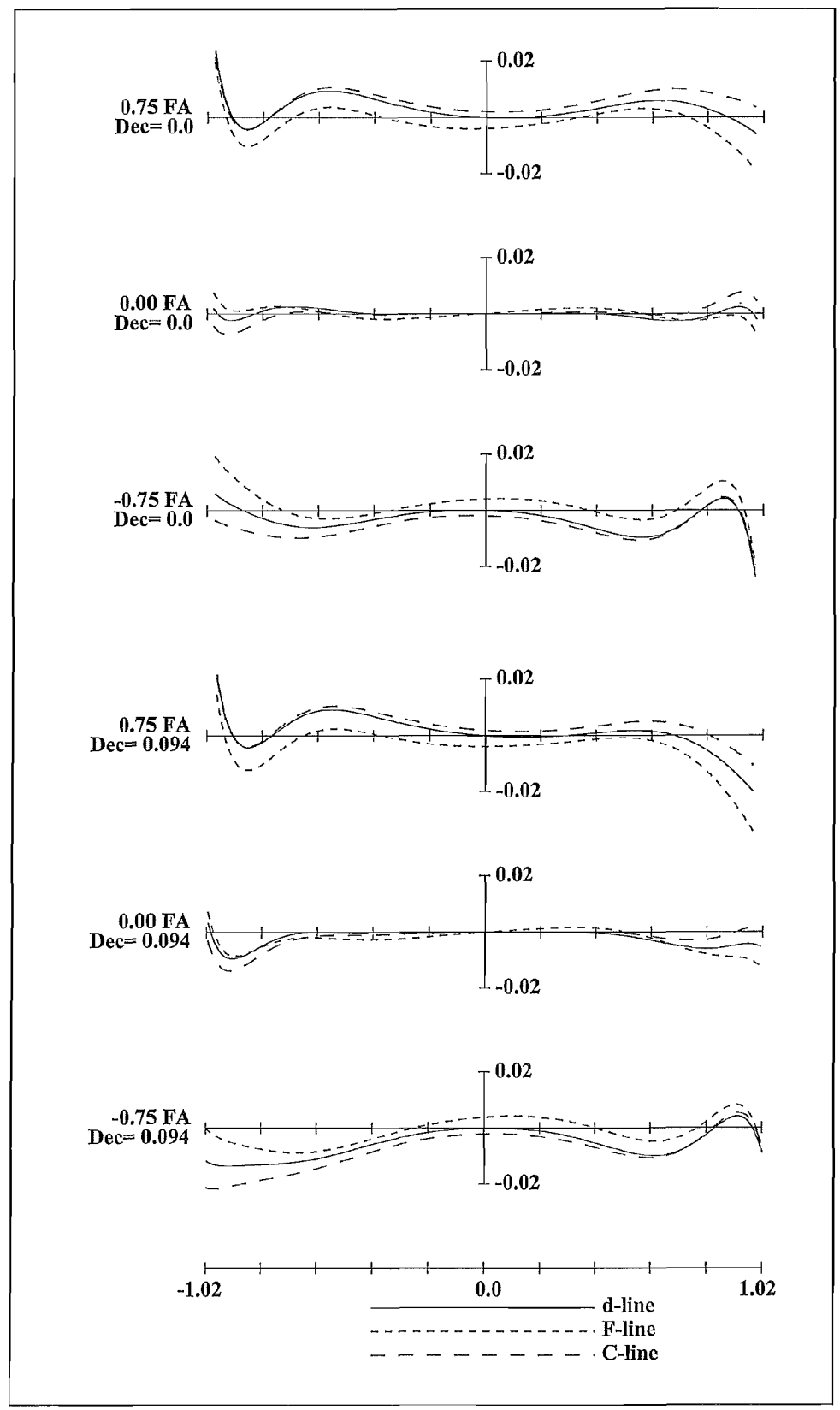
FIG. 57 is a lateral aberration diagram of a zoom lens system according to Example 19 at a telephoto limit in a basic state where image blur compensation is not performed and in a blur compensation state.

As shown in FIG. 55, in the zoom lens system according to Embodiment 19, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface, while the second lens element L2 has an aspheric object side surface.

Further, in the zoom lens system according to Embodiment 19, the second lens unit G2, in order from the object side to the image side, comprises: a bi-convex third lens element L3; a bi-concave fourth lens element L4; and a bi-convex fifth lens element L5. Among these, the third lens element L3 and the fourth lens element L4 are cemented with each other. Further, the third lens element L3 has an aspheric object side surface.

Further, in the zoom lens system of Embodiment 19, the third lens unit G3 comprises solely a bi-convex sixth lens element L6. The sixth lens element L6 has two aspheric surfaces.

In the zoom lens system according to Embodiment 19, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 58:
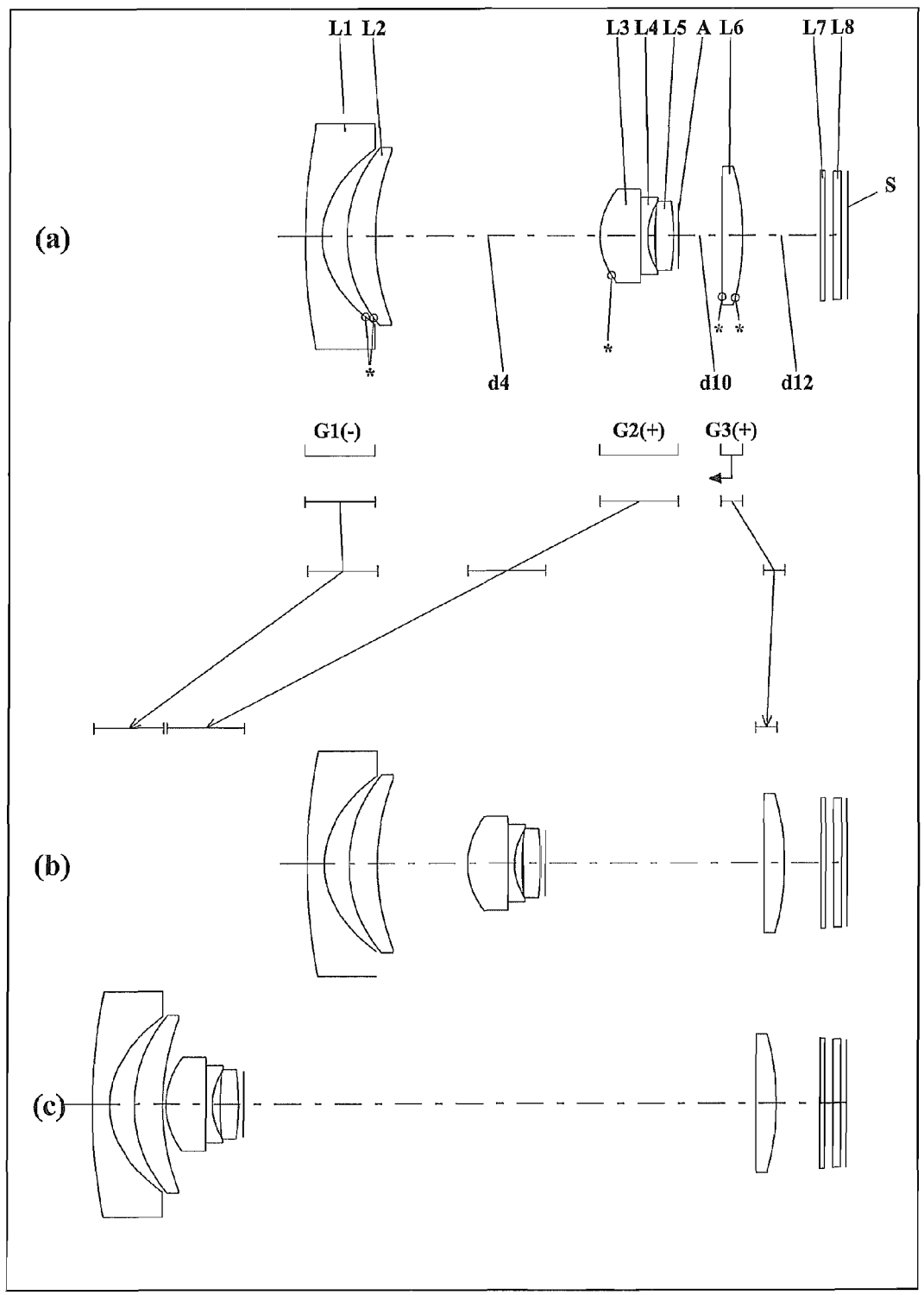
FIG. 58 is a lens arrangement diagram showing an infinity in-focus condition of a zoom lens system according to Embodiment 20 (Example 20).
Figure 59:
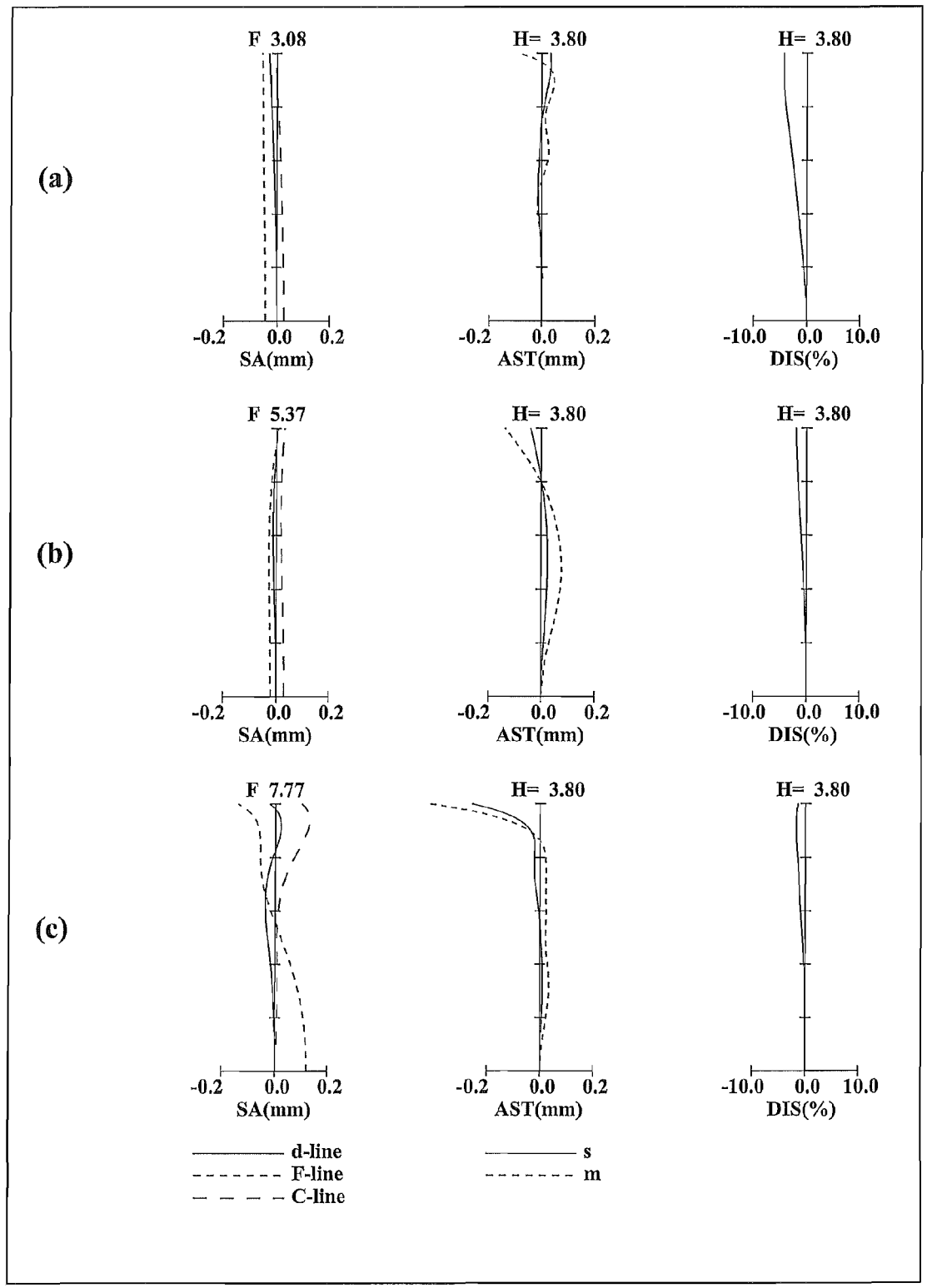
FIG. 59 is a longitudinal aberration diagram of an infinity in-focus condition of a zoom lens system according to Example 20.
Figure 60:
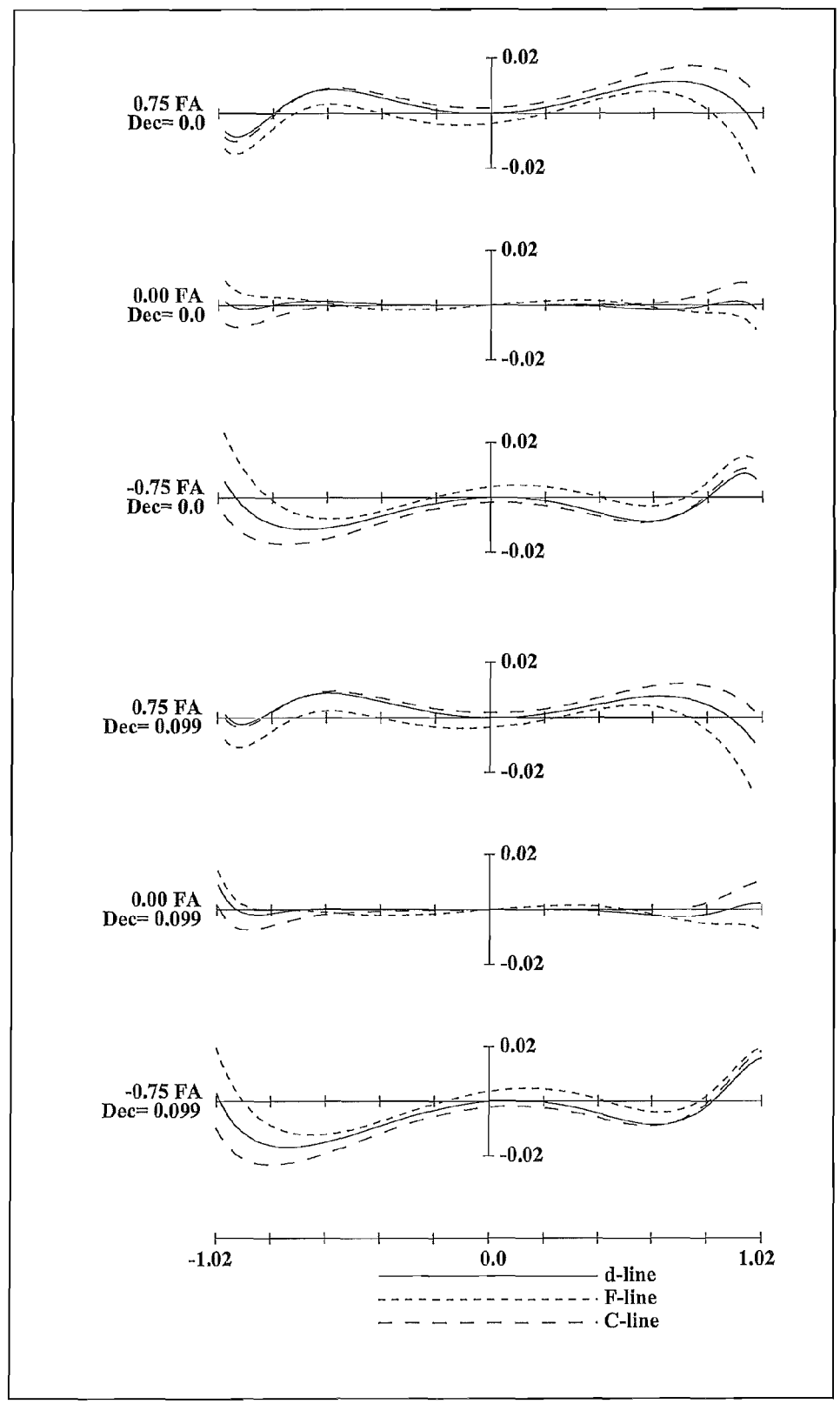
FIG. 60 is a lateral aberration diagram of a zoom lens system according to Example 20 at a telephoto limit in a basic state where image blur compensation is not performed and in a blur compensation state.

As shown in FIG. 58, in the zoom lens system according to Embodiment 20, the first lens unit G1, in order from the object side to the image side, comprises: a negative meniscus first lens element L1 with the convex surface facing the object side; and a positive meniscus second lens element L2 with the convex surface facing the object side. The first lens element L1 has an aspheric image side surface, while the second lens element L2 has an aspheric object side surface.

Further, in the zoom lens system according to Embodiment 20, the second lens unit G2, in order from the object side to the image side, comprises: a bi-convex third lens element L3; a bi-concave fourth lens element L4; and a bi-convex fifth lens element L5. Among these, the third lens element L3 and the fourth lens element L4 are cemented with each other. Further, the third lens element L3 has an aspheric object side surface.

Further, in the zoom lens system of Embodiment 20, the third lens unit G3 comprises solely a bi-convex sixth lens element L6. The sixth lens element L6 has two aspheric surfaces.

In the zoom lens system according to Embodiment 20, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 61:
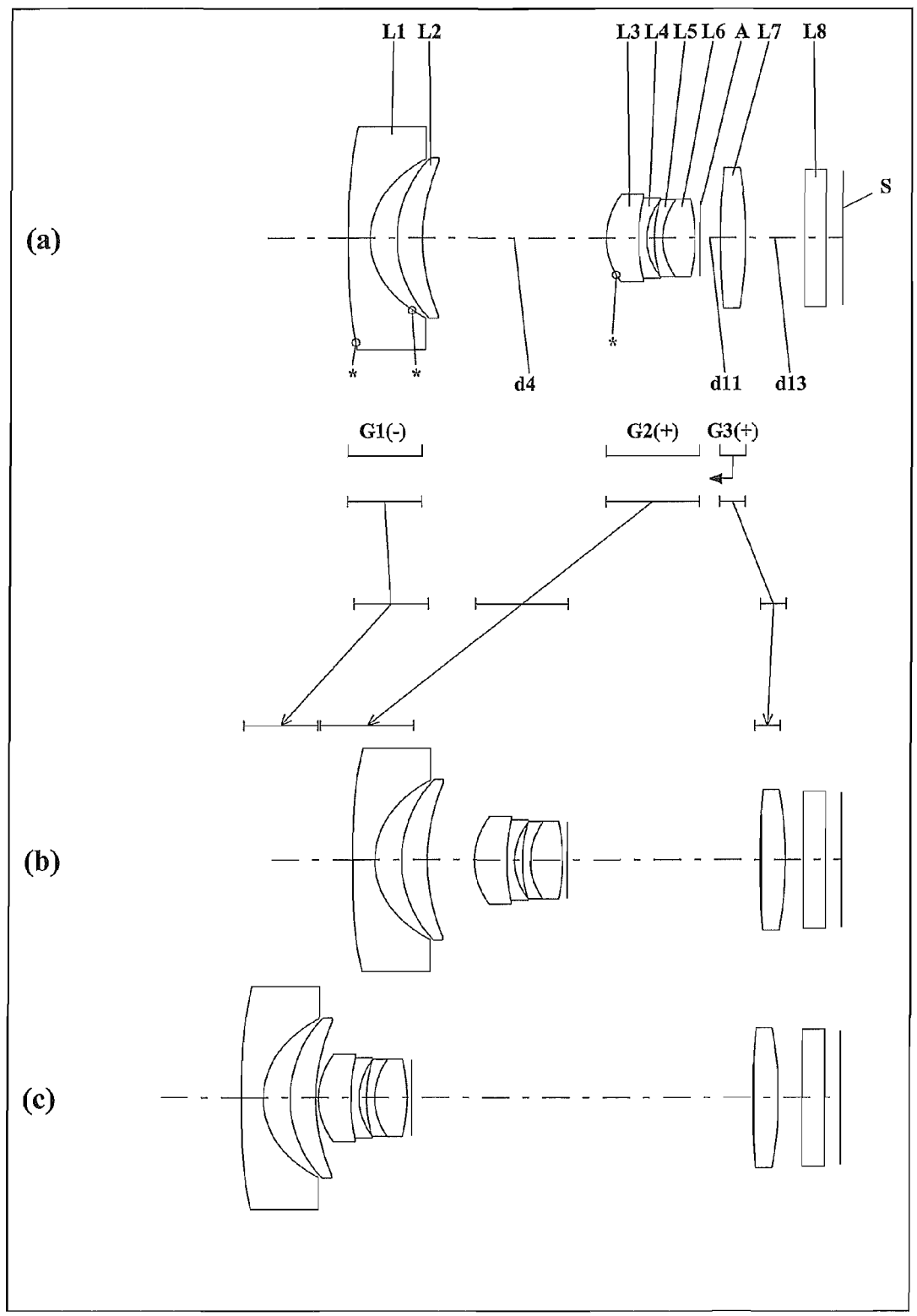
FIG. 61 is a lens arrangement diagram showing an infinity in-focus condition of a zoom lens system according to Embodiment 21 (Example 21).
Figure 62:
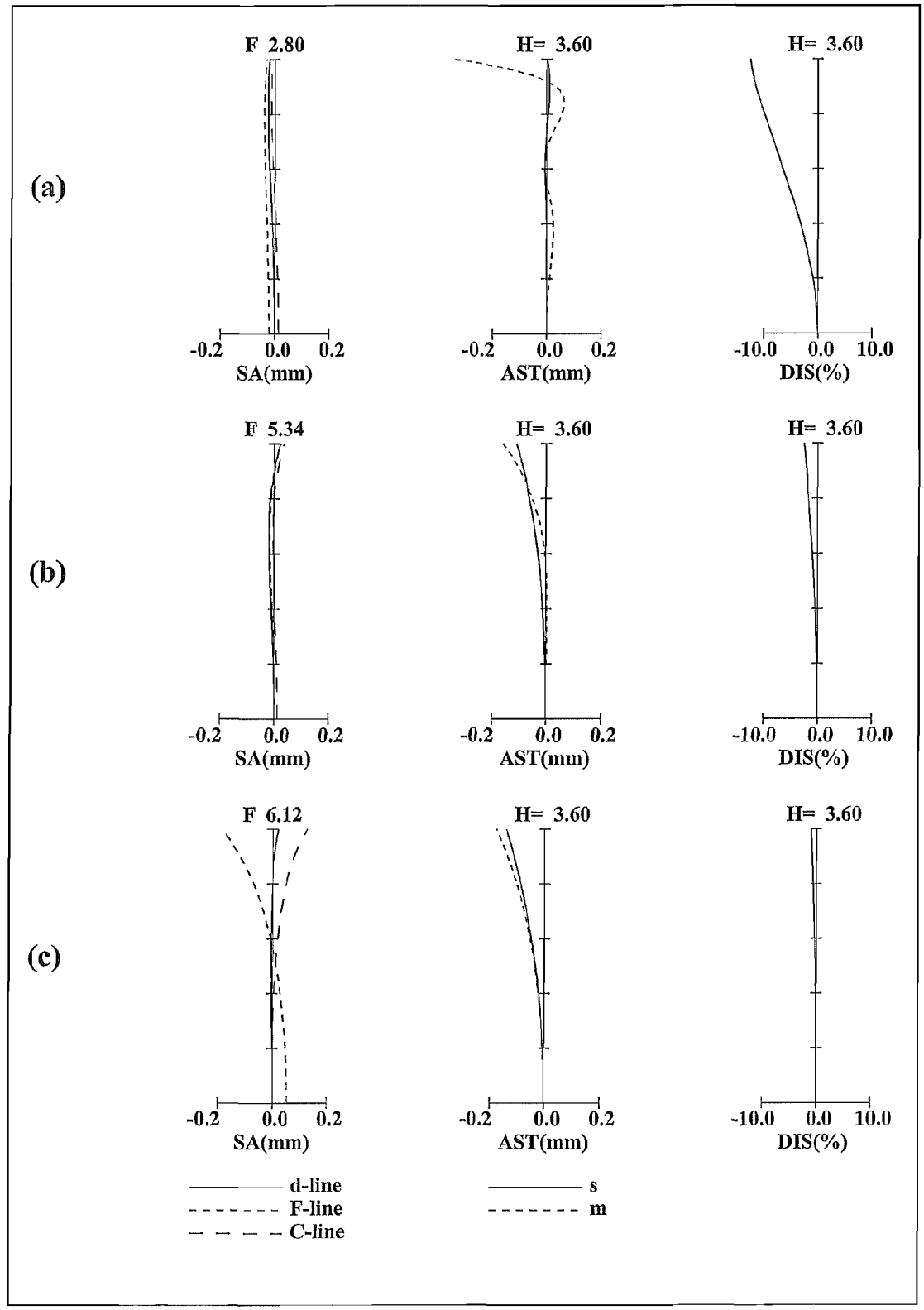
FIG. 62 is a longitudinal aberration diagram of an infinity in-focus condition of a zoom lens system according to Example 21.
Figure 63:
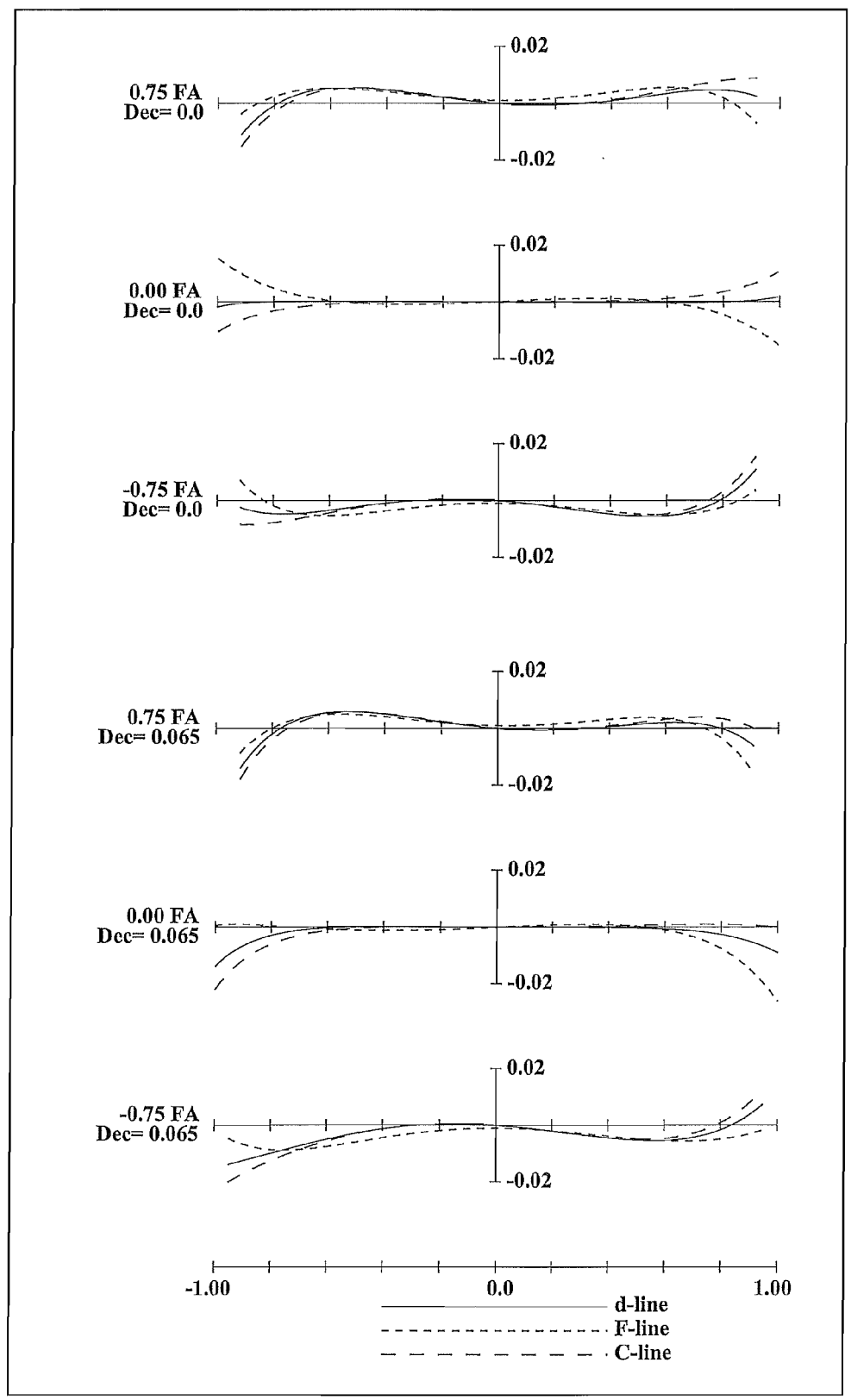
FIG. 63 is a lateral aberration diagram of a zoom lens system according to Example 21 at a telephoto limit in a basic state where image blur compensation is not performed and in a blur compensation state.

As shown in FIG. 61, in the zoom lens system according to Embodiment 21, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

In the zoom lens system according to Embodiment 21, the second lens unit G2, in order from the object side to the image side, comprises: a positive meniscus third lens element L3 with the convex surface facing the object side; a negative meniscus fourth lens element L4 with the convex surface facing the object side; a negative meniscus fifth lens element L5 with the convex surface facing the object side; and a bi-convex sixth lens element L6. Among these, the third lens element L3 and the fourth lens element L4 are cemented with each other, while the fifth lens element L5 and the sixth lens element L6 are cemented with each other. Further, the third lens element L3 has an aspheric object side surface.

Further, in the zoom lens system of Embodiment 21, the third lens unit G3 comprises solely a bi-convex seventh lens element L7.

In the zoom lens system according to Embodiment 21, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 64:
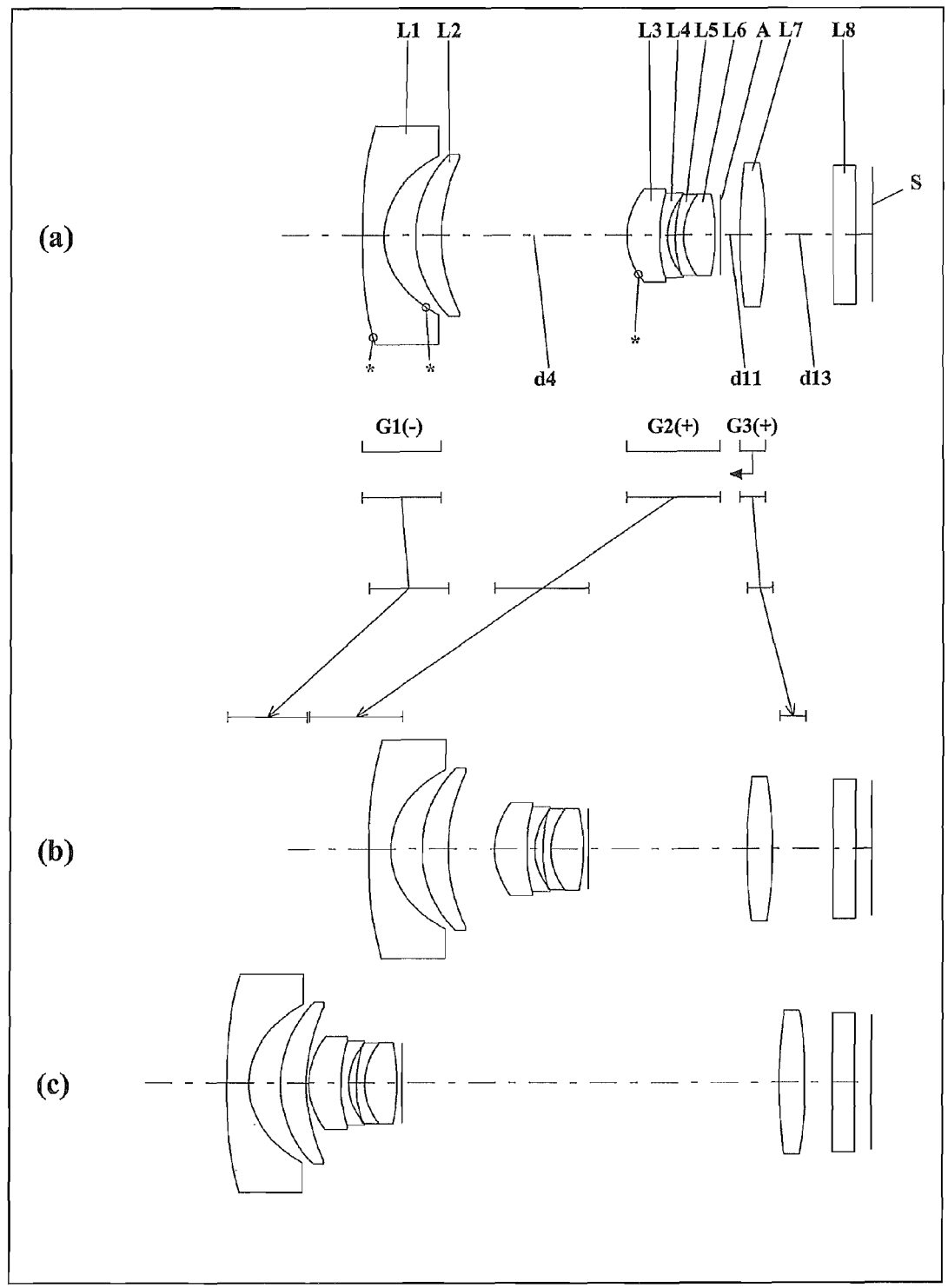
FIG. 64 is a lens arrangement diagram showing an infinity in-focus condition of a zoom lens system according to Embodiment 22 (Example 22).
Figure 65:
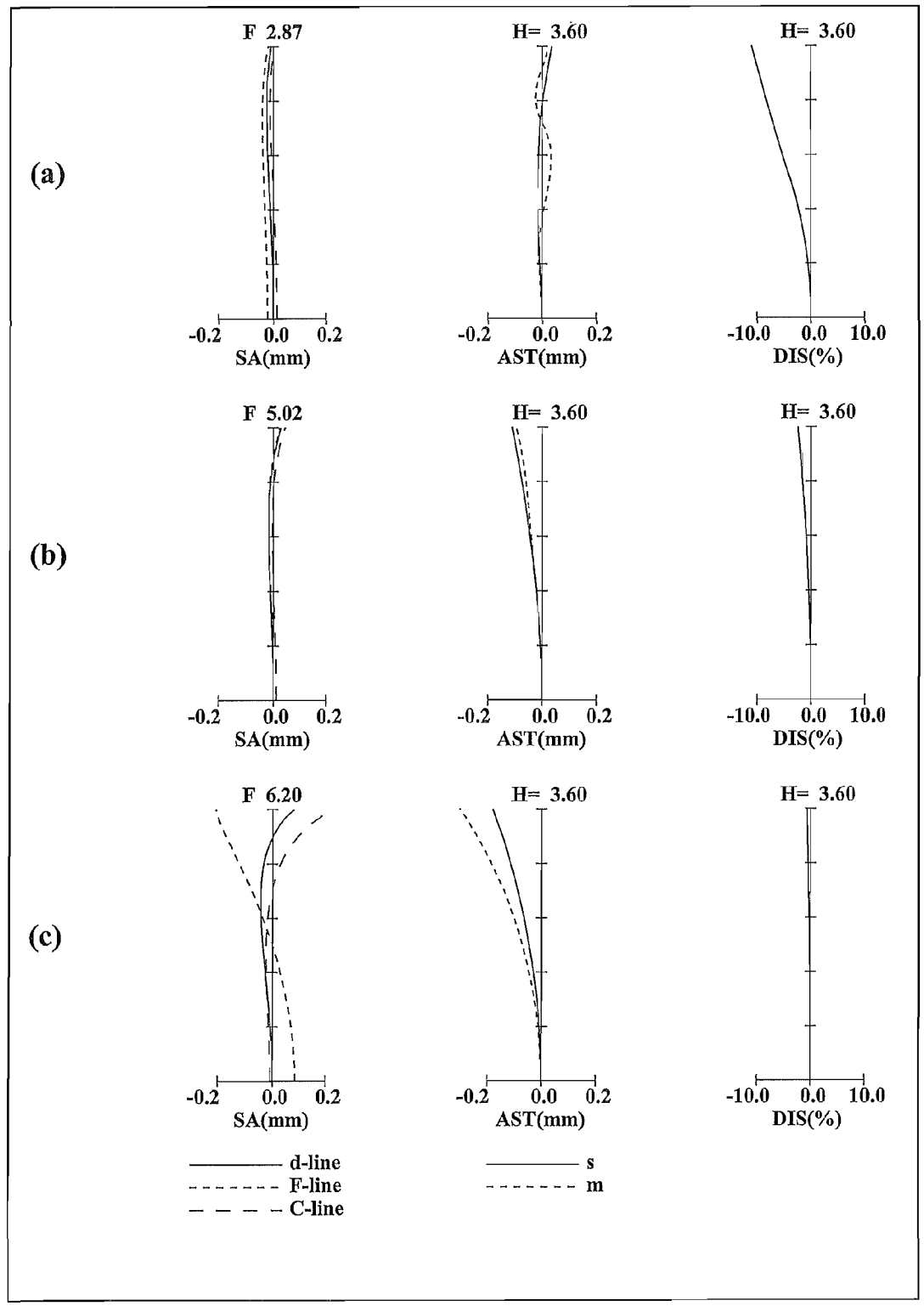
FIG. 65 is a longitudinal aberration diagram of an infinity in-focus condition of a zoom lens system according to Example 22.
Figure 66:
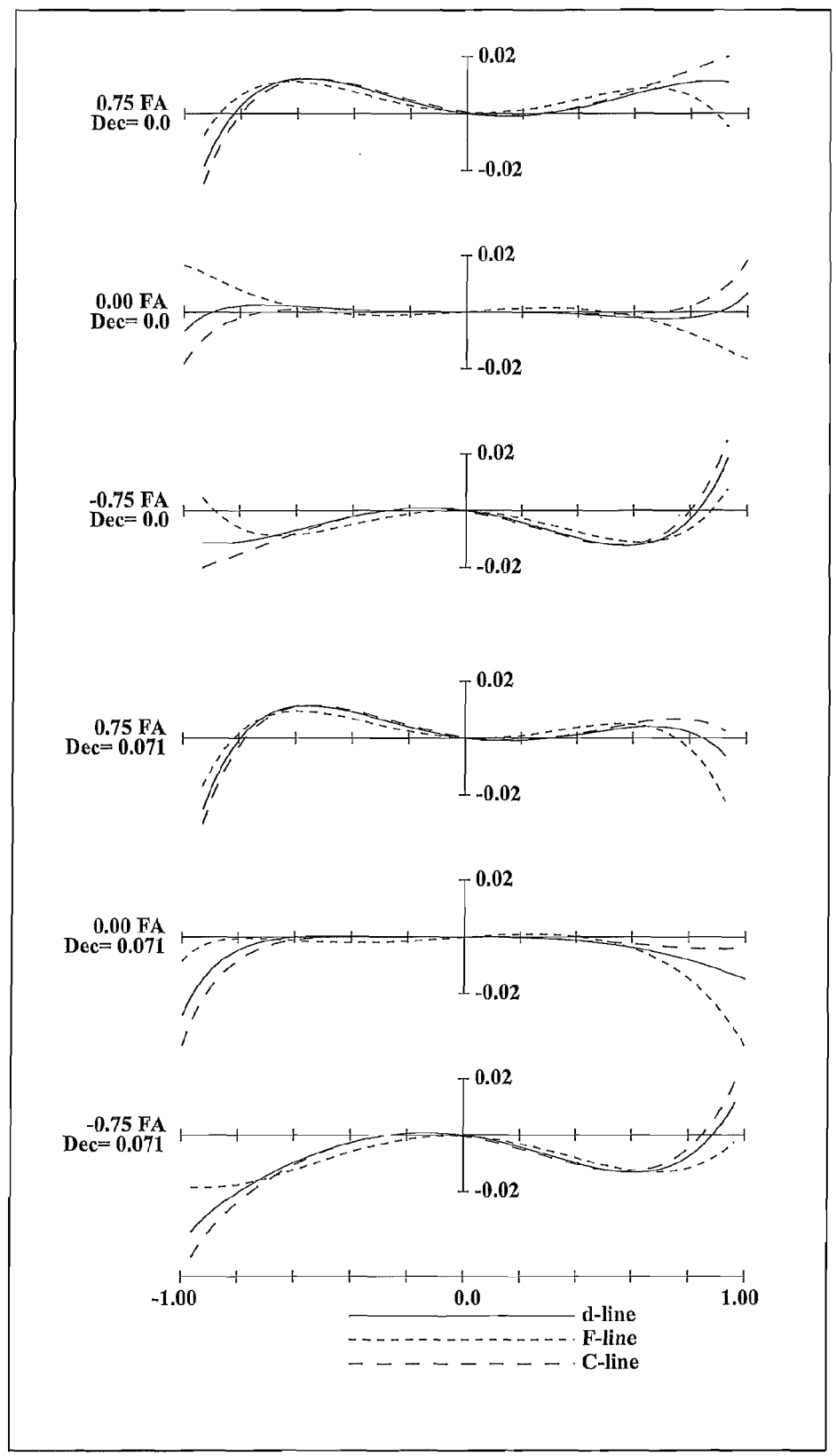
FIG. 66 is a lateral aberration diagram of a zoom lens system according to Example 22 at a telephoto limit in a basic state where image blur compensation is not performed and in a blur compensation state.

As shown in FIG. 64, in the zoom lens system according to Embodiment 22, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

In the zoom lens system according to Embodiment 22, the second lens unit G2, in order from the object side to the image side, comprises: a positive meniscus third lens element L3 with the convex surface facing the object side; a negative meniscus fourth lens element L4 with the convex surface facing the object side; a negative meniscus fifth lens element L5 with the convex surface facing the object side; and a bi-convex sixth lens element L6. Among these, the third lens element L3 and the fourth lens element L4 are cemented with each other, while the fifth lens element L5 and the sixth lens element L6 are cemented with each other. Further, the third lens element L3 has an aspheric object side surface.

Further, in the zoom lens system of Embodiment 22, the third lens unit G3 comprises solely a bi-convex seventh lens element L7.

In the zoom lens system according to Embodiment 22, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 67:
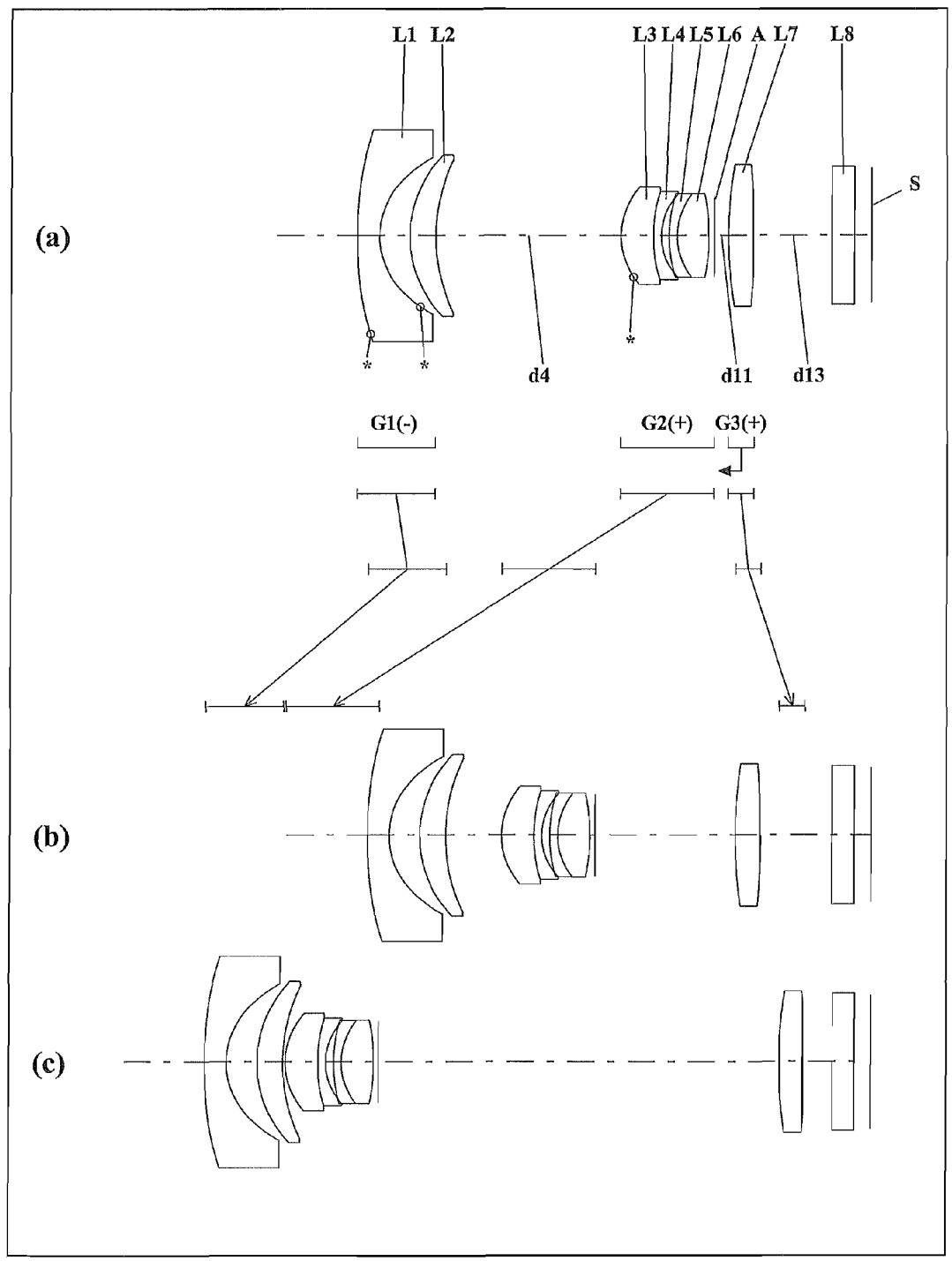
FIG. 67 is a lens arrangement diagram showing an infinity in-focus condition of a zoom lens system according to Embodiment 23 (Example 23).
Figure 68:
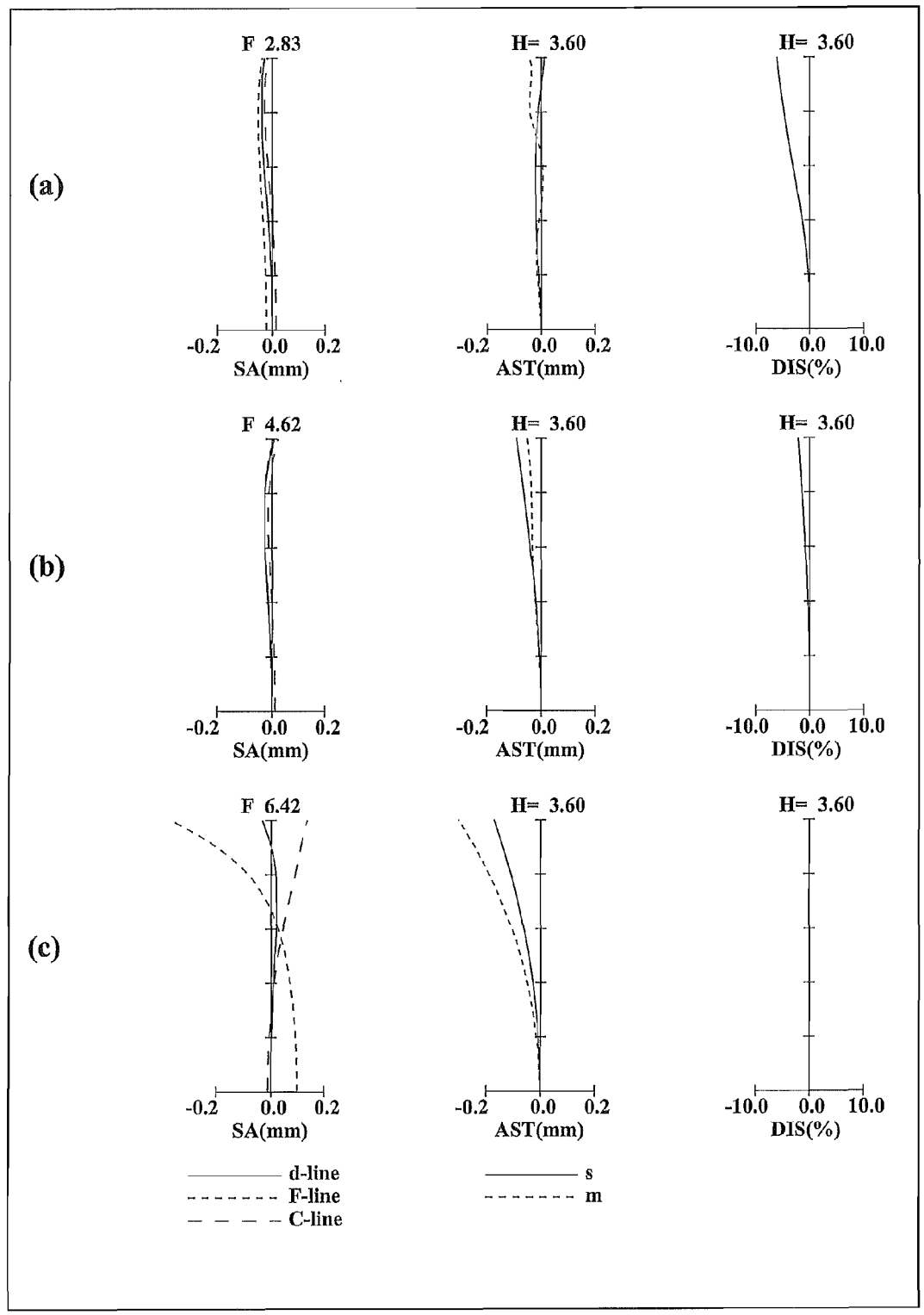
FIG. 68 is a longitudinal aberration diagram of an infinity in-focus condition of a zoom lens system according to Example 23.
Figure 69:
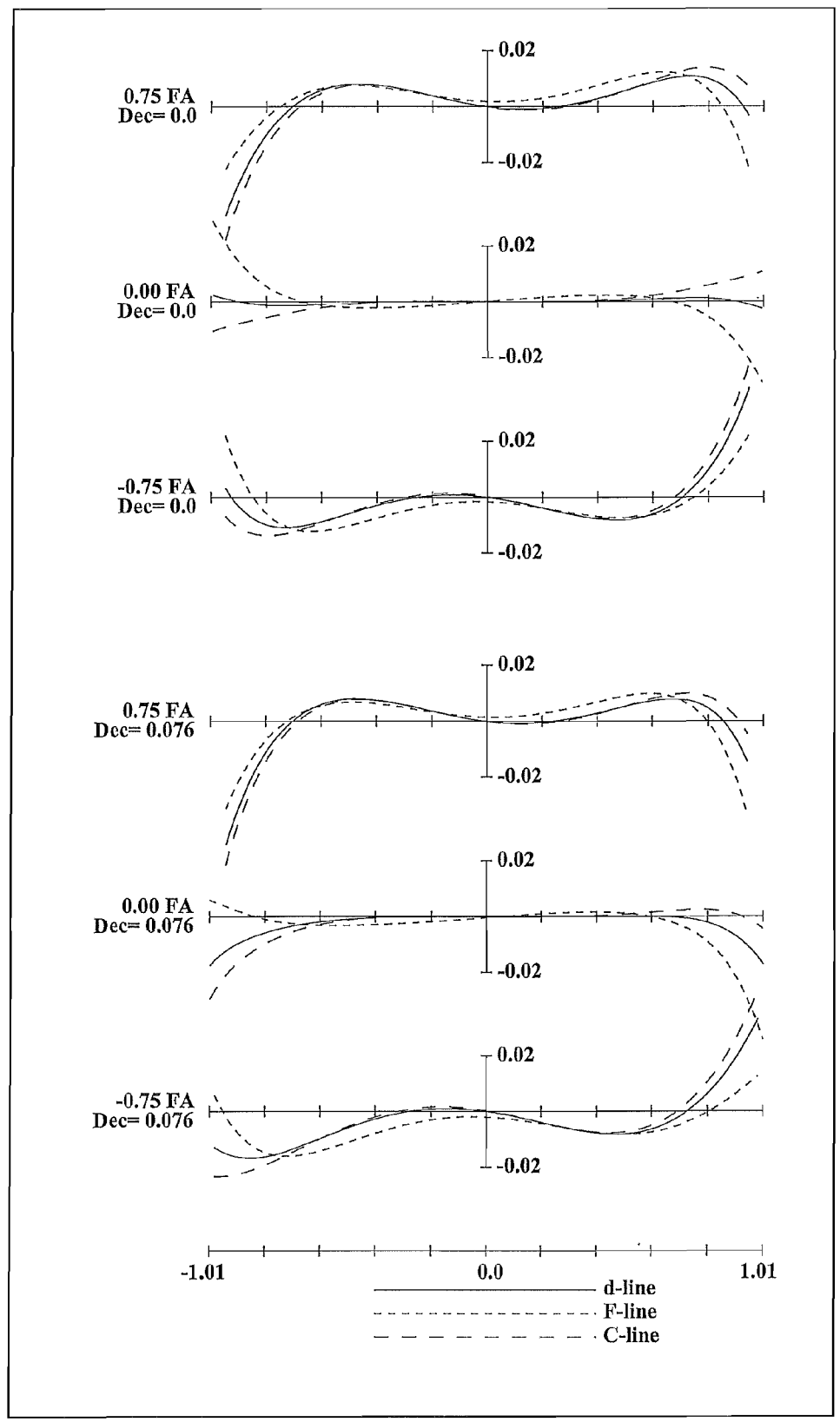
FIG. 69 is a lateral aberration diagram of a zoom lens system according to Example 23 at a telephoto limit in a basic state where image blur compensation is not performed and in a blur compensation state.

As shown in FIG. 67, in the zoom lens system according to Embodiment 23, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

In the zoom lens system according to Embodiment 23, the second lens unit G2, in order from the object side to the image side, comprises: a positive meniscus third lens element L3 with the convex surface facing the object side; a negative meniscus fourth lens element L4 with the convex surface facing the object side; a negative meniscus fifth lens element L5 with the convex surface facing the object side; and a bi-convex sixth lens element L6. Among these, the third lens element L3 and the fourth lens element L4 are cemented with each other, while the fifth lens element L5 and the sixth lens element L6 are cemented with each other. Further, the third lens element L3 has an aspheric object side surface.

Further, in the zoom lens system of Embodiment 23, the third lens unit G3 comprises solely a bi-convex seventh lens element L7.

In the zoom lens system according to Embodiment 23, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 70:
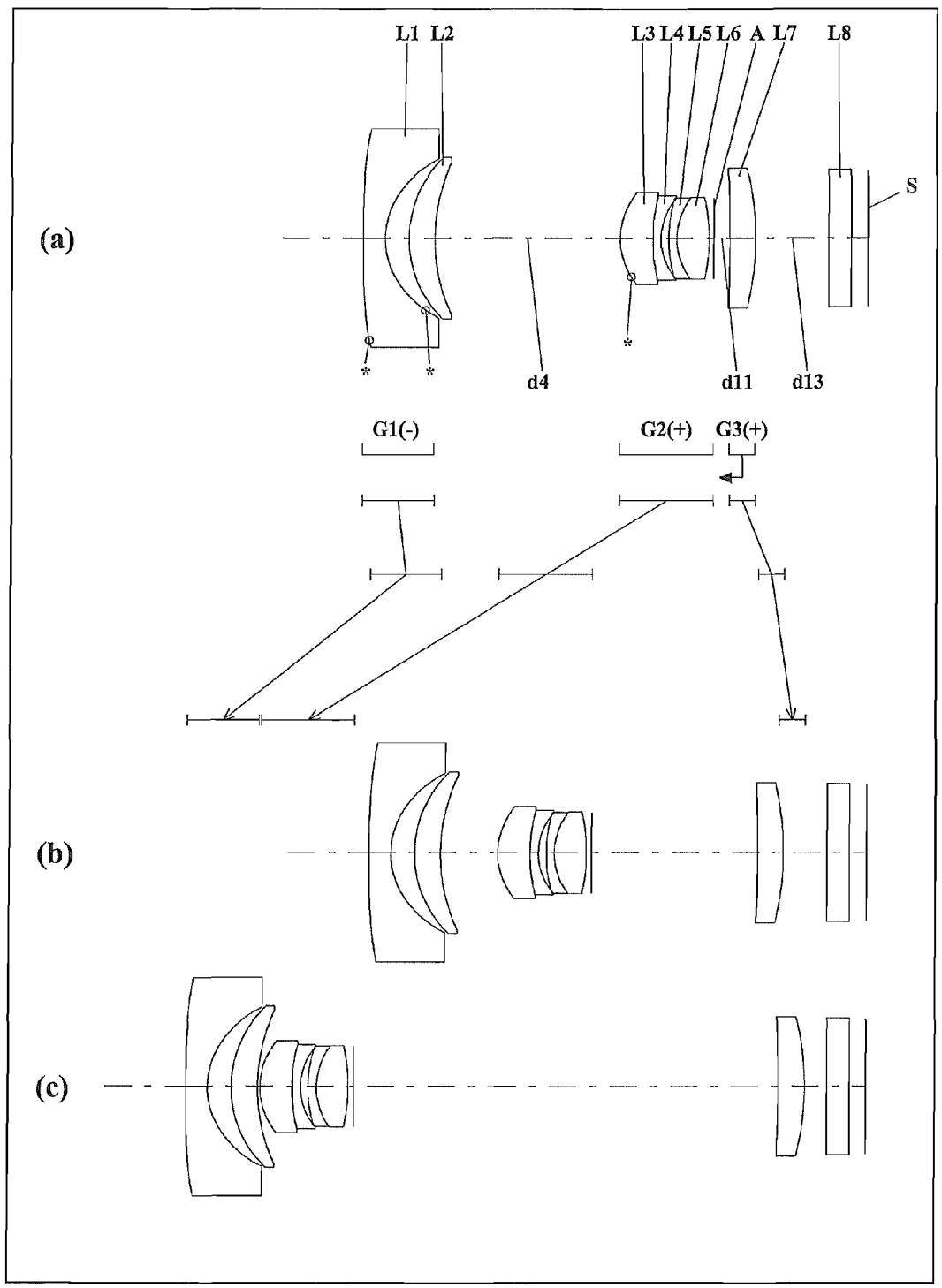
FIG. 70 is a lens arrangement diagram showing an infinity in-focus condition of a zoom lens system according to Embodiment 24 (Example 24).
Figure 71:
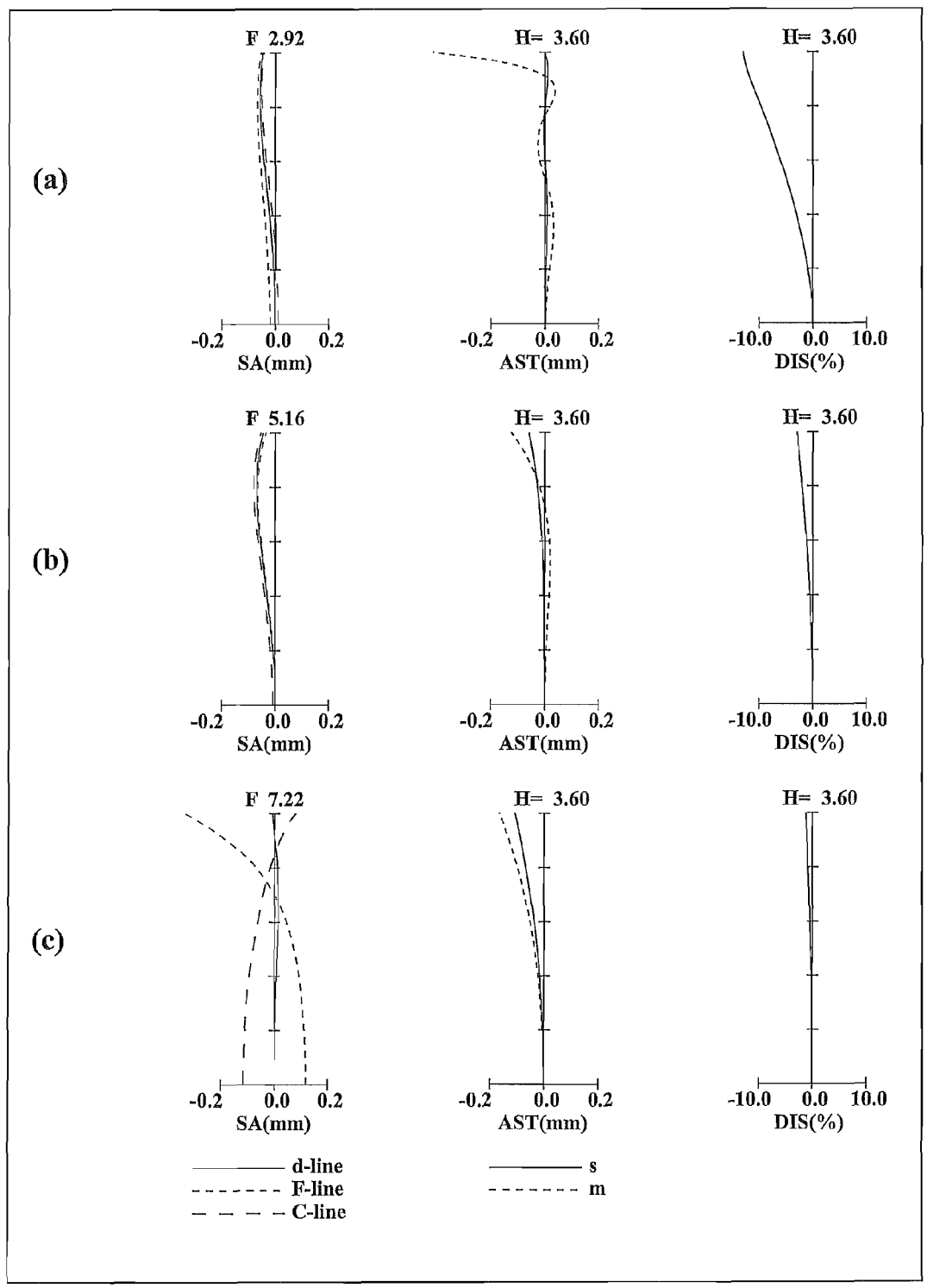
FIG. 71 is a longitudinal aberration diagram of an infinity in-focus condition of a zoom lens system according to Example 24.
Figure 72:
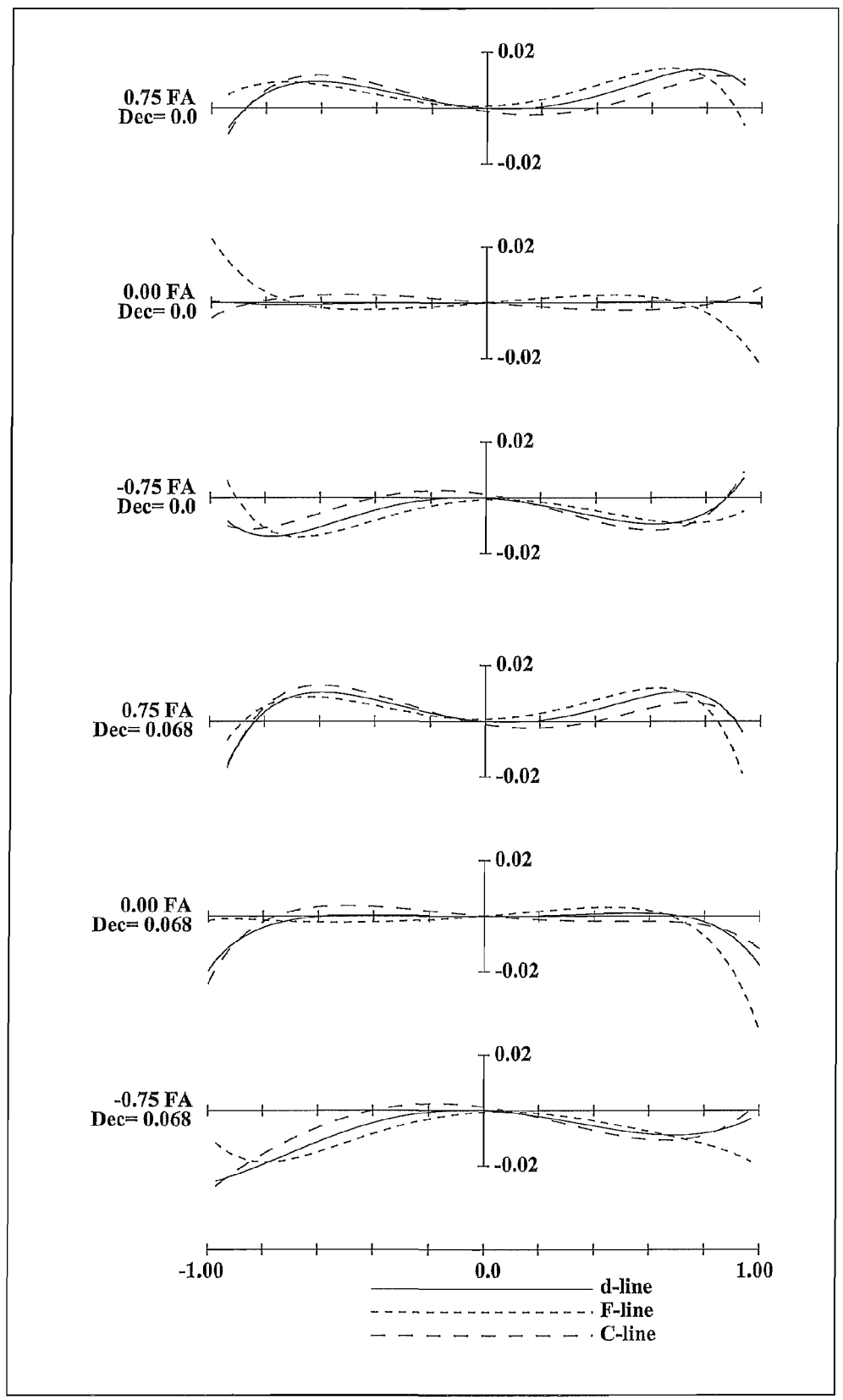
FIG. 72 is a lateral aberration diagram of a zoom lens system according to Example 24 at a telephoto limit in a basic state where image blur compensation is not performed and in a blur compensation state.

As shown in FIG. 70, in the zoom lens system according to Embodiment 24, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

In the zoom lens system according to Embodiment 24, the second lens unit G2, in order from the object side to the image side, comprises: a positive meniscus third lens element L3 with the convex surface facing the object side; a negative meniscus fourth lens element L4 with the convex surface facing the object side; a negative meniscus fifth lens element L5 with the convex surface facing the object side; and a bi-convex sixth lens element L6. Among these, the third lens element L3 and the fourth lens element L4 are cemented with each other, while the fifth lens element L5 and the sixth lens element L6 are cemented with each other. Further, the third lens element L3 has an aspheric object side surface.

Moreover, in the zoom lens system according to Embodiment 24, the third lens unit G3 comprises solely a positive meniscus seventh lens element L7 with the convex surface facing the image side.

In the zoom lens system according to Embodiment 24, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

Figure 73:
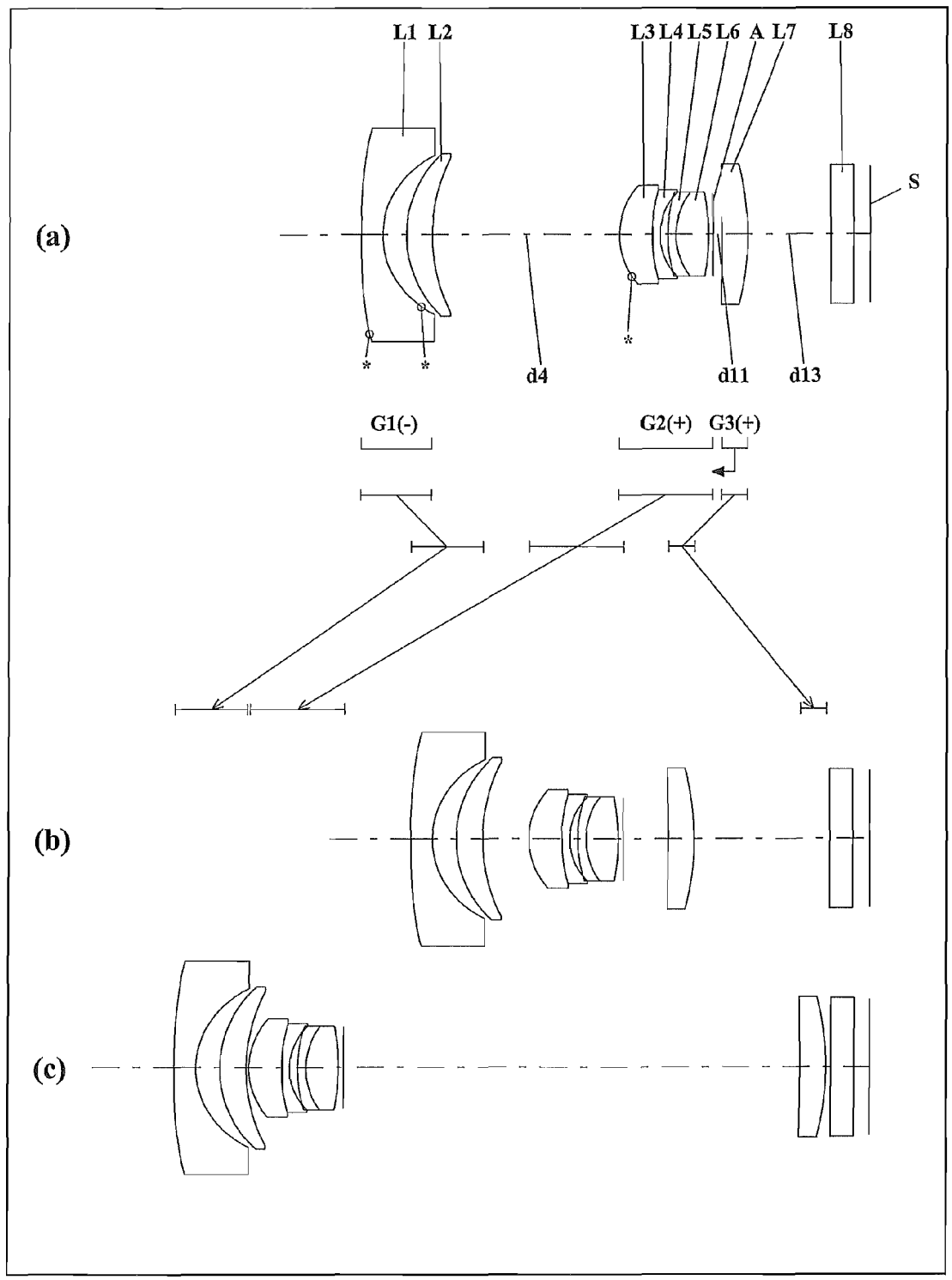
FIG. 73 is a lens arrangement diagram showing an infinity in-focus condition of a zoom lens system according to Embodiment 25 (Example 25).
Figure 74:
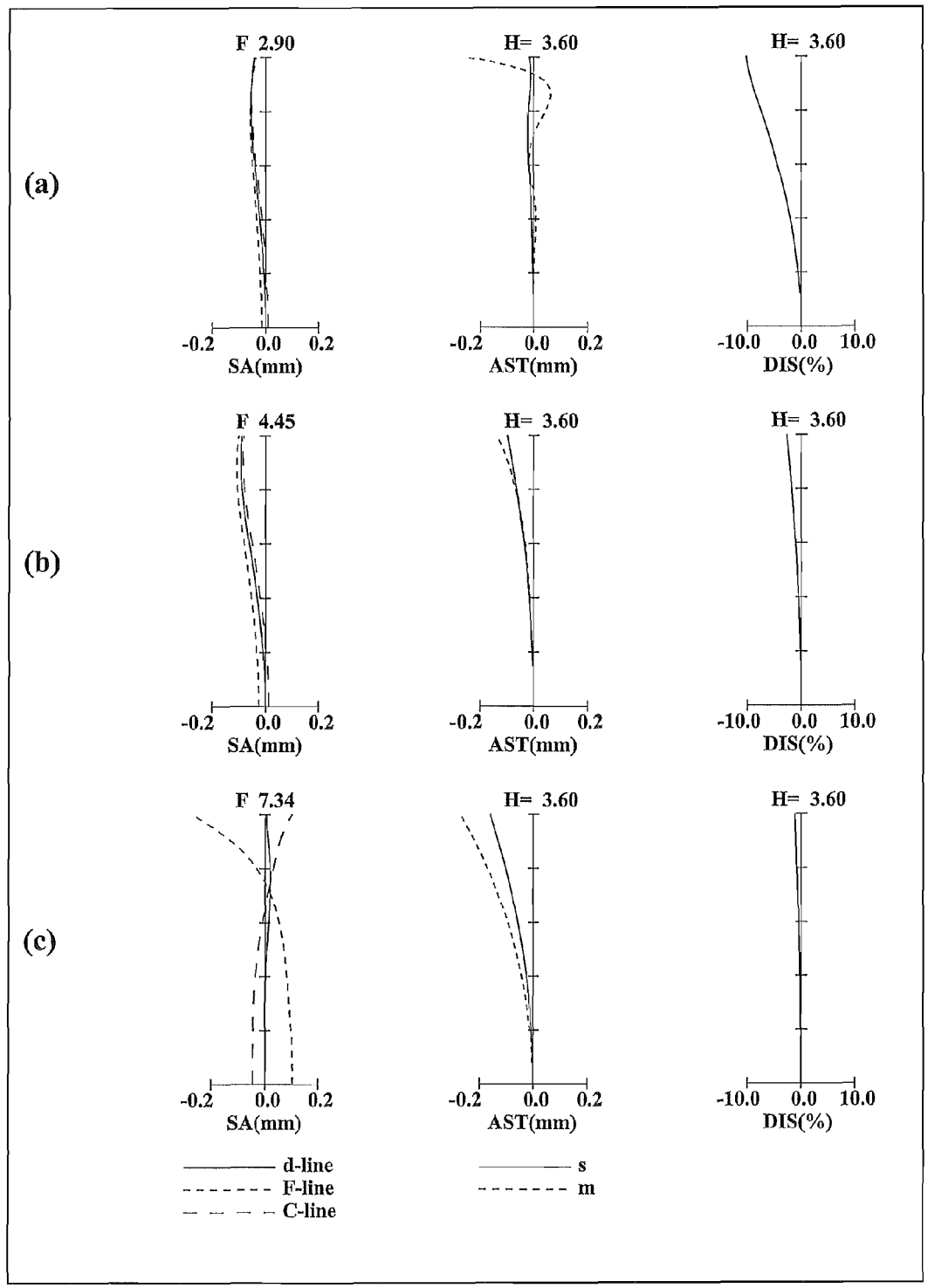
FIG. 74 is a longitudinal aberration diagram of an infinity in-focus condition of a zoom lens system according to Example 25.
Figure 75:
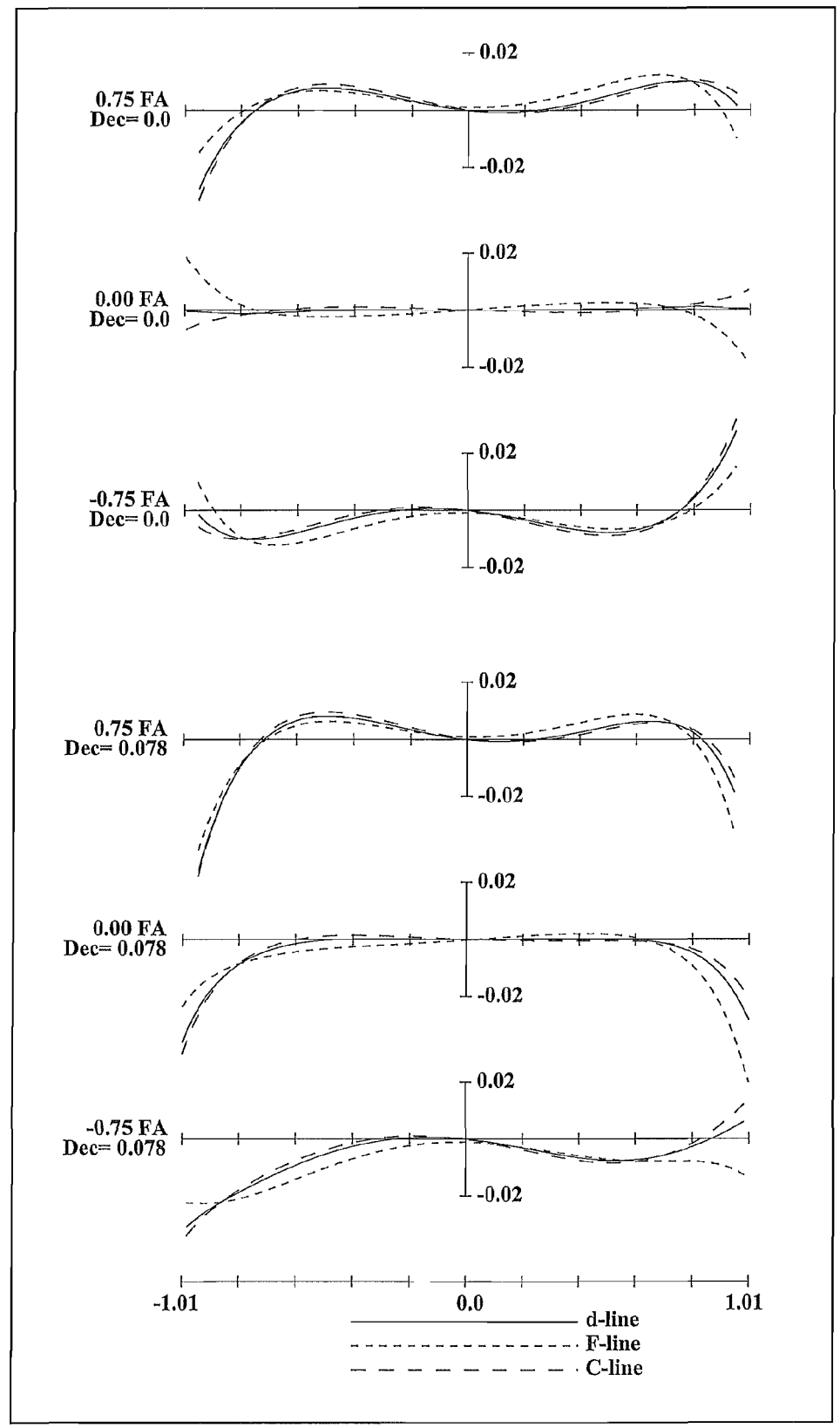
FIG. 75 is a lateral aberration diagram of a zoom lens system according to Example 25 at a telephoto limit in a basic state where image blur compensation is not performed and in a blur compensation state.

As shown in FIG. 73, in the zoom lens system according to Embodiment 25, the first lens unit G1, in order from the object side to the image side, comprises: a negative meniscus first lens element L1 with the convex surface facing the object side; and a positive meniscus second lens element L2 with the convex surface facing the object side. The first lens element L1 has two aspheric surfaces.

In the zoom lens system according to Embodiment 25, the second lens unit G2, in order from the object side to the image side, comprises: a positive meniscus third lens element L3 with the convex surface facing the object side; a negative meniscus fourth lens element L4 with the convex surface facing the object side; a negative meniscus fifth lens element L5 with the convex surface facing the object side; and a bi-convex sixth lens element L6. Among these, the third lens element L3 and the fourth lens element L4 are cemented with each other, while the fifth lens element L5 and the sixth lens element L6 are cemented with each other. Further, the third lens element L3 has an aspheric object side surface.

Moreover, in the zoom lens system according to Embodiment 25, the third lens unit G3 comprises solely a positive meniscus seventh lens element L7 with the convex surface facing the image side.

In the zoom lens system according to Embodiment 25, in zooming from a wide-angle limit to a telephoto limit during image taking, the first lens unit G1 moves to the object side with locus of a convex to the image side. Further, the second lens unit G2 moves to the object side together with the aperture diaphragm A, while the third lens unit G3 moves to the image side. That is, in zooming from a wide-angle limit to a telephoto limit during image taking, the individual lens units are moved along the optical axis such that the interval between the first lens unit G1 and the second lens unit G2 should decrease and that the interval between the second lens unit G2 and the third lens unit G3 should increase.

In particular, in the zoom lens systems according to Embodiments 1 to 25, the first lens unit G1, in order from the object side to the image side, comprises: a lens element having negative optical power; and a meniscus lens element having positive optical power with the convex surface facing the object side. By virtue of this, a reduced overall optical length can be realized in a state that various kinds of aberration, especially, distortion at a wide-angle limit, are compensated satisfactorily.

In the zoom lens system according to Embodiments 1 to 25, the first lens unit G1 includes at least one lens element having an aspheric surface, or alternatively includes at least two aspheric surfaces. By virtue of this, aberration is compensated more successfully.

In the zoom lens system according to Embodiments 1 to 25, the third lens unit G3 is composed of one lens element. Accordingly, the total number of lens elements is reduced, and so is the overall optical length in the lens system. Further, according to embodiments where the one lens element constituting the third lens unit G3 includes an aspheric surface, aberration is compensated more successfully.

In the zoom lens system according to Embodiments 1 to 25, the second lens unit G2 is constructed from three or four lens elements that include one or two sets of cemented lens elements. By virtue of this, the second lens unit G2 has a reduced thickness, and a reduced overall optical length is realized in the lens system.

Further, in the zoom lens system according to Embodiments 1 to 25, in zooming from a wide-angle limit to a telephoto limit during image taking, the first lens unit G1, the second lens unit G2 and the third lens unit G3 are moved individually along the optical axis so that magnification change is achieved. Here, among these lens units, for example, the second lens unit G2 is moved in a direction perpendicular to the optical axis, so that image blur caused by hand blurring, vibration and the like can be compensated optically.

When the image blur is to be compensated optically, the second lens unit G2 is moved in a direction perpendicular to the optical axis as described above, so that image blur is compensated in a state that size increase in the entire zoom lens system is suppressed and a compact construction is realized and that excellent imaging characteristics such as small decentering coma aberration and small decentering astigmatism are satisfied.

Conditions are described below that are preferable to be satisfied by a zoom lens system like the zoom lens system according to Embodiments 1 to 25 which has the above-mentioned basic configuration and in which on the image side relative to the second lens unit, an aperture diaphragm A is arranged that moves along the optical axis integrally with the second lens unit in zooming from a wide-angle limit to a telephoto limit during image taking. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect can be obtained.

For example, in a zoom lens system like the zoom lens system according to Embodiments 1 to 25, it is preferable that the following condition (1) is satisfied.

$$0.10 < D_2/(I_r \times Z^2) < 0.30 \quad (1)$$

(here, $Z = f_T/f_W > 4.0$ and $\omega_W > 35$)

where, $D_2$ is an amount of movement of the second lens unit in a direction from a telephoto limit to a wide-angle limit (defined as positive for the motion from the image side to the object side), $I_r$ is a maximum image height ($I_r = f_T \times \tan(\omega_T)$), $f_T$ is a focal length of the entire system at a telephoto limit, $f_W$ is a focal length of the entire system at a wide-angle limit, $\omega_W$ is a half value (°) of a maximum view angle at a wide-angle limit, and $\omega_T$ is a half value (°) of a maximum view angle at a telephoto limit.

The condition (1) relates to the amount of movement of the second lens unit. When the value exceeds the upper limit of the condition (1), the amount of movement of the second lens unit necessary in association with zooming increases. This can cause difficulty in compensating aberration fluctuation during zooming. In contrast, when the value goes below the lower limit of the condition (1), difficulty can arise in simultaneously compensating distortion and curvature of field especially at a wide-angle limit.

Here, when at least one of the following conditions (1)' and (1)" is satisfied, the above-mentioned effect is achieved more successfully.

$$0.15 < D_2/(I_r \times Z^2) \quad (1)'$$

$$D_2/(I_r \times Z^2) < 0.25 \quad (1)''$$

(here, $Z = f_T/f_W > 4.0$ and $\omega_W > 35$)

Further, it is more preferable that the conditions (1), (1)' and (1)" are satisfied with a condition $\omega_W > 40$.

For example, in a zoom lens system like the zoom lens system according to Embodiments 1 to 25 in which the second lens unit moves in a direction perpendicular to the optical axis, it is preferable that the entire system satisfies the following conditions (2) and (3).

$$Y_T > Y \quad (2)$$

$$0.05 < (Y/Y_T)/f_T/f) < 0.60 \quad (3)$$

(here, $Z = f_T/f_w > 4.0$ and $\omega_W > 35$)

where, f is a focal length of the entire system, $f_T$ is a focal length of the entire system at a telephoto limit, Y is an amount of movement in a direction perpendicular to the optical axis at the time of maximum blur compensation in the second lens unit with a focal length f of the entire system, $Y_T$ is an amount of movement in a direction perpendicular to the optical axis at the time of maximum blur compensation in the second lens unit with a focal length $f_T$ of the entire system at a telephoto limit, $f_w$ is a focal length of the entire system at a wide-angle limit, and $\omega_w$ is a half value)(°) of the maximum view angle at a wide-angle limit.

The conditions (2) and (3) relate to the amount of movement at the time of maximum blur compensation in the second lens unit that moves in a direction perpendicular to the optical axis. In the case of a zoom lens system, when the compensation angle is constant over the entire zoom range, a larger zoom ratio requires a larger amount of movement of the lens unit or the lens element that moves in a direction perpendicular to the optical axis. On the contrary, a smaller zoom ratio requires merely a smaller amount of movement of the lens unit or the lens element that moves in a direction perpendicular to the optical axis. When the condition (2) is not satisfied, alternatively when the value exceeds the upper limit of the condition (3), blur compensation becomes excessive. This causes a possibility of enhanced degradation in the optical performance. In contrast, when the value goes below the lower limit of the condition (3), a possibility of insufficient blur compensation arises.

Here, when at least one of the following conditions (3)' and (3)" is satisfied, the above-mentioned effect is achieved more successfully.

$$0.08<(Y/Y_T)/(f_T/f) \ldots \quad (3)'$$

$$(Y/Y_T)/(f_T/f)<0.50 \ldots \quad (3)''$$

(here, $Z=f_T/f_W>4.0$ and $\omega_W>35$)

Further, it is more preferable that the conditions (3), (3)' and (3)" are satisfied with a condition $\omega_W>40$.

For example, in a zoom lens system like the zoom lens system according to Embodiments 1 to 25, it is preferable that the following condition (4) is satisfied.

$$0.10<(D_{2T}-D_{2W})/(I_r \times Z^2)<0.30 \quad (4)$$

(here, $Z=f_T/f_W>4.0$ and $\omega_W>35$)

where, $D_{2T}$ is an axial interval from the most image side of the second lens unit to the most object side of the third lens unit at a telephoto limit, $D_{2W}$ is an axial interval from the most image side of the second lens unit to the most object side of the third lens unit at a wide-angle limit, $I_r$ is a maximum image height ($I_r=f_T \times \tan(\omega_T)$), $f_T$ is a focal length of the entire system at a telephoto limit, $f_W$ is a focal length of the entire system at a wide-angle limit, $\omega_W$ is a half value (°) of the maximum view angle at a wide-angle limit, and $\omega_T$ is a half value (°) of a maximum view angle at a telephoto limit.

The condition (4) relates to the amount of movement of the second lens unit. When the value exceeds the upper limit of the condition (4), the amount of movement of the second lens unit necessary in association with zooming increases. This can cause difficulty in compensating aberration fluctuation during zooming. In contrast, when the value goes below the lower limit of the condition (4), difficulty can arise in simultaneously compensating distortion and curvature of field especially at a wide-angle limit.

Here, when at least one of the following conditions (4)' and (4)" is satisfied, the above-mentioned effect is achieved more successfully.

$$0.15<(D_{2T}-D_{2W})/(I_r \times Z^2) \quad (4)'$$

$$(D_{2T}-D_{2W})/(I_r \times Z^2)<0.27 \quad (4)''$$

(here, $Z=f_T/f_W>4.0$ and $\omega_W>35$)

Further, it is more preferable that the conditions (4), (4)' and (4)" are satisfied with a condition $\omega_W>40$.

For example, in a zoom lens system like the zoom lens system according to Embodiments 1 to 25, it is preferable that the following condition (5) is satisfied.

$$-1.60<f_{G1}/f_{G2}<-0.90 \quad (5)$$

where, $f_{G1}$ is a focal length of the first lens unit, and $f_{G2}$ is a focal length of the second lens unit.

The condition (5) sets forth the ratio of the focal lengths of the first lens unit and the second lens unit. When the value exceeds the upper limit of the condition (5), the focal length of the second lens unit becomes excessively small relatively. This can cause difficulty in compensating aberration generated in the second lens unit. In contrast, when the value goes below the lower limit of the condition (5), the focal length of the first lens unit becomes excessively small relatively. This causes difficulty in maintaining the variable magnification function of the second lens unit, and hence can cause difficulty in constructing a zoom lens system having a zoom ratio exceeding 4 in a state that satisfactory optical performance is obtained.

Here, when at least one of the following conditions (5)' and (5)" is satisfied, the above-mentioned effect is achieved more successfully.

$$-1.50<f_{G1}/f_{G2} \quad (5)'$$

$$f_{G1}/f_{G2}<-1.00 \quad (5)''$$

For example, in a zoom lens system like the zoom lens system according to Embodiments 1 to 25, it is preferable that the following condition (6) is satisfied.

$$-0.80<f_{G1}/f_{G3}<0.20 \quad (6)$$

where, $f_{G1}$ is a focal length of the first lens unit, and $f_{G3}$ is a focal length of the third lens unit.

The condition (6) sets forth the ratio of the focal lengths of the first lens unit and the third lens unit. When the value exceeds the upper limit of the condition (6), the focal length of the first lens unit becomes excessively large relatively. This can cause difficulty in achieving a compact zoom lens system. In contrast, when the value goes below the lower limit of the condition (6), the focal length of the third lens unit becomes excessively large relatively. This can cause difficulty in ensuring satisfactory illuminance on the image surface.

Here, when at least one of the following conditions (6)' and (6)" is satisfied, the above-mentioned effect is achieved more successfully.

$$-0.70<f_{G1}/f_{G3} \quad (6)'$$

$$f_{G1}/f_{G3}<-0.50 \quad (6)''$$

For example, in a zoom lens system like the zoom lens system according to Embodiments 1 to 25, it is preferable that the following condition (7) is satisfied.

$$0.20<f_{G2}/f_{G3}<0.80 \quad (7)$$

where, $f_{G2}$ is a focal length of the second lens unit, and $f_{G3}$ is a focal length of the third lens unit.

The condition (7) sets forth the ratio of the focal lengths of the second lens unit and the third lens unit. When the value exceeds the upper limit of the condition (7), the focal length of the second lens unit becomes excessively large relatively. This can cause difficulty in compensating aberration fluctuation generated in the second lens unit in association with zooming. In contrast, when the value goes below the lower limit of the condition (7), the focal length of the third lens unit becomes excessively large relatively. This can cause difficulty in ensuring satisfactory illuminance on the image surface.

Here, when at least one of the following conditions (7)' and (7)" is satisfied, the above-mentioned effect is achieved more successfully.

$$0.30 < f_{G2}/f_{G3} \quad (7)'$$

$$f_{G2}/f_{G3} < 0.50 \quad (7)''$$

For example, in a zoom lens system like the zoom lens system according to Embodiments 1 to 25, it is preferable that the following condition (8) is satisfied.

$$-0.80 < f_{G1}/f_T < -0.30 \quad (8)$$

(here, $f_T/f_W > 4.0$ and $\omega_W > 35$)
where,
$f_{G1}$ is a focal length of the first lens unit,
$f_T$ is a focal length of the entire system at a telephoto limit,
$f_W$ is a focal length of the entire system at a wide-angle limit, and
$\omega_W$ is a half value (°) of the maximum view angle at a wide-angle limit.

The condition (8) substantially sets forth the focal length of the first lens unit. When the value exceeds the upper limit of the condition (8), the focal length of the first lens unit becomes excessively large, and hence the amount of movement of the first lens unit increases. This causes difficulty in achieving a compact zoom lens system. In contrast, when the value goes below the lower limit of the condition (8), the focal length of the first lens unit becomes excessively small, and hence difficulty arises in maintaining a sufficient air space for ensuring the movement of the second lens unit during zooming. This can cause difficulty in achieving a zoom lens system having a variable magnification ratio of 4 or greater.

Here, when at least one of the following conditions (8)' and (8)" is satisfied, the above-mentioned effect is achieved more successfully.

$$-0.60 < f_{G1}/f_T \quad (8)'$$

$$f_{G1}/f_T < -0.40 \quad (8)''$$

(here, $f_T/f_W > 4.0$ and $\omega_W > 35$)
Further, it is more preferable that the conditions (8), (8)' and (8)" are satisfied with a condition $\omega_W > 40$.

For example, in a zoom lens system like the zoom lens system according to Embodiments 1 to 25, it is preferable that the following condition (9) is satisfied.

$$0.20 < f_{G2}/f_T < 0.80 \quad (9)$$

(here, $f_T/f_W > 4.0$ and $\omega_W > 35$)
where,
$f_{G2}$ is a focal length of the second lens unit,
$f_T$ is a focal length of the entire system at a telephoto limit,
$f_W$ is a focal length of the entire system at a wide-angle limit, and
$\omega_W$ is a half value (°) of the maximum view angle at a wide-angle limit.

The condition (9) substantially sets forth the focal length of the second lens unit. When the value exceeds the upper limit of the condition (9), the focal length of the second lens unit becomes excessively large, and hence the amount of movement of the second lens unit during zooming increases. This can cause difficulty in achieving a compact zoom lens system having a variable magnification ratio of 4 or greater. In contrast, when the value goes below the lower limit of the condition (9), the focal length of the second lens unit becomes excessively small. This can cause difficulty in compensating aberration fluctuation generated in association with the movement of the second lens unit. Further, when the value goes below the lower limit of the condition (9), difficulty can arise also in compensating distortion.

Here, when at least one of the following conditions (9)' and (9)" is satisfied, the above-mentioned effect is achieved more successfully.

$$0.30 < f_{G2}/f_T \quad (9)'$$

$$f_{G2}/f_T < 0.50 \quad (9)''$$

(here, $f_T/f_W > 4.0$ and $\omega_W > 35$)
Further, it is more preferable that the conditions (9), (9)' and (9)" are satisfied with a condition $\omega_W > 40$.

For example, in a zoom lens system like the zoom lens system according to Embodiments 1 to 25, it is preferable that the following condition (10) is satisfied.

$$0.60 < f_{G3}/f_T < 1.50 \quad (10)$$

(here, $f_T/f_W > 4.0$ and $\omega_W > 35$)
where,
$f_{G3}$ is a focal length of the third lens unit,
$f_T$ is a focal length of the entire system at a telephoto limit,
$f_W$ is a focal length of the entire system at a wide-angle limit, and
$\omega_W$ is a half value (°) of the maximum view angle at a wide-angle limit.

The condition (10) substantially sets forth the focal length of the third lens unit. When the value exceeds the upper limit of the condition (10), the focal length of the third lens unit becomes excessively large. This can cause difficulty in ensuring appropriate illuminance on the image surface. In contrast, when the value goes below the lower limit of the condition (10), the focal length of the third lens unit becomes excessively small. This can cause that aberration generated in the third lens unit becomes difficult to be compensated by the second lens unit.

Here, when at least one of the following conditions (10)' and (10)" is satisfied, the above-mentioned effect is achieved more successfully.

$$0.70 < f_{G3}/f_T \quad (9)'$$

$$f_{G3}/f_T < 1.30 \quad (9)''$$

(here, $f_T/f_W > 4.0$ and $\omega_W > 35$)
Further, it is more preferable that the conditions (10), (10)' and (10)" are satisfied with a condition $\omega_W > 40$.

For example, in a zoom lens system like the zoom lens system according to Embodiments 1 to 25, it is preferable that the following condition (11) is satisfied.

$$0.35 < (D_{1W} + D_{2W})/(D_{1T} + D_{2T}) < 1.20 \quad (11)$$

(here, $f_T/f_W > 4.0$ and $\omega_W > 35$)
where,
$D_{1W}$ is an axial interval from the most image side of the first lens unit to the most object side of the second lens unit at a wide-angle limit,
$D_{2W}$ is an axial interval from the most image side of the second lens unit to the most object side of the third lens unit at a wide-angle limit,
$D_{1T}$ is an axial interval from the most image side of the first lens unit to the most object side of the second lens unit at a telephoto limit,
$D_{2T}$ is an axial interval from the most image side of the second lens unit to the most object side of the third lens unit at a telephoto limit,
$f_T$ is a focal length of the entire system at a telephoto limit, $f_T$ is a focal length of the entire system at a wide-angle limit, and $\omega_W$ is a half value (°) of the maximum view angle at a wide-angle limit.

The condition (11) relates to the amount of movement of the first lens unit and the second lens unit during zooming. When the value exceeds the upper limit of the condition (11), compensation becomes insufficient for distortion at a wide-angle limit, and hence difficulty can arise in achieving satisfactory optical performance. In contrast, when the value goes below the lower limit of the condition (11), the amount of movement of the individual lens units necessary in association with zooming increases. This can cause difficulty in compensating aberration fluctuation during zooming.

Here, when at least one of the following conditions (11)' and (11)" is satisfied, the above-mentioned effect is achieved more successfully.

$$0.45 < (D_{1W}+D_{2W})/(D_{1T}+D_{2T}) \quad (11)'$$

$$(D_{1W}+D_{2W})/(D_{1T}+D_{2T}) < 0.80 \quad (11)''$$

(here, $f_T/f_W > 4.0$ and ($\omega_W > 35$)

Further, it is more preferable that the conditions (11), (11)' and (11)" are satisfied with a condition $\omega_W > 40$.

For example, in a zoom lens system like the zoom lens system according to Embodiments 1 to 25, it is preferable that the following condition (12) is satisfied.

$$2.00 < (D_{2T}-D_{2W})/f_W < 6.00 \quad (12)$$

(here, $f_T/f_W > 4.0$ and $\omega_W > 35$)

where, $D_{2T}$ is an axial interval from the most image side of the second lens unit to the most object side of the third lens unit at a telephoto limit, $D_{2W}$ is an axial interval from the most image side of the second lens unit to the most object side of the third lens unit at a wide-angle limit, $f_T$ is a focal length of the entire system at a telephoto limit, $f_W$ is a focal length of the entire system at a wide-angle limit, and $\omega_W$ is a half value (°) of the maximum view angle at a wide-angle limit.

The condition (12) relates to the amount of movement of the second lens unit. When the value exceeds the upper limit of the condition (12), the amount of movement of the second lens unit necessary in association with zooming increases. This can cause difficulty in compensating aberration fluctuation during zooming. In contrast, when the value goes below the lower limit of the condition (12), a tendency becomes dominant that the focal length of the second lens unit becomes small. This can cause difficulty in compensating distortion especially at a wide-angle limit.

Here, when at least one of the following conditions (12)' and (12)" is satisfied, the above-mentioned effect is achieved more successfully.

$$3.00 < (D_{2T}-D_{2W})/f_W \quad (12)'$$

$$(D_{2T}-D_{2W})/f_W < 5.50 \quad (12)''$$

(here, $f_T/f_W > 4.0$ and $\omega_W > 35$)

Further, it is more preferable that the conditions (12), (12)' and (12)" are satisfied with a condition $\omega_W > 40$.

For example, in a zoom lens system like the zoom lens system according to Embodiments 1 to 25, it is preferable that the following condition (13) is satisfied.

$$0.65 < (D_{2T}-D_{2W})/f_T < 1.10 \quad (13)$$

(here, $f_T/f_W > 4.0$ and $\omega_W > 35$)

where, $D_{2T}$ is an axial interval from the most image side of the second lens unit to the most object side of the third lens unit at a telephoto limit, $D_{2W}$ is an axial interval from the most image side of the second lens unit to the most object side of the third lens unit at a wide-angle limit, $f_T$ is a focal length of the entire system at a telephoto limit, $f_W$ is a focal length of the entire system at a wide-angle limit, and $\omega_W$ is a half value (°) of the maximum view angle at a wide-angle limit.

The condition (13) relates to the amount of movement of the second lens unit. When the value exceeds the upper limit of the condition (13), the amount of movement of the second lens unit necessary in association with zooming increases. This can cause difficulty in compensating aberration fluctuation during zooming. In contrast, when the value goes below the lower limit of the condition (13), a tendency becomes dominant that the focal length of the second lens unit becomes small. This can cause difficulty in simultaneously compensating distortion and curvature of field especially at a wide-angle limit.

Here, when at least one of the following conditions (13)' and (13)" is satisfied, the above-mentioned effect is achieved more successfully.

$$0.75 < (D_{2T}-D_{2W})/f_T \quad (13)'$$

$$(D_{2T}-D_{2W})/f_T < 0.95 \quad (13)''$$

(here, $f_T/f_W > 4.0$ and $\omega_W > 35$)

Further, it is more preferable that the conditions (13), (13)' and (13)" are satisfied with a condition $\omega_W > 40$.

For example, in a zoom lens system like the zoom lens system according to Embodiments 1 to 25, it is preferable that the following condition (14) is satisfied.

$$0.00 < D_{1T}/I_r < 0.10 \quad (14)$$

(here, $f_T/f_W > 4.0$ and $\omega_W > 35$)

where, $D_{1T}$ is an axial interval from the most image side of the first lens unit to the most object side of the second lens unit at a telephoto limit, $I_r$ is a maximum image height ($I_r = f_T \times \tan(\omega_T)$), $f_T$ is a focal length of the entire system at a telephoto limit, $f_W$ is a focal length of the entire system at a wide-angle limit, $\omega_W$ is a half value (°) of the maximum view angle at a wide-angle limit, and $\omega_T$ is a half value (°) of a maximum view angle at a telephoto limit.

The condition (14) relates to the air space between the first lens unit and the second lens unit. When the value exceeds the upper limit of the condition (14), the air space between the first lens unit and the second lens unit becomes excessively large. This causes difficulty in obtaining satisfactory magnification in the zoom lens system, and can cause difficulty in compensating distortion especially at a wide-angle limit. In contrast, when the value goes below the lower limit of the condition (14), the air space between the first lens unit and the second lens unit becomes excessively small. This similarly can cause difficulty in compensating distortion at a wide-angle limit.

Further, it is more preferable that the condition (14) is satisfied with a condition $\omega_W > 40$.

For example, in a zoom lens system like the zoom lens system according to Embodiments 1 to 25, it is preferable that the following condition (15) is satisfied.

$$0.10 < (f_W/I_r) \times (f_W/f_T) < 0.40 \quad (15)$$

(here, $Z = f_T/f_W > 4.0$ and $\omega_W > 35$)
where,
$I_r$ is a maximum image height ($I_r = f_T \times \tan(\omega_T)$),
$f_T$ is a focal length of the entire system at a telephoto limit,
$f_W$ is a focal length of the entire system at a wide-angle limit, [[and]]
$\omega_w$ is a half value)(°) of the maximum view angle at a wide-angle limit, and
$\omega_T$ is a halfvalue)(°) of the maximum view angle at a telephoto limit.

The condition (15) relates to the variable magnification ratio of the zoom lens system. When the value falls outside the range of the condition (15), difficulty can arise in ensuring a zoom ratio of 4 or the like in a state that a satisfactory view angle at a wide-angle limit is obtained.

Here, when at least one of the following conditions (15)' and (15)" is satisfied, the above-mentioned effect is achieved more successfully.

$$0.20 < (f_W/I_r) \times (f_W/f_T) \quad (15)'$$

$$(f_W/I_r) \times (f_W/f_T) < 0.35 \quad (15)''$$

(here, $f_T/f_W > 4.0$ and $\omega_W > 35$)

Further, it is more preferable that the conditions (15), (15)' and (15)" are satisfied with a condition $\omega_W > 40$.

For example, in a zoom lens system like the zoom lens system according to Embodiments 1 to 25, it is preferable that the following condition (16) is satisfied.

$$2.50 < \tan(\omega_W) \times Z < 6.00 \quad (16)$$

(here, $Z = f_T/f_W > 4.0$ and $\omega_W > 35$)
where,
$f_T$ is a focal length of the entire system at a telephoto limit,
$f_W$ is a focal length of the entire system at a wide-angle limit, and
$\omega_W$ is a half value (°) of the maximum view angle at a wide-angle limit.

The condition (16) relates to the variable magnification ratio of the zoom lens system. When the value falls outside the range of the condition (16), difficulty can arise in ensuring a zoom ratio of 4 or the like in a state that a satisfactory view angle at a wide-angle limit is obtained.

Here, when at least one of the following conditions (16)' and (16)" is satisfied, the above-mentioned effect is achieved more successfully.

$$3.00 < \tan(\omega_W) \times Z \quad (16)'$$

$$\tan(\omega_W) \times Z < 5.50 \quad (16)''$$

(here, $f_T/f_W > 4.0$ and $\omega_W > 35$)
Further, it is more preferable that the conditions (16), (16)' and (16)" are satisfied with a condition $\omega_W > 40$.

For example, in a zoom lens system like the zoom lens system according to Embodiments 1 to 25, it is preferable that the following condition (17) is satisfied.

$$2.00 < |f_W \times f_{G1}|/I_r^2 < 6.00 \quad (17)$$

(here, $Z = f_T/f_W > 4.0$ and $\omega_W > 35$)
where,
$I_r$ is a maximum image height ($I_r = f_T \times \tan(\omega_T)$),
$f_{G1}$ is a focal length of the first lens unit,
$f_T$ is a focal length of the entire system at a telephoto limit,
$f_W$ is a focal length of the entire system at a wide-angle limit,
$\omega_W$ is a half value (°) of the maximum view angle at a wide-angle limit, and
$\omega_T$ is a half value (°) of a maximum view angle at a telephoto limit.

The condition (17) substantially sets forth the focal length of the first lens unit. When the value exceeds the upper limit of the condition (17), the focal length of the first lens unit becomes excessively large, and hence the amount of movement of the first lens unit during zooming increases. This can cause difficulty in achieving a compact zoom lens system having a variable magnification ratio of 4 or greater. In contrast, when the value goes below the lower limit of the condition (17), the focal length of the first lens unit becomes excessively small. This can cause difficulty in compensating distortion in a state that a wide view angle is obtained at a wide-angle limit.

Here, when at least one of the following conditions (17)' and (17)" is satisfied, the above-mentioned effect is achieved more successfully.

$$2.50 < |f_W \times f_{G1}|/I_r^2 \quad (17)'$$

$$|f_W \times f_{G1}|/I_r^2 < 5.00 \quad (17)''$$

(here, $f_T/f_W > 4.0$ and $\omega_W > 35$)
Further, it is more preferable that the conditions (17), (17)' and (17)" are satisfied with a condition $\omega_W > 40$.

For example, in a zoom lens system like the zoom lens system according to Embodiments 1 to 25, it is preferable that the following condition (18) is satisfied.

$$2.00 < (f_W \cdot f_{G2})/I_r^2 < 6.00 \quad (18)$$

(here, $Z = f_T/f_W > 4.0$ and $\omega_W > 35$)
where,
$I_r$ is a maximum image height ($I_r = f_T \times \tan(\omega_T)$),
$f_{G2}$ is a focal length of the second lens unit,
$f_T$ is a focal length of the entire system at a telephoto limit,
$f_W$ is a focal length of the entire system at a wide-angle limit,
$\omega_W$ is a half value (°) of the maximum view angle at a wide-angle limit, and
$\omega_T$ is a half value (°) of a maximum view angle at a telephoto limit.

The condition (18) substantially sets forth the focal length of the second lens unit. When the value exceeds the upper limit of the condition (18), the focal length of the second lens unit becomes excessively large, and hence the amount of movement of the second lens unit during zooming increases. This can cause difficulty in achieving a compact zoom lens system having a variable magnification ratio of 4 or greater. In contrast, when the value goes below the lower limit of the condition (18), the focal length of the second lens unit becomes excessively small. This can cause difficulty in compensating aberration fluctuation generated in association with the movement of the second lens unit. Further, when the value goes below the lower limit of the condition (18), difficulty can arise also in compensating distortion.

Here, when at least one of the following conditions (18)' and (18)" is satisfied, the above-mentioned effect is achieved more successfully.

$$2.50<(f_W\cdot f_{G2})/I_r^2 \quad (18)'$$

$$(f_W\cdot f_{G2})/I_r^2<5.00 \quad (18)"$$

(here, $f_T/f_W>4.0$ and $\omega_W>35$)

Further, it is more preferable that the conditions (18), (18)' and (18)" are satisfied with a condition $\omega_W>40$.

For example, in a zoom lens system like the zoom lens system according to Embodiments 1 to 25, it is preferable that the following condition (19) is satisfied.

$$(D_{G1}+D_{G2}+D_{G3})/f_T<0.70 \quad (19)$$

(here, $f_T/f_W>4.0$ and $\omega_W>35$)
where, $D_{G1}$ is an axial interval from the most object side to the most image side of the first lens unit, $D_{G2}$ is an axial interval from the most object side to the most image side of the second lens unit, $D_{G3}$ is an axial interval from the most object side to the most image side of the third lens unit, $f_T$ is a focal length of the entire system at a telephoto limit, $f_W$ is a focal length of the entire system at a wide-angle limit, and $\omega_W$ is a half value (°) of the maximum view angle at a wide-angle limit.

The condition (19) relates to the overall length at the time of accommodation. When a so-called retraction construction that is free from protrusions at the time of accommodation is to be realized, the total of the axial intervals between the individual lens units need be sufficiently small. When the value exceeds the upper limit of the condition (19), the overall length at the time of retraction becomes excessively large, and hence this situation is unpreferable.

For example, in a zoom lens system like the zoom lens system according to Embodiments 1 to 25, it is preferable that the following condition (20) is satisfied.

$$3.5<(F_W\times F_T)/Z<5.0 \quad (20)$$

(here, $Z=f_T/f_W>4.0$ and $\omega_W>35$)
where, $F_W$ is a minimum F-number at a wide-angle limit, $F_T$ is a minimum F-number at a telephoto limit, $f_T$ is a focal length of the entire system at a telephoto limit, $f_W$ is a focal length of the entire system at a wide-angle limit, and $\omega_W$ is a half value (°) of the maximum view angle at a wide-angle limit.

The condition (20) relates to the F-number of the zoom lens system. When the value falls outside the range of the condition (20), difficulty can arise in achieving a bright zoom lens system having a small F-number in a state that satisfactory optical performance is obtained.

When the following condition (20)' is satisfied, the above-mentioned effect is achieved more successfully.

$$(F_W\times F_T)/Z<4.7 \quad (20)'$$

(here, $Z=f_T/f_W>4.0$ and $\omega_W>35$)

Further, it is more preferable that the conditions (20) and (20)' are satisfied with a condition $\omega_W>40$.

For example, in a zoom lens system like the zoom lens system according to Embodiments 1 to 25, it is preferable that the following condition (21) is satisfied.

$$1.5<L_T/(I_r\times Z)<2.6 \quad (21)$$

(here, $Z=f_T/f_W>4.0$ and $\omega_W>35$)
where, $I_r$ is a maximum image height ($I_r=f_T\times\tan(\omega_T)$), $L_T$ is an overall length at a telephoto limit (a distance from the most object side of the first lens unit to the image surface), $f_T$ is a focal length of the entire system at a telephoto limit, $f_W$ is a focal length of the entire system at a wide-angle limit, $\omega_W$ is a half value (°) of the maximum view angle at a wide-angle limit, and $\omega_T$ is a half value (°) of a maximum view angle at a telephoto limit.

The condition (21) sets forth the overall length especially at a telephoto limit. When the value exceeds the upper limit of the condition (21), a tendency of increase in the overall length of the zoom lens system becomes dominant. This can cause difficulty in achieving a compact zoom lens system. In contrast, when the value goes below the lower limit of the condition (21), a tendency of decrease in the overall length of the zoom lens system becomes dominant, and hence the focal length of each lens unit becomes excessively small. This can cause difficulty in compensating various kinds of aberration.

Here, it is more preferable that the condition (21) is satisfied with a condition $\omega_W>40$.

For example, in a zoom lens system like the zoom lens system according to Embodiments 1 to 25, it is preferable that the following condition (22) is satisfied.

$$4.0<(D_{G2}+(D_{G2A}))/(D_{G2A})<20.0 \quad (22)$$

where, $D_{G2}$ is an axial interval from the most object side to the most image side of the second lens unit, and $D_{G2A}$ is an axial interval from the most image side of the second lens unit to the aperture diaphragm.

The condition (22) sets forth an appropriate interval between the second lens unit and the aperture diaphragm. When the value exceeds the upper limit of the condition (22), a tendency becomes dominant that the diaphragm position becomes distant from the second lens unit. Thus, the effective diameter of the first lens unit becomes excessively large, and difficulty can arise in compensating distortion and coma aberration especially at a wide-angle limit. In contrast, when the value goes below the lower limit of the condition (22), a tendency becomes dominant that the diaphragm position becomes close to the second lens unit. This can cause difficulty in compensation of spherical aberration to be performed by the second lens unit.

When the following condition (22)' is satisfied, the above-mentioned effect is achieved more successfully.

$$8.0<(D_{G2}+(D_{G2A}))/(D_{G2A}) \quad (22)'$$

For example, in a zoom lens system like the zoom lens system according to Embodiments 1 to 25, in a case that the first lens unit, in order from the object side to the image side, comprises a first lens element having negative optical power and a second lens element having positive optical power, it is preferable that the following condition (23) is satisfied.

$$-2.00<f_{L2}/f_{G1}<-1.00 \quad (23)$$

where, $f_{L2}$ is a focal length of the second lens element, and $f_{G1}$ is a focal length of the first lens unit.

The condition (23) sets forth the focal length of the second lens element of the first lens unit. When the value exceeds the upper limit of the condition (23), the focal length of the second lens element becomes excessively large. This can cause difficulty in compensating coma aberration especially at a telephoto limit. In contrast, when the value goes below the lower limit of the condition (23), the focal length of the second lens element becomes excessively small. This can cause difficulty in compensating distortion at a wide-angle limit.

When the following condition (23)' is satisfied, the above-mentioned effect is achieved more successfully.

$$-1.60 < f_{L2}/f_{G1} \qquad (23)'$$

For example, in a zoom lens system like the zoom lens system according to Embodiments 1 to 25, in a case that the first lens unit, in order from the object side to the image side, comprises a first lens element having negative optical power and a second lens element having positive optical power, it is preferable that the following condition (24) is satisfied.

$$0.20 < R_{2F}/f_T < 0.50 \qquad (24)$$

(here, $Z=f_T/f_W>4.0$ and $\omega_W>35$)
where,
$R_{2F}$ is a radius of curvature of the object side surface of the second lens element,
$f_T$ is a focal length of the entire system at a telephoto limit,
$f_W$ is a focal length of the entire system at a wide-angle limit, and
$\omega_W$ is a half value (°) of the maximum view angle at a wide-angle limit.

The condition (24) sets forth the object side surface of the second lens element of the first lens unit. When the value falls outside the range of the condition (24), difficulty can arise in compensating distortion at a wide-angle limit.

When the following condition (24)' is satisfied, the above-mentioned effect is achieved more successfully.

$$R_{2F}/f_T < 0.45 \qquad (24)'$$

(here, $Z=f_T/f_W>4.0$ and $\omega_W>35$)
Further, it is more preferable that the conditions (24) and (24)' are satisfied with a condition $\omega_W>40$.

For example, in a zoom lens system like the zoom lens system according to Embodiments 1 to 25, in a case that the first lens unit, in order from the object side to the image side, comprises a first lens element having negative optical power and a second lens element having positive optical power, it is preferable that the following condition (25) is satisfied.

$$0.30 < R_{2R}/f_T < 0.90 \qquad (25)$$

(here, $Z=f_T/f_W>4.0$ and $\omega_W>35$)
where,
$R_{2R}$ is a radius of curvature of the image side surface of the second lens element,
$f_T$ is a focal length of the entire system at a telephoto limit,
$f_W$ is a focal length of the entire system at a wide-angle limit, and
$\omega_W$ is a half value (°) of the maximum view angle at a wide-angle limit.

The condition (25) sets forth the image side surface of the second lens element of the first lens unit. When the value falls outside the range of the condition (25), difficulty can arise in compensating distortion at a wide-angle limit.

Here, when the following condition (25)' is satisfied, the above-mentioned effect is achieved more successfully.

$$R_{2R}/f_T < 0.85 \qquad (25)'$$

(here, $Z=f_T/f_W>4.0$ and $\omega_W>35$)
Further, it is more preferable that the conditions (25) and (25)' are satisfied with a condition $\omega_W>40$.

For example, in a zoom lens system like the zoom lens system according to Embodiments 1 to 25, in a case that the first lens unit, in order from the object side to the image side, comprises a first lens element having negative optical power and a second lens element having positive optical power, it is preferable that the following condition (26) is satisfied.

$$0.50 < f_{L2}/f_T < 1.00 \qquad (26)$$

(here, $Z=f_T/f_W>4.0$ and $\omega_W>35$)
where,
$f_{L2}$ is a focal length of the second lens element,
$f_T$ is a focal length of the entire system at a telephoto limit,
$f_W$ is a focal length of the entire system at a wide-angle limit, and
$\omega_W$ is a half value (°) of the maximum view angle at a wide-angle limit.

The condition (26) sets forth the focal length of the second lens element of the first lens unit. When the value exceeds the upper limit of the condition (26), the focal length of the second lens element becomes excessively large, and hence the negative optical power of the entire first lens unit becomes small. This can cause difficulty in compensating various kinds of aberration, especially distortion, in a state that the focal length is reduced at a wide-angle limit. Further, when the value exceeds the upper limit of the condition (26), magnification chromatic aberration can be generated remarkably. In contrast, when the value goes below the lower limit of the condition (26), the focal length of the second lens element becomes excessively small. This can cause difficulty in ensuring a variable magnification ratio as high as 4 or greater in a state that satisfactory optical performance is obtained. Further, compensation of distortion can become insufficient.

When the following condition (26)' is satisfied, the above-mentioned effect is achieved more successfully.

$$f_{L2}/f_T < 0.90 \qquad (26)'$$

(here, $Z=f_T/f_W>4.0$ and $\omega_W>35$)
Further, it is more preferable that the conditions (26) and (26)' are satisfied with a condition $\omega_W>40$.

For example, in a zoom lens system like the zoom lens system according to Embodiments 1 to 25, in a case that the second lens unit has a positive lens element on the most object side, it is preferable that the following condition (27) is satisfied.

$$0.40 < f_{L3}/f_{G2} < 1.00 \qquad (27)$$

where,
$f_{L3}$ is a focal length of the positive lens element arranged on the most object side of the second lens unit, and
$f_{G2}$ is a focal length of the second lens unit.

The condition (27) sets forth the positive lens element arranged on the most object side of the second lens unit. When the value exceeds the upper limit of the condition (27), difficulty can arise in compensating distortion at a wide-angle limit. In contrast, when the value goes below the lower limit of the condition (27), difficulty arises in compensating spherical aberration over the entire zoom range, and hence size reduction and optical performance cannot simultaneously be achieved. This causes a possibility of degradation in the basic imaging performance as an optical system.

When the following condition (27)' is satisfied, the above-mentioned effect is achieved more successfully.

$$f_{L3}/f_{G2} \leqq 0.92 \qquad (27)'$$

For example, in a zoom lens system like the zoom lens system according to Embodiments 21 to 25, in a case that the second lens unit, in order from the object side to the image side, comprises a first cemented lens element constructed by cementing two lens elements with each other and a second cemented lens element constructed by cementing two lens elements with each other, it is preferable that the following condition (28) is satisfied.

$$2.00 < f_{G2a}/f_{G2b} < 3.00 \qquad (28)$$

where, $f_{G2a}$ is a focal length of the first cemented lens element, and
$f_{G2b}$ is a focal length of the second cemented lens element.

The condition (28) sets forth appropriate focal lengths of cemented lens elements in a case that the second lens unit is composed of two sets of the cemented lens elements. When the value exceeds the upper limit of the condition (28), decentering error sensitivity of the second lens unit becomes excessively high. Thus, performance degradation can be caused by an assembling error. In particular, degradation in image surface property can be caused by relative decentering. In contrast, when the value goes below the lower limit of the condition (28), difficulty can arise in compensating spherical aberration generated in the second lens unit.

When the following condition (28)' is satisfied, the above-mentioned effect is achieved more successfully.

$$2.25 < f_{G2a}/f_{G2b} \qquad (28)'$$

For example, in a zoom lens system like the zoom lens system according to Embodiments 1 to 25 in which the second lens unit moves in a direction perpendicular to the optical axis, it is preferable that the following condition (29) is satisfied.

$$2.00 < (1 - m_{2T}) \times m_{3T} < 5.00 \qquad (29)$$

(here, $Z = f_T/f_W > 4.0$ and $\omega_W > 35$)

where, $m_{2T}$ is a lateral magnification of the second lens unit at a telephoto limit in an infinity in-focus condition, $m_{3T}$ is a lateral magnification of the third lens unit at a telephoto limit in an infinity in-focus condition, $f_T$ is a focal length of the entire system at a telephoto limit,
$f_W$ is a focal length of the entire system at a wide-angle limit, and $\omega_W$ is a half value (°) of the maximum view angle at a wide-angle limit.

The condition (29) is a condition for obtaining satisfactory imaging characteristics in a case that image blur compensation is performed by moving the second lens unit in a direction perpendicular to the optical axis. When the value exceeds the upper limit of the condition (29), the amount of movement of the second lens unit required for decentering the image by a predetermined amount becomes excessively small. Thus, difficulty arises in causing the second lens unit to perform parallel movement with precision. Accordingly, pixel deviation during image taking cannot sufficiently be reduced. This can cause difficulty in achieving satisfactory imaging characteristics in an image blur compensation state. In contrast, when the value goes below the lower limit of the condition (29), the amount of decentering of the second lens unit required for decentering the image by a predetermined amount becomes excessively large. Thus, a large aberration change is generated in association with the parallel movement of the second lens unit. This causes a possibility of degradation in the imaging characteristics in the image periphery part.

When the following condition (29)' is satisfied, the above-mentioned effect is achieved more successfully.

$$2.50 < (1 - m_{2T}) \times m_{3T} \qquad (29)'$$

(here, $Z = f_T/f_W > 4.0$ and $\omega_W > 35$)

Further, it is more preferable that the conditions (29) and (29)' are satisfied with a condition $\omega_W > 40$.

For example, in a zoom lens system like the zoom lens system according to Embodiments 1 to 25, it is preferable that the following condition (30) is satisfied.

$$3.50 < m_{2T}/m_{2W} < 5.50 \qquad (30)$$

(here, $Z = f_T/f_W > 4.0$ and $\omega_W > 35$)

where, $m_{2T}$ is a lateral magnification of the second lens unit at a telephoto limit in an infinity in-focus condition, $m_{2W}$ is a lateral magnification of the second lens unit at a wide-angle limit in an infinity in-focus condition, $f_T$ is a focal length of the entire system at a telephoto limit,
$f_W$ is a focal length of the entire system at a wide-angle limit, and $\omega_W$ is a half value (°) of the maximum view angle at a wide-angle limit.

The condition (30) sets forth magnification change in the second lens unit, and substantially optimizes a variable magnification load to the second lens unit during zooming. When the value falls outside the range of the condition (30), the variable magnification load to the second lens unit becomes inappropriate. This can cause difficulty in constructing a compact zoom lens system having satisfactory optical performance.

When the following condition (30)' is satisfied, the above-mentioned effect is achieved more successfully.

$$4.00 < m_{2T}/m_{2W} \qquad (30)'$$

(here, $Z = f_T/f_W > 4.0$ and $\omega_W > 35$)

Further, it is more preferable that the conditions (30) and (30)' are satisfied with a condition $\omega_W > 40$.

For example, in a zoom lens system like the zoom lens system according to Embodiments 1 to 25, it is preferable that the following condition (31) is satisfied.

$$-6.00 < (1 - m_{2T}/m_{2W}) \times (m_{3T}/m_{3W}) < -3.00 \qquad (31)$$

(here, $Z = f_T/f_W > 4.0$ and $\omega_W > 35$)

where, $m_{2T}$ is a lateral magnification of the second lens unit at a telephoto limit in an infinity in-focus condition, $m_{2W}$ is a lateral magnification of the second lens unit at a wide-angle limit in an infinity in-focus condition, $m_{3T}$ is a lateral magnification of the third lens unit at a telephoto limit in an infinity in-focus condition, $m_{3W}$ is a lateral magnification of the third lens unit at a wide-angle limit in an infinity in-focus condition, $f_T$ is a focal length of the entire system at a telephoto limit,
$f_W$ is a focal length of the entire system at a wide-angle limit, and $\omega_W$ is a half value (°) of the maximum view angle at a wide-angle limit.

The condition (31) sets forth magnification change in the second lens unit and the third lens unit, and substantially optimizes a variable magnification load to the second lens unit and the third lens unit during zooming. When the value falls outside the range of the condition (31), distribution of the variable magnification load between the second lens unit and the third lens unit becomes inappropriate. This can cause difficulty in constructing a compact zoom lens system having satisfactory optical performance.

When the following condition (31)' is satisfied, the above-mentioned effect is achieved more successfully.

$$-4.00 < (1-m_{2T}/m_{2W}) \times (m_{3T}/m_{3W}) \quad (31)'$$

(here, $Z=f_T/f_W>4.0$ and $\omega_W>35$)

Further, it is more preferable that the conditions (31) and (31)' are satisfied with a condition $\omega_W>40$.

For example, in a zoom lens system like the zoom lens system according to Embodiments 1 to 25 in which the second lens unit moves in a direction perpendicular to the optical axis, it is preferable that the following condition (32) is satisfied.

$$1.00 < (1-m_{2W}) \times m_{3W} < 1.50 \quad (32)$$

(here, $Z=f_T/f_W>4.0$ and $\omega_W>35$)

where, $m_{2W}$ is a lateral magnification of the second lens unit at a wide-angle limit in an infinity in-focus condition, $m_{3W}$ is a lateral magnification of the third lens unit at a wide-angle limit in an infinity in-focus condition, $f_T$ is a focal length of the entire system at a telephoto limit, $f_W$ is a focal length of the entire system at a wide-angle limit, and $\omega_W$ is a half value (°) of the maximum view angle at a wide-angle limit.

The condition (32) is a condition for obtaining satisfactory imaging characteristics in a case that image blur compensation is performed by moving the second lens unit in a direction perpendicular to the optical axis. When the value exceeds the upper limit of the condition (32), the amount of movement of the second lens unit required for decentering the image by a predetermined amount becomes excessively small. Thus, difficulty can arise in causing the second lens unit to perform parallel movement with precision. Accordingly, pixel deviation during image taking cannot sufficiently be reduced. This can cause difficulty in achieving satisfactory imaging characteristics in an image blur compensation state. In contrast, when the value goes below the lower limit of the condition (32), the amount of decentering of the second lens unit required for decentering the image by a predetermined amount becomes excessively large. Thus, a large aberration change is generated in association with the parallel movement of the second lens unit. This causes a possibility of degradation in the imaging characteristics in the image periphery part.

When the following condition (32)' is satisfied, the above-mentioned effect is achieved more successfully.

$$1.15 < (1-m_{2T}) \times m_{3T} \quad (32)'$$

(here, $Z=f_T/f_W>4.0$ and $\omega_W>35$)

Further, it is more preferable that the conditions (32) and (32)' are satisfied with a condition $\omega_W>40$.

The lens units constituting the zoom lens system of Embodiments 1 to 25 are composed exclusively of refractive type lens elements that deflect the incident light by refraction (that is, lens elements of a type in which deflection is achieved at the interface between media each having a distinct refractive index). However, the present invention is not limited to the zoom lens system of this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium.

Moreover, in each embodiment, a configuration has been described that on the object side relative to the image surface S (that is, between the image surface S and the most image side lens surface of the third lens unit G3), a plane parallel plate such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves required characteristics of optical cut-off frequency by diffraction.

(Embodiment 26)

Figure 76:
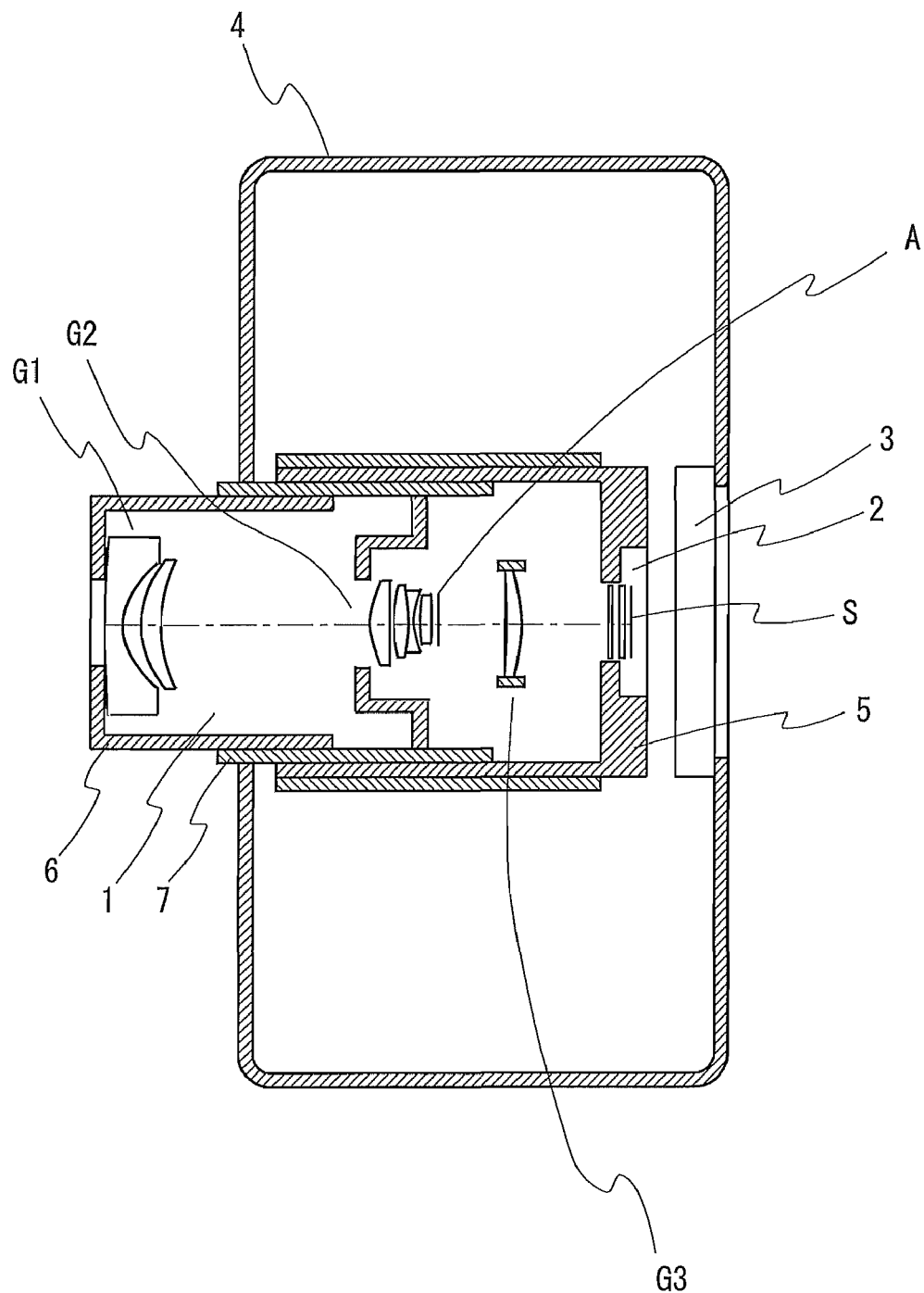
FIG. 76 is a schematic construction diagram of a digital still camera according to Embodiment 26.

FIG. 76 is a schematic construction diagram of a digital still camera according to Embodiment 26. In FIG. 76, the digital still camera comprises: an imaging device having a zoom lens system 1 and an image sensor 2 that is a CCD; a liquid crystal display monitor 3; and a body 4. The employed zoom lens system 1 is a zoom lens system according to Embodiment 1. In FIG. 76, the zoom lens system 1 comprises a first lens unit G1, a second lens unit G2, an aperture diaphragm A and a third lens unit G3. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2, the aperture diaphragm A and the third lens unit G3 move to predetermined positions relative to the image sensor 2, so that magnification change can be achieved ranging from a wide-angle limit to a telephoto limit. The third lens unit G3 is movable in an optical axis direction by a motor for focus adjustment.

As such, when the zoom lens system according to Embodiment 1 is employed in a digital still camera, a small digital still camera is obtained that has a high resolution and high capability of compensating the curvature of field and that has a short overall optical length at the time of non-use. Here, in the digital still camera shown in FIG. 76, any one of the zoom lens systems according to Embodiments 2 to 25 may be employed in place of the zoom lens system according to Embodiment 1. Further, the optical system of the digital still camera shown in FIG. 76 is applicable also to a digital video camera for moving images. In this case, moving images with high resolution can be acquired in addition to still images.

Here, the digital still camera according to the present Embodiment 26 has been described for a case that the employed zoom lens system 1 is a zoom lens system according to Embodiments 1 to 25. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments 1 to 25.

Further, Embodiment 26 has been described for a case that the zoom lens system is applied to a lens barrel of so-called retraction construction. However, the present invention is not limited to this. For example, to a lens barrel of so-called bending configuration may be applied the zoom lens system where a prism having an internal reflective surface or a front surface reflective mirror is arranged at an arbitrary position within the first lens unit G1 or the like. Further, in Embodiment 26, the zoom lens system may be applied to a so-called sliding lens barrel where a part, such as the entire second lens unit G2, of the lens units that constitute the zoom lens system is retracted from the optical axis at the time of retraction.

Further, an imaging device comprising a zoom lens system according to Embodiments 1 to 25 described above and an image sensor such as a CCD or a CMOS may be applied to a mobile telephone, a PDA (Personal Digital Assistance), a surveillance camera in a surveillance system, a Web camera, a vehicle-mounted camera or the like.

Numerical examples are described below in which the zoom lens systems according to Embodiments 1 to 25 are implemented. In the numerical examples, the units of the length in the tables are all "mm", while the units of the view angle are all "°". Moreover, in the numerical examples, r is the radius of curvature, d is the axial distance, nd is the refractive index to the d-line, and vd is the Abbe number to the d-line. In the numerical examples, the surfaces marked with * are aspheric surfaces, and the aspheric surface configuration is defined by the following expression.

$$z = \frac{h^2/r}{1+\sqrt{1-(1-\kappa)(h/r)^2}} + A4h^4 + A6h^6 + A8h^8 + A10h^{10} + A12h^{12} + A14h^{14}$$

Here, κ is the conic constant, A4, A6, A8, A10, A12 and A14 are a fourth-order, sixth-order, eighth-order, tenth-order, twelfth-order and fourteenth-order aspherical coefficients, respectively.

FIGS. 2, 5, 8, 11, 14, 17, 20, 23, 26, 29, 32, 35, 38, 41, 44, 47, 50, 53, 56, 59, 62, 65, 68, 71 and 74 are longitudinal aberration diagrams of the zoom lens systems according to Embodiments 1 to 25, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each FIG., indicated as "F"), and the solid line, the short dash line and the long dash line indicate the characteristics to the d-line, the F-line and the C-line, respectively. In each astigmatism diagram, the vertical axis indicates the image height (in each FIG., indicated as "H"), and the solid line and the dash line indicate the characteristics to the sagittal plane (in each FIG., indicated as "s") and the meridional plane (in each FIG., indicated as "m"), respectively. In each distortion diagram, the vertical axis indicates the image height (in each FIG., indicated as "H").

FIGS. 3, 6, 9, 12, 15, 18, 21, 24, 27, 30, 33, 36, 39, 42, 45, 48, 51, 54, 57, 60, 63, 66, 69, 72 and 75 are lateral aberration diagrams of the zoom lens systems at a telephoto limit according to Embodiments 1 to 25, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the entire second lens unit G2 is moved by a predetermined amount in a direction perpendicular to the optical axis at a telephoto limit. Among the lateral aberration diagrams of a basic state, the upper part shows the lateral aberration at an image point of 75% of the maximum image height, the middle part shows the lateral aberration at the axial image point, and the lower part shows the lateral aberration at an image point of −75% of the maximum image height. Among the lateral aberration diagrams of an image blur compensation state, the upper part shows the lateral aberration at an image point of 75% of the maximum image height, the middle part shows the lateral aberration at the axial image point, and the lower part shows the lateral aberration at an image point of −75% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the second lens unit G2.

In the zoom lens system according to each example, the amount ($Y_T$) of movement of the second lens unit G2 in a direction perpendicular to the optical axis in an image blur compensation state at a telephoto limit is as follows.

| Example | Amount of movement $Y_T$ (mm) |
| --- | --- |
| 1 | 0.0820 |
| 2 | 0.0848 |
| 3 | 0.0838 |
| 4 | 0.0838 |
| 5 | 0.0838 |
| 6 | 0.1025 |
| 7 | 0.0935 |
| 8 | 0.0847 |
| 9 | 0.0860 |
| 10 | 0.1038 |
| 11 | 0.0829 |
| 12 | 0.0854 |
| 13 | 0.0933 |
| 14 | 0.0841 |
| 15 | 0.1016 |
| 16 | 0.0972 |
| 17 | 0.0966 |
| 18 | 0.0974 |
| 19 | 0.0940 |
| 20 | 0.0989 |
| 21 | 0.0650 |
| 22 | 0.0707 |
| 23 | 0.0762 |
| 24 | 0.0678 |
| 25 | 0.0775 |

Here, when the shooting distance is infinity, at a telephoto limit, the amount of image decentering in a case that the zoom lens system inclines by 0.6° is equal to the amount of image decentering in a case that the entire second lens unit G2 moves in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +75% image point and the lateral aberration at the −75% image point are compared with each other in a basic state, all have a small degree of curvature and almost the same inclination in the aberration curve. Thus, decentering coma aberration and decentering astigmatism are small. This indicates that sufficient imaging performance is obtained even in an image blur compensation state. Further, when the image blur compensation angle of a zoom lens system is the same, the amount of parallel movement required for image blur compensation decreases with decreasing focal length of the entire zoom lens system. Thus, at arbitrary zoom positions, sufficient image blur compensation can be performed for image blur compensation angles up to 0.6° without degrading the imaging characteristics.

NUMERICAL EXAMPLE 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows various data.

TABLE 1

(Surface data)

| Surface number | r | d | nd | vd |
|---|---|---|---|---|
| Object surface | ∞ | | | |
| 1* | 188.92300 | 1.06000 | 1.85976 | 40.6 |
| 2* | 5.44500 | 1.73200 | | |
| 3* | 9.22600 | 1.98000 | 1.99537 | 20.7 |
| 4 | 17.36000 | Variable | | |
| 5* | 4.94900 | 1.55900 | 1.80434 | 40.8 |
| 6 | 117.92500 | 0.15300 | | |
| 7 | 13.15200 | 1.05000 | 1.72916 | 54.7 |
| 8 | −21.47500 | 0.01000 | 1.56732 | 42.8 |
| 9 | −21.47500 | 0.40000 | 1.76182 | 26.6 |
| 10 | 3.74800 | 0.58300 | | |
| 11 | 22.33900 | 1.01500 | 1.69680 | 55.5 |
| 12 | −19.41000 | 0.40000 | | |
| 13 (Diaphragm) | ∞ | Variable | | |
| 14* | −116.08400 | 1.40700 | 1.68863 | 52.8 |
| 15* | −12.09600 | Variable | | |
| 16 | ∞ | 0.28000 | 1.51680 | 64.2 |
| 17 | ∞ | 0.50000 | | |
| 18 | ∞ | 0.50000 | 1.51680 | 64.2 |
| 19 | ∞ | (BF) | | |
| Image surface | ∞ | | | |

TABLE 2

(Aspherical data)

Surface No. 1

K = 0.00000E+00, A4 = −1.00660E−06, A6 = 1.42786E−06,
A8 = −2.21841E−08, A10 = 4.62309E−11, A12 = 0.00000E+00,
A14 = 0.00000E+00

Surface No. 2

K = −1.50376E+00, A4 = 9.16971E−04, A6 = 9.94477E−06,
A8 = −3.69570E−06, A10 = 2.88772E−07, A12 = −9.37503E−09,
A14 = 1.08167E−10

Surface No. 3

K = 0.00000E+00, A4 = 1.33735E−04, A6 = 8.26828E−06,
A8 = −2.36263E−06, A10 = 1.72041E−07, A12 = −5.39358E−09,
A14 = 6.14991E−11

Surface No. 5

K = 0.00000E+00, A4 = −7.21745E−04, A6 = −2.78703E−06,
A8 = −1.01123E−05, A10 = 2.41573E−06, A12 = −3.18270E−07,
A14 = 1.76444E−08

Surface No. 14

K = 0.00000E+00, A4 = 3.84582E−04, A6 = −4.88167E−05,
A8 = 2.35198E−06, A10 = 4.74331E−08, A12 = −3.53285E−09,
A14 = 0.00000E+00

Surface No. 15

K = 0.00000E+00, A4 = 5.69667E−04, A6 = −3.94000E−05,
A8 = 1.79407E−06, A10 = 3.36301E−08, A12 = −2.29056E−09,
A14 = 0.00000E+00

TABLE 3

(Various data)

Zooming ratio 5.02077

| | Wide-angle limit | Middle position | Telephoto limit |
|---|---|---|---|
| Focal length | 4.2071 | 10.2045 | 21.1228 |
| F-number | 2.90782 | 5.02380 | 6.11771 |
| View angle | 46.1595 | 20.5403 | 10.1174 |
| Image height | 3.8000 | 3.8000 | 3.8000 |
| Overall length of lens system | 33.0753 | 29.8672 | 37.3253 |
| BF | 0.42136 | 0.37974 | 0.40715 |
| d4 | 14.3760 | 4.3000 | 0.2000 |
| d13 | 1.7728 | 9.7004 | 21.4167 |
| d15 | 3.8761 | 2.8581 | 2.6724 |

Zoom lens unit data

| Lens unit | Initial surface | Focal length |
|---|---|---|
| 1 | 1 | −11.10099 |
| 2 | 5 | 9.35617 |
| 3 | 14 | 19.50093 |

NUMERICAL EXAMPLE 2

The zoom lens system of Numerical Example 2 corresponds to Embodiment 2 shown in FIG. 4. Table 4 shows the surface data of the zoom lens system of Numerical Example 2. Table 5 shows the aspherical data. Table 6 shows various data.

TABLE 4

(Surface data)

| Surface number | r | d | nd | vd |
|---|---|---|---|---|
| Object surface | ∞ | | | |
| 1 | 91.71600 | 1.06000 | 1.85976 | 40.6 |
| 2* | 5.02500 | 1.73200 | | |
| 3* | 8.10500 | 1.98000 | 1.99537 | 20.7 |
| 4 | 15.41300 | Variable | | |
| 5 | 4.67900 | 1.55000 | 1.80434 | 40.8 |
| 6 | 20.06000 | 0.15000 | | |
| 7 | 17.38100 | 1.05000 | 1.72916 | 54.7 |
| 8 | −7.78900 | 0.01000 | 1.56732 | 42.8 |
| 9 | −7.78900 | 0.40000 | 1.76182 | 26.6 |
| 10 | 5.54400 | 0.58300 | | |
| 11* | 9.60700 | 1.03000 | 1.69680 | 55.5 |
| 12* | 24.77100 | 0.40000 | | |
| 13 (Diaphragm) | ∞ | Variable | | |
| 14* | 143.86300 | 1.40700 | 1.68863 | 52.8 |
| 15* | −14.99700 | Variable | | |
| 16 | ∞ | 0.28000 | 1.51680 | 64.2 |
| 17 | ∞ | 0.50000 | | |
| 18 | ∞ | 0.50000 | 1.51680 | 64.2 |
| 19 | ∞ | (BF) | | |
| Image surface | ∞ | | | |

TABLE 5

(Aspherical data)

Surface No. 2

K = −1.72393E+00, A4 = 8.21522E−04, A6 = 2.55266E−05,
A8 = −3.88679E−06, A10 = 2.77924E−07, A12 = −9.47533E−09,
A14 = 1.16437E−10

Surface No. 3

TABLE 5-continued (Aspherical data)

K = 0.00000E+00, A4 = −2.24219E−04, A6 = 2.10672E−05,
A8 = −2.55993E−06, A10 = 1.68943E−07, A12 = −5.44312E−09,
A14 = 6.31627E−11
Surface No. 11

K = 0.00000E+00, A4 = −1.79281E−03, A6 = −2.82240E−04,
A8 = 1.33862E−05, A10 = 7.24137E−06, A12 = 0.00000E+00,
A14 = 0.00000E+00
Surface No. 12

K = 0.00000E+00, A4 = 8.20695E−04, A6 = −3.73734E−05,
A8 = −4.11489E−07, A10 = 1.63224E−05, A12 = 0.00000E+00,
A14 = 0.00000E+00
Surface No. 14

K = 0.00000E+00, A4 = −1.43793E−03, A6 = 6.22989E−05,
A8 = −3.57284E−06, A10 = 4.27742E−08, A12 = 1.29183E−09,
A14 = 0.00000E+00
Surface No. 15

K = 0.00000E+00, A4 = −1.03151E−03, A6 = −6.84282E−06,
A8 = 2.21877E−06, A10 = −1.02480E−07, A12 = 1.11563E−09,
A14 = 0.00000E+00

TABLE 6

(Various data)

Zooming ratio 4.78728

| | Wide-angle limit | Middle position | Telephoto limit |
|---|---|---|---|
| Focal length | 4.5625 | 10.3339 | 21.8419 |
| F-number | 2.91681 | 4.41216 | 6.27025 |
| View angle | 43.7744 | 20.6796 | 9.7181 |
| Image height | 3.8000 | 3.8000 | 3.8000 |
| Overall length of lens system | 32.9851 | 26.5722 | 37.4677 |
| BF | 0.42089 | 0.40791 | 0.39091 |
| d4 | 13.9363 | 2.2741 | 0.2000 |
| d13 | 2.4243 | 4.3279 | 21.6993 |
| d15 | 3.5716 | 6.9303 | 2.5455 |

Zoom lens unit data

| Lens unit | Initial surface | Focal length |
|---|---|---|
| 1 | 1 | −11.49994 |
| 2 | 5 | 9.44980 |
| 3 | 14 | 19.79358 |

NUMERICAL EXAMPLE 3

The zoom lens system of Numerical Example 3 corresponds to Embodiment 3 shown in FIG. 7. Table 7 shows the surface data of the zoom lens system of Numerical Example 3. Table 8 shows the aspherical data. Table 9 shows various data.

TABLE 7

(Surface data)

| Surface number | r | d | nd | vd |
|---|---|---|---|---|
| Object surface | ∞ | | | |
| 1* | 140.23000 | 1.06000 | 1.89816 | 34.5 |
| 2* | 5.45300 | 1.73200 | | |
| 3* | 9.42700 | 1.98000 | 2.13854 | 17.8 |
| 4 | 17.36000 | Variable | | |
| 5* | 4.99100 | 1.55000 | 1.80434 | 40.8 |
| 6 | 117.92500 | 0.15000 | | |
| 7 | 12.94200 | 1.05000 | 1.72916 | 54.7 |
| 8 | −13.72800 | 0.01000 | 1.56732 | 42.8 |
| 9 | −13.72800 | 0.40000 | 1.76182 | 26.6 |
| 10 | 3.74800 | 0.58300 | | |
| 11 | 20.43300 | 1.03000 | 1.69680 | 55.5 |
| 12 | −21.48900 | 0.40000 | | |
| 13 (Diaphragm) | ∞ | Variable | | |
| 14* | −116.08400 | 1.40700 | 1.68863 | 52.8 |
| 15* | −12.26900 | Variable | | |
| 16 | ∞ | 0.28000 | 1.51680 | 64.2 |
| 17 | ∞ | 0.50000 | | |
| 18 | ∞ | 0.50000 | 1.51680 | 64.2 |
| 19 | ∞ | (BF) | | |
| Image surface | ∞ | | | |

TABLE 8

Aspherical data)

Surface No. 1

K = 0.00000E+00, A4 = −5.16032E−06, A6 = 1.36006E−06,
A8 = −2.35032E−08, A10 = 9.64467E−12, A12 = 0.00000E+00,
A14 = 0.00000E+00
Surface No. 2

K = −1.54603E+00, A4 = 8.66310E−04, A6 = 1.05013E−05,
A8 = −3.56556E−06, A10 = 2.87567E−07, A12 = −9.59572E−09,
A14 = 1.13274E−10
Surface No. 3

K = 0.00000E+00, A4 = 5.82564E−05, A6 = 1.23467E−05,
A8 = −2.44842E−06, A10 = 1.70937E−07, A12 = −5.28376E−09,
A14 = 6.04276E−11
Surface No. 5

K = 0.00000E+00, A4 = −6.59982E−04, A6 = −1.07316E−05,
A8 = −7.67478E−06, A10 = 2.20031E−06, A12 = −3.14693E−07,
A14 = 1.71160E−08
Surface No. 14

K = 0.00000E+00, A4 = 3.98783E−04, A6 = −4.87903E−05,
A8 = 2.32347E−06, A10 = 4.49831E−08, A12 = −3.64603E−09,
A14 = 0.00000E+00
Surface No. 15

K = 0.00000E+00, A4 = 6.66651E−04, A6 = −6.35825E−05,
A8 = 3.80613E−06, A10 = −2.17291E−08, A12 = −2.43698E−09,
A14 = 0.00000E+00

TABLE 9

(Various data)

Zooming ratio 4.75067

| | Wide-angle limit | Middle position | Telephoto limit |
|---|---|---|---|
| Focal length | 4.5762 | 10.2956 | 21.7403 |
| F-number | 2.90973 | 4.76492 | 6.12812 |
| View angle | 43.6578 | 20.3579 | 9.8270 |
| Image height | 3.8000 | 3.8000 | 3.8000 |
| Overall length of lens system | 32.9778 | 29.9914 | 37.7234 |
| BF | 0.40883 | 0.36012 | 0.36629 |
| d4 | 13.7226 | 4.3000 | 0.2000 |
| d13 | 2.4223 | 9.4455 | 21.9297 |
| d15 | 3.7921 | 3.2538 | 2.5954 |

TABLE 9-continued (Various data)

Zoom lens unit data

| Lens unit | Initial surface | Focal length |
|---|---|---|
| 1 | 1 | −11.37494 |
| 2 | 5 | 9.50394 |
| 3 | 14 | 19.81261 |

NUMERICAL EXAMPLE 4

The zoom lens system of Numerical Example 4 corresponds to Embodiment 4 shown in FIG. 10. Table 10 shows the surface data of the zoom lens system of Numerical Example 4. Table 11 shows the aspherical data. Table 12 shows various data.

TABLE 10

(Surface data)

| Surface number | r | d | nd | vd |
|---|---|---|---|---|
| Object surface | ∞ | | | |
| 1* | 277.61100 | 1.06000 | 1.80470 | 41.0 |
| 2* | 5.18600 | 1.73200 | | |
| 3* | 9.15000 | 1.98000 | 1.99537 | 20.7 |
| 4 | 17.36000 | Variable | | |
| 5* | 5.00400 | 1.55000 | 1.80434 | 40.8 |
| 6 | 117.92500 | 0.15000 | | |
| 7 | 12.83700 | 1.05000 | 1.72916 | 54.7 |
| 8 | −16.64100 | 0.01000 | 1.56732 | 42.8 |
| 9 | −16.64100 | 0.40000 | 1.76182 | 26.6 |
| 10 | 3.74800 | 0.58300 | | |
| 11 | 19.27500 | 1.03000 | 1.69680 | 55.5 |
| 12 | −23.38700 | 0.40000 | | |
| 13 (Diaphragm) | ∞ | Variable | | |
| 14* | −116.08400 | 1.40700 | 1.68863 | 52.8 |
| 15* | −12.26800 | Variable | | |
| 16 | ∞ | 0.28000 | 1.51680 | 64.2 |
| 17 | ∞ | 0.50000 | | |
| 18 | ∞ | 0.50000 | 1.51680 | 64.2 |
| 19 | ∞ | (BF) | | |
| Image surface | ∞ | | | |

TABLE 11

(Aspherical data)

Surface No. 1

K = 0.00000E+00, A4 = −5.16032E−06, A6 = 1.36006E−06,
A8 = −2.35032E−08, A10 = 9.64467E−12, A12 = 0.00000E+00,
A14 = 0.00000E+00

Surface No. 2

K = −1.36045E+00, A4 = 9.62829E−04, A6 = 9.75296E−06,
A8 = −3.60697E−06, A10 = 2.88964E−07, A12 = −9.50399E−09,
A14 = 1.08374E−10

Surface No. 3

K = 0.00000E+00, A4 = 1.46718E−04, A6 = 9.99932E−06,
A8 = −2.39751E−06, A10 = 1.71641E−07, A12 = −5.32077E−09,
A14 = 5.98708E−11

Surface No. 5

K = 0.00000E+00, A4 = −6.52447E−04, A6 = −7.02093E−06,
A8 = −1.00791E−05, A10 = 2.75597E−06, A12 = −3.51282E−07,
A14 = 1.65967E−08

Surface No. 14

K = 0.00000E+00, A4 = 3.98783E−04, A6 = −4.87903E−05,
A8 = 2.32347E−06, A10 = 4.49831E−08, A12 = −3.64603E−09,
A14 = 0.00000E+00

TABLE 11-continued (Aspherical data)

Surface No. 15

K = 0.00000E+00, A4 = 6.34167E−04, A6 = −6.11751E−05,
A8 = 3.80911E−06, A10 = −3.34184E−08, A12 = −2.00676E−09,
A14 = 0.00000E+00

TABLE 12

(Various data)

Zooming ratio 4.74438

| | Wide-angle limit | Middle position | Telephoto limit |
|---|---|---|---|
| Focal length | 4.5794 | 10.3078 | 21.7266 |
| F-number | 2.91050 | 4.77133 | 6.13310 |
| View angle | 43.5230 | 20.3763 | 9.8525 |
| Image height | 3.8000 | 3.8000 | 3.8000 |
| Overall length of lens system | 32.9845 | 30.0066 | 37.7343 |
| BF | 0.41553 | 0.37528 | 0.37716 |
| d4 | 13.7226 | 4.3000 | 0.2000 |
| d13 | 2.4384 | 9.4758 | 21.9238 |
| d15 | 3.7760 | 3.2235 | 2.6013 |

Zoom lens unit data

| Lens unit | Initial surface | Focal length |
|---|---|---|
| 1 | 1 | −11.37119 |
| 2 | 5 | 9.50694 |
| 3 | 14 | 19.81081 |

NUMERICAL EXAMPLE 5

The zoom lens system of Numerical Example 5 corresponds to Embodiment 5 shown in FIG. 13. Table 13 shows the surface data of the zoom lens system of Numerical Example 5. Table 14 shows the aspherical data. Table 15 shows various data.

TABLE 13

(Surface data)

| Surface number | r | d | nd | vd |
|---|---|---|---|---|
| Object surface | ∞ | | | |
| 1* | 277.61100 | 1.06000 | 1.80470 | 41.0 |
| 2* | 5.18600 | 1.73200 | | |
| 3* | 9.15400 | 1.98000 | 1.99537 | 20.7 |
| 4 | 17.36000 | Variable | | |
| 5* | 5.09400 | 1.55000 | 1.87290 | 40.8 |
| 6 | 117.92500 | 0.15000 | | |
| 7 | 16.28000 | 1.05000 | 1.72916 | 54.7 |
| 8 | −13.60500 | 0.01000 | 1.56732 | 42.8 |
| 9 | −13.60500 | 0.40000 | 1.76182 | 26.6 |
| 10 | 3.74800 | 0.58300 | | |
| 11 | 28.27400 | 1.03000 | 1.69680 | 55.5 |
| 12 | −16.70500 | 0.40000 | | |
| 13 (Diaphragm) | ∞ | Variable | | |
| 14* | −116.08400 | 1.40700 | 1.68863 | 52.8 |
| 15* | −12.24500 | Variable | | |
| 16 | ∞ | 0.28000 | 1.51680 | 64.2 |
| 17 | ∞ | 0.50000 | | |
| 18 | ∞ | 0.50000 | 1.51680 | 64.2 |
| 19 | ∞ | (BF) | | |
| Image surface | ∞ | | | |

TABLE 14

(Aspherical data)

Surface No. 1

K = 0.00000E+00, A4 = −5.16032E−06, A6 = 1.36006E−06,
A8 = −2.35032E−08, A10 = 9.64467E−12,
A12 = 0.00000E+00, A14 = 0.00000E+00

Surface No. 2

K = −1.21146E+00, A4 = 9.42719E−04, A6 = 8.22480E−06,
A8 = −3.73153E−06, A10 = 2.89294E−07,
A12 = −9.56885E−09, A14 = 1.15064E−10

Surface No. 3

K = 0.00000E+00, A4 = 1.96871E−04, A6 = 9.09412E−06,
A8 = −2.42115E−06, A10 = 1.68578E−07,
A12 = −5.27161E−09, A14 = 6.24497E−11

Surface No. 5

K = 0.00000E+00, A4 = −5.89690E−04, A6 = −2.66456E−05,
A8 = −4.67652E−06, A10 = 2.49299E−06,
A12 = −4.37504E−07, A14 = 2.60253E−08

Surface No. 14

K = 0.00000E+00, A4 = 3.98783E−04, A6 = −4.87903E−05,
A8 = 2.32347E−06, A10 = 4.49831E−08,
A12 = −3.64603E−09, A14 = 0.00000E+00

Surface No. 15

K = 0.00000E+00, A4 = 4.95733E−04, A6 = −5.52926E−05,
A8 = 4.07254E−06, A10 = −8.39574E−08,
A12 = −3.60474E−10, A14 = 0.00000E+00

TABLE 15

(Various data)

Zooming ratio 4.73379

| | Wide-angle limit | Middle position | Telephoto limit |
|---|---|---|---|
| Focal length | 4.5814 | 10.3126 | 21.6875 |
| F-number | 2.90996 | 4.76998 | 6.12631 |
| View angle | 43.6298 | 20.5699 | 9.9939 |
| Image height | 3.8000 | 3.8000 | 3.8000 |
| Overall length of lens system | 32.9849 | 30.0104 | 37.7589 |
| BF | 0.41591 | 0.37912 | 0.40176 |
| d4 | 13.7226 | 4.3000 | 0.2000 |
| d13 | 2.4562 | 9.4832 | 21.8879 |
| d15 | 3.7582 | 3.2161 | 2.6372 |

Zoom lens unit data

| Lens unit | Initial surface | Focal length |
|---|---|---|
| 1 | 1 | −11.36300 |
| 2 | 5 | 9.50654 |
| 3 | 14 | 19.76931 |

NUMERICAL EXAMPLE 6

The zoom lens system of Numerical Example 6 corresponds to Embodiment 6 shown in FIG. 16. Table 16 shows the surface data of the zoom lens system of Numerical Example 6. Table 17 shows the aspherical data. Table 18 shows various data.

TABLE 16

(Surface data)

| Surface number | r | d | nd | vd |
|---|---|---|---|---|
| Object surface | ∞ | | | |
| 1* | 177.47800 | 1.03900 | 1.85976 | 40.6 |
| 2* | 6.63600 | 2.05700 | | |
| 3* | 11.13100 | 2.32400 | 1.99537 | 20.7 |
| 4 | 21.12900 | Variable | | |
| 5* | 6.03400 | 1.85100 | 1.80434 | 40.8 |
| 6 | 143.52700 | 0.20100 | | |
| 7 | 15.89500 | 1.28000 | 1.72916 | 54.7 |
| 8 | −20.09100 | 0.01200 | 1.56732 | 42.8 |
| 9 | −20.09100 | 0.47900 | 1.76182 | 26.6 |
| 10 | 4.56200 | 0.74600 | | |
| 11 | 24.99300 | 1.11300 | 1.69680 | 55.5 |
| 12 | −26.97000 | 0.48700 | | |
| 13(Diaphragm) | ∞ | Variable | | |
| 14* | −141.28500 | 1.53800 | 1.68863 | 52.8 |
| 15* | −14.74800 | Variable | | |
| 16 | ∞ | 0.34100 | 1.51680 | 64.2 |
| 17 | ∞ | 0.60900 | | |
| 18 | ∞ | 0.60900 | 1.51680 | 64.2 |
| 19 | ∞ | (BF) | | |
| Image surface | ∞ | | | |

TABLE 17

(Aspherical data)

Surface No. 1

K = 0.00000E+00, A4 = −2.86219E−06, A6 = 5.09247E−07,
A8 = −5.94077E−09, A10 = 1.64570E−12, A12 = 0.00000E+00,
A14 = 0.00000E+00

Surface No. 2

K = −1.53666E+00, A4 = 5.02282E−04, A6 = 4.46163E−06,
A8 = −9.10715E−07, A10 = 4.91821E−08, A12 = −1.09034E−09,
A14 = 8.46522E−12

Surface No. 3

K = 0.00000E+00, A4 = 5.74073E−05, A6 = 3.98544E−06,
A8 = −6.02600E−07, A10 = 2.93515E−08, A12 = −6.16876E−10,
A14 = 4.72214E−12

Surface No. 5

K = 0.00000E+00, A4 = −3.87012E−04, A6 = 1.94856E−06,
A8 = −3.17953E−06, A10 = 4.47726E−07, A12 = −3.24123E−08,
A14 = 9.30481E−10

Surface No. 14

K = 0.00000E+00, A4 = 2.21186E−04, A6 = −1.82685E−05,
A8 = 5.87291E−07, A10 = 7.67561E−09, A12 = −4.19983E−10,
A14 = 0.00000E+00

Surface No. 15

K = 0.00000E+00, A4 = 3.95412E−04, A6 = −2.36935E−05,
A8 = 8.28888E−07, A10 = 3.84189E−09, A12 = −4.16995E−10,
A14 = 0.00000E+00

TABLE 18

(Various data)

Zooming ratio 4.78219

| | Wide-angle limit | Middle position | Telephoto limit |
|---|---|---|---|
| Focal length | 5.5419 | 12.5134 | 26.5024 |
| F-number | 2.88513 | 4.73316 | 6.09875 |
| View angle | 43.7864 | 20.3478 | 9.7989 |
| Image height | 4.6250 | 4.6250 | 4.6250 |
| Overall length | 39.4596 | 35.8400 | 45.2842 |

TABLE 18-continued (Various data)

| of lens system | | | |
|---|---|---|---|
| BF | 0.50832 | 0.46420 | 0.50531 |
| d4 | 16.7018 | 5.2335 | 0.2434 |
| d13 | 2.9482 | 11.5357 | 26.7513 |
| d15 | 4.6153 | 3.9206 | 3.0982 |

Zoom lens unit data

| Lens unit | Initial surface | Focal length |
|---|---|---|
| 1 | 1 | −13.88579 |
| 2 | 5 | 11.53034 |
| 3 | 14 | 23.79460 |

NUMERICAL EXAMPLE 7

The zoom lens system of Numerical Example 7 corresponds to Embodiment 7 shown in FIG. 19. Table 19 shows the surface data of the zoom lens system of Numerical Example 7. Table 20 shows the aspherical data. Table 21 shows various data.

TABLE 19

(Surface data)

| Surface number | r | d | nd | vd |
|---|---|---|---|---|
| Object surface | ∞ | | | |
| 1 | 126.42600 | 1.06000 | 1.86000 | 40.6 |
| 2* | 5.72700 | 1.53700 | | |
| 3* | 8.95800 | 1.77600 | 1.99537 | 20.7 |
| 4 | 17.36000 | Variable | | |
| 5* | 5.19400 | 1.56100 | 1.80434 | 40.8 |
| 6 | 377.10900 | 0.30000 | | |
| 7 | 17.42100 | 1.06000 | 1.72916 | 54.7 |
| 8 | −13.83000 | 0.01000 | 1.56732 | 42.8 |
| 9 | −13.83000 | 0.40000 | 1.76182 | 26.6 |
| 10 | 4.00000 | 0.58300 | | |
| 11 | 19.73300 | 1.07700 | 1.69680 | 55.5 |
| 12 | −23.72700 | 0.40000 | | |
| 13(Diaphragm) | ∞ | Variable | | |
| 14* | −1047.51300 | 1.40700 | 1.74993 | 45.4 |
| 15* | −14.88700 | Variable | | |
| 16 | ∞ | 0.28000 | 1.51680 | 64.2 |
| 17 | ∞ | 0.50000 | | |
| 18 | ∞ | 0.50000 | 1.51680 | 64.2 |
| 19 | ∞ | (BF) | | |
| Image surface | ∞ | | | |

TABLE 20

(Aspherical data)

Surface No. 2

K = −1.57344E+00, A4 = 7.46340E−04, A6 = 1.88232E−06,
A8 = −3.37126E−06, A10 = 2.89498E−07, A12 = −9.69126E−09,
A14 = 1.14218E−10
Surface No. 3

K = 0.00000E+00, A4 = 6.08925E−05, A6 = 2.83846E−06,
A8 = −2.14698E−06, A10 = 1.72132E−07, A12 = −5.49899E−09,
A14 = 6.19799E−11
Surface No. 5

K = 0.00000E+00, A4 = −5.98636E−04, A6 = −2.84764E−06,
A8 = −8.39427E−06, A10 = 2.21918E−06, A12 = −2.87429E−07,
A14 = 1.45836E−08

TABLE 20-continued (Aspherical data)

Surface No. 14

K = 0.00000E+00, A4 = −1.30794E−04, A6 = −9.53762E−06,
A8 = −1.31083E−06, A10 = 1.80961E−07, A12 = −4.51916E−09,
A14 = 0.00000E+00
Surface No. 15

K = 0.00000E+00, A4 = 1.09118E−04, A6 = −3.68938E−05,
A8 = 2.09767E−06, A10 = −3.35203E−08, A12 = 5.68690E−10,
A14 = 0.00000E+00

TABLE 21

(Various data)

Zooming ratio 4.61126

| | Wide-angle limit | Middle position | Telephoto limit |
|---|---|---|---|
| Focal length | 5.1178 | 11.0963 | 23.5995 |
| F-number | 2.90501 | 4.68134 | 6.13237 |
| View angle | 39.2002 | 18.9429 | 9.0829 |
| Image height | 3.8000 | 3.8000 | 3.8000 |
| Overall length of lens system | 33.5786 | 30.7415 | 38.3943 |
| BF | 0.41039 | 0.37079 | 0.37158 |
| d4 | 14.1000 | 4.7084 | 0.2000 |
| d13 | 2.4138 | 9.8111 | 22.8264 |
| d15 | 4.1974 | 3.3942 | 2.5393 |

Zoom lens unit data

| Lens unit | Initial surface | Focal length |
|---|---|---|
| 1 | 1 | −12.85293 |
| 2 | 5 | 10.12689 |
| 3 | 14 | 20.12562 |

NUMERICAL EXAMPLE 8

The zoom lens system of Numerical Example 8 corresponds to Embodiment 8 shown in FIG. 22. Table 22 shows the surface data of the zoom lens system of Numerical Example 8. Table 23 shows the aspherical data. Table 24 shows various data.

TABLE 22

(Surface data)

| Surface number | r | d | nd | vd |
|---|---|---|---|---|
| Object surface | ∞ | | | |
| 1* | 133.91200 | 1.06000 | 1.85976 | 40.6 |
| 2* | 5.42900 | 1.73200 | | |
| 3* | 9.15600 | 1.98000 | 1.99537 | 20.7 |
| 4 | 17.36000 | Variable | | |
| 5* | 4.97400 | 1.55000 | 1.80434 | 40.8 |
| 6 | 117.92500 | 0.15000 | | |
| 7 | 13.33900 | 1.05000 | 1.72916 | 54.7 |
| 8 | −20.65000 | 0.01000 | 1.56732 | 42.8 |
| 9 | −20.65000 | 0.40000 | 1.76182 | 26.6 |
| 10 | 3.74800 | 0.58300 | | |
| 11 | 17.95000 | 1.03000 | 1.69680 | 55.5 |
| 12 | −25.80200 | 0.40000 | | |
| 13(Diaphragm) | ∞ | Variable | | |
| 14* | −116.08400 | 1.40700 | 1.68863 | 52.8 |
| 15* | −12.28300 | Variable | | |
| 16 | ∞ | 0.28000 | 1.51680 | 64.2 |
| 17 | ∞ | 0.50000 | | |
| 18 | ∞ | 0.50000 | 1.51680 | 64.2 |
| 19 | ∞ | (BF) | | |
| Image surface | ∞ | | | |

TABLE 23

(Aspherical data)

Surface No. 1

K = 0.00000E+00, A4 = −5.52740E−06, A6 = 1.34755E−06,
A8 = −2.37945E−08, A10 = 6.53313E−12, A12 = 0.00000E+00,
A14 = 0.00000E+00

Surface No. 2

K = −1.51232E+00, A4 = 9.13792E−04, A6 = 1.00193E−05,
A8 = −3.69775E−06, A10 = 2.88686E−07, A12 = −9.37576E−09,
A14 = 1.08259E−10

Surface No. 3

K = 0.00000E+00, A4 = 1.27176E−04, A6 = 7.89593E−06,
A8 = −2.36128E−06, A10 = 1.72237E−07, A12 = −5.38467E−09,
A14 = 6.18081E−11

Surface No. 5

K = 0.00000E+00, A4 = −7.06960E−04, A6 = −3.25988E−07,
A8 = −9.87767E−06, A10 = 2.42687E−06, A12 = −3.19796E−07,
A14 = 1.70210E−08

Surface No. 14

K = 0.00000E+00, A4 = 3.70421E−04, A6 = −5.43849E−05,
A8 = 1.64888E−06, A10 = 1.80901E−09, A12 = −5.31193E−09,
A14 = 0.00000E+00

Surface No. 15

K = 0.00000E+00, A4 = 5.24695E−04, A6 = −4.63237E−05,
A8 = 1.20665E−06, A10 = 4.10694E−09, A12 = −4.23522E−09,
A14 = 0.00000E+00

TABLE 24

(Various data)

Zooming ratio 5.35662

|  | Wide-angle limit | Middle position | Telephoto limit |
| --- | --- | --- | --- |
| Focal length | 4.5928 | 10.2950 | 24.6021 |
| F-number | 2.90896 | 4.74737 | 6.91879 |
| View angle | 43.5348 | 20.5052 | 8.8865 |
| Image height | 3.8000 | 3.8000 | 3.8000 |
| Overall length of lens system | 32.9479 | 30.0189 | 38.9815 |
| BF | 0.40477 | 0.36130 | 0.37320 |
| d4 | 13.7226 | 4.3000 | 0.2000 |
| d13 | 2.2520 | 9.2104 | 24.8417 |
| d15 | 3.9365 | 3.5152 | 0.9346 |

Zoom lens unit data

| Lens unit | Initial surface | Focal length |
| --- | --- | --- |
| 1 | 1 | −11.42384 |
| 2 | 5 | 9.55095 |
| 3 | 14 | 19.83788 |

NUMERICAL EXAMPLE 9

The zoom lens system of Numerical Example 9 corresponds to Embodiment 9 shown in FIG. 25. Table 25 shows the surface data of the zoom lens system of Numerical Example 9. Table 26 shows the aspherical data. Table 27 shows various data.

TABLE 25

(Surface data)

| Surface number | r | d | nd | vd |
| --- | --- | --- | --- | --- |
| Object surface | ∞ |  |  |  |
| 1* | 102.49100 | 1.06000 | 1.85976 | 40.6 |
| 2* | 5.38400 | 1.73200 |  |  |
| 3* | 9.16300 | 1.98000 | 1.99537 | 20.7 |
| 4 | 17.36000 | Variable |  |  |
| 5* | 4.98100 | 1.55000 | 1.80434 | 40.8 |
| 6 | 117.92500 | 0.15000 |  |  |
| 7 | 13.41700 | 1.05000 | 1.72916 | 54.7 |
| 8 | −22.36400 | 0.01000 | 1.56732 | 42.8 |
| 9 | −22.36400 | 0.40000 | 1.76182 | 26.6 |
| 10 | 3.74800 | 0.58300 |  |  |
| 11 | 17.49900 | 1.03000 | 1.69680 | 55.5 |
| 12 | −27.91500 | 0.40000 |  |  |
| 13(Diaphragm) | ∞ | Variable |  |  |
| 14* | −116.08400 | 1.40700 | 1.68863 | 52.8 |
| 15* | −12.30700 | Variable |  |  |
| 16 | ∞ | 0.28000 | 1.51680 | 64.2 |
| 17 | ∞ | 0.50000 |  |  |
| 18 | ∞ | 0.50000 | 1.51680 | 64.2 |
| 19 | ∞ | (BF) |  |  |
| Image surface | ∞ |  |  |  |

TABLE 26

(Aspherical data)

Surface No. 1

K = 0.00000E+00, A4 = −9.58085E−06, A6 = 1.28804E−06,
A8 = −2.45481E−08, A10 = −7.28916E−12, A12 = 0.00000E+00,
A14 = 0.00000E+00

Surface No. 2

K = −1.52889E+00, A4 = 9.08403E−04, A6 = 1.00563E−05,
A8 = −3.70044E−06, A10 = 2.88590E−07, A12 = −9.37676E−09,
A14 = 1.08272E−10

Surface No. 3

K = 0.00000E+00, A4 = 1.17643E−04, A6 = 7.85565E−06,
A8 = −2.35722E−06, A10 = 1.72387E−07, A12 = −5.38158E−09,
A14 = 6.18075E−11

Surface No. 5

K = 0.00000E+00, A4 = −6.97064E−04, A6 = 1.09037E−06,
A8 = −9.75291E−06, A10 = 2.43347E−06, A12 = −3.20810E−07,
A14 = 1.65049E−08

Surface No. 14

K = 0.00000E+00, A4 = 3.07888E−04, A6 = −5.28977E−05,
A8 = 1.68576E−06, A10 = 1.34836E−09, A12 = 1.29575E−10,
A14 = 0.00000E+00

Surface No. 15

K = 0.00000E+00, A4 = 5.47465E−04, A6 = −5.13331E−05,
A8 = 1.07290E−06, A10 = 4.69963E−08, A12 = −1.02369E−09,
A14 = 0.00000E+00

TABLE 27

(Various data)

Zooming ratio 5.52871

|  | Wide-angle limit | Middle position | Telephoto limit |
| --- | --- | --- | --- |
| Focal length | 4.6725 | 10.3808 | 25.8329 |
| F-number | 2.94730 | 4.77127 | 7.24009 |
| View angle | 42.6119 | 20.1748 | 8.3929 |
| Image height | 3.8000 | 3.8000 | 3.8000 |

TABLE 27-continued (Various data)

| | | | |
|---|---|---|---|
| Overall length of lens system | 33.0804 | 30.2033 | 40.0342 |
| BF | 0.40551 | 0.36552 | 0.38499 |
| d4 | 13.7226 | 4.3000 | 0.2000 |
| d13 | 2.3123 | 9.1093 | 26.0977 |
| d15 | 4.0080 | 3.7965 | 0.7195 |

Zoom lens unit data

| Lens unit | Initial surface | Focal length |
|---|---|---|
| 1 | 1 | −11.50512 |
| 2 | 5 | 9.64428 |
| 3 | 14 | 19.88122 |

NUMERICAL EXAMPLE 10

The zoom lens system of Numerical Example 10 corresponds to Embodiment 10 shown in FIG. 28. Table 28 shows the surface data of the zoom lens system of Numerical Example 10. Table 29 shows the aspherical data. Table 30 shows various data.

TABLE 28

(Surface data)

| Surface number | r | d | nd | vd |
|---|---|---|---|---|
| Object surface | ∞ | | | |
| 1* | 76.42751 | 1.00000 | 1.80470 | 41.0 |
| 2* | 6.64817 | 1.48000 | | |
| 3 | 7.75447 | 1.60000 | 1.92286 | 20.9 |
| 4 | 10.50123 | Variable | | |
| 5* | 5.53570 | 1.50000 | 1.80434 | 40.8 |
| 6 | −674.52140 | 0.30000 | | |
| 7 | 10.79499 | 1.10000 | 1.72916 | 54.7 |
| 8 | −15.59648 | 0.01000 | 1.56732 | 42.8 |
| 9 | −15.59648 | 0.40000 | 1.76182 | 26.6 |
| 10 | 4.00000 | 0.64000 | | |
| 11 | 40.99489 | 1.10000 | 1.80146 | 40.2 |
| 12 | −40.99489 | 0.30000 | | |
| 13(Diaphragm) | ∞ | Variable | | |
| 14 | −53.29376 | 1.33000 | 1.68863 | 52.8 |
| 15* | −12.58029 | Variable | | |
| 16 | ∞ | 0.28000 | 1.51680 | 64.2 |
| 17 | ∞ | 0.50000 | | |
| 18 | ∞ | 0.50000 | 1.51680 | 64.2 |
| 19 | ∞ | (BF) | | |
| Image surface | ∞ | | | |

TABLE 29

(Aspherical data)

Surface No. 1

K = 0.00000E+00, A4 = 5.76012E−05, A6 = 8.73773E−07,
A8 = 0.00000E+00, A10 = 0.00000E+00, A12 = 0.00000E+00,
A14 = 0.00000E+00
Surface No. 2

K = −1.43352E+00, A4 = 6.73429E−04, A6 = −1.70436E−07,
A8 = 1.25757E−07, A10 = 3.13106E−08, A12 = −1.68591E−09,
A14 = 3.01568E−11
Surface No. 5

K = 0.00000E+00, A4 = −4.98245E−04, A6 = 4.02131E−06,
A8 = −1.18557E−05, A10 = 2.68271E−06, A12 = −2.79815E−07,
A14 = 1.08519E−08

TABLE 29-continued (Aspherical data)

Surface No. 15

K = 0.00000E+00, A4 = −3.33092E−05, A6 = 2.24255E−05,
A8 = −2.42474E−06, A10 = 1.37066E−07, A12 = −2.99454E−09,
A14 = 0.00000E+00

TABLE 30

(Various data)

Zooming ratio 4.72712

| | Wide-angle limit | Middle position | Telephoto limit |
|---|---|---|---|
| Focal length | 6.0022 | 13.0594 | 28.3731 |
| F-number | 3.44370 | 5.55842 | 6.33102 |
| View angle | 34.9812 | 16.3974 | 7.6997 |
| Image height | 3.8000 | 3.8000 | 3.8000 |
| Overall length of lens system | 33.8543 | 31.0006 | 39.9649 |
| BF | 0.46119 | 0.40554 | 0.37123 |
| d4 | 14.2069 | 4.6883 | 0.2000 |
| d13 | 2.9360 | 10.1917 | 24.3632 |
| d15 | 4.2102 | 3.6751 | 2.9905 |

Zoom lens unit data

| Lens unit | Initial surface | Focal length |
|---|---|---|
| 1 | 1 | −13.93476 |
| 2 | 5 | 10.14370 |
| 3 | 14 | 23.59911 |

NUMERICAL EXAMPLE 11

The zoom lens system of Numerical Example 11 corresponds to Embodiment 11 shown in FIG. 31. Table 31 shows the surface data of the zoom lens system of Numerical Example 11. Table 32 shows the aspherical data. Table 33 shows various data.

TABLE 31

(Surface data)

| Surface number | r | d | nd | vd |
|---|---|---|---|---|
| Object surface | ∞ | | | |
| 1* | 59.05000 | 1.06000 | 1.85280 | 39.0 |
| 2* | 5.46200 | 1.50400 | | |
| 3* | 8.60600 | 1.75000 | 1.99537 | 20.7 |
| 4 | 14.38100 | Variable | | |
| 5* | 4.36700 | 2.50000 | 1.80359 | 40.8 |
| 6 | −67.53500 | 0.00000 | | |
| 7 | −67.53500 | 0.40000 | 1.80518 | 25.5 |
| 8 | 3.80100 | 0.47700 | | |
| 9 | 12.23200 | 1.14400 | 1.77250 | 49.6 |
| 10 | −16.77300 | 0.30000 | | |
| 11(Diaphragm) | ∞ | Variable | | |
| 12* | 145.66100 | 1.33400 | 1.60602 | 57.4 |
| 13* | −11.92000 | Variable | | |
| 14 | ∞ | 0.78000 | 1.51680 | 64.2 |
| 15 | ∞ | (BF) | | |
| Image surface | ∞ | | | |

TABLE 32

(Aspherical data)

Surface No. 1

K = 0.00000E+00, A4 = 3.04043E−06, A6 = 8.38044E−08,
A8 = 3.68394E−10, A10 = 1.11988E−11, A12 = 0.00000E+00,
A14 = 0.00000E+00

Surface No. 2

K = −1.14246E+00, A4 = 9.52084E−04, A6 = 1.16305E−05,
A8 = −3.37781E−06, A10 = 2.84249E−07, A12 = −9.68993E−09,
A14 = 1.17859E−10

Surface No. 3

K = 0.00000E+00, A4 = 2.77587E−04, A6 = 7.49692E−06,
A8 = −2.20563E−06, A10 = 1.70898E−07, A12 = −5.50993E−09,
A14 = 6.41238E−11

Surface No. 5

K = −2.43504E−01, A4 = −3.61300E−04, A6 = 1.01452E−05,
A8 = −3.95475E−06, A10 = 2.05823E−07, A12 = 0.00000E+00,
A14 = 0.00000E+00

Surface No. 12

K = 0.00000E+00, A4 = −3.11808E−04, A6 = 1.60552E−05,
A8 = −9.71795E−07, A10 = 2.22891E−07, A12 = −2.85194E−09,
A14 = 0.00000E+00

Surface No. 13

K = 0.00000E+00, A4 = 3.67285E−05, A6 = −1.48330E−05,
A8 = 2.12933E−06, A10 = 5.52463E−08, A12 = 2.05349E−09,
A14 = 0.00000E+00

TABLE 33

(Various data)

Zooming ratio 4.70964

|  | Wide-angle limit | Middle position | Telephoto limit |
|---|---|---|---|
| Focal length | 4.2182 | 10.9848 | 19.8661 |
| F-number | 2.91810 | 4.94788 | 6.15928 |
| View angle | 45.5442 | 19.1934 | 10.7826 |
| Image height | 3.8000 | 3.8000 | 3.8000 |
| Overall length of lens system | 32.2531 | 29.2032 | 33.9277 |
| BF | 0.89844 | 0.85770 | 0.89904 |
| d4 | 14.1856 | 3.9014 | 0.2000 |
| d11 | 2.1610 | 11.4996 | 19.9321 |
| d13 | 3.7591 | 1.6955 | 1.6476 |

Zoom lens unit data

| Lens unit | Initial surface | Focal length |
|---|---|---|
| 1 | 1 | −11.81909 |
| 2 | 5 | 9.29435 |
| 3 | 12 | 18.23972 |

NUMERICAL EXAMPLE 12

The zoom lens system of Numerical Example 12 corresponds to Embodiment 12 shown in FIG. 34. Table 34 shows the surface data of the zoom lens system of Numerical Example 12. Table 35 shows the aspherical data. Table 36 shows various data.

TABLE 34

(Surface data)

| Surface number | r | d | nd | vd |
|---|---|---|---|---|
| Object surface | ∞ | | | |
| 1* | 48.20000 | 1.06000 | 1.85280 | 39.0 |
| 2* | 5.40600 | 1.50400 | | |
| 3* | 8.59700 | 1.75000 | 1.99537 | 20.7 |
| 4 | 14.38100 | Variable | | |
| 5* | 4.37800 | 2.50000 | 1.80359 | 40.8 |
| 6 | −74.88600 | 0.00000 | | |
| 7 | −74.88600 | 0.40000 | 1.80518 | 25.5 |
| 8 | 3.79800 | 0.47700 | | |
| 9 | 12.73200 | 1.14400 | 1.77250 | 49.6 |
| 10 | −16.77300 | 0.30000 | | |
| 11(Diaphragm) | ∞ | Variable | | |
| 12* | 147.88000 | 1.33400 | 1.60602 | 57.4 |
| 13* | −13.66400 | Variable | | |
| 14 | ∞ | 0.78000 | 1.51680 | 64.2 |
| 15 | ∞ | (BF) | | |
| Image surface | ∞ | | | |

TABLE 35

(Aspherical data)

Surface No. 1

K = 0.00000E+00, A4 = 3.27932E−07, A6 = −4.95347E−08,
A8 = 0.00000E+00, A10 = 0.00000E+00, A12 = 0.00000E+00,
A14 = 0.00000E+00

Surface No. 2

K = −1.15549E+00, A4 = 9.45387E−04, A6 = 1.00448E−05,
A8 = −3.40038E−06, A10 = 2.83776E−07, A12 = −9.69584E−09,
A14 = 1.17520E−10

Surface No. 3

K = 0.00000E+00, A4 = 2.60379E−04, A6 = 6.67780E−06,
A8 = −2.20806E−06, A10 = 1.70845E−07, A12 = −5.50808E−09,
A14 = 6.38203E−11

Surface No. 5

K = −2.33677E−01, A4 = −3.37270E−04, A6 = 5.87427E−06,
A8 = −3.18469E−06, A10 = 2.15900E−07, A12 = 0.00000E+00,
A14 = 0.00000E+00

Surface No. 12

K = 0.00000E+00, A4 = −3.84815E−04, A6 = 1.89763E−05,
A8 = −9.66009E−07, A10 = 2.07197E−07, A12 = −2.90921E−09,
A14 = 0.00000E+00

Surface No. 13

K = 0.00000E+00, A4 = −8.25767E−05, A6 = −1.37702E−05,
A8 = 1.82480E−06, A10 = 5.49510E−08, A12 = 2.05096E−09,
A14 = 0.00000E+00

TABLE 36

(Various data)

Zooming ratio 4.66639

|  | Wide-angle limit | Middle position | Telephoto limit |
|---|---|---|---|
| Focal length | 4.5138 | 11.0107 | 21.0630 |
| F-number | 2.92234 | 4.74573 | 6.11588 |
| View angle | 42.9660 | 19.1684 | 10.1843 |
| Image height | 3.8000 | 3.8000 | 3.8000 |
| Overall length of lens system | 32.9135 | 29.6175 | 34.9167 |

TABLE 36-continued (Various data)

| | | | |
|---|---|---|---|
| BF | 0.89634 | 0.86350 | 0.87175 |
| d4 | 14.3758 | 4.2462 | 0.2000 |
| d11 | 2.4307 | 11.1258 | 20.7413 |
| d13 | 3.9617 | 2.1330 | 1.8547 |

Zoom lens unit data

| Lens unit | Initial surface | Focal length |
|---|---|---|
| 1 | 1 | −12.09887 |
| 2 | 5 | 9.49321 |
| 3 | 12 | 20.70451 |

NUMERICAL EXAMPLE 13

The zoom lens system of Numerical Example 13 corresponds to Embodiment 13 shown in FIG. 37. Table 37 shows the surface data of the zoom lens system of Numerical Example 13. Table 38 shows the aspherical data. Table 39 shows various data.

TABLE 37

(Surface data)

| Surface number | r | d | nd | vd |
|---|---|---|---|---|
| Object surface | ∞ | | | |
| 1 | 43.56000 | 1.06000 | 1.85280 | 39.0 |
| 2* | 5.54700 | 1.50400 | | |
| 3* | 8.64600 | 1.75000 | 1.99537 | 20.7 |
| 4 | 14.38100 | Variable | | |
| 5* | 4.39600 | 2.50000 | 1.80359 | 40.8 |
| 6 | −115.81400 | 0.00000 | | |
| 7 | −115.81400 | 0.40000 | 1.80518 | 25.5 |
| 8 | 3.79300 | 0.47700 | | |
| 9 | 14.69100 | 1.14400 | 1.77250 | 49.6 |
| 10 | −16.77300 | 0.30000 | | |
| 11(Diaphragm) | ∞ | Variable | | |
| 12* | 79.01900 | 1.33400 | 1.60602 | 57.4 |
| 13* | −14.68200 | Variable | | |
| 14 | ∞ | 0.78000 | 1.51680 | 64.2 |
| 15 | ∞ | (BF) | | |
| Image surface | ∞ | | | |

TABLE 38

(Aspherical data)

Surface No. 2

K = −1.11955E+00, A4 = 9.72575E−04, A6 = 5.28421E−06,
A8 = −3.33441E−06, A10 = 2.83170E−07, A12 = −9.76538E−09,
A14 = 1.18913E−10
Surface No. 3

K = 0.00000E+00, A4 = 2.96666E−04, A6 = 4.70617E−06,
A8 = −2.23721E−06, A10 = 1.71468E−07, A12 = −5.48027E−09,
A14 = 6.24905E−11
Surface No. 5

K = −2.21945E−01, A4 = −3.12123E−04, A6 = 4.68008E−06,
A8 = −3.33833E−06, A10 = 2.42304E−07, A12 = 0.00000E+00,
A14 = 0.00000E+00
Surface No. 12

K = 0.00000E+00, A4 = −5.07858E−04, A6 = 1.16247E−05,
A8 = −1.11086E−06, A10 = 1.55636E−07, A12 = −9.60910E−10,
A14 = 0.00000E+00

TABLE 38-continued (Aspherical data)

Surface No. 13

K = 0.00000E+00, A4 = −4.92557E−04, A6 = −2.33283E−06,
A8 = 7.70699E−07, A10 = 4.54566E−08, A12 = 2.00412E−09,
A14 = 0.00000E+00

TABLE 39

(Various data)

Zooming ratio 4.65926

| | Wide-angle limit | Middle position | Telephoto limit |
|---|---|---|---|
| Focal length | 4.9826 | 11.0055 | 23.2154 |
| F-number | 2.96523 | 4.88875 | 6.11703 |
| View angle | 38.2008 | 18.4701 | 8.9029 |
| Image height | 3.6000 | 3.6000 | 3.6000 |
| Overall length of lens system | 33.4459 | 31.3516 | 38.0142 |
| BF | 0.90869 | 0.86454 | 0.89389 |
| d4 | 14.2459 | 5.5449 | 0.2000 |
| d11 | 2.6393 | 11.7655 | 23.1698 |
| d13 | 4.4030 | 1.9277 | 2.5015 |

Zoom lens unit data

| Lens unit | Initial surface | Focal length |
|---|---|---|
| 1 | 1 | −12.88044 |
| 2 | 5 | 10.10697 |
| 3 | 12 | 20.54116 |

NUMERICAL EXAMPLE 14

The zoom lens system of Numerical Example 14 corresponds to Embodiment 14 shown in FIG. 40. Table 40 shows the surface data of the zoom lens system of Numerical Example 14. Table 41 shows the aspherical data. Table 42 shows various data.

TABLE 40

(Surface data)

| Surface number | r | d | nd | vd |
|---|---|---|---|---|
| Object surface | ∞ | | | |
| 1* | 65.26800 | 1.06000 | 1.85280 | 39.0 |
| 2* | 5.43100 | 1.50400 | | |
| 3* | 8.75800 | 1.75000 | 1.99537 | 20.7 |
| 4 | 14.38100 | Variable | | |
| 5* | 4.34800 | 2.50000 | 1.80359 | 40.8 |
| 6 | 154.36000 | 0.00000 | | |
| 7 | 154.36000 | 0.40000 | 1.80518 | 25.5 |
| 8 | 3.78600 | 0.47700 | | |
| 9 | 12.80100 | 1.14400 | 1.77250 | 49.6 |
| 10 | −16.77300 | 0.30000 | | |
| 11(Diaphragm) | ∞ | Variable | | |
| 12* | −21.93400 | 1.33400 | 1.60602 | 57.4 |
| 13* | −8.75000 | Variable | | |
| 14 | ∞ | 0.78000 | 1.51680 | 64.2 |
| 15 | ∞ | (BF) | | |
| Image surface | ∞ | | | |

TABLE 41

(Aspherical data)

Surface No. 1

K = 0.00000E+00, A4 = 1.92866E−06, A6 = −2.59806E−07,
A8 = 0.00000E+00, A10 = 0.00000E+00, A12 = 0.00000E+00,
A14 = 0.00000E+00
Surface No. 2

K = −1.12457E+00, A4 = 9.65240E−04, A6 = 7.72275E−06,
A8 = −3.45452E−06, A10 = 2.84301E−07, A12 = −9.70703E−09,
A14 = 1.17484E−10
Surface No. 3

K = 0.00000E+00, A4 = 2.90216E−04, A6 = 7.30560E−06,
A8 = −2.22065E−06, A10 = 1.70191E−07, A12 = −5.52242E−09,
A14 = 6.43532E−11
Surface No. 5

K = −2.32994E−01, A4 = −3.37630E−04, A6 = 2.79870E−06,
A8 = −3.71831E−06, A10 = 3.04308E−07, A12 = 0.00000E+00,
A14 = 0.00000E+00
Surface No. 12

K = 0.00000E+00, A4 = −3.98270E−04, A6 = 1.52053E−05,
A8 = −8.64592E−07, A10 = 2.48416E−07, A12 = −4.83203E−09,
A14 = 0.00000E+00
Surface No. 13

K = 0.00000E+00, A4 = 1.48124E−04, A6 = −1.28334E−05,
A8 = 2.23453E−06, A10 = 2.99201E−08, A12 = 1.47871E−09,
A14 = 0.00000E+00

TABLE 42

(Various data)

Zooming ratio 5.64043

|  | Wide-angle limit | Middle position | Telephoto limit |
|---|---|---|---|
| Focal length | 4.5204 | 11.0121 | 25.4968 |
| F-number | 2.92132 | 5.03801 | 7.49395 |
| View angle | 41.3621 | 18.1278 | 7.9812 |
| Image height | 3.6000 | 3.6000 | 3.6000 |
| Overall length of lens system | 33.3391 | 30.6877 | 39.6399 |
| BF | 0.90466 | 0.88115 | 0.85890 |
| d4 | 14.3758 | 4.8086 | 0.2000 |
| d11 | 2.2899 | 11.5361 | 25.6839 |
| d13 | 4.5197 | 2.2129 | 1.6481 |

Zoom lens unit data

| Lens unit | Initial surface | Focal length |
|---|---|---|
| 1 | 1 | −11.17647 |
| 2 | 5 | 9.42887 |
| 3 | 12 | 23.13762 |

NUMERICAL EXAMPLE 15

The zoom lens system of Numerical Example 15 corresponds to Embodiment 15 shown in FIG. 43. Table 43 shows the surface data of the zoom lens system of Numerical Example 15. Table 44 shows the aspherical data. Table 45 shows various data.

TABLE 43

(Surface data)

| Surface number | r | d | nd | vd |
|---|---|---|---|---|
| Object surface | ∞ | | | |
| 1 | 63.47399 | 1.06000 | 1.85280 | 39.0 |
| 2* | 6.01722 | 1.50400 | | |
| 3* | 8.59181 | 1.75000 | 1.99537 | 20.7 |
| 4 | 14.38100 | Variable | | |
| 5* | 6.08005 | 1.56770 | 1.68863 | 52.8 |
| 6 | −35.80408 | 0.10000 | | |
| 7 | 7.98466 | 1.48630 | 1.83481 | 42.7 |
| 8 | −7.57710 | 0.01000 | 1.56732 | 42.8 |
| 9 | −7.57710 | 0.40000 | 1.71736 | 29.5 |
| 10 | 3.50287 | 0.98500 | | |
| 11(Diaphragm) | ∞ | Variable | | |
| 12* | −122.39270 | 1.33400 | 1.68863 | 52.8 |
| 13* | −12.51244 | Variable | | |
| 14 | ∞ | 0.28000 | 1.51680 | 64.2 |
| 15 | ∞ | 0.50000 | | |
| 16 | ∞ | 0.50000 | 1.51680 | 64.2 |
| 17 | ∞ | (BF) | | |
| Image surface | ∞ | | | |

TABLE 44

(Aspherical data)

Surface No. 2

K = −1.40153E+00, A4 = 8.22636E−04, A6 = 7.20741E−06,
A8 = −3.32095E−06, A10 = 2.82431E−07, A12 = −9.82219E−09,
A14 = 1.18759E−10
Surface No. 3

K = 0.00000E+00, A4 = 1.68228E−04, A6 = 3.35892E−06,
A8 = −2.18948E−06, A10 = 1.71047E−07, A12 = −5.51145E−09,
A14 = 6.18100E−11
Surface No. 5

K = 0.00000E+00, A4 = −8.68691E−04, A6 = −1.04599E−05,
A8 = −4.13399E−07, A10 = −1.71635E−07, A12 = 3.28061E−08,
A14 = −1.59341E−09
Surface No. 12

K = 0.00000E+00, A4 = 7.33143E−05, A6 = 8.19768E−07,
A8 = −1.14709E−06, A10 = 1.69694E−07, A12 = −4.34250E−09,
A14 = 0.00000E+00
Surface No. 13

K = 0.00000E+00, A4 = 3.98865E−04, A6 = −2.32267E−05,
A8 = 1.39281E−06, A10 = 2.04809E−08, A12 = −9.18152E−10,
A14 = 0.00000E+00

TABLE 45

(Various data)

Zooming ratio 4.69249

|  | Wide-angle limit | Middle position | Telephoto limit |
|---|---|---|---|
| Focal length | 5.3887 | 11.4765 | 25.2865 |
| F-number | 2.90678 | 4.47443 | 6.16111 |
| View angle | 37.6440 | 18.1179 | 8.4394 |
| Image height | 3.8000 | 3.8000 | 3.8000 |
| Overall length of lens system | 33.2324 | 28.8126 | 36.4906 |
| BF | 0.41957 | 0.34467 | 0.39309 |
| d4 | 14.8608 | 4.6809 | 0.2000 |
| d11 | 2.6360 | 8.2604 | 21.7344 |
| d13 | 3.8390 | 4.0496 | 2.6861 |

TABLE 45-continued (Various data)

Zoom lens unit data

| Lens unit | Initial surface | Focal length |
|---|---|---|
| 1 | 1 | −14.00580 |
| 2 | 5 | 9.86327 |
| 3 | 12 | 20.13942 |

NUMERICAL EXAMPLE 16

The zoom lens system of Numerical Example 16 corresponds to Embodiment 16 shown in FIG. 46. Table 46 shows the surface data of the zoom lens system of Numerical Example 16. Table 47 shows the aspherical data. Table 48 shows various data.

TABLE 46

(Surface data)

| Surface number | r | d | nd | vd |
|---|---|---|---|---|
| Object surface | ∞ | | | |
| 1 | 67.11508 | 1.06000 | 1.85280 | 39.0 |
| 2* | 5.93643 | 1.50400 | | |
| 3* | 8.67244 | 1.75000 | 1.99537 | 20.7 |
| 4 | 14.38100 | Variable | | |
| 5* | 6.04644 | 1.50070 | 1.68863 | 52.8 |
| 6 | −31.45638 | 0.10000 | | |
| 7 | 8.02778 | 1.52600 | 1.83481 | 42.7 |
| 8 | −7.47219 | 0.01000 | 1.56732 | 42.8 |
| 9 | −7.47219 | 0.40000 | 1.71736 | 29.5 |
| 10 | 3.50287 | 0.98500 | | |
| 11(Diaphragm) | ∞ | Variable | | |
| 12* | −107.31420 | 1.33400 | 1.68863 | 52.8 |
| 13* | −12.02005 | Variable | | |
| 14 | ∞ | 0.28000 | 1.51680 | 64.2 |
| 15 | ∞ | 0.50000 | | |
| 16 | ∞ | 0.50000 | 1.51680 | 64.2 |
| 17 | ∞ | (BF) | | |
| Image surface | ∞ | | | |

TABLE 47

(Aspherical data)

Surface No. 2

K = −1.40725E+00, A4 = 8.24033E−04, A6 = 7.65767E−06,
A8 = −3.31358E−06, A10 = 2.82628E−07, A12 = −9.81656E−09,
A14 = 1.18891E−10
Surface No. 3

K = 0.00000E+00, A4 = 1.68357E−04, A6 = 3.35244E−06,
A8 = −2.18545E−06, A10 = 1.71187E−07, A12 = −5.50659E−09,
A14 = 6.20096E−11
Surface No. 5

K = 0.00000E+00, A4 = −9.09029E−04, A6 = −1.11663E−05,
A8 = −3.76602E−07, A10 = −1.69774E−07, A12 = 3.26901E−08,
A14 = −1.59319E−09
Surface No. 12

K = 0.00000E+00, A4 = 4.98372E−05, A6 = 2.36765E−05,
A8 = −1.16504E−06, A10 = 1.33583E−07, A12 = −4.07360E−09,
A14 = 0.00000E+00
Surface No. 13

K = 0.00000E+00, A4 = 5.23496E−04, A6 = −1.18940E−05,
A8 = 1.57366E−06, A10 = 3.05910E−08, A12 = −2.51680E−09,
A14 = 0.00000E+00

TABLE 48

(Various data)

Zooming ratio 4.97350

| | Wide-angle limit | Middle position | Telephoto limit |
|---|---|---|---|
| Focal length | 4.9440 | 10.9999 | 24.5887 |
| F-number | 2.86849 | 4.47181 | 6.02934 |
| View angle | 40.5984 | 18.7047 | 8.5997 |
| Image height | 3.8000 | 3.8000 | 3.8000 |
| Overall length of lens system | 33.3276 | 28.0492 | 36.0296 |
| BF | 0.42910 | 0.35221 | 0.38698 |
| d4 | 15.4234 | 4.4723 | 0.2000 |
| d11 | 2.6360 | 7.7519 | 21.3068 |
| d13 | 3.3894 | 4.0230 | 2.6861 |

Zoom lens unit data

| Lens unit | Initial surface | Focal length |
|---|---|---|
| 1 | 1 | −13.26565 |
| 2 | 5 | 9.49125 |
| 3 | 12 | 19.54515 |

NUMERICAL EXAMPLE 17

The zoom lens system of Numerical Example 17 corresponds to Embodiment 17 shown in FIG. 49. Table 49 shows the surface data of the zoom lens system of Numerical Example 17. Table 50 shows the aspherical data. Table 51 shows various data.

TABLE 49

(Surface data)

| Surface number | r | d | nd | vd |
|---|---|---|---|---|
| Object surface | ∞ | | | |
| 1 | 66.99756 | 1.06000 | 1.85280 | 39.0 |
| 2* | 5.92693 | 1.50400 | | |
| 3* | 8.66891 | 1.75000 | 1.99537 | 20.7 |
| 4 | 14.38100 | Variable | | |
| 5* | 6.04238 | 1.47300 | 1.68863 | 52.8 |
| 6 | −31.84957 | 0.10000 | | |
| 7 | 7.97831 | 1.52260 | 1.83481 | 42.7 |
| 8 | −7.42943 | 0.01000 | 1.56732 | 42.8 |
| 9 | −7.42943 | 0.40000 | 1.71736 | 29.5 |
| 10 | 3.50287 | 0.98500 | | |
| 11(Diaphragm) | ∞ | Variable | | |
| 12* | −124.53680 | 1.33400 | 1.68863 | 52.8 |
| 13* | −11.63546 | Variable | | |
| 14 | ∞ | 0.28000 | 1.51680 | 64.2 |
| 15 | ∞ | 0.50000 | | |
| 16 | ∞ | 0.50000 | 1.51680 | 64.2 |
| 17 | ∞ | (BF) | | |
| Image surface | ∞ | | | |

TABLE 50

(Aspherical data)

Surface No. 2

K = −1.40989E+00, A4 = 8.22545E−04, A6 = 7.45234E−06,
A8 = −3.31504E−06, A10 = 2.82561E−07, A12 = −9.82067E−09,
A14 = 1.18701E−10
Surface No. 3

K = 0.00000E+00, A4 = 1.68883E−04, A6 = 3.36000E−06,
A8 = −2.18923E−06, A10 = 1.71073E−07, A12 = −5.50897E−09,
A14 = 6.19721E−11

TABLE 50-continued (Aspherical data)

Surface No. 5

K = 0.00000E+00, A4 = −9.17209E−04, A6 = −1.14922E−05,
A8 = −3.86295E−07, A10 = −1.69119E−07, A12 = 3.29873E−08,
A14 = −1.52387E−09
Surface No. 12

K = 0.00000E+00, A4 = 3.44434E−05, A6 = 2.52919E−05,
A8 = −1.15251E−06, A10 = 1.31557E−07, A12 = −3.96388E−09,
A14 = 0.00000E+00
Surface No. 13

K = 0.00000E+00, A4 = 5.44445E−04, A6 = −1.16407E−05,
A8 = 1.60284E−06, A10 = 3.33080E−08, A12 = −2.54996E−09,
A14 = 0.00000E+00

TABLE 51

(Various data)

Zooming ratio 4.94889

|  | Wide-angle limit | Middle position | Telephoto limit |
|---|---|---|---|
| Focal length | 4.8230 | 9.8989 | 23.8686 |
| F-number | 2.92673 | 4.29935 | 6.02423 |
| View angle | 41.2896 | 20.6747 | 8.8279 |
| Image height | 3.8000 | 3.8000 | 3.8000 |
| Overall length of lens system | 33.3145 | 27.6252 | 35.5444 |
| BF | 0.42965 | 0.35867 | 0.38805 |
| d4 | 15.5588 | 5.1363 | 0.2000 |
| d11 | 2.6360 | 6.7258 | 20.8516 |
| d13 | 3.2715 | 3.9858 | 2.6861 |

Zoom lens unit data

| Lens unit | Initial surface | Focal length |
|---|---|---|
| 1 | 1 | −13.24063 |
| 2 | 5 | 9.45447 |
| 3 | 12 | 18.54849 |

NUMERICAL EXAMPLE 18

The zoom lens system of Numerical Example 18 corresponds to Embodiment 18 shown in FIG. 52. Table 52 shows the surface data of the zoom lens system of Numerical Example 18. Table 53 shows the aspherical data. Table 54 shows various data.

TABLE 52

(Surface data)

| Surface number | r | d | nd | vd |
|---|---|---|---|---|
| Object surface | ∞ | | | |
| 1 | 42.52694 | 1.06000 | 1.85280 | 39.0 |
| 2* | 5.68093 | 1.50400 | | |
| 3* | 8.67288 | 1.75000 | 1.99537 | 20.7 |
| 4 | 14.38100 | Variable | | |
| 5* | 4.36525 | 2.50000 | 1.80359 | 40.8 |
| 6 | −71.54269 | 0.40000 | 1.80518 | 25.5 |
| 7 | 3.82048 | 0.47690 | | |
| 8 | 17.07332 | 1.14410 | 1.77250 | 49.6 |
| 9 | −16.77307 | 0.30000 | | |
| 10(Diaphragm) | ∞ | Variable | | |
| 11* | −80.54801 | 1.33400 | 1.68863 | 52.8 |
| 12* | −11.93863 | Variable | | |

TABLE 52-continued (Surface data)

| Surface number | r | d | nd | vd |
|---|---|---|---|---|
| 13 | ∞ | 0.28000 | 1.51680 | 64.2 |
| 14 | ∞ | 0.50000 | | |
| 15 | ∞ | 0.50000 | 1.51680 | 64.2 |
| 16 | ∞ | (BF) | | |
| Image surface | ∞ | | | |

TABLE 53

(Aspherical data)

Surface No. 2

K = −1.34333E+00, A4 = 8.43676E−04, A6 = 3.59200E−06,
A8 = −3.29172E−06, A10 = 2.85355E−07, A12 = −9.76033E−09,
A14 = 1.18324E−10
Surface No. 3

K = 0.00000E+00, A4 = 1.80977E−04, A6 = 4.80208E−06,
A8 = −2.19007E−06, A10 = 1.70661E−07, A12 = −5.49780E−09,
A14 = 6.36027E−11
Surface No. 5

K = −2.27637E−01, A4 = −3.76705E−04, A6 = 2.78981E−05,
A8 = −8.69457E−06, A10 = 6.43727E−07, A12 = 0.00000E+00,
A14 = 0.00000E+00
Surface No. 11

K = 0.00000E+00, A4 = −1.52329E−04, A6 = −2.60128E−06,
A8 = −7.83396E−07, A10 = 1.95923E−07, A12 = −3.84055E−09,
A14 = 0.00000E+00
Surface No. 12

K = 0.00000E+00, A4 = 3.23671E−05, A6 = −1.87291E−05,
A8 = 1.47652E−06, A10 = 3.09913E−08, A12 = 7.47159E−10,
A14 = 0.00000E+00

TABLE 54

(Various data)

Zooming ratio 4.53687

|  | Wide-angle limit | Middle position | Telephoto limit |
|---|---|---|---|
| Focal length | 5.2926 | 11.4781 | 24.0120 |
| F-number | 3.04251 | 4.88869 | 6.20669 |
| View angle | 36.5361 | 18.3530 | 9.0055 |
| Image height | 3.8000 | 3.8000 | 3.8000 |
| Overall length of lens system | 33.5962 | 31.4434 | 38.5006 |
| BF | 0.42600 | 0.35251 | 0.38880 |
| d4 | 14.0464 | 5.0701 | 0.2000 |
| d10 | 2.6360 | 11.1355 | 23.4767 |
| d12 | 4.7387 | 3.1363 | 2.6861 |

Zoom lens unit data

| Lens unit | Initial surface | Focal length |
|---|---|---|
| 1 | 1 | −13.49971 |
| 2 | 5 | 10.36991 |
| 3 | 11 | 20.19342 |

NUMERICAL EXAMPLE 19

The zoom lens system of Numerical Example 19 corresponds to Embodiment 19 shown in FIG. 55. Table 55 shows the surface data of the zoom lens system of Numerical Example 19. Table 56 shows the aspherical data. Table 57 shows various data.

TABLE 55

(Surface data)

| Surface number | r | d | nd | vd |
|---|---|---|---|---|
| Object surface | ∞ | | | |
| 1 | 42.70102 | 1.06000 | 1.85280 | 39.0 |
| 2* | 5.57066 | 1.50400 | | |
| 3* | 8.68434 | 1.75000 | 1.99537 | 20.7 |
| 4 | 14.38100 | Variable | | |
| 5* | 4.39069 | 2.50000 | 1.80359 | 40.8 |
| 6 | −70.26053 | 0.40000 | 1.80518 | 25.5 |
| 7 | 3.79211 | 0.47690 | | |
| 8 | 14.95528 | 1.14410 | 1.77250 | 49.6 |
| 9 | −16.77307 | 0.30000 | | |
| 10(Diaphragm) | ∞ | Variable | | |
| 11* | 75.54035 | 1.33400 | 1.68863 | 52.8 |
| 12* | −16.87201 | Variable | | |
| 13 | ∞ | 0.28000 | 1.51680 | 64.2 |
| 14 | ∞ | 0.50000 | | |
| 15 | ∞ | 0.50000 | 1.51680 | 64.2 |
| 16 | ∞ | (BF) | | |
| Image surface | ∞ | | | |

TABLE 56

(Aspherical data)

Surface No. 2

K = −1.10895E+00, A4 = 9.80110E−04, A6 = 5.37935E−06, A8 = −3.31816E−06, A10 = 2.82550E−07, A12 = −9.79287E−09, A14 = 1.19194E−10

Surface No. 3

K = 0.00000E+00, A4 = 3.16620E−04, A6 = 4.52889E−06, A8 = −2.24766E−06, A10 = 1.71664E−07, A12 = −5.47562E−09, A14 = 6.19684E−11

Surface No. 5

K = −2.23619E−01, A4 = −3.15552E−04, A6 = 4.51483E−06, A8 = −3.56603E−06, A10 = 2.70787E−07, A12 = 0.00000E+00, A14 = 0.00000E+00

Surface No. 11

K = 0.00000E+00, A4 = −5.09159E−04, A6 = 3.02877E−06, A8 = −1.27336E−06, A10 = 1.46792E−07, A12 = −1.63257E−09, A14 = 0.00000E+00

Surface No. 12

K = 0.00000E+00, A4 = −5.90562E−04, A6 = −3.70497E−06, A8 = 3.88633E−07, A10 = 2.62396E−08, A12 = 1.43856E−09, A14 = 0.00000E+00

TABLE 57

(Various data)

Zooming ratio 4.64119

| | Wide-angle limit | Middle position | Telephoto limit |
|---|---|---|---|
| Focal length | 4.9861 | 11.0001 | 23.1414 |
| F-number | 2.95520 | 4.87262 | 6.08135 |
| View angle | 39.9116 | 19.5373 | 9.4812 |
| Image height | 3.8000 | 3.8000 | 3.8000 |
| Overall length of lens system | 33.4464 | 31.4551 | 38.2247 |
| BF | 0.41065 | 0.34276 | 0.37653 |
| d4 | 14.2276 | 5.5541 | 0.2000 |

TABLE 57-continued (Various data)

| | | | |
|---|---|---|---|
| d10 | 2.6360 | 11.7632 | 23.2131 |
| d12 | 4.4231 | 2.0461 | 2.6861 |

Zoom lens unit data

| Lens unit | Initial surface | Focal length |
|---|---|---|
| 1 | 1 | −12.94754 |
| 2 | 5 | 10.15020 |
| 3 | 11 | 20.14624 |

NUMERICAL EXAMPLE 20

The zoom lens system of Numerical Example 20 corresponds to Embodiment 20 shown in FIG. 58. Table 58 shows the surface data of the zoom lens system of Numerical Example 20. Table 59 shows the aspherical data. Table 60 shows various data.

TABLE 58

(Surface data)

| Surface number | r | d | nd | vd |
|---|---|---|---|---|
| Object surface | ∞ | | | |
| 1 | 35.42244 | 1.06000 | 1.85280 | 39.0 |
| 2* | 5.32451 | 1.50400 | | |
| 3* | 8.65227 | 1.75000 | 1.99537 | 20.7 |
| 4 | 14.38100 | Variable | | |
| 5* | 4.27762 | 2.50000 | 1.80359 | 40.8 |
| 6 | −494.42940 | 0.40000 | 1.80518 | 25.5 |
| 7 | 3.70655 | 0.47690 | | |
| 8 | 17.62745 | 1.14410 | 1.77250 | 49.6 |
| 9 | −16.77307 | 0.30000 | | |
| 10(Diaphragm) | ∞ | Variable | | |
| 11* | 46.41221 | 1.33400 | 1.68863 | 52.8 |
| 12* | −19.53072 | Variable | | |
| 13 | ∞ | 0.28000 | 1.51680 | 64.2 |
| 14 | ∞ | 0.50000 | | |
| 15 | ∞ | 0.50000 | 1.51680 | 64.2 |
| 16 | ∞ | (BF) | | |
| Image surface | ∞ | | | |

TABLE 59

(Aspherical data)

Surface No. 2

K = −1.02588E+00, A4 = 1.00837E−03, A6 = −1.35772E−05, A8 = −2.98948E−06, A10 = 2.92183E−07, A12 = −9.57272E−09, A14 = 1.06236E−10

Surface No. 3

K = 0.00000E+00, A4 = 3.49391E−04, A6 = −3.31939E−06, A8 = −2.26288E−06, A10 = 1.85846E−07, A12 = −5.62099E−09, A14 = 5.85455E−11

Surface No. 5

K = −2.28466E−01, A4 = −3.11847E−04, A6 = −9.62733E−06, A8 = −9.01185E−08, A10 = 1.56445E−08, A12 = 0.00000E+00, A14 = 0.00000E+00

Surface No. 11

K = 0.00000E+00, A4 = −8.40972E−04, A6 = 8.55587E−05, A8 = −5.50326E−06, A10 = 9.49363E−08, A12 = 1.92040E−09, A14 = 0.00000E+00

TABLE 59-continued (Aspherical data)

Surface No. 12

K = 0.00000E+00, A4 = −8.48616E−04, A6 = 5.97906E−05,
A8 = −1.72782E−06, A10 = −1.09232E−07, A12 = 5.79395E−09,
A14 = 0.00000E+00

TABLE 60

(Various data)

Zooming ratio 5.67343

|  | Wide-angle limit | Middle position | Telephoto limit |
|---|---|---|---|
| Focal length | 5.2010 | 12.0508 | 29.5073 |
| F-number | 3.08108 | 5.36923 | 7.77372 |
| View angle | 37.3653 | 17.8273 | 7.4457 |
| Image height | 3.8000 | 3.8000 | 3.8000 |
| Overall length of lens system | 33.5190 | 33.3381 | 46.5304 |
| BF | 0.41574 | 0.34122 | 0.36643 |
| d4 | 13.9022 | 5.5477 | 0.2000 |
| d10 | 2.6360 | 13.4442 | 31.5289 |
| d12 | 4.8160 | 2.2560 | 2.6861 |

Zoom lens unit data

| Lens unit | Initial surface | Focal length |
|---|---|---|
| 1 | 1 | −12.61134 |
| 2 | 5 | 10.47662 |
| 3 | 11 | 20.12769 |

NUMERICAL EXAMPLE 21

The zoom lens system of Numerical Example 21 corresponds to Embodiment 21 shown in FIG. 61. Table 61 shows the surface data of the zoom lens system of Numerical Example 21. Table 62 shows the aspherical data. Table 63 shows various data.

TABLE 61

(Surface data)

| Surface number | r | d | nd | vd |
|---|---|---|---|---|
| Object surface | ∞ | | | |
| 1* | 121.77400 | 1.35000 | 1.88300 | 40.8 |
| 2* | 4.59300 | 1.66900 | | |
| 3 | 7.05800 | 1.60000 | 1.92287 | 18.9 |
| 4 | 11.92800 | Variable | | |
| 5* | 4.18500 | 2.00000 | 1.77250 | 49.6 |
| 6 | 10.87900 | 0.50000 | 1.64769 | 33.8 |
| 7 | 3.66100 | 0.48000 | | |
| 8 | 8.24900 | 0.50000 | 1.76183 | 26.5 |
| 9 | 3.97900 | 2.00000 | 1.60311 | 60.6 |
| 10 | −10.51800 | 0.30000 | | |
| 11(Diaphragm) | ∞ | Variable | | |
| 12 | 45.65100 | 1.60000 | 1.60311 | 60.6 |
| 13 | −23.91400 | Variable | | |
| 14 | ∞ | 1.40000 | 1.51633 | 64.1 |
| 15 | ∞ | (BF) | | |
| Image surface | ∞ | | | |

TABLE 62

(Aspherical data)

Surface No. 1

K = 0.00000E+00, A4 = 3.18638E−04, A6 = −4.73036E−06,
A8 = 3.76995E−08, A10 = 0.00000E+00

Surface No. 2

K = −1.47866E+00, A4 = 1.64875E−03, A6 = 1.02150E−05,
A8 = −4.99629E−07, A10 = 2.42134E−08

Surface No. 5

K = −4.49065E−01, A4 = −9.97316E−05, A6 = 1.40893E−06,
A8 = 0.00000E+00, A10 = 0.00000E+00

TABLE 63

(Various data)

Zooming ratio 4.80185

|  | Wide-angle limit | Middle position | Telephoto limit |
|---|---|---|---|
| Focal length | 3.8997 | 10.4303 | 18.7259 |
| F-number | 2.80200 | 5.33669 | 6.11778 |
| View angle | 46.5205 | 19.4974 | 10.9872 |
| Image height | 3.6000 | 3.6000 | 3.6000 |
| Overall length of lens system | 30.7959 | 30.3826 | 37.2037 |
| BF | 1.02501 | 1.00139 | 1.01023 |
| d4 | 11.4400 | 2.9456 | 0.1500 |
| d11 | 1.2672 | 11.9186 | 21.1596 |
| d13 | 3.6647 | 1.1180 | 1.4849 |

Zoom lens unit data

| Lens unit | Initial surface | Focal length |
|---|---|---|
| 1 | 1 | −8.66678 |
| 2 | 5 | 8.54395 |
| 3 | 12 | 26.24759 |

NUMERICAL EXAMPLE 22

The zoom lens system of Numerical Example 22 corresponds to Embodiment 22 shown in FIG. 64. Table 64 shows the surface data of the zoom lens system of Numerical Example 22. Table 65 shows the aspherical data. Table 66 shows various data.

TABLE 64

(Surface data)

| Surface number | r | d | nd | vd |
|---|---|---|---|---|
| Object surface | ∞ | | | |
| 1* | 54.56700 | 1.35000 | 1.88300 | 40.8 |
| 2* | 4.76000 | 1.94200 | | |
| 3 | 7.01500 | 1.60000 | 1.92287 | 18.9 |
| 4 | 10.72700 | Variable | | |
| 5* | 4.23600 | 2.00000 | 1.77250 | 49.6 |
| 6 | 9.39300 | 0.50000 | 1.64769 | 33.8 |
| 7 | 3.64800 | 0.48000 | | |
| 8 | 8.26300 | 0.50000 | 1.76183 | 26.5 |
| 9 | 4.00600 | 2.00000 | 1.60311 | 60.6 |
| 10 | −11.64200 | 0.30000 | | |
| 11(Diaphragm) | ∞ | Variable | | |
| 12 | 34.68300 | 1.60000 | 1.60311 | 60.6 |
| 13 | −27.64900 | Variable | | |
| 14 | ∞ | 1.40000 | 1.51633 | 64.1 |
| 15 | ∞ | (BF) | | |
| Image surface | ∞ | | | |

TABLE 65

(Aspherical data)

Surface No. 1

K = 0.00000E+00, A4 = 3.61641E−04, A6 = −5.02438E−06,
A8 = 2.59231E−08, A10 = 0.00000E+00

Surface No. 2

K = −1.53173E+00, A4 = 1.65738E−03, A6 = 2.09911E−05,
A8 = −1.66275E−07, A10 = −3.69650E−09

Surface No. 5

K = −4.39707E−01, A4 = −2.39404E−05, A6 = 2.26135E−06,
A8 = 0.00000E+00, A10 = 0.00000E+00

TABLE 66

(Various data)

Zooming ratio 4.78672

|  | Wide-angle limit | Middle position | Telephoto limit |
|---|---|---|---|
| Focal length | 4.2681 | 10.4357 | 20.4301 |
| F-number | 2.86927 | 5.02409 | 6.20159 |
| View angle | 43.4719 | 19.4769 | 10.0548 |
| Image height | 3.6000 | 3.6000 | 3.6000 |
| Overall length of lens system | 31.5753 | 31.0990 | 39.8252 |
| BF | 1.02817 | 1.00170 | 1.03473 |
| d4 | 11.4400 | 2.8570 | 0.1500 |
| d11 | 1.2161 | 9.8230 | 23.2974 |
| d13 | 4.2190 | 3.7453 | 1.6711 |

Zoom lens unit data

| Lens unit | Initial surface | Focal length |
|---|---|---|
| 1 | 1 | −9.34613 |
| 2 | 5 | 9.08938 |
| 3 | 12 | 25.75745 |

NUMERICAL EXAMPLE 23

The zoom lens system of Numerical Example 23 corresponds to Embodiment 23 shown in FIG. 67. Table 67 shows the surface data of the zoom lens system of Numerical Example 23. Table 68 shows the aspherical data. Table 69 shows various data.

TABLE 67

(Surface data)

| Surface number | r | d | nd | vd |
|---|---|---|---|---|
| Object surface | ∞ | | | |
| 1* | 34.18200 | 1.35000 | 1.88300 | 40.8 |
| 2* | 4.69900 | 1.88700 | | |
| 3 | 7.07000 | 1.60000 | 1.92287 | 18.9 |
| 4 | 10.87800 | Variable | | |
| 5* | 4.25100 | 2.00000 | 1.77250 | 49.6 |
| 6 | 8.92800 | 0.50000 | 1.64769 | 33.8 |
| 7 | 3.69800 | 0.48000 | | |
| 8 | 8.66500 | 0.50000 | 1.76183 | 26.5 |
| 9 | 4.04000 | 2.00000 | 1.60311 | 60.6 |
| 10 | −12.32600 | 0.30000 | | |
| 11(Diaphragm) | ∞ | Variable | | |
| 12 | 26.45400 | 1.60000 | 1.60311 | 60.6 |
| 13 | −48.99600 | Variable | | |
| 14 | ∞ | 1.40000 | 1.51633 | 64.1 |
| 15 | ∞ | (BF) | | |
| Image surface | ∞ | | | |

TABLE 68

(Aspherical data)

Surface No. 1

K = 0.00000E+00, A4 = 3.62205E−04, A6 = −5.63958E−06,
A8 = 3.53569E−08, A10 = 0.00000E+00

Surface No. 2

K = −1.52605E+00, A4 = 1.70369E−03, A6 = 2.17529E−05,
A8 = −5.40577E−07, A10 = 8.14121E−09

Surface No. 5

K = −4.35512E−01, A4 = −8.44450E−07, A6 = 3.99899E−06,
A8 = 0.00000E+00, A10 = 0.00000E+00

TABLE 69

(Various data)

Zooming ratio 4.76804

|  | Wide-angle limit | Middle position | Telephoto limit |
|---|---|---|---|
| Focal length | 4.7145 | 10.4216 | 22.4791 |
| F-number | 2.82795 | 4.62162 | 6.42143 |
| View angle | 39.1095 | 19.4169 | 9.1025 |
| Image height | 3.6000 | 3.6000 | 3.6000 |
| Overall length of lens system | 31.8271 | 31.1332 | 41.1670 |
| BF | 1.03932 | 1.00578 | 0.97275 |
| d4 | 11.4400 | 3.4367 | 0.1500 |
| d11 | 0.8955 | 8.6718 | 24.7468 |
| d13 | 4.8353 | 4.4019 | 1.6804 |

Zoom lens unit data

| Lens unit | Initial surface | Focal length |
|---|---|---|
| 1 | 1 | −10.05331 |
| 2 | 5 | 9.42654 |
| 3 | 12 | 28.71276 |

NUMERICAL EXAMPLE 24

The zoom lens system of Numerical Example 24 corresponds to Embodiment 24 shown in FIG. 70. Table 70 shows the surface data of the zoom lens system of Numerical Example 24. Table 71 shows the aspherical data. Table 72 shows various data.

TABLE 70

(Surface data)

| Surface number | r | d | nd | vd |
|---|---|---|---|---|
| Object surface | ∞ | | | |
| 1* | 132.95400 | 1.35000 | 1.88300 | 40.8 |
| 2* | 4.68700 | 1.46800 | | |
| 3 | 6.81900 | 1.60000 | 1.92287 | 18.9 |
| 4 | 11.04200 | Variable | | |
| 5* | 4.17000 | 2.00000 | 1.77632 | 52.6 |
| 6 | 10.88700 | 0.50000 | 1.64619 | 31.8 |
| 7 | 3.66300 | 0.48000 | | |
| 8 | 8.27600 | 0.50000 | 1.76287 | 27.7 |
| 9 | 4.01800 | 2.00000 | 1.60281 | 56.0 |
| 10 | −11.07600 | 0.30000 | | |
| 11(Diaphragm) | ∞ | Variable | | |
| 12 | −90.89600 | 1.60000 | 1.60311 | 60.6 |
| 13 | −17.48600 | Variable | | |
| 14 | ∞ | 1.40000 | 1.51633 | 64.1 |
| 15 | ∞ | (BF) | | |
| Image surface | ∞ | | | |

TABLE 71

(Aspherical data)

Surface No. 1

K = 0.00000E+00, A4 = 2.44936E−04, A6 = −4.54400E−06,
A8 = 5.72566E−08, A10 = 0.00000E+00

Surface No. 2

K = −1.48880E+00, A4 = 1.58237E−03, A6 = 2.31084E−06,
A8 = −5.39884E−07, A10 = 4.21354E−08

Surface No. 5

K = −4.35869E−01, A4 = −7.86886E−05, A6 = −3.25838E−06,
A8 = 0.00000E+00, A10 = 0.00000E+00

TABLE 72

(Various data)

Zooming ratio 5.57548

|  | Wide-angle limit | Middle position | Telephoto limit |
|---|---|---|---|
| Focal length | 4.3036 | 10.4658 | 23.9944 |
| F-number | 2.92255 | 5.16214 | 7.21745 |
| View angle | 43.8656 | 19.5147 | 8.6343 |
| Image height | 3.6000 | 3.6000 | 3.6000 |
| Overall length of lens system | 31.2161 | 30.7032 | 41.9501 |
| BF | 1.05074 | 1.06124 | 1.01753 |
| d4 | 11.4400 | 3.5088 | 0.1500 |
| d11 | 0.9832 | 10.2556 | 26.1962 |
| d13 | 4.5442 | 2.6796 | 1.3884 |

Zoom lens unit data

| Lens unit | Initial surface | Focal length |
|---|---|---|
| 1 | 1 | −8.59764 |
| 2 | 5 | 8.56522 |
| 3 | 12 | 35.60713 |

NUMERICAL EXAMPLE 25

The zoom lens system of Numerical Example 25 corresponds to Embodiment 25 shown in FIG. 73. Table 73 shows the surface data of the zoom lens system of Numerical Example 25. Table 74 shows the aspherical data. Table 75 shows various data.

TABLE 73

(Surface data)

| Surface number | r | d | nd | vd |
|---|---|---|---|---|
| Object surface | ∞ | | | |
| 1* | 54.53300 | 1.35000 | 1.88300 | 40.8 |
| 2* | 4.96100 | 1.47200 | | |
| 3 | 6.67300 | 1.60000 | 1.92287 | 18.9 |
| 4 | 10.19200 | Variable | | |
| 5* | 4.20800 | 2.00000 | 1.78129 | 58.0 |
| 6 | 9.60800 | 0.50000 | 1.64147 | 23.9 |
| 7 | 3.58500 | 0.48000 | | |
| 8 | 7.93100 | 0.50000 | 1.75881 | 27.4 |
| 9 | 4.13600 | 2.00000 | 1.60469 | 40.7 |
| 10 | −14.12900 | 0.30000 | | |
| 11(Diaphragm) | ∞ | Variable | | |
| 12 | −154.55700 | 1.60000 | 1.60311 | 60.6 |
| 13 | −16.64500 | Variable | | |

TABLE 73-continued (Surface data)

| Surface number | r | d | nd | vd |
|---|---|---|---|---|
| 14 | ∞ | 1.40000 | 1.51633 | 64.1 |
| 15 | ∞ | (BF) | | |
| Image surface | ∞ | | | |

TABLE 74

(Aspherical data)

Surface No. 1

K = 0.00000E+00, A4 = 2.53590E−04, A6 = −5.06029E−06,
A8 = 7.20897E−08, A10 = 0.00000E+00

Surface No. 2

K = −1.59957E+00, A4 = 1.57219E−03, A6 = 1.11451E−05,
A8 = −8.91772E−07, A10 = 5.36076E−08

Surface No. 5

K = −4.33780E−01, A4 = 2.73110E−06, A6 = 5.63913E−07,
A8 = 0.00000E+00, A10 = 0.00000E+00

TABLE 75

(Various data)

Zooming ratio 5.56401

|  | Wide-angle limit | Middle position | Telephoto limit |
|---|---|---|---|
| Focal length | 4.8460 | 10.4141 | 26.9631 |
| F-number | 2.90201 | 4.44683 | 7.33626 |
| View angle | 39.6112 | 19.5730 | 7.6976 |
| Image height | 3.6000 | 3.6000 | 3.6000 |
| Overall length of lens system | 31.3839 | 28.2301 | 42.7099 |
| BF | 1.04922 | 1.08220 | 0.98344 |
| d4 | 11.4400 | 2.8111 | 0.1500 |
| d11 | 0.5529 | 2.7579 | 28.0785 |
| d13 | 5.1398 | 8.3769 | 0.2960 |

Zoom lens unit data

| Lens unit | Initial surface | Focal length |
|---|---|---|
| 1 | 1 | −9.94113 |
| 2 | 5 | 9.09119 |
| 3 | 12 | 30.79516 |

The following Table 76 shows the corresponding values to the individual conditions in the zoom lens systems of Numerical Examples. Here, in Table 76, $Y_W$ is defined as an amount of movement in a direction perpendicular to the optical axis at the time of maximum blur compensation in the second lens unit with a focal length $f_W$ of the entire system at a wide-angle limit, and indicates a value obtained in a state that the zoom lens system is at a wide-angle limit. That is, a corresponding value $(Y_W/Y_T)/(f_T/f_W)$ at the time of $Y=Y_W$ ($f=f_W$) in the condition formula (3) was obtained.

TABLE 76

(Values corresponding to conditions)

| | Condition | Example 1 | 2 | 3 | 4 | 5 | 6 | 7 | 8 | 9 |
|---|---|---|---|---|---|---|---|---|---|---|
| (1) | $D_2/(I_r \times Z^2)$ | 0.19 | 0.21 | 0.21 | 0.21 | 0.22 | 0.21 | 0.23 | 0.18 | 0.18 |
| (2) | $Y_W$ | 0.0397 | 0.0419 | 0.0419 | 0.0419 | 0.0419 | 0.0511 | 0.0479 | 0.0423 | 0.0430 |
| | $Y_T$ | 0.0820 | 0.0848 | 0.0838 | 0.0838 | 0.0838 | 0.1025 | 0.0935 | 0.0847 | 0.0860 |
| (3) | $(Y_W/Y_T)/(f_T/f_W)$ | 0.096 | 0.103 | 0.105 | 0.105 | 0.106 | 0.104 | 0.111 | 0.093 | 0.090 |
| (4) | $(D_{2T} - D_{2W})/(I_r \times Z^2)$ | 0.21 | 0.22 | 0.23 | 0.23 | 0.23 | 0.23 | 0.25 | 0.21 | 0.20 |
| (5) | $f_{G1}/f_{G2}$ | −1.19 | −1.22 | −1.20 | −1.20 | −1.20 | −1.20 | −1.27 | −1.20 | −1.19 |
| (6) | $f_{G1}/f_{G3}$ | −0.57 | −0.58 | −0.57 | −0.57 | −0.57 | −0.58 | −0.64 | −0.58 | −0.58 |
| (7) | $f_{G2}/f_{G3}$ | 0.48 | 0.48 | 0.48 | 0.48 | 0.48 | 0.48 | 0.50 | 0.48 | 0.49 |
| (8) | $f_{G1}/f_T$ | −0.53 | −0.53 | −0.52 | −0.52 | −0.52 | −0.52 | −0.54 | −0.46 | −0.45 |
| (9) | $f_{G2}/f_T$ | 0.44 | 0.43 | 0.44 | 0.44 | 0.44 | 0.44 | 0.43 | 0.39 | 0.37 |
| (10) | $f_{G3}/f_T$ | 0.92 | 0.91 | 0.91 | 0.91 | 0.91 | 0.90 | 0.85 | 0.81 | 0.77 |
| (11) | $(D_{1W} + D_{2W})/(D_{1T} + D_{2T})$ | 0.75 | 0.75 | 0.73 | 0.73 | 0.73 | 0.73 | 0.72 | 0.64 | 0.61 |
| (12) | $(D_{2T} - D_{2W})/f_W$ | 4.67 | 4.22 | 4.26 | 4.26 | 4.24 | 4.30 | 3.99 | 4.92 | 5.09 |
| (13) | $(D_{2T} - D_{2W})/f_T$ | 0.93 | 0.88 | 0.90 | 0.90 | 0.90 | 0.90 | 0.86 | 0.92 | 0.92 |
| (14) | $D_{1T}/I_r$ | 0.05 | 0.05 | 0.05 | 0.05 | 0.05 | 0.05 | 0.05 | 0.05 | 0.05 |
| (15) | $(f_W/I_r) \times (f_W/f_T)$ | 0.22 | 0.25 | 0.25 | 0.25 | 0.25 | 0.25 | 0.29 | 0.23 | 0.22 |
| (16) | $\tan(\omega_W) \times Z$ | 5.23 | 4.59 | 4.53 | 4.51 | 4.51 | 4.58 | 3.76 | 5.09 | 5.09 |
| (17) | $|f_W \times f_{G1}|/I_r^2$ | 3.23 | 3.63 | 3.60 | 3.61 | 3.61 | 3.60 | 4.56 | 3.63 | 3.72 |
| (18) | $(f_W \cdot f_{G2})/I_r^2$ | 2.73 | 2.99 | 3.01 | 3.01 | 3.02 | 2.99 | 3.59 | 3.04 | 3.12 |
| (19) | $(D_{G1} + D_{G2} + D_{G3})/f_T$ | 0.52 | 0.50 | 0.50 | 0.50 | 0.50 | 0.48 | 0.46 | 0.45 | 0.42 |
| (20) | $(F_W \times F_T)/Z$ | 3.54 | 3.82 | 3.75 | 3.76 | 3.77 | 3.68 | 3.86 | 3.76 | 3.86 |
| (21) | $L_T/(I_r \times Z)$ | 1.95 | 2.06 | 2.09 | 2.09 | 2.10 | 2.04 | 2.19 | 1.91 | 1.90 |
| (22) | $(D_{G2} + (D_{G2A}))/(D_{G2A})$ | 12.92 | 12.93 | 12.93 | 12.93 | 12.93 | 12.67 | 13.49 | 12.93 | 12.93 |
| (23) | $f_{L2}/f_{G1}$ | −1.59 | −1.32 | −1.41 | −1.53 | −1.53 | −1.53 | −1.31 | −1.52 | −1.51 |
| (24) | $R_{2F}/f_T$ | 0.44 | 0.37 | 0.43 | 0.42 | 0.42 | 0.42 | 0.38 | 0.37 | 0.35 |
| (25) | $R_{2R}/f_T$ | 0.82 | 0.71 | 0.80 | 0.80 | 0.80 | 0.80 | 0.74 | 0.71 | 0.67 |
| (26) | $f_{L2}/f_T$ | 0.84 | 0.69 | 0.74 | 0.80 | 0.80 | 0.80 | 0.71 | 0.71 | 0.67 |
| (27) | $f_{L3}/f_{G2}$ | 0.68 | 0.77 | 0.68 | 0.68 | 0.64 | 0.68 | 0.65 | 0.67 | 0.67 |
| (28) | $f_{G2a}/f_{G2b}$ | — | — | — | — | — | — | — | — | — |
| (29) | $(1 - m_{2T}) \times m_{3T}$ | 2.70 | 2.70 | 2.72 | 2.71 | 2.71 | 2.71 | 2.64 | 3.04 | 3.14 |
| (30) | $m_{2T}/m_{2W}$ | 4.63 | 4.47 | 4.38 | 4.38 | 4.39 | 4.40 | 4.13 | 4.43 | 4.50 |
| (31) | $(1 - m_{2T}/m_{2W}) \times (m_{3T}/m_{3W})$ | −3.94 | −3.72 | −3.67 | −3.66 | −3.66 | −3.70 | −3.49 | −4.15 | −4.30 |
| (32) | $(1 - m_{2W}) \times m_{3W}$ | 1.11 | 1.14 | 1.14 | 1.14 | 1.15 | 1.14 | 1.12 | 1.14 | 1.14 |
| | $f_T/f_W$ | 5.02 | 4.79 | 4.75 | 4.74 | 4.73 | 4.78 | 4.61 | 5.36 | 5.53 |
| | $\omega_W$ | 46.160 | 43.774 | 43.658 | 43.523 | 43.630 | 43.786 | 39.200 | 43.535 | 42.612 |

| | Condition | Example 10 | 11 | 12 | 13 | 14 | 15 | 16 | 17 | 18 |
|---|---|---|---|---|---|---|---|---|---|---|
| (1) | $D_2/(I_r \times Z^2)$ | 0.24 | 0.19 | 0.20 | 0.23 | 0.17 | 0.21 | 0.19 | 0.19 | 0.24 |
| (2) | $Y_W$ | 0.0524 | 0.0413 | 0.0426 | 0.0476 | 0.0404 | 0.0501 | 0.0458 | 0.0453 | 0.0507 |
| | $Y_T$ | 0.1038 | 0.0829 | 0.0854 | 0.0933 | 0.0841 | 0.1016 | 0.0972 | 0.0966 | 0.0974 |
| (3) | $(Y_W/Y_T)/(f_T/f_W)$ | 0.107 | 0.106 | 0.107 | 0.109 | 0.085 | 0.105 | 0.095 | 0.095 | 0.115 |
| (4) | $(D_{2T} - D_{2W})/(I_r \times Z^2)$ | 0.25 | 0.21 | 0.22 | 0.25 | 0.19 | 0.23 | 0.20 | 0.20 | 0.27 |
| (5) | $f_{G1}/f_{G2}$ | −1.37 | −1.27 | −1.27 | −1.27 | −1.19 | −1.42 | −1.40 | −1.40 | −1.30 |
| (6) | $f_{G1}/f_{G3}$ | −0.59 | −0.65 | −0.58 | −0.63 | −0.48 | −0.70 | −0.68 | −0.71 | −0.67 |
| (7) | $f_{G2}/f_{G3}$ | 0.43 | 0.51 | 0.46 | 0.49 | 0.41 | 0.49 | 0.49 | 0.51 | 0.51 |
| (8) | $f_{G1}/f_T$ | −0.49 | −0.59 | −0.57 | −0.55 | −0.44 | −0.55 | −0.54 | −0.55 | −0.56 |
| (9) | $f_{G2}/f_T$ | 0.36 | 0.47 | 0.45 | 0.44 | 0.37 | 0.39 | 0.39 | 0.40 | 0.43 |
| (10) | $f_{G3}/f_T$ | 0.83 | 0.92 | 0.98 | 0.88 | 0.91 | 0.80 | 0.79 | 0.78 | 0.84 |
| (11) | $(D_{1W} + D_{2W})/(D_{1T} + D_{2T})$ | 0.70 | 0.81 | 0.80 | 0.72 | 0.64 | 0.80 | 0.84 | 0.86 | 0.70 |
| (12) | $(D_{2T} - D_{2W})/f_W$ | 3.57 | 4.21 | 4.06 | 4.12 | 5.18 | 3.54 | 3.78 | 3.78 | 3.94 |
| (13) | $(D_{2T} - D_{2W})/f_T$ | 0.76 | 0.89 | 0.87 | 0.88 | 0.92 | 0.76 | 0.76 | 0.76 | 0.87 |
| (14) | $D_{1T}/I_r$ | 0.05 | 0.05 | 0.05 | 0.05 | 0.05 | 0.05 | 0.05 | 0.05 | 0.05 |
| (15) | $(f_W/I_r) \times (f_W/f_T)$ | 0.33 | 0.24 | 0.25 | 0.28 | 0.21 | 0.30 | 0.26 | 0.26 | 0.31 |
| (16) | $\tan(\omega_W) \times Z$ | 3.36 | 4.54 | 4.10 | 3.67 | 4.97 | 3.64 | 4.29 | 4.38 | 3.38 |
| (17) | $|f_W \times f_{G1}|/I_r^2$ | 5.79 | 3.45 | 3.78 | 4.44 | 3.50 | 5.23 | 4.54 | 4.42 | 4.95 |
| (18) | $(f_W \cdot f_{G2})/I_r^2$ | 4.22 | 2.72 | 2.97 | 3.49 | 2.95 | 3.68 | 3.25 | 3.16 | 3.80 |
| (19) | $(D_{G1} + D_{G2} + D_{G3})/f_T$ | 0.37 | 0.51 | 0.48 | 0.44 | 0.40 | 0.36 | 0.37 | 0.38 | 0.42 |
| (20) | $(F_W \times F_T)/Z$ | 4.61 | 3.82 | 3.83 | 3.89 | 3.88 | 3.82 | 3.48 | 3.56 | 4.16 |
| (21) | $L_T/(I_r \times Z)$ | 2.22 | 1.89 | 1.97 | 2.15 | 1.85 | 2.05 | 1.91 | 1.89 | 2.23 |
| (22) | $(D_{G2} + (D_{G2A}))/(D_{G2A})$ | 17.83 | 16.07 | 16.07 | 16.07 | 16.07 | 4.62 | 4.59 | 4.56 | 16.07 |
| (23) | $f_{L2}/f_{G1}$ | −1.80 | −1.58 | −1.54 | −1.47 | −1.74 | −1.33 | −1.44 | −1.44 | −1.41 |
| (24) | $R_{2F}/f_T$ | 0.27 | 0.43 | 0.41 | 0.37 | 0.34 | 0.34 | 0.35 | 0.36 | 0.36 |
| (25) | $R_{2R}/f_T$ | 0.37 | 0.72 | 0.68 | 0.62 | 0.56 | 0.57 | 0.58 | 0.60 | 0.60 |
| (26) | $f_{L2}/f_T$ | 0.88 | 0.94 | 0.89 | 0.81 | 0.76 | 0.74 | 0.77 | 0.80 | 0.79 |
| (27) | $f_{L3}/f_{G2}$ | 0.67 | 0.56 | 0.55 | 0.53 | 0.59 | 0.78 | 0.79 | 0.79 | 0.50 |
| (28) | $f_{G2a}/f_{G2b}$ | — | — | — | — | — | — | — | — | — |
| (29) | $(1 - m_{2T}) \times m_{3T}$ | 2.86 | 2.51 | 2.58 | 2.61 | 3.17 | 2.61 | 2.65 | 2.59 | 2.58 |
| (30) | $m_{2T}/m_{2W}$ | 4.41 | 4.05 | 4.09 | 4.12 | 4.84 | 4.35 | 4.74 | 4.74 | 3.95 |
| (31) | $(1 - m_{2T}/m_{2W}) \times (m_{3T}/m_{3W})$ | −3.66 | −3.55 | −3.53 | −3.53 | −4.48 | −3.61 | −3.92 | −3.90 | −3.39 |
| (32) | $(1 - m_{2W}) \times m_{3W}$ | 1.20 | 1.07 | 1.11 | 1.10 | 1.17 | 1.13 | 1.13 | 1.11 | 1.09 |
| | $f_T/f_W$ | 4.73 | 4.71 | 4.67 | 4.66 | 5.64 | 4.69 | 4.97 | 4.95 | 4.54 |

TABLE 76-continued (Values corresponding to conditions)

| ω$_W$ | 35.441 | 43.934 | 41.314 | 38.201 | 41.362 | 37.767 | 40.763 | 41.506 | 36.651 |

| | | Example | | | | | | |
|---|---|---|---|---|---|---|---|---|
| | Condition | 19 | 20 | 21 | 22 | 23 | 24 | 25 |
| (1) | $D_2/(I_r \times Z^2)$ | 0.23 | 0.22 | 0.21 | 0.24 | 0.25 | 0.20 | 0.20 |
| (2) | $Y_W$ | 0.0480 | 0.0500 | 0.0334 | 0.0373 | 0.0408 | 0.0341 | 0.0403 |
|     | $Y_T$ | 0.0940 | 0.0989 | 0.0650 | 0.0707 | 0.0762 | 0.0678 | 0.0775 |
| (3) | $(Y_W/Y_T)/(f_T/f_W)$ | 0.110 | 0.089 | 0.107 | 0.110 | 0.112 | 0.090 | 0.093 |
| (4) | $(D_{2T} - D_{2W})/(I_r \times Z^2)$ | 0.25 | 0.24 | 0.24 | 0.27 | 0.29 | 0.23 | 0.25 |
| (5) | $f_{G1}/f_{G2}$ | −1.28 | −1.20 | −1.01 | −1.03 | −1.07 | −1.00 | −1.09 |
| (6) | $f_{G1}/f_{G3}$ | −0.64 | −0.63 | −0.33 | −0.36 | −0.35 | −0.24 | −0.32 |
| (7) | $f_{G2}/f_{G3}$ | 0.50 | 0.52 | 0.33 | 0.35 | 0.33 | 0.24 | 0.30 |
| (8) | $f_{G1}/f_T$ | −0.56 | −0.43 | −0.46 | −0.46 | −0.45 | −0.36 | −0.37 |
| (9) | $f_{G2}/f_T$ | 0.44 | 0.36 | 0.46 | 0.44 | 0.42 | 0.36 | 0.34 |
| (10) | $f_{G3}/f_T$ | 0.87 | 0.68 | 1.40 | 1.26 | 1.28 | 1.48 | 1.14 |
| (11) | $(D_{1W} + D_{2W})/(D_{1T} + D_{2T})$ | 0.72 | 0.52 | 0.60 | 0.54 | 0.50 | 0.47 | 0.42 |
| (12) | $(D_{2T} - D_{2W})/f_W$ | 4.13 | 5.56 | 5.10 | 5.17 | 5.06 | 5.86 | 5.68 |
| (13) | $(D_{2T} - D_{2W})/f_T$ | 0.89 | 0.98 | 1.06 | 1.08 | 1.06 | 1.05 | 1.02 |
| (14) | $D_{1T}/I_r$ | 0.05 | 0.05 | 0.04 | 0.04 | 0.04 | 0.04 | 0.04 |
| (15) | $(f_W/I_r) \times (f_W/f_T)$ | 0.28 | 0.24 | 0.23 | 0.25 | 0.27 | 0.21 | 0.24 |
| (16) | $\tan(\omega_W) \times Z$ | 3.89 | 4.35 | 5.06 | 4.54 | 3.88 | 5.36 | 4.60 |
| (17) | $|f_W \times f_{G1}|/I_r^2$ | 4.47 | 4.54 | 2.61 | 3.08 | 3.66 | 2.86 | 3.72 |
| (18) | $(f_W \cdot f_{G2})/I_r^2$ | 3.50 | 3.77 | 2.57 | 2.99 | 3.43 | 2.84 | 3.40 |
| (19) | $(D_{G1} + D_{G2} + D_{G3})/f_T$ | 0.44 | 0.34 | 0.62 | 0.59 | 0.53 | 0.48 | 0.43 |
| (20) | $(F_W \times F_T)/Z$ | 3.87 | 4.22 | 3.57 | 3.72 | 3.81 | 3.78 | 3.83 |
| (21) | $L_T/(I_r \times Z)$ | 2.17 | 2.16 | 2.15 | 2.31 | 2.40 | 2.09 | 2.13 |
| (22) | $(D_{G2} + (D_{G2A}))/(D_{G2A})$ | 16.07 | 16.07 | 19.27 | 19.27 | 19.27 | 19.27 | 19.27 |
| (23) | $f_{L2}/f_{G1}$ | −1.48 | −1.50 | −1.87 | −1.95 | −1.81 | −1.90 | −1.73 |
| (24) | $R_{2F}/f_T$ | 0.38 | 0.29 | 0.38 | 0.34 | 0.31 | 0.28 | 0.25 |
| (25) | $R_{2R}/f_T$ | 0.62 | 0.49 | 0.64 | 0.53 | 0.48 | 0.46 | 0.38 |
| (26) | $f_{L2}/f_T$ | 0.83 | 0.64 | 0.86 | 0.89 | 0.81 | 0.68 | 0.64 |
| (27) | $f_{L3}/f_{G2}$ | 0.51 | 0.50 | 0.94 | 0.94 | 0.94 | 0.90 | 0.91 |
| (28) | $f_{G2d}/f_{G2b}$ | — | — | 2.35 | 2.51 | 2.33 | 2.20 | 2.33 |
| (29) | $(1 - m_{2T}) \times m_{3T}$ | 2.58 | 3.13 | 3.02 | 3.03 | 3.09 | 3.70 | 3.64 |
| (30) | $m_{2T}/m_{2W}$ | 4.12 | 4.89 | 4.33 | 4.23 | 4.14 | 5.03 | 4.61 |
| (31) | $(1 - m_{2T}/m_{2W}) \times (m_{3T}/m_{3W})$ | −3.52 | −4.51 | −3.69 | −3.65 | −3.62 | −4.47 | −4.36 |
| (32) | $(1 - m_{2W}) \times m_{3W}$ | 1.09 | 1.09 | 1.22 | 1.20 | 1.21 | 1.32 | 1.26 |
|      | $f_T/f_W$ | 4.64 | 5.67 | 4.80 | 4.79 | 4.77 | 5.58 | 5.56 |
|      | $\omega_W$ | 39.994 | 37.452 | 46.521 | 43.472 | 39.109 | 43.866 | 39.611 |

INDUSTRIAL APPLICABILITY

The zoom lens system according to the present invention is applicable to a digital input device such as a digital camera, a mobile telephone, a PDA (Personal Digital Assistance), a surveillance camera in a surveillance system, a Web camera or a vehicle-mounted camera. In particular, the zoom lens system according to the present invention is suitable for a photographing optical system where high image quality is required like in a digital camera.

The invention claimed is:

1. A zoom lens system having a plurality of lens units each composed of at least one lens element and,
in order from an object side to an image side, comprising:
a first lens unit having negative optical power and composed of two lens elements;
a second lens unit having positive optical power; and
a third lens unit having positive optical power, wherein
in zooming from a wide-angle limit to a telephoto limit during image taking, the individual lens units are moved along an optical axis such that an interval between the first lens unit and the second lens unit should decrease and that an interval between the second lens unit and the third lens unit should increase, so that magnification change is achieved, and wherein
on the image side relative to the second lens unit, an aperture diaphragm is arranged that moves along the optical axis integrally with the second lens unit during zooming.

2. The zoom lens system as claimed in claim 1, wherein the first lens unit, in order from the object side to the image side, comprises:
a lens element having negative optical power; and
a meniscus lens element having positive optical power with the convex surface facing the object side.

3. The zoom lens system as claimed in claim 1, wherein the first lens unit includes at least one lens element having an aspheric surface.

4. The zoom lens system as claimed in claim 1, wherein the first lens unit includes at least two aspheric surfaces.

5. The zoom lens system as claimed in claim 1, wherein the third lens unit is composed of one lens element.

6. The zoom lens system as claimed in claim 5, wherein one lens element of the third lens unit includes an aspheric surface.

7. The zoom lens system as claimed in claim 1, wherein the second lens unit is composed of three lens elements.

8. The zoom lens system as claimed in claim 1, wherein the second lens unit is composed of four lens elements.

9. The zoom lens system as claimed in claim 1, wherein the second lens unit moves in a direction perpendicular to the optical axis.

10. The zoom lens system as claimed in claim 9, wherein the entire system satisfies the following conditions (2) and (3):

$$Y_T > Y \quad (2)$$

$$0.05 < (Y/Y_T)/(f_T/f) < 0.60 \quad (3)$$

(here, $Z = f_T/f_W > 4.0$ and $\omega_W > 35$)
where,
f is a focal length of the entire system,
$f_T$ is a focal length of the entire system at a telephoto limit,
Y is an amount of movement in a direction perpendicular to the optical axis at the time of maximum blur compensation in the second lens unit with a focal length f of the entire system,
$Y_T$ is an amount of movement in a direction perpendicular to the optical axis at the time of maximum blur compensation in the second lens unit with a focal length $f_T$ of the entire system at a telephoto limit,
$f_W$ is a focal length of the entire system at a wide-angle limit, and
$\omega_W$ is a half value)(°) of the maximum view angle at a wide-angle limit.

11. An imaging device capable of outputting an optical image of an object as an electric image signal, comprising:
a zoom lens system that forms the optical image of the object; and
an image sensor that converts the optical image formed by the zoom lens system into the electric image signal, wherein
the zoom lens system has a plurality of lens units each composed of at least one lens element and,
in order from an object side to an image side, comprises:
a first lens unit having negative optical power and composed of two lens elements;
a second lens unit having positive optical power; and
a third lens unit having positive optical power, wherein
in zooming from a wide-angle limit to a telephoto limit during image taking, the individual lens units are moved along an optical axis such that an interval between the first lens unit and the second lens unit should decrease and that an interval between the second lens unit and the third lens unit should increase, so that magnification change is achieved, and wherein
on the image side relative to the second lens unit, an aperture diaphragm is arranged that moves along the optical axis integrally with the second lens unit during zooming.

12. A camera for converting an optical image of an object into an electric image signal and then performing at least one of displaying and storing of the converted image signal, comprising
an imaging device including a zoom lens system that forms the optical image of the object and an image sensor that converts the optical image formed by the zoom lens system into the electric image signal, wherein
the zoom lens system has a plurality of lens units each composed of at least one lens element and,
in order from an object side to an image side, comprises:
a first lens unit having negative optical power and composed of two lens elements;
a second lens unit having positive optical power; and
a third lens unit having positive optical power, wherein
in zooming from a wide-angle limit to a telephoto limit during image taking, the individual lens units are moved along an optical axis such that an interval between the first lens unit and the second lens unit should decrease and that an interval between the second lens unit and the third lens unit should increase, so that magnification change is achieved, and wherein
on the image side relative to the second lens unit, an aperture diaphragm is arranged that moves along the optical axis integrally with the second lens unit during zooming.

* * * * *